(12) United States Patent
Rasmus-Vorrath et al.

(10) Patent No.: US 12,345,568 B2
(45) Date of Patent: Jul. 1, 2025

(54) PREDICTIVE MODELING FOR TINTABLE WINDOWS

(71) Applicant: View, Inc., Milpitas, CA (US)

(72) Inventors: Jack Kendrick Rasmus-Vorrath, Mountain House, CA (US); Nidhi Satyacharan Tiwari, San Jose, CA (US); Nitin Khanna, Sunnyvale, CA (US); See Wai Fu, San Jose, CA (US)

(73) Assignee: View Operating Corporation, San Jose, CA (US)

( * ) Notice: Subject to any disclaimer, the term of this patent is extended or adjusted under 35 U.S.C. 154(b) by 75 days.

(21) Appl. No.: 17/760,474

(22) PCT Filed: Feb. 11, 2021

(86) PCT No.: PCT/US2021/017603
§ 371 (c)(1),
(2) Date: Aug. 10, 2022

(87) PCT Pub. No.: WO2021/163287
PCT Pub. Date: Aug. 19, 2021

(65) Prior Publication Data
US 2023/0076947 A1   Mar. 9, 2023

Related U.S. Application Data

(63) Continuation-in-part of application No. 17/250,586, filed as application No. PCT/US2019/046524 on
(Continued)

(51) Int. Cl.
*G01J 1/02* (2006.01)
*E06B 9/24* (2006.01)
(Continued)

(52) U.S. Cl.
CPC .............. *G01J 1/0219* (2013.01); *E06B 9/24* (2013.01); *G01J 1/0242* (2013.01);
(Continued)

(58) Field of Classification Search
CPC ...... G01J 1/0219; G01J 1/0242; G01J 1/4228; G01J 2001/4266; E06B 9/24;
(Continued)

(56) References Cited

U.S. PATENT DOCUMENTS

| 7,747,070 B2 | 6/2010 | Puri |
| 8,249,731 B2 | 8/2012 | Tran et al. |

(Continued)

FOREIGN PATENT DOCUMENTS

| CN | 103562962 A | 2/2014 |
| CN | 106164973 A | 11/2016 |

(Continued)

OTHER PUBLICATIONS

Caliński T. et al., "A dendrite method for cluster analysis," Communications in Statistics, vol. 3, Iss. 1, Jan. 1, 1974, pp. 1-27.
(Continued)

*Primary Examiner* — Zhipeng Wang
(74) *Attorney, Agent, or Firm* — Weaver Austin Villeneuve & Sampson LLP; Brian D. Griedel

(57) ABSTRACT

Disclosed herein are systems, apparatuses, methods, and non-transitory computer readable media related to controlling tint of tintable window(s) that include various predictive modules, and quality assurance related modules.

20 Claims, 40 Drawing Sheets

Related U.S. Application Data

Aug. 14, 2019, now Pat. No. 12,124,147, which is a continuation-in-part of application No. PCT/US2019/023268, filed on Mar. 20, 2019, which is a continuation-in-part of application No. 16/013,770, filed on Jun. 20, 2018, now Pat. No. 10,802,372, which is a continuation of application No. 15/347,677, filed on Nov. 9, 2016, now Pat. No. 10,048,561, which is a continuation-in-part of application No. PCT/US2015/029675, filed on May 7, 2015, said application No. 15/347,677 is a continuation-in-part of application No. 13/772,969, filed on Feb. 21, 2013, now Pat. No. 9,638,978, said application No. PCT/US2019/046524 is a continuation-in-part of application No. 16/438,177, filed on Jun. 11, 2019, now Pat. No. 11,405,465, which is a continuation of application No. 14/391,122, filed as application No. PCT/US2013/036456 on Apr. 12, 2013, now Pat. No. 10,365,531.

(60) Provisional application No. 63/145,333, filed on Feb. 3, 2021, provisional application No. 62/745,920, filed on Oct. 15, 2018, provisional application No. 63/075,569, filed on Sep. 8, 2020, provisional application No. 62/975,677, filed on Feb. 12, 2020, provisional application No. 62/805,841, filed on Feb. 14, 2019, provisional application No. 62/764,821, filed on Aug. 15, 2018, provisional application No. 62/666,572, filed on May 3, 2018, provisional application No. 62/646,260, filed on Mar. 21, 2018, provisional application No. 61/991,375, filed on May 9, 2014, provisional application No. 61/624,175, filed on Apr. 13, 2012.

(51) Int. Cl.
*G01J 1/42* (2006.01)
*G01W 1/12* (2006.01)
*E06B 9/68* (2006.01)

(52) U.S. Cl.
CPC ............ *G01J 1/4228* (2013.01); *G01W 1/12* (2013.01); *E06B 2009/2464* (2013.01); *E06B 2009/6818* (2013.01); *E06B 2009/6827* (2013.01); *G01J 2001/4266* (2013.01)

(58) Field of Classification Search
CPC ..... E06B 2009/2464; E06B 2009/6818; E06B 2009/6827; G01W 1/12
See application file for complete search history.

(56) References Cited

U.S. PATENT DOCUMENTS

| | | | |
|---|---|---|---|
| 8,254,013 B2 | 8/2012 | Mehtani et al. | |
| 8,270,059 B2 | 9/2012 | Friedman et al. | |
| 8,300,298 B2 | 10/2012 | Wang et al. | |
| 8,432,603 B2 | 4/2013 | Wang et al. | |
| 8,582,193 B2 | 11/2013 | Wang et al. | |
| 8,705,162 B2 | 4/2014 | Brown et al. | |
| 8,764,950 B2 | 7/2014 | Wang et al. | |
| 8,764,951 B2 | 7/2014 | Wang et al. | |
| 9,224,091 B2 | 12/2015 | Arsovski | |
| 9,547,821 B1 | 1/2017 | Loreggia et al. | |
| 9,664,974 B2 | 5/2017 | Kozlowski et al. | |
| 10,289,094 B2 | 5/2019 | Ashdown et al. | |
| 10,359,681 B2 | 7/2019 | Brown | |
| 10,365,531 B2 | 7/2019 | Shrivastava et al. | |
| 10,458,863 B2* | 10/2019 | Bernhard | G01L 1/00 |
| 10,495,939 B2 | 12/2019 | Brown et al. | |
| 10,533,892 B2 | 1/2020 | Brown et al. | |
| 10,539,456 B2 | 1/2020 | Klawuhn et al. | |
| 2002/0144831 A1 | 10/2002 | Kalt | |
| 2005/0046584 A1 | 3/2005 | Breed | |
| 2006/0252348 A1* | 11/2006 | Lin | G05B 23/0297 451/41 |
| 2010/0152905 A1 | 6/2010 | Kusiak | |
| 2010/0243427 A1 | 9/2010 | Kozlowski et al. | |
| 2010/0245973 A1 | 9/2010 | Wang et al. | |
| 2010/0274366 A1 | 10/2010 | Fata et al. | |
| 2010/0313476 A1 | 12/2010 | Sethuraman et al. | |
| 2011/0066302 A1 | 3/2011 | Mcewan | |
| 2011/0266137 A1 | 11/2011 | Wang et al. | |
| 2011/0266138 A1 | 11/2011 | Wang et al. | |
| 2011/0267674 A1 | 11/2011 | Wang et al. | |
| 2011/0267675 A1 | 11/2011 | Wang et al. | |
| 2012/0033287 A1 | 2/2012 | Friedman et al. | |
| 2012/0033288 A1 | 2/2012 | Lee et al. | |
| 2012/0062975 A1 | 3/2012 | Mehtani et al. | |
| 2013/0011315 A1 | 1/2013 | Ahmed et al. | |
| 2013/0038093 A1 | 2/2013 | Snider | |
| 2013/0057937 A1* | 3/2013 | Berman | G05B 13/04 359/245 |
| 2013/0271812 A1 | 10/2013 | Brown et al. | |
| 2013/0271813 A1 | 10/2013 | Brown | |
| 2013/0271814 A1 | 10/2013 | Brown | |
| 2013/0271815 A1 | 10/2013 | Pradhan et al. | |
| 2014/0236323 A1 | 8/2014 | Brown et al. | |
| 2015/0097944 A1 | 4/2015 | Palm et al. | |
| 2015/0116811 A1 | 4/2015 | Shrivastava et al. | |
| 2015/0129140 A1 | 5/2015 | Dean et al. | |
| 2015/0195644 A1 | 7/2015 | Wilson et al. | |
| 2015/0338713 A1 | 11/2015 | Brown | |
| 2016/0062332 A1 | 3/2016 | Call et al. | |
| 2016/0203403 A1 | 7/2016 | Nagel et al. | |
| 2016/0258209 A1 | 9/2016 | Berman et al. | |
| 2016/0376831 A1 | 12/2016 | Plummer | |
| 2017/0075183 A1 | 3/2017 | Brown | |
| 2017/0122802 A1 | 5/2017 | Brown et al. | |
| 2017/0242315 A1 | 8/2017 | Ash et al. | |
| 2017/0276542 A1 | 9/2017 | Klawuhn et al. | |
| 2017/0328121 A1 | 11/2017 | Purdy et al. | |
| 2018/0114079 A1 | 4/2018 | Myers et al. | |
| 2018/0119973 A1 | 5/2018 | Rothman et al. | |
| 2018/0141414 A1 | 5/2018 | Lota | |
| 2018/0162203 A1 | 6/2018 | Boehm | |
| 2018/0181085 A1 | 6/2018 | Gabriel et al. | |
| 2018/0187484 A1* | 7/2018 | Hebeisen | G05B 17/02 |
| 2018/0189647 A1* | 7/2018 | Calvo | G06N 3/08 |
| 2018/0195752 A1 | 7/2018 | Sasaki et al. | |
| 2018/0225585 A1 | 8/2018 | Dong et al. | |
| 2018/0306609 A1* | 10/2018 | Agarwal | G06N 20/10 |
| 2018/0373111 A1 | 12/2018 | Brown | |
| 2019/0025661 A9 | 1/2019 | Brown et al. | |
| 2019/0317458 A1* | 10/2019 | Shrivastava | G02F 1/163 |
| 2019/0346734 A1 | 11/2019 | Shrivastava et al. | |
| 2019/0356508 A1 | 11/2019 | Trikha et al. | |
| 2020/0061975 A1 | 2/2020 | Pradhan et al. | |
| 2020/0067870 A1 | 2/2020 | Nagel et al. | |
| 2021/0084056 A1* | 3/2021 | Abbaszadeh | H04L 9/0858 |
| 2021/0088867 A1* | 3/2021 | Nagel | G01N 21/8851 |
| 2021/0173969 A1* | 6/2021 | Abbey | G06F 30/13 |
| 2021/0294172 A1 | 9/2021 | Rasmus-Vorrath et al. | |
| 2022/0113184 A1 | 4/2022 | Zedlitz et al. | |
| 2024/0013162 A1 | 1/2024 | Rasmus-Vorrath et al. | |

FOREIGN PATENT DOCUMENTS

| | | |
|---|---|---|
| CN | 107709688 A | 2/2018 |
| CN | 109275336 A | 1/2019 |
| CN | 110214293 A | 9/2019 |
| DE | 4436658 B4 | 2/2004 |
| EP | 3328000 A1 | 5/2018 |
| KR | 101542684 B1 | 8/2015 |
| KR | 20160127762 A | 11/2016 |
| WO | WO-2013155467 A1 | 10/2013 |
| WO | WO-2015171886 A1 | 11/2015 |
| WO | WO-2017007942 A1 | 1/2017 |
| WO | WO-2017120262 A1 | 7/2017 |
| WO | WO-2018067996 A1 | 4/2018 |
| WO | WO-2018098089 A1 | 5/2018 |

(56) References Cited

FOREIGN PATENT DOCUMENTS

| WO | WO-2019183232 A1 | 9/2019 |
|---|---|---|
| WO | WO-2019183289 A1 | 9/2019 |
| WO | WO-2020037055 A1 | 2/2020 |
| WO | WO-2021163287 A1 | 8/2021 |

OTHER PUBLICATIONS

CN Office Action dated Jun. 29, 2022 in Application No. CN201980064161.8 with English translation.
International Preliminary Report on Patentability dated Feb. 25, 2021 in PCT Application No. PCT/US2019/046524.
International Search Report and Written Opinion (ISA/EP) dated Jan. 31, 2020 in PCT Application No. PCT/US2019/046524.
International Search Report and Written Opinion (ISA/EP) dated Jul. 27, 2021 in PCT Application No. PCT/US2021/017603.
Rousseeuw, P.J., "Silhouettes: a graphical aid to the interpretation and validation of cluster analysis," Journal of Computational and Applied Mathematics, vol. 20, Nov. 1, 1987, pp. 53-65.
U.S. Appl. No. 63/106,058, inventors Rasmus-Vorrath et al., filed Oct. 27, 2020.
CN Office Action dated Jan. 12, 2023 in Application No. CN201980064161.8 with English translation.
CN Office Action dated Mar. 27, 2024 in CN Application No. 202180087451.1 with English translation.
CN Office Action dated May 10, 2023, in application No. CN201980064161.8 with English translation.
EP Extended European Search Report dated Apr. 29, 2024 in EP Application No. 21754072.3.
EP Partial Supplementary European Search report dated Feb. 8, 2024, in EP Application No. 21754072.3.
European Office Action dated Mar. 3, 2023 for EP Application No. EP19759832.9.
International Preliminary Report on Patentability and written opinion dated Aug. 25, 2022 in Application PCT/2021/US17603.
International Preliminary Report on Patentability dated May 11, 2023 in PCT Application No. PCT/US2021/056103.
International Search Report and Written Opinion dated Feb. 11, 2022 issued in Application No. PCT/US2021/056103.
U.S. Final Office Action dated Dec. 7, 2023 in U.S. Appl. No. 17/250,586.
U.S. Non-Final Office Action dated Feb. 29, 2024 in U.S. Appl. No. 18/033,517.
U.S. Non-Final Office Action dated May 4, 2023 in U.S. Appl. No. 17/250,586.
U.S. Notice of Allowance dated Jun. 7, 2024 in U.S. Appl. No. 17/250,586.
U.S. Notice of Allowance dated Mar. 21, 2024 in U.S. Appl. No. 17/250,586.
EP Extended European Search report dated Sep. 3, 2024 in EP Application No. 21887223.2.
U.S. Appl. No. 18/825,235, inventors Rasmus-Vorrath J, et al., filed Sep. 5, 2024.

* cited by examiner

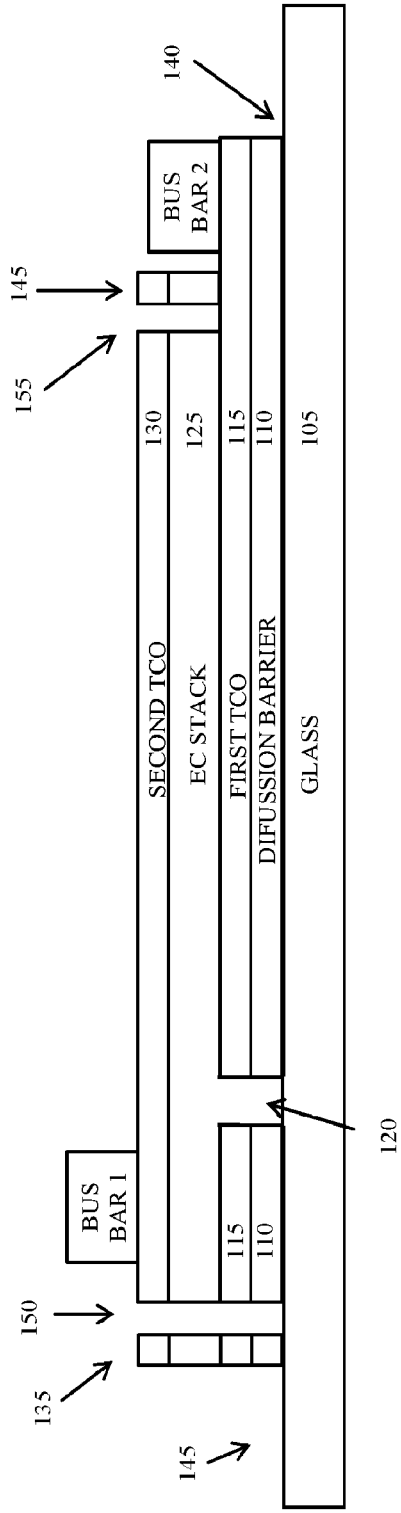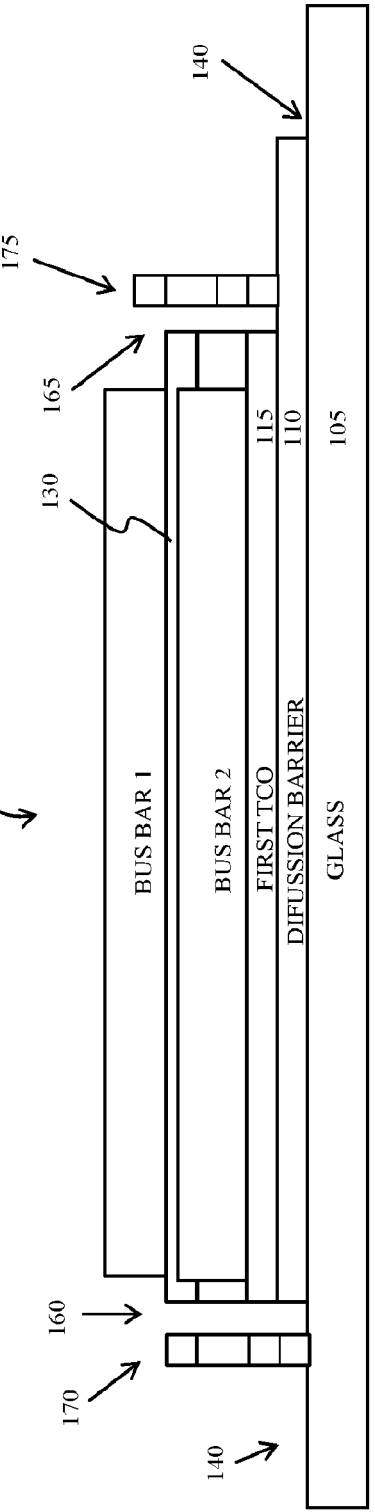

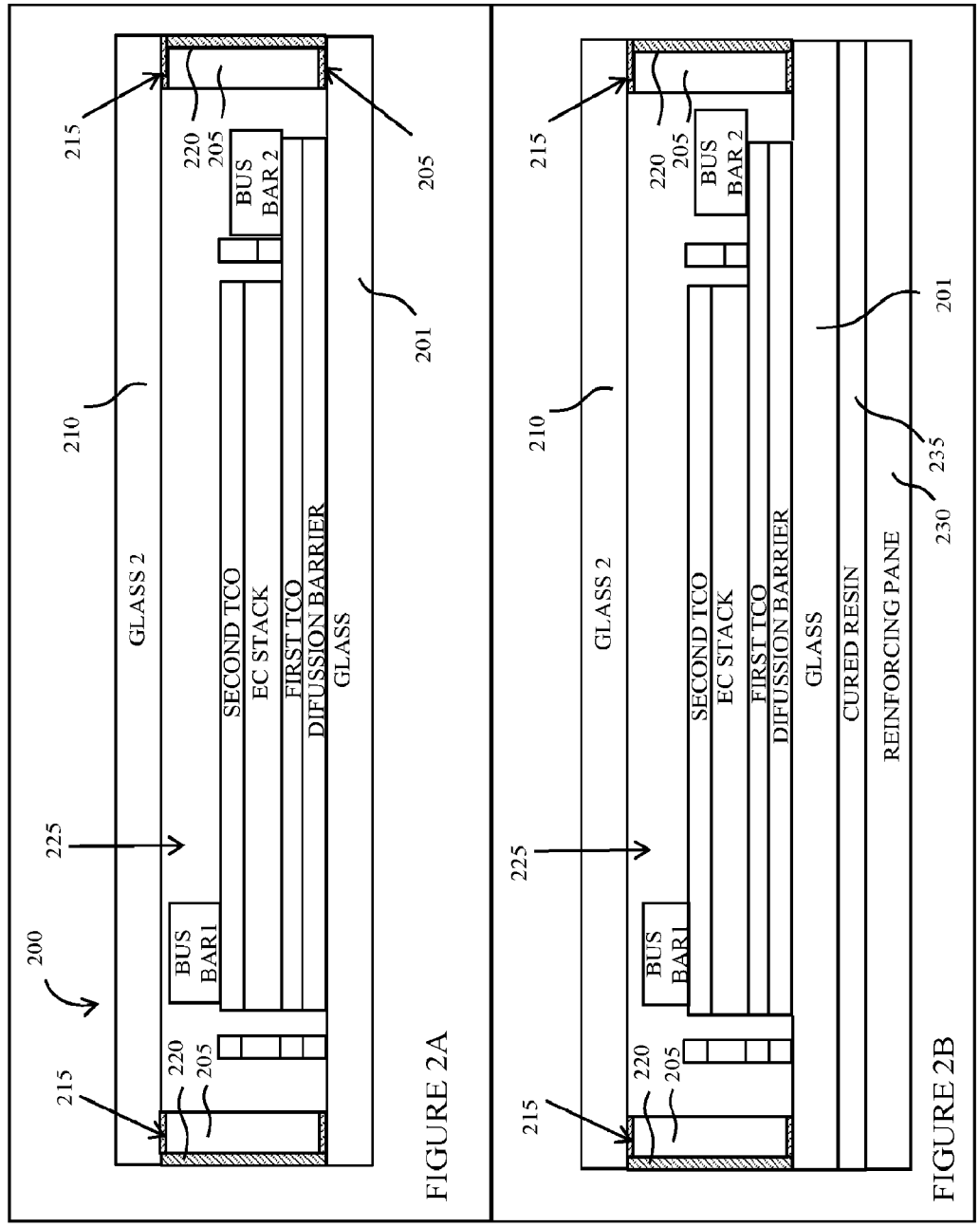

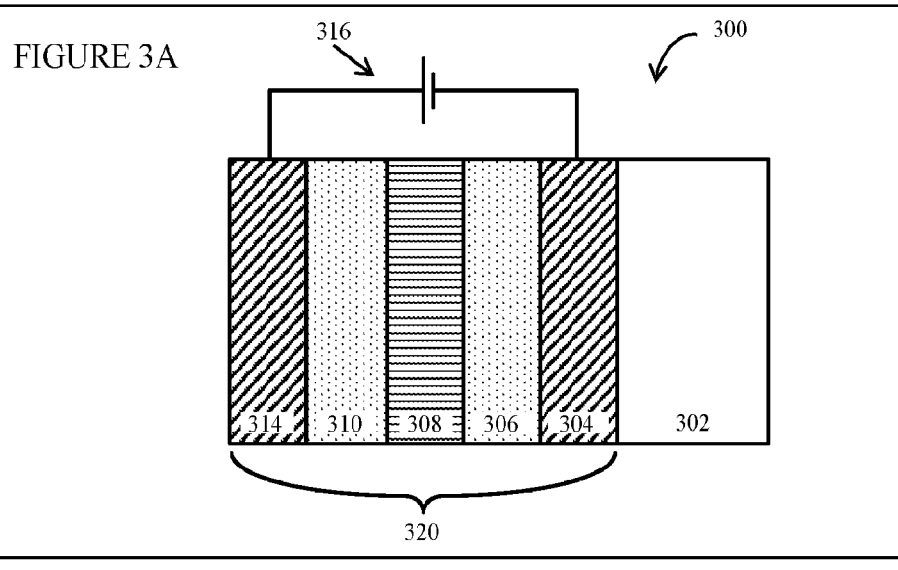
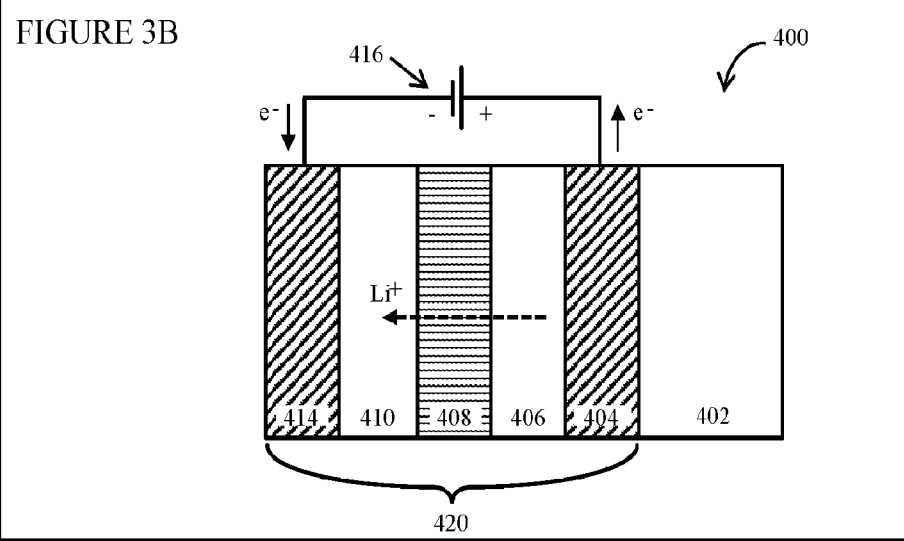
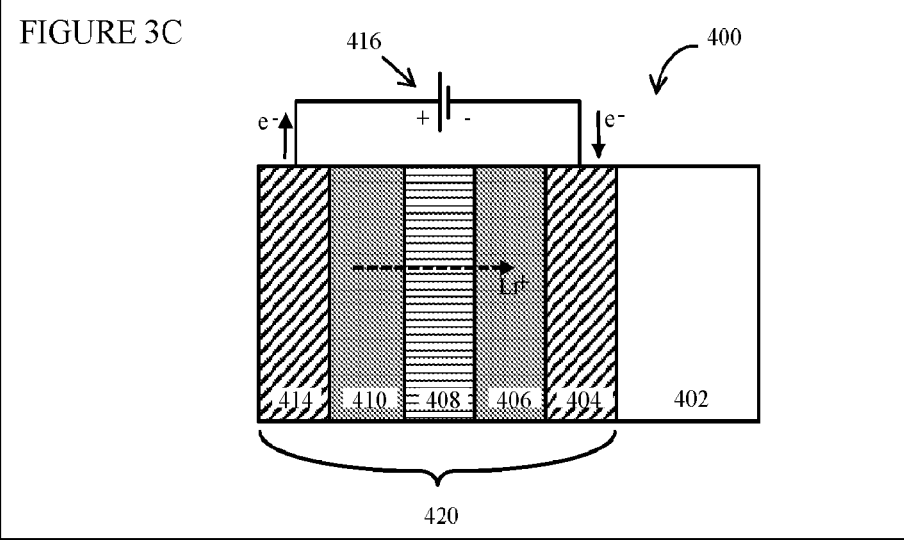

PREDICTIVE MODELING FOR TINTABLE WINDOWS

PRIORITY APPLICATIONS

This application claims benefit from U.S. Provisional Patent Application Ser. No. 63/145,333, filed Feb. 3, 2021, titled "PREDICTIVE MODELING FOR TINTABLE WINDOWS:" from U.S. Provisional Patent Application Ser. No. 62/975,677, filed Feb. 12, 2020, titled "VIRTUAL SKY SENSORS AND SUPERVISED CLASSIFICATION OF SENSOR RADIATION FOR WEATHER MODELING:" from U.S. Provisional Patent Application Ser. No. 63/075,569, filed Sep. 8, 2020, titled "PREDICTIVE MODELING FOR TINTABLE WINDOWS:" is a continuation in part of U.S. patent application Ser. No. 16/949,493, filed Oct. 30, 2020, that is a continuation of U.S. patent application Ser. No. 16/946,168, filed Jun. 8, 2020, that is a continuation of U.S. patent application Ser. No. 16/695,057, filed Nov. 25, 2019, that is a continuation of U.S. patent application Ser. No. 15/514,480, filed Mar. 24, 2017, that is a National Stage Entry of International Patent Application Serial No. PCT/US15/52822, filed Sep. 29, 2015, that claims benefit from U.S. Provisional Patent Application Ser. No. 62/057,104, filed Sep. 29, 2014; is a continuation in part of U.S. patent application Ser. No. 16/469,851, filed Jun. 14, 2019, that is a National Stage Entry of International Patent Application Serial No. PCT/US17/66198, filed Dec. 13, 2017, that (i) claims Priority from U.S. Provisional Patent Application Ser. No. 62/434,826, filed Dec. 15, 2016, and (ii) is a Continuation in part of International Patent Application Serial No. PCT/US16/41344, filed Jul. 7, 2016, that claims Priority from U.S. Provisional Patent Application Ser. No. 62/189,672, filed Jul. 7, 2015; is a continuation in part of U.S. patent application Ser. No. 17/008,342, filed Aug. 31, 2020, that is a continuation of U.S. patent application Ser. No. 16/013,770, filed Jun. 20, 2018, that is a continuation of U.S. patent application Ser. No. 15/347,677, filed Nov. 9, 2016, that (a) is a continuation in part of International Patent Application Serial No. PCT/US15/29675, filed May 7, 2015, that claims Priority from U.S. Provisional Patent Application Ser. No. 61/991,375 filed May 9, 2014, and (b) is a continuation in part of U.S. patent application Ser. No. 13/772,969, filed Feb. 21, 2013; is a continuation in part of U.S. patent application Ser. No. 16/335,222, filed Mar. 20, 2019 that is a National Stage Entry of International Patent Application Serial No. PCT/US17/55631, filed Oct. 6, 2017, that claims Priority from U.S. Provisional Patent Application Ser. No. 62/453,407, filed Feb. 1, 2017; is a continuation in part of U.S. patent application Ser. No. 16/695,004 filed Nov. 25, 2019, that is a continuation of U.S. patent application Ser. No. 15/464,837, filed Mar. 21, 2017, that is a continuation of U.S. patent application Ser. No. 13/772,969, filed Feb. 21, 2013; is a continuation in part of International Patent Application Serial No. PCT/US19/46524, filed Aug. 14, 2019, titled "CONTROL METHODS AND SYSTEMS USING EXTERNAL 3D MODELING AND NEURAL NETWORKS" that claims benefit from (I) U.S. Provisional Patent Application Ser. No. 62/764,821, filed Aug. 15, 2018, titled "CONTROL METHODS AND SYSTEMS USING EXTERNAL 3D MODELING AND NEURAL NETWORKS." (II) U.S. Provisional Patent Application Ser. No. 62/745,920, filed Oct. 15, 2018, titled "CONTROL METHODS AND SYSTEMS USING EXTERNAL 3D MODELING AND NEURAL NETWORKS." and (III) U.S. Provisional Patent Application Ser. No. 62/805,841, filed Feb. 14, 2019, titled "CONTROL METHODS AND SYSTEMS USING EXTERNAL 3D MODELING AND NEURAL NETWORKS:" International Patent Application Serial No. PCT/US19/46524 is also a continuation-in-part of International Patent Application Serial No. PCT/US19/23268, filed Mar. 20, 2019, titled "CONTROL METHODS AND SYSTEMS USING EXTERNAL 3D MODELING AND SCHEDULE-BASED COMPUTING," which claims benefit of U.S. Provisional Patent Application Ser. No. 62/646,260, filed Mar. 21, 2018, titled "METHODS AND SYSTEMS FOR CONTROLLING TINTABLE WINDOWS WITH CLOUD DETECTION." and of U.S. Provisional Patent Application Ser. No. 62/666,572, filed May 3, 2018, titled "CONTROL METHODS AND SYSTEMS USING EXTERNAL 3D MODELING AND SCHEDULE-BASED COMPUTING:" International Patent Application Serial No. PCT/US19/23268 is also a continuation-in-part of U.S. patent application Ser. No. 16/013,770, filed Jun. 20, 2018, titled "CONTROL METHOD FOR TINTABLE WINDOWS," which is a continuation of U.S. patent application Ser. No. 15/347,677, filed Nov. 9, 2016, titled "CONTROL METHOD FOR TINTABLE WINDOWS:" U.S. patent application Ser. No. 15/347,677 is a continuation in part of International Patent Application Serial No. PCT/US15/29675, filed May 7, 2015, titled "CONTROL METHOD FOR TINTABLE WINDOWS." which claims benefit from U.S. Provisional Patent Application Ser. No. 61/991,375, filed May 9, 2014, and titled "CONTROL METHOD FOR TINTABLE WINDOWS:" U.S. patent application Ser. No. 15/347,677 is also a continuation in part of U.S. patent application Ser. No. 13/772,969, filed Feb. 21, 2013, and titled "CONTROL METHOD FOR TINTABLE WINDOWS:" International Patent Application Serial No. PCT/US19/46524 is also a continuation in part of U.S. patent application Ser. No. 16/438,177, filed Jun. 11, 2019, titled "APPLICATIONS FOR CONTROLLING OPTICALLY SWITCHABLE DEVICES." which is a continuation of U.S. patent application Ser. No. 14/391,122, filed Oct. 7, 2014, and titled "APPLICATIONS FOR CONTROLLING OPTICALLY SWITCHABLE DEVICES:" U.S. patent application Ser. No. 14/391,122 is a National Stage Entry of International Patent Application Serial No. PCT/US13/36456, filed Apr. 12, 2013, titled "APPLICATIONS FOR CONTROLLING OPTICALLY SWITCHABLE DEVICES." which claims benefit of U.S. Provisional Patent Application Ser. No. 61/624,175, filed Apr. 13, 2012, titled "APPLICATIONS FOR CONTROLLING OPTICALLY SWITCHABLE DEVICES; each of which is hereby incorporated by reference in its entirety and for all purposes.

BACKGROUND

Electrochromism is a phenomenon in which a material exhibits a (e.g., reversible) electrochemically-mediated change in an optical property when placed in a different electronic state, e.g., by being subjected to a voltage and/or current change. The optical property can be of color, transmittance, absorbance, and/or reflectance. One electrochromic material is tungsten oxide ($WO_3$). Tungsten oxide is a cathodic electrochromic material in which a coloration transition (e.g., transparent to blue) occurs by electrochemical reduction.

Electrochromic materials may be incorporated into, for example, windows for home, commercial and/or other uses. The color, transmittance, absorbance, and/or reflectance of such windows may be changed by inducing a change in the electrochromic material. Electrochromic windows are windows that can be darkened or lightened electronically. A (e.g., small) voltage applied to an electrochromic device of the window will cause it to darken: reversing the voltage causes it to lighten. This capability allows control of the amount of light that passes through the window, and presents an opportunity for electrochromic windows to be used for comfort in an enclosure in which they are disposed, and as energy-saving devices.

While electrochromism was discovered in the 1960s, electrochromic devices, and particularly electrochromic windows, have not begun to realize their full commercial potential despite many recent advances in electrochromic technology, apparatus, computer readable media, and related methods of making and/or using such electrochromic devices.

SUMMARY

Various aspects disclosed herein alleviate as least part of the above referenced shortcomings.

In one embodiment, the present invention comprises a control system comprising: a tintable window: a window controller coupled to the tintable window; and one or more forecasting module coupled to the window controller, wherein the one or more forecasting module comprises control logic configured to process signals from at least one sensor and to provide one or more output indicative of a forecast of an environmental condition at a future time and/or a desired window tint for the tintable window at the future time, and wherein the window controller comprises control logic configured to control the tintable window based at least in part on the one or more output. In one embodiment, the one or more forecasting module comprises a neural network. In one embodiment, the neural network comprises an LSTM network. In one embodiment, the neural network comprises a DNN network. In one embodiment, the forecast of an environmental condition comprises a short term environmental condition and a relatively longer term environmental condition. In one embodiment, the one or more forecasting module is configured to implement machine learning. In one embodiment, the at least one sensor comprises a photosensor and/or an infrared sensor. In one embodiment, the environmental condition comprises a weather condition. In one embodiment, the environmental condition comprises a position of the sun. In one embodiment, the one or more output is based at least in part on a rolling mean of maximum photosensor values and/or a rolling median of minimum infrared sensor values. In one embodiment, the one or more forecasting modules are configured to calculate Barycenter Averages from a times series of the readings.

In one embodiment, the present invention comprises a control system comprising: a plurality of tintable windows; one or more window controller coupled to the plurality of tintable windows: at least one sensor configured to provide a first output representative of one or more environmental condition; and one or more neural network coupled to the one or more window controller, wherein neural network comprises control logic configured to process the first output and to provide a second output representative of a forecast of a future environmental condition, and wherein the one or more window controller comprises control logic configured to control tint states of the plurality of tintable windows based at least in part on the second output. In one embodiment, the future environmental condition comprises a weather condition. In one embodiment, the neural network comprises a supervised neural network. In one embodiment, the neural network includes an LSTM neural network and/or a DNN neural network. In some embodiments, the neural network comprises a dense neural network. In some embodiments, artificial intelligence predictions (e.g., sensor value predictions) are fed into modules C and/or D. In some embodiments, the neural network is devoid of LSTM and/or DNN. In some embodiments, the module (e.g., using artificial intelligence) predicts a sequence of (e.g., sensor) values. In some embodiments, the module finds an average, mean, or median of the sequence of values and designates the average/mean/median as the predicted sensor value (e.g., to be communicated as input to the modules such as C and/or D). In one embodiment, the at least one sensor comprises at least one photosensor and at least one infrared sensor, and wherein the first output comprises a rolling mean of maximum photosensor readings and a rolling median of minimum infrared sensor readings. In one embodiment, the second output is based at least in part on a majority agreement between the LSTM neural network and the DNN neural network.

In one embodiment, the present invention comprises a method of controlling at least one tintable window comprising steps of: using one or more sensor to provide an output representative of a recent environmental condition; coupling the output to control logic: using the control logic to forecast a future environmental condition; and using the control logic to control a tint of the at least one tintable window based at least in part on the forecast of the future environmental condition. In one embodiment, the one or more sensor comprises one or more photosensor and one or more infrared sensor. In one embodiment, the control logic comprises at least one of an LSTM and a DNN neural network. In one embodiment the output comprises a rolling mean of maximum photosensor readings and a rolling median of minimum infrared sensor readings.

In one embodiment, the present invention comprises a method of controlling a tintable window using site specific and seasonally differentiated weather data, comprising: at the site, obtaining environmental readings from at least one sensor over a period N days: storing the readings on a computer readable medium: on a day that is the most recent of the N days, or on a day that is subsequent to the day that is most recent of the N days, processing the readings with control logic configured to provide a first output representative of a distribution of a likely future range of environmental readings from the at least one sensor; and controlling a tint of the tintable window based at least in part on the first output. In one embodiment, the control logic comprises an unsupervised classifier. In one embodiment, the invention further comprises: using the control logic to forecast an environmental condition at the site on the day that is the most recent of the N days, or on the day that is subsequent to the day that is most recent of the N days. In one embodiment, the control logic comprises a neural network. In one embodiment, the control logic comprises one or more forecasting module configured to process signals from the at least one sensor and to provide a second output indicative of a desired window tint for the tintable window at a future time, and wherein the method further comprises controlling the tint of the tintable window based at least in part on the second output. In one embodiment, the one or more forecasting module comprises a neural network. In one embodiment, the neural network comprises an LSTM network. In one embodiment, the neural network comprises a DNN network. In one embodiment, the second output is based at least in part on a majority agreement between an LSTM neural network and a DNN neural network.

In one embodiment, the present invention comprises a building control system, comprising: at least one sensor configured to take environmental readings: storage for storing the environmental readings; and control logic configured to process the environmental readings and to provide a first output representative of a likely future range of environmental readings from the at least one sensor, wherein the first output is used at least in part to control a system of the building. I one embodiment, the system comprises at least one tintable window and at least one tintable window controller. In one embodiment, the control logic comprises one or more neural network configured to process recent environmental readings and to provide a second output representative of a forecast of a future environmental condition at a future time. In one embodiment, at least one window controller is configured to control a tint state of the at least one tintable window based at least in part on the first or second output. In one embodiment, the at least one sensor is located on a roof or a wall of the building. In one embodiment, the stored environmental readings comprise readings taken over multiple days and where the recent environmental readings comprise readings taken on the same day. In one embodiment, the readings taken on the same day comprise readings taken over a window of time that is on the order of minutes. In one embodiment, the window of time is 5 minutes. In one embodiment, the second output is comprised of at least one rule indicative of a desired window tint for the at least one tintable window at the future time, and, using the at least one tintable window controller to control the at least one tintable window to achieve the desired window tint at the future time. In one embodiment, the second output is based at least in part on a majority agreement between an LSTM neural network and a DNN neural network. In one embodiment, the control logic comprises an unsupervised classifier.

Another aspect pertains to a control system comprising a tintable window, a window controller in communication with the tintable window, and another controller or a server in communication with the window controller, and comprising one or more forecasting modules, wherein the one or more forecasting modules comprises control logic configured to use readings from at least one sensor to determine one or more output including a forecast of an environmental condition at a future time and/or a tint level for the tintable window at the future time, and wherein the window controller is configured to transition the tintable window based at least in part on the one or more output. In one example, the one or more forecasting modules comprises a neural network (e.g., a dense neural network or along short-term memory (LSTM) network).

Another aspect pertains to a control system a plurality of tintable windows, one or more window controllers configured to control the plurality of tintable windows, at least one sensor configured to provide a first output, and one or more processors including at least one neural network, and in communication with the one or more window controllers, wherein the at least one neural network is configured to process the first output and to provide a second output including a forecast of a future environmental condition, and wherein the one or more window controllers are configured to control tint states of the plurality of tintable windows based at least in part on the second output.

Another aspect pertains to a method of controlling at least one tintable window. The method comprises steps of: receiving output from one or more sensors, using control logic to forecast a future environmental condition, and determining a control a tint of the at least one tintable window based at least in part on the forecast of the future environmental condition.

Another aspect pertains to a method of controlling a tintable window using site specific and seasonally differentiated weather data, the method comprising: receiving environmental readings from at least one sensor at the site over a period N days, storing the readings on a computer readable medium on a day that is the most recent of the N days, or on a day that is subsequent to the day that is most recent of the N days, processing the readings with control logic to determine a first output representative of a distribution of a likely future range of environmental readings from the at least one sensor, and sending tint instructions to transition the tintable window to a tint level determined at least in part on the first output.

Another aspect pertains to a building control system comprising at least one sensor configured to take environmental readings, a memory for storing the environmental readings, and control logic stored on the memory, and configured to process the environmental readings to determine a first output representative of a likely future range of environmental readings from the at least one sensor, wherein the first output is used at least in part to control a system of the building.

Another aspect pertains to a control system for controlling tintable windows at a building. The control system comprises one or more window controllers and a server or another controller configured to receive historical sensor readings associated with a current or past weather condition, the server or other controller having control logic with at least one neural network configured to forecast a future weather condition based at least in part on the historical sensor readings and determine the tint schedule instructions based at least in part on the future environmental condition. The one or more window controllers are configured to control tint level of the one or more tintable windows of a building based at least in part on one of tint schedule instructions received from the server or other controller and tint schedule instructions received from a geometric model and a clear sky model.

Another aspect pertains to a method of determining tint states for one or more tintable windows. The method comprises: (a) determining a current or future external condition that affects choices of tint states of the one or more tintable windows, (b) selecting from a suite of models a first model determined to perform better than other models from the suite of models under the current or future external conditions, wherein the models of the suite of models are machine learning models trained to determine the tint states, or information used to determine the tint states, of the one or more tintable windows under multiple sets of external conditions and (c) executing the first model and using outputs of the first model to determine current or future tint states for the one or more tintable windows.

Another aspect pertains to a system configured to determine tint states for one or more tintable windows. The system comprising a processor and memory configured to: (a) determine a current or future external condition that affects choices of tint states of the one or more tintable windows (b) select from a suite of models a first model determined to perform better than other models from the suite of models under the current or future external conditions, wherein the models of the suite of models are machine learning models trained to determine the tint states, or information used to determine the tint states, of the one or more tintable windows under multiple sets of external conditions, and (c) execute the first model and using outputs of the first model to determine current or future tint states for the one or more tintable windows.

Another aspect pertains to a method of generating a computational system for determining tint states for one or more tintable windows. The comprises (a) clustering or classifying different types of external conditions based at least in part on historical radiation profiles or patterns and (b) training a machine learning model for each of the different types of external conditions, wherein the machine learning models are trained to determine the tint states, or information used to determine the tint states, of the one or more tintable windows under multiple sets of external conditions.

Another aspect pertains to a method of identifying a subset of feature inputs for a machine learning model configured to determine tint states, or information used to determine the tint states, of one or more tintable windows under multiple sets of external conditions. The method comprises (a) performing a feature elimination procedure on a set of available feature inputs for the machine learning model to thereby remove one or more of the available feature inputs and produce a subset of feature inputs and (b) initializing the machine learning model with the subset of feature inputs.

Another aspect pertains to a system configured to identify a subset of feature inputs for a machine learning model configured to determine tint states, or information used to determine the tint states, of one or more tintable windows under multiple sets of external conditions. The system comprises a processor and memory configured to (a) perform a feature elimination procedure on a set of available feature inputs for the machine learning model to thereby remove one or more of the available feature inputs and produce a subset of feature inputs and (b) initialize the machine learning model with the subset of feature inputs. In another aspect, the present disclosure provides systems, apparatuses (e.g., controllers), and/or non-transitory computer-readable medium (e.g. software) that implement any of the methods disclosed herein.

In another aspect, an apparatus for controlling at least one setting (e.g., level) of one or more devices at a site, comprises one or more controllers having circuitry, which one or more controllers are configured to: (a) operatively couple to a sensor data base configured to store sensor data communicated from a virtual sensor and from one or more data sources; and (b) control, or direct control of, setting of a plurality of devices at a site using sensor data retrieved from the sensor data base.

In some embodiments, the virtual sensor is configured to predict future sensor data. In some embodiments, the future sensor data is based at least in part on readings from one or more physical sensors. In some embodiments, the future sensor data is based at least in part on a machine learning module. In some embodiments, the setting comprises tint levels, wherein the one or more controllers are configured to: determine, or direct determination of, tint levels of a plurality of tintable windows using the sensor data retrieved from the sensor data base; and transition, or direct transition of, the plurality of tintable windows to the tint levels determined. In some embodiments, the sensor data base is configured to store sensor data communicated from the virtual sensor. In some embodiments, the sensor data communicated from the virtual sensor includes test data. In some embodiments, the apparatus further comprises a deep neural network (DNN). In some embodiments, the sensor data communicated from the virtual sensor to the sensor database is forecasted by the deep neural network (DNN). In some embodiments, the sensor data base is configured to store sensor data communicated from the virtual sensor and from the one or more data sources. In some embodiments, the one or more controllers comprise a hierarchical control system configured to transition one or more tintable windows.

In another aspect, a non-transitory computer readable program product for controlling at least one setting of one or more devices at a site, the non-transitory computer readable program product, when read by one or more processors, causes the one or more processors to execute operations of the one or more controllers recited above.

In some embodiments, the one or more processors are operatively coupled to the sensor data base configured to store sensor data communicated from a virtual sensor and/or from one or more data sources. In some embodiments, at least two of the operations are executed by the same processor of the one or more processors. In some embodiments, at least two of the operations are executed by different processors of the one or more processors. In some embodiments, the non-transitory computer readable program product comprises a non-transitory computer readable medium. In some embodiments, the non-transitory computer readable program product comprises a non-transitory computer readable media.

In another aspect, a method for controlling at least one setting of one or more devices at a site, executing operations of the one or more controllers recited above.

In another aspect, a non-transitory computer readable program product for controlling at least one setting of one or more devices at a site, the non-transitory computer readable program product, when read by one or more processors, causes the one or more processors to execute one or more operations comprises: controlling, or directing control of, settings of a plurality of devices disposed at a site based at least in part on sensor data retrieved from a sensor data base, wherein the one or more processors are operatively coupled to the sensor data base configured to store sensor data communicated from a virtual sensor and from one or more data sources.

In some embodiments, the virtual sensor is configured to predict future sensor data. In some embodiments, the future sensor data is based at least in part on readings from one or more physical sensors. In some embodiments, the future sensor data is based at least in part on a machine learning module.

In another aspect, a method of controlling at least one setting of one or more devices at a site, the method comprises: controlling, or directing control of, settings of a plurality of devices disposed at a site based at least in part on sensor data retrieved from the sensor data base and from a virtual sensor.

In some embodiments, the virtual sensor is configured to predict future sensor data. In some embodiments, the future sensor data is based at least in part on readings from one or more physical sensors. In some embodiments, the future sensor data is based at least in part on a machine learning module.

In another aspect, an apparatus for controlling tint of at least one tintable window, comprises one or more controllers comprising circuitry, which one or more controllers are configured to: (a) operatively couple to a sensor data base configured to (I) store sensor data communicated from a virtual sensor and (II) store sensor data communicated from at least one physical sensor: (b) determine, or direct determination of, a first set of tint states for at least one tintable window at a site (e.g., facility) using the sensor data communicated from the virtual sensor, which first set of tint states comprises one or more first tint states: (c) determine, or direct determination of, a second set of tint states for at least tintable window at the site using the sensor data communicated from the at least one physical sensor, which second set of tint states comprises one or more second tint states; and (d) alter, or direct alternation of, tint of the at least one tintable window based at least in part on (i) the first set of tint states, (ii) the second set of tint states, or (iii) the first set of tint states and the second set of tint states.

In some embodiments, the virtual sensor configured to predict future sensor data. In some embodiments, the future sensor data is based at least in part on readings from one or more physical sensors. In some embodiments, the future sensor data is based at least in part on a machine learning module. In some embodiments, the sensor data communicated from the virtual sensor includes test data. In some embodiments, the test data includes time and/or date stamps and sensor values. In some embodiments, the one or more controllers comprise one or more forecasting modules configured to use sensor data to determine, or direct determination of, one or more outputs including (i) a forecast of an environmental condition at a future time and/or (ii) a tint level for the at least one tintable window at the future time. In some embodiments, the one or more forecasting modules comprises a neural network. In some embodiments, the neural network comprises a deep neural network (DNN). In some embodiments, the at least one physical sensor includes a photosensor and/or an infrared sensor. In some embodiments, the environmental condition comprises a weather condition. In some embodiments, the one or more outputs comprise a rolling value of maximum first readings and/or a rolling value of minimum second sensor readings, wherein the rolling value of maximum first readings comprises a mean, median, or average of the maximum photosensor readings, and wherein the rolling value of minimum second sensor readings comprises a mean, median, or average of the minimum infrared readings. In some embodiments, the one or more outputs comprise a rolling value of maximum photosensor readings and/or a rolling value of minimum infrared sensor readings, wherein the rolling value of maximum photosensor readings comprises a mean, median, or average of the maximum photosensor readings, and wherein the rolling value of minimum infrared sensor readings comprises a mean, median, or average of the minimum infrared readings. In some embodiments, the one or more forecasting modules are configured to calculate a barycenter average from a times series of the readings. In some embodiments, operations (b) and (c) are performed by the same controller of the at least one controller. In some embodiments, operations (b) and (c) are performed by different controllers of the at least one controller.

In another aspect, a non-transitory computer readable program product for controlling tint of at least one tintable window, the non-transitory computer readable program product, when read by one or more processors, causes the one or more processors to execute operations of the one or more controllers (e.g., of the at least one controller) recited above.

In some embodiments, the one or more processors are operatively coupled to a sensor data base configured to (i) store sensor data communicated from a virtual sensor and (ii) store sensor data communicated from at least one physical sensor. In some embodiments, at least two of the operations are executed by the same processor of the one or more processors. In some embodiments, at least two of the operations are executed by different processors of the one or more processors. In some embodiments, the non-transitory computer readable program product comprises a non-transitory computer readable medium. In some embodiments, the non-transitory computer readable program product comprises a non-transitory computer readable media.

In another aspect, a method of controlling tint of at least one tintable window, executing operations of any of the one or more controllers recited above.

In another aspect, a non-transitory computer readable program product for controlling tint of at least one tintable window, the non-transitory computer readable program product, when read by one or more processors, causes the one or more processors to execute operations comprises: (a) determining, or directing determination of, a first set of tint states for at least one tintable window at a site (e.g., facility) using sensor data communicated from a virtual sensor, which first set of tint states comprises one or more first tint states: (b) determining, or directing determination of, a second set of tint states for at least tintable window at the site using the sensor data communicated from the at least one physical sensor, which second set of tint states comprises one or more second tint states; and (c) altering tint of the at least one tintable window based at least in part on (i) the first set of tint states, (ii) the second set of tint states, or (iii) the first set of tint states and the second set of tint states.

In some embodiments, the virtual sensor is configured to predict future sensor data. In some embodiments, the future sensor data is based at least in part on readings from one or more physical sensors. In some embodiments, the future sensor data is based at least in part on a machine learning module.

In another aspect, a method of controlling tint of at least one tintable window, the method comprises: (a) determining, or directing determination of, a first set of tint states for at least one tintable window at a site (e.g., facility) using sensor data communicated from a virtual sensor, which first set of tint states comprises one or more first tint states: (b) determining, or directing determination of, a second set of tint states for at least tintable window at the site using the sensor data communicated from the at least one physical sensor, which second set of tint states comprises one or more second tint states; and (c) altering tint of the at least one tintable window based at least in part on (i) the first set of tint states, (ii) the second set of tint states, or (iii) the first set of tint states and the second set of tint states.

In some embodiments, the virtual sensor is configured to predict future sensor data. In some embodiments, the future sensor data is based at least in part on readings from one or more physical sensors. In some embodiments, the future sensor data is based at least in part on a machine learning module.

In another aspect, an apparatus for controlling states for the at least one device, the apparatus comprises one or more controllers comprising circuitry, which one or more controllers are configured to: (a) operatively couple to a sensor data base configured to store sensor data communicated from a virtual sky sensor and store sensor data communicated from at least one physical sensor, wherein the sensor data communicated from the virtual sky sensor includes test data: (b) determine, or direct determination of, a first set of control states for at least one device using the test data: (c) determine, or direct determination of, a second set of control states for the at least one device using the sensor data communicated from the at least one physical sensor; and (d) alter, or direct alteration of, state of the at least one device based at least in part on (i) the first set of control states, (ii)

the second set of control states, or (iii) the first set of control states and the second control of tint states.

In some embodiments, the virtual sensor is configured to predict future sensor data. In some embodiments, the virtual sensor is configured to predict future sensor data. In some embodiments, the future sensor data is based at least in part on readings from one or more physical sensors. In some embodiments, the one or more controllers are configured to (I) compare the first set of control states to the second set of control states, and (II) based at least in part on the comparison use, or direct usage of, one of the first set of control states and the second set of control states to control the least one device. In some embodiments, the at least one device comprises at least one tintable window, wherein the first set of control states comprises a first set of tint states, and wherein the second set of control states comprises a second set of tint states. In some embodiments, (b) and (c) are performed by the same controller of the at least one controller. In some embodiments, (b) and (c) are performed by different controllers of the at least one controller.

In another aspect, a non-transitory computer readable program product for controlling states for the at least one device, the non-transitory computer readable program product, when read by one or more processors, causes the one or more processors to execute operations of any of the one or more controllers recited above.

In some embodiments, the one or more processors are operatively coupled to a sensor data base configured to (i) store sensor data communicated from a virtual sensor and (ii) store sensor data communicated from at least one physical sensor. In some embodiments, at least two of the operations are executed by the same processor of the one or more processors. In some embodiments, at least two of the operations are executed by different processors of the one or more processors. In some embodiments, the non-transitory computer readable program product comprises a non-transitory computer readable medium. In some embodiments, the non-transitory computer readable program product comprises a non-transitory computer readable media.

In another aspect, a method of controlling states for the at least one device, executing operations of any of the one or more controllers recited above.

In another aspect, a non-transitory computer readable program product for controlling states for the at least one device, the non-transitory computer readable program product, when read by one or more processors, causes the one or more processors to execute operations comprises: (a) determining, or directing determination of, a first set of control states for at least one device using test data that is included in sensor data communicated from the virtual sky sensor: (b) determining, or directing determination of, a second set of control states for the at least one device using sensor data communicated from at least one physical sensor; and (c) altering, or directing alteration of, state of the at least one device based at least in part on (i) the first set of control states, (ii) the second set of control states, or (iii) the first set of control states and the second control of tint states, wherein the one or more processors are operatively couple to the sensor data base configured to (I) store sensor data communicated from the virtual sky sensor and (II) store sensor data communicated from the at least one physical sensor.

In some embodiments, the virtual sensor is configured to predict future sensor data. In some embodiments, the future sensor data is based at least in part on readings from one or more physical sensors. In some embodiments, the future sensor data is based at least in part on a machine learning module.

In another aspect, a method of controlling states for the at least one device, the method comprises: (a) determining, or directing determination of, a first set of control states for at least one device using test data that is included in sensor data communicated from the virtual sky sensor: (b) determining, or directing determination of, a second set of control states for the at least one device using sensor data communicated from at least one physical sensor; and (c) altering, or directing alteration of, state of the at least one device based at least in part on (i) the first set of control states, (ii) the second set of control states, or (iii) the first set of control states and the second control of tint states.

In some embodiments, the virtual sensor is configured to predict future sensor data. In some embodiments, the future sensor data is based at least in part on readings from one or more physical sensors. In some embodiments, the future sensor data is based at least in part on a machine learning module. In some embodiments, (I) the sensor data communicated from the virtual sky sensor and (II) the sensor data communicated from the at least one physical sensor, are stored in a sensor data base.

In another aspect, an apparatus for controlling states for at least one device, comprises one or more controllers comprising circuitry, which one or more controllers are configured to: (a) operatively couple to a sensor data base configured to (i) store sensor data communicated from a virtual sensor and (ii) store sensor data communicated from at least one physical sensor, wherein the sensor data communicated from the virtual sensor includes test data for a first test case and a second test case: (b) determine, or direct determination of, a first set of control states for at least one device using test data for the first test case: (c) determine, or direct determination of, a second set of control states for the at least one device using test data for the second test case; and (d) alter, or direct alteration of, state of the at least one device based at least in part on (i) the first set of control states, (ii) the second set of control states, or (iii) the first set of control states and the second control of tint states.

In some embodiments, the virtual sensor is configured to predict future sensor data. In some embodiments, the future sensor data is based at least in part on readings from one or more physical sensors. In some embodiments, the future sensor data is based at least in part on a machine learning module. In some embodiments, the one or more controllers are configured to compare (i) the first set of control states to (ii) the second set of control states, and based at least in part on the comparison use, or direct usage of, one of the first set of control states and the second set of control states to control the least one device. In some embodiments, the at least one device comprises at least one tintable window, wherein the first set of control states comprises a first set of tint states, and wherein the second set of control states comprises a second set of tint states. In some embodiments, (b) and (d) are performed by the same controller of the at least one controller. In some embodiments, (b) and (d) are performed by different controllers of the at least one controller.

In another aspect, a non-transitory computer readable program product for controlling states for the at least one device, the non-transitory computer readable program product, when read by one or more processors, causes the one or more processors to execute operations of any of the one or more controllers recited above.

In some embodiments, the one or more processors are operatively coupled to a sensor data base configured to (i) store sensor data communicated from a virtual sensor and (ii) store sensor data communicated from at least one physical sensor, wherein the sensor data communicated from the virtual sensor includes test data for a first test case and a second test case. In some embodiments, at least two of the operations are executed by the same processor of the one or more processors. In some embodiments, at least two of the operations are executed by different processors of the one or more processors. In some embodiments, the non-transitory computer readable program product comprises a non-transitory computer readable medium. In some embodiments, the non-transitory computer readable program product comprises a non-transitory computer readable media.

In another aspect, A method of controlling states for the at least one device, executing operations of any of the one or more controllers recite above.

In another aspect, a non-transitory computer readable program product for controlling states for the at least one device, the non-transitory computer readable program product, when read by one or more processors, causes the one or more processors to execute operations comprises: (b) determining, or directing determination of, a first set of control states for at least one device using test data for the first test case: (c) determining, or directing determination of, a second set of control states for the at least one device using test data for the second test case; and (d) altering, or directing alteration of, state of the at least one device based at least in part on (i) the first set of control states, (ii) the second set of control states, or (iii) the first set of control states and the second control of tint states, wherein the one or more processors are operatively coupled to a sensor data base configured to (i) store sensor data communicated from a virtual sensor and (ii) store sensor data communicated from at least one physical sensor, wherein the sensor data communicated from the virtual sensor includes test data for a first test case and a second test case.

In some embodiments, the virtual sensor is configured to predict future sensor data. In some embodiments, the future sensor data is based at least in part on readings from one or more physical sensors. In some embodiments, the future sensor data is based at least in part on a machine learning module.

In another aspect, a method of controlling states for the at least one device, the method comprises: (b) determining, or directing determination of, a first set of control states for at least one device using test data for the first test case: (c) determining, or directing determination of, a second set of control states for the at least one device using test data for the second test case; and (d) altering, or directing alteration of, state of the at least one device based at least in part on (i) the first set of control states, (ii) the second set of control states, or (iii) the first set of control states and the second control of tint states.

In some embodiments, the virtual sensor is configured to predict future sensor data. In some embodiments, the future sensor data is based at least in part on readings from one or more physical sensors. In some embodiments, the future sensor data is based at least in part on a machine learning module. In some embodiments, a sensor data base configured to (i) store sensor data communicated from a virtual sensor and (ii) store sensor data communicated from at least one physical sensor, In some embodiments, the sensor data communicated from the virtual sensor includes test data for a first test case and a second test case.

In another aspect, an apparatus for controlling states for the at least one device, comprises one or more controllers comprising circuitry, which one or more controllers are: (a) configured to operatively couple to a sensor data base configured to store test data communicated from a virtual sensor; and (b) comprise one or more forecasting modules configured to use the test data communicated from the virtual sensor to determine, or facilitate determination of, (I) one or more outputs including a first forecasted environmental condition at a future time and/or (II) a first tint level for the at least one tintable window at the future time.

In some embodiments, the virtual sensor is configured to predict future sensor data. In some embodiments, the future sensor data is based at least in part on readings from one or more physical sensors. In some embodiments, the future sensor data is based at least in part on a machine learning module. In some embodiments, the one or more forecasting modules are configured to use sensor data from readings taken by at least one physical sensor to determine one or more additional outputs. In some embodiments, the future time is a first future time, and wherein the one or more additional output includes a second forecasted environmental condition at a second future time and/or a second tint level for the at least one tintable window at the second future time. In some embodiments, the first future time and the second future time are different future times. In some embodiments, the first future time and the second future time are the same future time. In some embodiments, the virtual sensor is a virtual sky sensor configured to predict sensor data external to a facility at a future time to a facility in which the at least one tintable window is disposed. In some embodiments, the one or more forecasting modules comprises a neural network. In some embodiments, the neural network comprises a deep neural network (DNN). In some embodiments, the one or more forecasting modules includes logic that uses machine learning to determine output. In some embodiments, the at least one sensor includes a photosensor and/or an infrared sensor. In some embodiments, the first forecasted environmental condition and/or the second environmental condition comprises a weather condition. In some embodiments, the one or more output comprises a rolling value of maximum first readings and/or a rolling value of minimum second sensor readings, wherein the rolling value of maximum first readings comprises a mean, median, or average of the maximum photosensor readings, and wherein the rolling value of minimum second sensor readings comprises a mean, median, or average of the minimum infrared readings. In some embodiments, the one or more output comprises a rolling value of maximum photosensor readings and/or a rolling value of minimum infrared sensor readings, wherein the rolling value of maximum photosensor readings comprises a mean, median, or average of the maximum photosensor readings, and wherein the rolling value of minimum infrared sensor readings comprises a mean, median, or average of the minimum infrared readings. In some embodiments, the one or more forecasting modules are configured to calculate a barycenter average from a times series of the readings. In some embodiments, the one or more controllers are configured to control an environment of an enclosure in which the at least one tintable window is disposed.

In another aspect, a non-transitory computer readable program product for controlling states for the at least one device, the non-transitory computer readable program product, when read by one or more processors, causes the one or more processors to execute operations of any of the one or more controllers recited above.

In some embodiments, the one or more processors are operatively coupled to a sensor data base configured to store test data communicated from a virtual sensor. In some embodiments, at least two of the operations are executed by the same processor of the one or more processors. In some embodiments, at least two of the operations are executed by different processors of the one or more processors. In some embodiments, the non-transitory computer readable program product comprises a non-transitory computer readable medium. In some embodiments, the non-transitory computer readable program product comprises a non-transitory computer readable media.

In another aspect, a method of controlling states for the at least one device, executing operations of any of the one or more controllers recited above.

In another aspect, a non-transitory computer readable program product for controlling states for the at least one device, the non-transitory computer readable program product, when read by one or more processors, causes the one or more processors to execute one or more operations, which one or more processors are configured to operatively couple to a sensor data base configured to store test data communicated from a virtual sensor; and which non-transitory computer readable program product comprises one or more forecasting modules configured to use the test data communicated from the virtual sensor to determine, or facilitate determination of, (I) one or more outputs including a first forecasted environmental condition at a future time and/or (II) a first tint level for the at least one tintable window at the future time.

In some embodiments, the virtual sensor is configured to predict future sensor data. In some embodiments, the future sensor data is based at least in part on readings from one or more physical sensors. In some embodiments, the future sensor data is based at least in part on a machine learning module.

In another aspect, a method of determining tint states for one or more tintable windows, the method comprises: (a) generating training data for a plurality of external conditions by labeling sensor data from radiation profiles using external conditions from weather feed data: (b) using the training data generated for the plurality of external conditions to train at least one machine learning model for the plurality of external conditions, wherein the at least one machine learning model is trained to determine the tint states, or information used to determine the tint states, of the one or more tintable windows under the plurality of external conditions; and (c) altering tint of the one or more tintable windows at least in part by using the tint states determined.

In some embodiments, the virtual sensor is configured to predict future sensor data. In some embodiments, the future sensor data is based at least in part on readings from one or more physical sensors. In some embodiments, the plurality of external conditions are weather conditions. In some embodiments, the weather feed data is received from a third-party. In some embodiments, the radiation profiles are segmented according to different types of the plurality of external conditions received from the weather feed data. In some embodiments, the sensor data in each segment is labeled with one of the plurality of external conditions. In some embodiments, the plurality of external conditions includes a sunny condition, a partly cloudy condition, a foggy condition, a rain condition, a hail condition, a thunderstorm condition, and/or a smog condition.

In another aspect, a non-transitory computer readable program product for determining tint states for one or more tintable windows, the non-transitory computer readable program product, when read by one or more processors, cause the one or more processors to execute operations of any of the methods recited above.

In some embodiments, the one or more processors are operatively coupled to the one or more tintable windows. In some embodiments, at least two of the operations are executed by the same processor of the one or more processors. In some embodiments, at least two of the operations are executed by different processors of the one or more processors. In some embodiments, the non-transitory computer readable program product comprises computer readable medium. In some embodiments, the non-transitory computer readable program product comprises a non-transitory computer readable media.

In another aspect, an apparatus for determining tint states for one or more tintable windows, the at least one controller comprising circuitry and is configured to execute operations of any of the methods recited above.

In some embodiments, at least two of the operations are performed by the same controller of the at least one controller. In some embodiments, at least two of the operations are performed by different controllers of the at least one controller.

In another aspect, a non-transitory computer readable program product for determining tint states for one or more tintable windows, the non-transitory computer readable program product, when read by one or more processors, cause the one or more processors to execute operations comprises: (a) generating, or directing generation of, training data for a plurality of external conditions by labeling sensor data from radiation profiles using external conditions from weather feed data: (b) using, or directing utilization of, the training data generated for the plurality of external conditions to train at least one machine learning model for the plurality of external conditions, wherein the at least one machine learning model is trained to determine the tint states, or information used to determine the tint states, of the one or more tintable windows under the plurality of external conditions; and (c) altering, or directing alteration of, tint of the one or more tintable windows at least in part by using the tint states determined.

In some embodiments, the virtual sensor is configured to predict future sensor data. In some embodiments, the future sensor data is based at least in part on readings from one or more physical sensors.

In another aspect, an apparatus for determining tint states for one or more tintable windows, the apparatus comprises at least one controller having circuitry, which at least one controller is configured to: (a) operatively couple to the one or more tintable windows: (b) generating, or directing generation of, training data for a plurality of external conditions by labeling sensor data from radiation profiles using external conditions from weather feed data: (c) using, or directing utilization of, the training data generated for the plurality of external conditions to train at least one machine learning model for the plurality of external conditions, wherein the at least one machine learning model is trained to determine the tint states, or information used to determine the tint states, of the one or more tintable windows under the plurality of external conditions; and (d) altering, or directing alteration of, tint of the one or more tintable windows at least in part by using the tint states determined.

In some embodiments, the virtual sensor is configured to predict future sensor data. In some embodiments, the future sensor data is based at least in part on readings from one or more physical sensors.

In another aspect, an apparatus for controlling at least one setting of one or more devices at a site, comprises one or more controllers having circuitry, which one or more controllers are configured to: (a) operatively couple to a virtual sensor predicting at a first time predicted sensor data of a physical sensor at a second time: (b) operatively couple to a physical sensor measuring real sensor data at the second time: (c) compare, or direct comparison of the predicted sensor data to the real sensor data to generate a result; and (d) alter, or direct alteration of, one or more operations of the virtual sensor based at least in part on the result to generate an altered virtual sensor; and (e) control, or direct control of, the at least one setting of the one or more devices based at least in part on the altered virtual sensor.

In some embodiments, wherein the predicted sensor data is based at least in part on a machine learning module. In some embodiments, the one or more controllers is configured to use, or direct usage of, the result to monitor over a time window a comparison between (i) successively predicted sensor data that are successively predicted after the second time and (ii) successive real sensor data that are successively taken after the second time, to generate successive results. In some embodiments, alteration of the one or more operations of the virtual sensor is based at least in part on length of the time window. In some embodiments, the one or more controllers is configured to send, or direct sending of, a notification based at least in part on the result. In some embodiments, the at least one controller is configured to utilize, or direct utilization of, data from the virtual sensor and from the physical sensor are utilized to control the at least one setting of the one or more devices at the site. In some embodiments, the one or more controllers utilizes a network. In some embodiments, the one or more devices comprise a tintable window. In some embodiments, the one or more devices comprise a building management system. In some embodiments, the one or more controllers are configured to control an environment of the site. In some embodiments, the virtual sensor utilizes machine learning to predict the sensor data. In some embodiments, at least two of (a) to (e) are performed by the same controller of the at least one controller. In some embodiments, at least two of (a) to (e) are performed by different controllers of the at least one controller.

In another aspect, a non-transitory computer readable program product for controlling at least one setting of one or more devices at a site, the non-transitory computer readable program product, when read by one or more processors, causes the one or more processors to execute operations of any of the one or more controllers recited above.

In some embodiments, the one or more processors are operatively coupled to a virtual sensor predicting at a first time predicted sensor data of a physical sensor at a second time. In some embodiments, at least two of the operations are executed by the same processor of the one or more processors. In some embodiments, at least two of the operations are executed by different processors of the one or more processors. In some embodiments, the non-transitory computer readable program product comprises a non-transitory computer readable medium. In some embodiments, the non-transitory computer readable program product comprises a non-transitory computer readable media.

In another aspect, a non-transitory computer readable program product for controlling at least one setting of one or more devices at a site, the non-transitory computer readable program product, when read by one or more processors, causes the one or more processors to execute operations comprises: (a) comparing, or directing comparison of, predicted sensor data to real sensor data to generate a result, wherein the predicted sensor data are generated by a virtual sensor at a first time, wherein the predicted sensor data is of a physical sensor at a second time after the first time, and wherein the real sensor data are measured by the physical sensor at the second time; and (b) altering, or directing alteration of, one or more operations of a virtual sensor based at least in part on the result to generate an altered virtual sensor; and (c) controlling, or directing control of, the at least one setting of the one or more devices based at least in part on the altered virtual sensor, wherein the one or more processors are operatively coupled to the virtual sensor and to the physical sensor. In some embodiments, the predicted sensor data is based at least in part on a machine learning module.

In another aspect, a method of controlling at least one setting of one or more devices at a site, comprises: (a) predicting at a first time predicted sensor data by using a virtual sensor: (b) using a physical sensor to measure real sensor data at a second time: (c) comparing the predicted sensor data to the real sensor data to generate a result: (d) altering one or more operations of the virtual sensor based at least in part on the result to generate an altered virtual sensor; and (e) controlling the at least one setting of the one or more devices based at least in part on the altered virtual sensor. In some embodiments, the predicted sensor data is based at least in part on a machine learning module.

In another aspect, a non-transitory computer readable program product for controlling at least one level of one or more devices at a site, the non-transitory computer readable program product, when read by one or more processors, cause the one or more processors to execute operations of any of the methods recited above.

In some embodiments, the one or more processors are operatively coupled to the physical sensor. In some embodiments, at least two of the operations are executed by the same processor of the one or more processors. In some embodiments, at least two of the operations are executed by different processors of the one or more processors. In some embodiments, the non-transitory computer readable program product comprises a non-transitory computer readable medium. In some embodiments, the non-transitory computer readable program product comprises a non-transitory computer readable media.

In another aspect, a method of determining gain in daylight and/or glare protection in a facility, the method comprises: (a) using measured sensor data of one or more physical sensors to generate a first instruction to transition a tint for at least one tintable window according to a first logic, which at least one tintable window is disposed in the facility: (b) using virtual sensor data of one or more virtual sensors to generate a second instruction to transition a tint for a tintable window using a second logic; and (c) comparing the first instruction with the second instruction to determine any gain in daylight and/or glare protection in the facility.

In some embodiments, the virtual sensor data comprises predicted future sensor data. In some embodiments, the predicted future sensor data is based at least in part on data from the one or more physical sensors. In some embodiments, the predicted future sensor data is based at least in part on a machine learning module. In some embodiments, the first instruction carries a first timestamp, and wherein the second instruction carries a second timestamp, and wherein comparing the first instruction with the second instruction comprises comparing the first time stamp with the second time stamp. In some embodiments, the one or more physical sensors include a photosensor and/or an infrared sensor. In some embodiments, the method further comprises differentiating tinting the at least one tintable window to a darker tint, from tinting the at least one tintable window to a lighter tint. In some embodiments, the method further comprises applying one or more filtering operations to the measured sensor data and/or to the virtual sensor data. In some embodiments, the one or more filtering operations comprise boxcar filtering.

In another aspect, a non-transitory computer readable program product for controlling at least one level of one or more devices at a site, the non-transitory computer readable program product, when read by one or more processors, cause the one or more processors to execute operations of any of the methods recited above.

In some embodiments, the one or more processors are operatively coupled to one or more physical sensors. In some embodiments, at least two of the operations are executed by the same processor of the one or more processors. In some embodiments, at least two of the operations are executed by different processors of the one or more processors. In some embodiments, the non-transitory computer readable program product comprises a non-transitory computer readable medium. In some embodiments, the non-transitory computer readable program product comprises a non-transitory computer readable media.

In another aspect, an apparatus for determining gain in daylight and/or glare protection in a facility, the apparatus comprises at least one controller comprising circuitry, which at least one controller is configured to: (a) operatively couple to at least one physical sensor, at least one tintable window, and at least one virtual sensor: (b) receive, or direct receipt of, measured sensor data of at least one physical sensor: (c) use, or direct usage of, the measured sensor data to generate a first instruction to transition a tint for at least one tintable window according to a first logic, which at least one tintable window is disposed in the facility: (d) receive, or direct receipt of, virtual sensor data of at least one virtual sensor: (e) use, or direct usage of, the virtual sensor data to generate a second instruction to transition a tint for a tintable window using a second logic; and (f) compare, or direct comparison of, the first instruction with the second instruction to determine any gain in daylight and/or glare protection in the facility.

In some embodiments, the virtual sensor data comprises predicted future sensor data. In some embodiments, the predicted future sensor data is based at least in part on data from the one or more physical sensors. In some embodiments, the predicted future sensor data is based at least in part on a machine learning module. In some embodiments, the first instruction carries a first timestamp, and wherein the second instruction carries a second timestamp, and wherein the at least one controller is configured to compare, or direct comparison of, the first instruction with the second instruction at least in part by comparing the first timestamp with the second timestamp. In some embodiments, the one or more physical sensors include a photosensor and/or an infrared sensor. In some embodiments, the at least one controller is configured to differentiate, or direct differentiation of, tinting the at least one tintable window to a darker tint, from tinting the at least one tintable window to a lighter tint. In some embodiments, the at least one controller is configured to apply, or direct application of, one or more filtering operations to the measured sensor data and/or to the virtual sensor data. In some embodiments, the one or more filtering operations comprise boxcar filtering. In some embodiments, at least two of (a) to (f) are performed by the same controller of the at least one controller. In some embodiments, at least two of (a) to (f) are performed by different controllers of the at least one controller.

In another aspect, a non-transitory computer readable program product for controlling at least one level of one or more devices at a site, the non-transitory computer readable program product, when read by one or more processors, cause the one or more processors to execute one or more operations of any of the at least one controller recited above.

In some embodiments, the one or more processors are operatively coupled to one or more physical sensors. In some embodiments, at least two of the one or more operations are executed by the same processor of the one or more processors. In some embodiments, at least two of the one or more operations are executed by different processors of the one or more processors. In some embodiments, the non-transitory computer readable program product comprises a non-transitory computer readable medium. In some embodiments, the non-transitory computer readable program product comprises a non-transitory computer readable media.

In another aspect, a non-transitory computer readable program product for controlling at least one level of one or more devices at a site, the non-transitory computer readable program product, when read by one or more processors, cause the one or more processors to execute one or more operations comprises: (a) receiving, or directing receipt of, measured sensor data of at least one physical sensor: (b) using, or directing usage of, the measured sensor data to generate a first instruction to transition a tint for at least one tintable window according to a first logic, which at least one tintable window is disposed in the facility: (c) receiving, or directing receipt of, virtual sensor data of at least one virtual sensor: (d) using, or directing usage of, the virtual sensor data to generate a second instruction to transition a tint for a tintable window using a second logic; and (e) comparing, or directing comparison of, the first instruction with the second instruction to determine any gain in daylight and/or glare protection in the facility, wherein the one or more processors are operatively coupled to at least one physical sensor, at least one tintable window, and at least one virtual sensor. In some embodiments, the virtual sensor data comprises predicted future sensor data. In some embodiments, the predicted future sensor data is based at least in part on data from the one or more physical sensors. In some embodiments, the predicted future sensor data is based at least in part on a machine learning module.

In another aspect, a method of controlling at least one level of one or more devices at a site, the method comprises: (a) receiving, or directing receipt of, measured sensor data of at least one physical sensor; (b) using, or directing usage of, the measured sensor data to generate a first instruction to transition a tint for at least one tintable window according to a first logic, which at least one tintable window is disposed in the facility: (c) receiving, or directing receipt of, virtual sensor data of at least one virtual sensor: (d) using, or directing usage of, the virtual sensor data to generate a second instruction to transition a tint for a tintable window using a second logic; and (e) comparing, or directing comparison of, the first instruction with the second instruction to determine any gain in daylight and/or glare protection in the facility. In some embodiments, the virtual sensor data comprises predicted future sensor data. In some embodiments, the predicted future sensor data is based at least in part on data from the one or more physical sensors. In some embodiments, the predicted future sensor data is based at least in part on a machine learning module.

In another aspect, the present disclosure provides systems, apparatuses (e.g., controllers), and/or non-transitory computer-readable medium (e.g., software) that implement any of the methods disclosed herein.

In another aspect, the present disclosure provides methods that use any of the systems, computer readable media, and/or apparatuses disclosed herein, e.g., for their intended purpose.

In another aspect, an apparatus comprises at least one controller that is programmed to direct a mechanism used to implement (e.g., effectuate) any of the method disclosed herein, which at least one controller is configured to operatively couple to the mechanism. In some embodiments, at least two operations (e.g., of the method) are directed/executed by the same controller. In some embodiments, at less at two operations are directed/executed by different controllers.

In another aspect, an apparatus comprises at least one controller that is configured (e.g., programmed) to implement (e.g., effectuate) any of the methods disclosed herein. The at least one controller may implement any of the methods disclosed herein. In some embodiments, at least two operations (e.g., of the method) are directed/executed by the same controller. In some embodiments, at less at two operations are directed/executed by different controllers.

In another aspect, a system comprises at least one controller that is programmed to direct operation of at least one another apparatus (or component thereof), and the apparatus (or component thereof), wherein the at least one controller is operatively coupled to the apparatus (or to the component thereof). The apparatus (or component thereof) may include any apparatus (or component thereof) disclosed herein. The at least one controller may be configured to direct any apparatus (or component thereof) disclosed herein. The at least one controller may be configured to operatively couple to any apparatus (or component thereof) disclosed herein. In some embodiments, at least two operations (e.g., of the apparatus) are directed by the same controller. In some embodiments, at less at two operations are directed by different controllers.

In another aspect, a computer software product, comprising a non-transitory computer-readable medium in which program instructions are stored, which instructions, when read by at least one processor (e.g., computer), cause the at least one processor to direct a mechanism disclosed herein to implement (e.g., effectuate) any of the method disclosed herein, wherein the at least one processor is configured to operatively couple to the mechanism. The mechanism can comprise any apparatus (or any component thereof) disclosed herein. In some embodiments, at least two operations (e.g., of the apparatus) are directed/executed by the same processor. In some embodiments, at less at two operations are directed/executed by different processors.

In another aspect, the present disclosure provides a non-transitory computer-readable medium comprising machine-executable code that, upon execution by one or more processors, implements any of the methods disclosed herein. In some embodiments, at least two operations (e.g., of the method) are directed/executed by the same processor. In some embodiments, at less at two operations are directed/executed by different processors.

In another aspect, the present disclosure provides a non-transitory computer-readable medium comprising machine-executable code that, upon execution by one or more processors, effectuates directions of the controller(s) (e.g., as disclosed herein). In some embodiments, at least two operations (e.g., of the controller) are directed/executed by the same processor. In some embodiments, at less at two operations are directed/executed by different processors.

In another aspect, the present disclosure provides a computer system comprising one or more computer processors and a non-transitory computer-readable medium coupled thereto. The non-transitory computer-readable medium comprises machine-executable code that, upon execution by the one or more processors, implements any of the methods disclosed herein and/or effectuates directions of the controller(s) disclosed herein.

The content of this summary section is provided as a simplified introduction to the disclosure and is not intended to be used to limit the scope of any invention disclosed herein or the scope of the appended claims.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

These and other features and embodiments will be described in more detail below with reference to the drawings.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures ("Fig." and "Figs." herein), of which:

FIGS. 1A-1C show schematic diagrams of electrochromic devices formed on glass substrates, e.g., electrochromic lites;

FIGS. 2A and 2B show cross-sectional schematic diagrams of the electrochromic lites as described in relation to FIGS. 1A-1C integrated into an insulated glass unit;

FIG. 3A depicts a schematic cross-section of an electrochromic device;

FIG. 3B depicts a schematic cross-section of an electrochromic device in a bleached state (or transitioning to a bleached state);

FIG. 3C depicts a schematic cross-section of the electrochromic device shown in FIG. 3B, but in a colored state (or transitioning to a colored state);

Figure 1C:
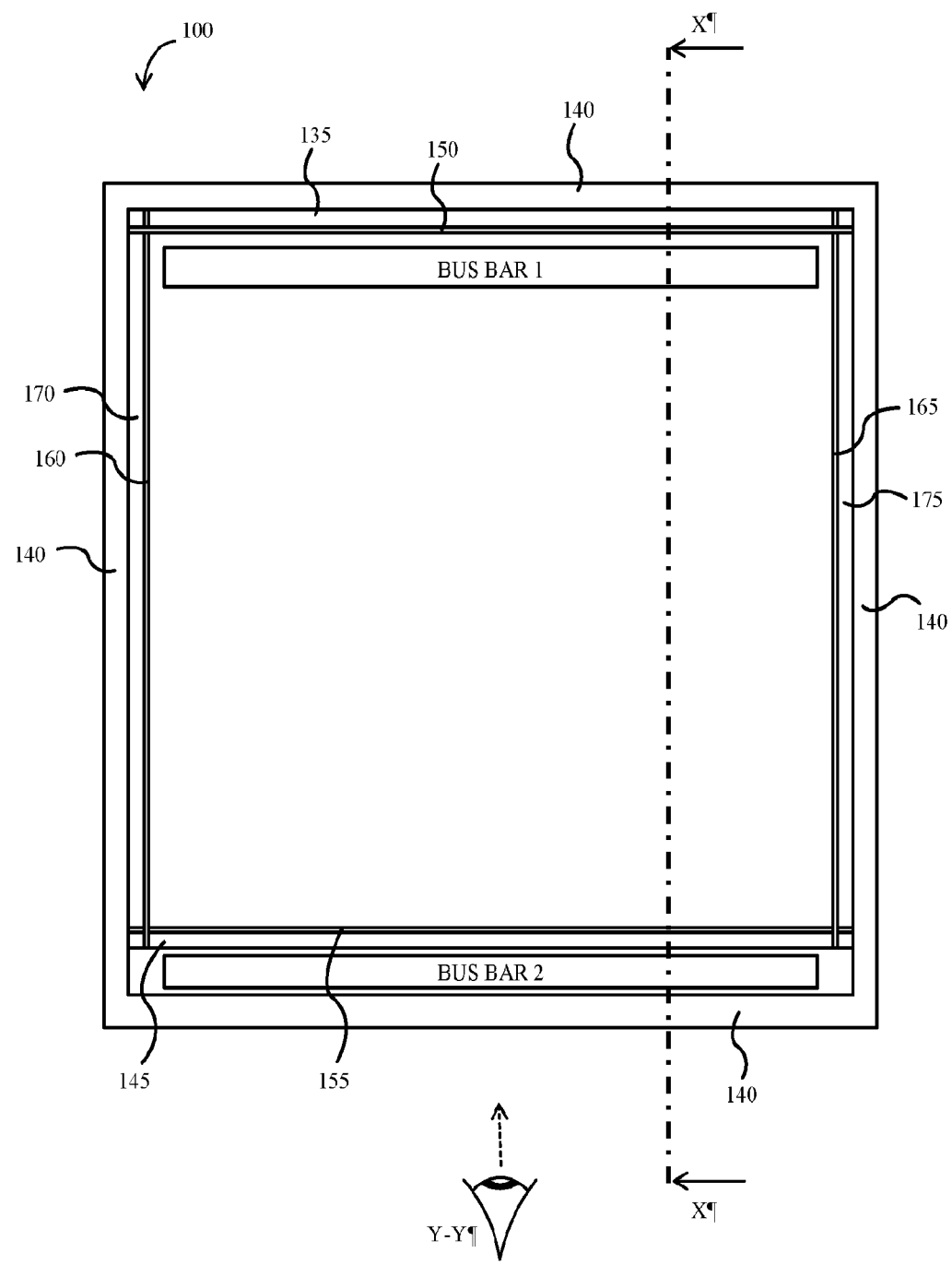

The figures and components therein may not be drawn to scale. Various components of the figures described herein may not be drawn to scale.

DETAILED DESCRIPTION

While various embodiments of the invention have been shown, and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein might be employed.

Terms such as "a," "an," and "the" are not intended to refer to only a singular entity but include the general class of which a specific example may be used for illustration. The terminology herein is used to describe specific embodiments of the invention(s), but their usage does not delimit the invention(s).

The conjunction "and/or" in a phrase such as "including X, Y, and/or Z", refers to in inclusion of any combination or plurality of X, Y, and Z. For example, such phrase is meant to include X. For example, such phrase is meant to include Y. For example, such phrase is meant to include Z. For example, such phrase is meant to include X and Y. For example, such phrase is meant to include X and Z. For example, such phrase is meant to include Y and Z. For example, such phrase is meant to include a plurality of Xs. For example, such phrase is meant to include a plurality of Ys. For example, such phrase is meant to include a plurality of Zs. For example, such phrase is meant to include a plurality of Xs and a plurality of Ys. For example, such phrase is meant to include a plurality of Xs and a plurality of Zs. For example, such phrase is meant to include a plurality of Ys and a plurality of Zs. For example, such phrase is meant to include a plurality of Xs and Y. For example, such phrase is meant to include a plurality of Xs and Z. For example, such phrase is meant to include a plurality of Ys and Z. For example, such phrase is meant to include X and a plurality of Ys. For example, such phrase is meant to include X and a plurality of Zs. For example, such phrase is meant to include Y and a plurality of Zs. The conjunction "and/or" is meant to have the same effect as the phrase "X, Y, Z, or any combination or plurality thereof." The conjunction "and/or" is meant to have the same effect as the phrase "one or more X, Y, Z, or any combination thereof." The conjunction "and/or" is meant to have the same effect as the phrase "at least one X, Y, Z, or any combination thereof." The conjunction "and/or" is meant to have the same effect as the phrase at least one of: X, Y, and Z."

When ranges are mentioned, the ranges are meant to be inclusive, unless otherwise specified. For example, a range between value 1 and value 2 is meant to be inclusive and include value 1 and value 2. The inclusive range will span any value from about value 1 to about value 2. The term "adjacent" or "adjacent to," as used herein, includes "next to," "adjoining," "in contact with," and "in proximity to."

The term "operatively coupled" or "operatively connected" refers to a first element (e.g., mechanism) that is coupled (e.g., connected) to a second element, to allow the intended operation of the second and/or first element. The coupling may comprise physical or non-physical coupling (e.g., communicative coupling). The non-physical coupling may comprise signal-induced coupling (e.g., wireless coupling). Coupled can include physical coupling (e.g., physically connected), or non-physical coupling (e.g., via wireless communication). Operatively coupled may comprise communicatively coupled.

An element (e.g., mechanism) that is "configured to" perform a function includes a structural feature that causes the element to perform this function. A structural feature may include an electrical feature, such as a circuitry or a circuit element. A structural feature may include a circuitry (e.g., comprising electrical or optical circuitry). Electrical circuitry may comprise one or more wires. Optical circuitry may comprise at least one optical element (e.g., beam splitter, mirror, lens and/or optical fiber). A structural feature may include a mechanical feature. A mechanical feature may comprise a latch, a spring, a closure, a hinge, a chassis, a support, a fastener, or a cantilever, and so forth. Performing the function may comprise utilizing a logical feature. A logical feature may include programming instructions. Programming instructions may be executable by at least one processor. Programming instructions may be stored or encoded on a medium accessible by one or more processors.

Additionally, in the following description, the phrases "operable to," "adapted to." "configured to," "designed to," "programmed to," or "capable of" may be used interchangeably where appropriate.

In the following description, numerous specific details are set forth in order to provide a thorough understanding of the presented embodiments. The disclosed embodiments may be practiced without one or more of these specific details. In other instances, known process operations have not been described in detail to not unnecessarily obscure the disclosed embodiments. While the disclosed embodiments will be described in conjunction with the specific embodiments, it will be understood that it is not intended to limit the disclosed embodiments. It should be understood that while certain disclosed embodiments focus on electrochromic windows, the aspects disclosed herein may apply to other types of tintable windows. For example, a tintable window incorporating a liquid crystal device or a suspended particle device, instead of an electrochromic device could be incorporated in any of the disclosed embodiments.

In various embodiments, a network infrastructure supports a control system for one or more windows such as tintable (e.g. electrochromic) windows. The control system may comprise one or more controllers operatively coupled (e.g., directly or indirectly) to one or more windows. While the disclosed embodiments describe tintable windows (also referred to herein as "optically switchable windows," or "smart windows") such as electrochromic windows, the concepts disclosed herein may apply to other types of switchable optical devices comprising a liquid crystal device, an electrochromic device, suspended particle device (SPD), NanoChromics display (NCD), Organic electroluminescent display (OELD), suspended particle device (SPD), NanoChromics display (NCD), or an Organic electroluminescent display (OELD). The display element may be attached to a part of a transparent body (such as the windows). The tintable window may be disposed in a (non-transitory) facility such as a building, and/or in a transitory vehicle such as a car, RV, buss, train, airplane, helicopter, ship, or boat.

In order to orient the reader to the embodiments of apparatuses, systems, computer readable media, and/or methods disclosed herein, a brief discussion of electrochromic devices and window controllers is provided. This initial discussion is provided for context only, and the subsequently described embodiments of systems, window controllers, and methods are not limited to the specific features and fabrication processes of this initial discussion.

Certain disclosed embodiments provide a network infrastructure in the enclosure (e.g., a facility such as a building). The network infrastructure is available for various purposes such as for providing communication and/or power services. The communication services may comprise high bandwidth (e.g., wireless and/or wired) communications services. The communication services can be to occupants of a facility and/or users outside the facility (e.g., building). The network infrastructure may work in concert with, or as a partial replacement of, the infrastructure of one or more cellular carriers. The network infrastructure can be provided in a facility that includes electrically switchable windows. Examples of components of the network infrastructure include a high speed backhaul. The network infrastructure may include at least one cable, switch, physical antenna, transceivers, sensor, transmitter, receiver, radio, processor and/or controller (that may comprise a processor). The network infrastructure may be operatively coupled to, and/or include, a wireless network. The network infrastructure may comprise wiring. One or more sensors can be deployed (e.g., installed) in an environment as part of installing the network and/or after installing the network. The communication services can be to occupants of a facility and/or users outside the facility (e.g., building). The network infrastructure may work in concert with, or as a partial replacement of, the infrastructure of one or more cellular carriers. The network infrastructure can be provided in a facility that includes electrically switchable windows. Examples of components of the network infrastructure include a high speed backhaul. The network infrastructure may include at least one cable, switch, physical antenna, transceivers, sensor, transmitter, receiver, radio, processor and/or controller (that may comprise a processor). The network infrastructure may be operatively coupled to, and/or include, a wireless network. The network infrastructure may comprise wiring. One or more sensors can be deployed (e.g., installed) in an environment as part of installing the network and/or after installing the network. The network may be configured to provide power and/or communication. The network may be operatively coupled to one or more transmitter, transceiver, modem, router, and/or antenna. The network may comprise cabling comprising a twisted wire, coaxial cable, or optical cable. The network may be configured for internet and/or ethernet communication. The network may be configured to support at least third, fourth or fifth generation cellular communication. The network may be configured to coupled one or more controllers. The network may be configured to coupled one or more devices including: tintable windows, sensors, emitters, antenna, and/or media display construct.

In various embodiments, a network infrastructure supports a control system for one or more windows such as tintable (e.g., electrochromic) windows. The control system may comprise one or more controllers operatively coupled (e.g., directly or indirectly) to one or more windows. While the disclosed embodiments describe tintable windows (referred to herein as "optically switchable windows," or "smart windows") such as electrochromic windows the concepts disclosed herein may apply to other types of switchable optical devices comprising a liquid crystal device, an electrochromic device, suspended particle device (SPD). NanoChromics display (NCD), Organic electroluminescent display (OELD), suspended particle device (SPD), NanoChromics display (NCD), or an Organic electroluminescent display (OELD). The display element may be attached to a part of a transparent body (such as the windows). The tintable window may be disposed in a (non-transitory) facility such as a building, and/or in a transitory vehicle such as a car, RV, buss, train, airplane, rocket ship, helicopter, ship, or boat.

In some embodiments, a tintable window exhibits a (e.g., controllable and/or reversible) change in at least one optical property of the window, e.g., when a stimulus is applied. The stimulus can include an optical, electrical and/or magnetic stimulus. For example, the stimulus can include an applied voltage. One or more tintable windows can be used to control lighting and/or glare conditions, e.g., by regulating the transmission of solar energy propagating through them. One or more tintable windows can be used to control a temperature within a building, e.g., by regulating the transmission of solar energy propagating through them. Control of the solar energy may control heat load imposed on the interior of the facility (e.g., building). The control may be manual and/or automatic. The control may be used for maintaining one or more requested (e.g., environmental) conditions, e.g., occupant comfort. The control may include reducing energy consumption of a heating, ventilation, air conditioning and/or lighting systems. At least two of heating, ventilation, and air conditioning may be induced by separate systems. At least two of heating, ventilation, and air conditioning may be induced by one system. The heating, ventilation, and air conditioning may be induced by a single system (abbreviated herein as "HVAC). In some cases, tintable windows may be responsive to (e.g., and communicatively coupled to) one or more environmental sensors and/or user control. Tintable windows may comprise (e.g., may be) electrochromic windows. The windows may be located in the range from the interior to the exterior of a structure (e.g., facility, e.g., building). However, this need not be the case. Tintable windows may operate using liquid crystal devices, suspended particle devices, microelectromechanical systems (MEMS) devices (such as microshutters), or any technology known now, or later developed, that is configured to control light transmission through a window. Windows (e.g., with MEMS devices for tinting) are described in U.S. patent application Ser. No. 14/443,353, filed May 15, 2015, titled "MULTI-PANE WINDOWS INCLUDING ELECTROCHROMIC DEVICES AND ELECTROMECHANICAL SYSTEMS DEVICES," that is incorporated herein by reference in its entirety. In some cases, one or more tintable windows can be located within the interior of a building, e.g., between a conference room and a hallway. In some cases, one or more tintable windows can be used in automobiles, trains, aircraft, and other vehicles. e.g., in lieu of a passive and/or non-tinting window.

A particular example of an electrochromic lite (e.g., window pane) is described with reference to FIGS. 1A-1C, in order to illustrate embodiments described herein. FIG. 1A is a cross-sectional representation (see section cut X-X' of FIG. 1C) of an electrochromic lite 100, which is fabricated starting with a glass sheet 105. FIG. 1B shows an end view (see viewing perspective Y-Y' of FIG. 1C) of electrochromic lite 100, and FIG. 1C shows a top-down view of electrochromic lite 100. FIG. 1A shows the electrochromic lite after fabrication on glass sheet 105, edge deleted to produce area 140, around the perimeter of the lite. The electrochromic lite has been laser scribed and bus bars have been attached. The glass lite 105 has a diffusion barrier 110, and a first transparent conducting oxide layer (TCO) 115, on the diffusion barrier. In this example, the edge deletion process removes both TCO 115 and diffusion barrier 110, but in other embodiments only the TCO is removed, leaving the diffusion barrier intact. The TCO 115 is the first of two conductive layers used to form the electrodes of the electrochromic device fabricated on the glass sheet. In this example, the glass sheet includes underlying glass and the diffusion barrier layer. Thus, in this example, the diffusion barrier is formed, and then the first TCO, an electrochromic stack 125, (e.g., having electrochromic, ion conductor, and counter electrode layers), and a second TCO 130, are formed. In one embodiment, the electrochromic device (electrochromic stack and second TCO) is fabricated in an integrated deposition system where the glass sheet does not leave the integrated deposition system at any time during fabrication of the stack. In one embodiment, the first TCO layer is formed using the integrated deposition system where the glass sheet does not leave the integrated deposition system during deposition of the electrochromic stack and the (second) TCO layer. In one embodiment, all the layers (diffusion barrier, first TCO, electrochromic stack, and second TCO) are deposited in the integrated deposition system where the glass sheet does not leave the integrated deposition system during deposition. In this example, prior to deposition of electrochromic stack 125, an isolation trench 120, is cut through TCO 115 and diffusion barrier 110. Trench 120 is made in contemplation of electrically isolating an area of TCO 115 that will reside under bus bar 1 after fabrication is complete (see FIG. 1A). This can be done to reduce (e.g., avoid) charge buildup and coloration of the electrochromic device under the bus bar, which can be undesirable.

After formation of the electrochromic device, edge deletion processes and additional laser scribing can be performed. FIG. 1A depicts areas 140 where the device has been removed, in this example, from a perimeter region surrounding laser scribe trenches 150, 155, 160, and 165. Trenches 150, 160 and 165 pass through the electrochromic stack and through the first TCO and diffusion barrier. Trench 155 passes through second TCO 130 and the electrochromic stack, but not the first TCO 115. Laser scribe trenches 150, 155, 160, and 165 are made to isolate portions of the electrochromic device, 135, 145, 170, and 175, which were potentially damaged during edge deletion processes from the operable electrochromic device. In this example, laser scribe trenches 150, 160, and 165 pass through the first TCO to aid in isolation of the device (laser scribe trench 155 does not pass through the first TCO, otherwise it may cut off bus bar 2's electrical communication with the first TCO and thus the electrochromic stack). The laser or lasers used for the laser scribe processes may be pulse-type lasers, for example, diode-pumped solid-state lasers. For example, the laser scribe processes can be performed using a suitable laser from IPG Photonics (of Oxford, Massachusetts), or from Ekspla (of Vilnius, Lithuania). Scribing can be performed mechanically, for example, by a diamond tipped scribe. One of ordinary skill in the art would appreciate that the laser scribing processes can be performed at different depths and/or performed in a single process whereby the laser cutting depth is varied, or not, during a continuous path around the perimeter of the electrochromic device. In one embodiment, the edge deletion is performed to the depth of the first TCO.

After laser scribing is complete, electricity distribution units (e.g., bus bars) can be attached. The electrical distribution unit can be penetrating or non-penetrating. For example, a non-penetrating bus bar 1 is applied to the second TCO. Non-penetrating bus bar 2 is applied to an area where the device was not deposited (e.g., from a mask protecting the first TCO from device deposition), in contact with the first TCO or, in this example, where an edge deletion process (e.g., laser ablation using an apparatus having a XY or XYZ galvanometer) was used to remove material down to the first TCO. In this example, both bus bar 1 and bus bar 2 are non-penetrating bus bars. A penetrating bus bar is one that can be pressed into and through the electrochromic stack to make contact with the TCO at the bottom of the stack. A non-penetrating bus bar is one that does not penetrate into the electrochromic stack layers, but rather makes electrical and physical contact on the surface of a conductive layer, for example, a TCO.

The TCO layers can be electrically connected using an electricity distribution units (e.g., bus bar). For example, a bus bar fabricated with screen and lithography patterning methods. In one embodiment, electrical communication is established with the device's transparent conducting layers via silk screening (or using another patterning method) a conductive ink followed by heat curing or sintering the ink. Advantages to using the above described device configuration include simpler manufacturing, for example, and less laser scribing than conventional techniques which use penetrating bus bars.

After the bus bars are connected, the device can be integrated into an insulated glass unit (IGU), which includes, for example, wiring the bus bars and the like. In some embodiments, one or both of the bus bars are inside the finished IGU, however in one embodiment one bus bar is outside the seal of the IGU and one bus bar is inside the IGU. In the former embodiment, area 140 is used to make the seal with one face of the spacer used to form the IGU. Thus, the wires or other connection to the bus bars runs between the spacer and the glass. As many spacers are made of metal (e.g., comprising elemental metal or metal alloy), e.g., stainless steel, which is conductive, it is desirable to take steps to reduce (e.g., avoid) short circuiting due to electrical communication between the bus bar and connector thereto and the metal spacer.

As described herein, after the electricity distribution units (e.g., bus bars) are connected, the electrochromic lite can be integrated into an IGU, which includes, for example, wiring for the electricity distribution units (e.g., bus bars) and the like. In the embodiments described herein, both of the bus bars are inside the primary seal of the finished IGU.

FIG. 2A shows a cross-sectional schematic diagram of the electrochromic window as described in relation to FIGS. 1A-1C integrated into an IGU 200. A spacer 205 is used to separate the electrochromic lite from a second lite 210. Second lite 210 in IGU 200 is a non-electrochromic lite, however, the embodiments disclosed herein are not so limited. For example, lite 210 can have an electrochromic device thereon and/or one or more coatings such as low-E coatings and the like. Lite 201 can be laminated glass, such as depicted in FIG. 2B (lite 201 is laminated to reinforcing pane 230, via resin 235). Between spacer 205 and the first TCO layer of the electrochromic lite is a primary seal material 215. This primary seal material is between spacer 205 and second (e.g., glass) lite 210. Around the perimeter of spacer 205 is a secondary seal 220. Bus bar wiring/leads traverse the seals for connection to a controller. Secondary seal 220 may be much thicker that depicted. These seals aid in keeping moisture out of an interior space 225, of the IGU. They can serve to reduce (e.g., prevent) argon or other (e.g., inert) gas in the interior of the IGU from escaping.

FIG. 3A schematically depicts an electrochromic device 300, in cross-section. Electrochromic device 300 includes a substrate 302, a first conductive layer (CL) 304, an electrochromic layer (EC) 306, an ion conducting layer (IC) 308, a counter electrode layer (CE) 310, and a second conductive layer (CL) 314. Layers 304, 306, 308, 310, and 314 are collectively referred to as an electrochromic stack 320. A voltage source 316 operable to apply an electric potential across electrochromic stack 320 effects the transition of the electrochromic device from, for example, a bleached state to a colored state (depicted). The order of layers can be reversed with respect to the substrate.

In some embodiments, the electrochromic device comprises inorganic or organic material. For example, electrochromic devices having distinct layers (e.g., as described herein) can be fabricated as all solid-state devices and/or all inorganic devices. Such devices and methods of fabricating them are described in more detail in U.S. patent application Ser. No. 12/645,111, filed Dec. 22, 2009, entitled "Fabrication of Low-Defectivity Electrochromic Devices," and naming Mark Kozlowski et al, as inventors, and in U.S. patent application Ser. No. 12/645,159, filed on Dec. 22, 2009, entitled, "Electrochromic Devices,", and naming Zhongchun Wang et al, as inventors, each of which is hereby incorporated by reference in its entirety. It should be understood, that any one or more of the layers in the stack may contain any (e.g., some) amount of organic material. The same can be said for liquids that may be present in one or more layers, e.g., in small amounts. It should be understood that solid state material may be deposited or otherwise formed by processes employing liquid components such as certain processes employing sol-gels or chemical vapor deposition.

It should be understood that the reference to a transition between a bleached state and colored state is non-limiting and suggests only one example, among many, of an electrochromic transition that may be implemented. Unless otherwise specified herein (including the foregoing discussion), whenever reference is made to a bleached-colored transition, the corresponding device or process encompasses other optical state transitions such as non-reflective-reflective, transparent-opaque, etc. Further, the term "bleached" refers to an optically neutral state, for example, uncolored, transparent, or translucent. Unless specified otherwise herein, the "color" of an electrochromic transition is not limited to any particular wavelength or range of wavelengths. For example, the wavelength can be visible, or any other wavelength disclosed herein. As understood by those of skill in the art, the choice of appropriate electrochromic and counter electrode materials governs the relevant optical transition.

In embodiments described herein, the electrochromic device reversibly cycles between a bleached state and a colored state. In some cases, when the device is in a bleached state, a potential is applied to the electrochromic stack 320 such that available ions in the stack reside primarily in the counter electrode 310. When the potential on the electrochromic stack is reversed, the ions are transported across the ion conducting layer 308 to the electrochromic material 306 and cause the material to transition to the colored state. In a similar way, the electrochromic device of embodiments described herein can be reversibly cycled between different tint levels (e.g., bleached state, darkest colored state, and intermediate levels between the bleached state and the darkest colored state).

Referring again to FIG. 3A, voltage source 316 may be configured to operate in conjunction with radiant and other environmental sensors. As described herein, voltage source 316 interfaces with a device controller (not shown in this figure). Additionally, voltage source 316 may interface with an energy management system that controls the electrochromic device according to various criteria such as the time of year, time of day, and measured environmental conditions. Such an energy management system, in conjunction with large area electrochromic devices (e.g., an electrochromic window), can dramatically lower the energy consumption of a building.

Any material having suitable optical, electrical, thermal, and mechanical properties may be used as substrate 302. Such substrates include, for example, glass, plastic, and mirror materials. Suitable glasses include either clear or tinted soda lime glass, including soda lime float glass. The glass may be fortified (e.g., tempered) or untempered.

In many cases, the substrate is a glass pane sized for residential window applications. The size of such glass pane can vary widely depending on the specific needs of the residence. In other cases, the substrate is architectural glass. Architectural glass may be used in commercial buildings. It may be used in residential buildings; and may separate an indoor environment from an outdoor environment. In certain embodiments, the pane (e.g., architectural glass) is at least about 20 inches by 20 inches. The pane may be at least about 80 inches by 120 inches. The window pane may be at least about 2 mm thick, typically from about 3 mm to about 6 mm thick. Electrochromic devices may be scalable to substrates smaller or larger than window pane. Further, the electrochromic device may be provided on a mirror of any size and shape.

On top of substrate 302 is conductive layer 304. In certain embodiments, one or both of the conductive layers 304 and 314 is inorganic and/or solid. Conductive layers 304 and 314 may be made from a number of different materials, including conductive oxides, thin metallic coatings, conductive metal nitrides, and composite conductors. Conductive layers 304 and 314 are transparent at least in the range of wavelengths where electrochromism is exhibited by the electrochromic layer. Transparent conductive oxides include metal oxides and metal oxides doped with one or more metals. Examples of such metal oxides and doped metal oxides include indium oxide, indium tin oxide, doped indium oxide, tin oxide, doped tin oxide, zinc oxide, aluminum zinc oxide, doped zinc oxide, ruthenium oxide, doped ruthenium oxide and the like. Since oxides can be used for these layers, they are sometimes referred to as "transparent conductive oxide" (TCO) layers. Thin metallic coatings that are (e.g., substantially) transparent may be used, as well as combinations of TCO's and metallic coatings.

In some embodiments, the function of the conductive layers is to spread an electric potential provided by voltage source 316 over surfaces of the electrochromic stack 320 to interior regions of the stack, e.g., with relatively little ohmic potential drop. The electric potential can be transferred to the conductive layers though electrical connections to the conductive layers. In some embodiments, bus bars, one in contact with conductive layer 304 and one in contact with conductive layer 314, provide the electric connection between the voltage source 316 and the conductive layers 304 and 314. The conductive layers 304 and 314 may be connected to the voltage source 316, e.g., with (e.g., other) means.

Overlaying conductive layer 304 is electrochromic layer 306. In some embodiments, electrochromic layer 306 includes inorganic and/or solid material. The electrochromic layer may contain any one or more of a number of different electrochromic materials, including metal oxides. Such metal oxides include tungsten oxide ($WO_3$), molybdenum oxide ($MoO_3$), niobium oxide ($Nb_2O_5$), titanium oxide ($TiO_2$), copper oxide (CuO), iridium oxide ($Ir_2O_3$), chromium oxide ($Cr_2O_3$), manganese oxide ($Mn_2O_3$), vanadium oxide ($V_2O_5$), nickel oxide ($Ni_2O_3$), cobalt oxide ($Co_2O_3$) and the like. During operation, electrochromic layer 306 transfers ions to and receives ions from counter electrode layer 310 to cause optical transitions.

In some embodiments, the colorization (or change in any optical property—e.g., absorbance, reflectance, and transmittance) of the electrochromic material is caused by reversible ion insertion into the material (e.g., intercalation) and a corresponding injection of a charge balancing electron. Some fraction of the ions responsible for the optical transition may be irreversibly bound up in the electrochromic material. Some or all of the irreversibly bound ions may be used to compensate "blind charge" in the material. In some electrochromic materials, suitable ions include lithium ions (Li+) and hydrogen ions (H+) (protons). In some cases, other ions will be suitable. In various embodiments, lithium ions are used to produce the electrochromic phenomena. Intercalation of lithium ions into, e.g., tungsten oxide ($WO_{3-y}$ ($0<y\leq\sim0.3$)), causes the tungsten oxide to change from transparent (bleached state) to blue (colored state).

Referring again to FIG. 3A, in electrochromic stack 320, ion conducting layer 308 is sandwiched between electrochromic layer 306 and counter electrode layer 310. In some embodiments, counter electrode layer 310 includes inorganic and/or solid material. The counter electrode layer may include one or more of a number of different materials that serve as a reservoir of ions when the electrochromic device is in the bleached state. During an electrochromic transition initiated by, for example, application of an appropriate electric potential, the counter electrode layer may transfer some or all of the ions it holds to the electrochromic layer, changing the electrochromic layer to, e.g., the colored state. Concurrently, in the case of NiWO, the counter electrode layer colors with the loss of ions.

In some embodiments, suitable materials for the counter electrode complementary to $WO_3$ include nickel oxide (NiO), nickel tungsten oxide (NiWO), nickel vanadium oxide, nickel chromium oxide, nickel aluminum oxide, nickel manganese oxide, nickel magnesium oxide, chromium oxide ($Cr_2O_3$), manganese oxide ($MnO_2$), and/or Prussian blue.

When charge is removed from a counter electrode 310 made of nickel tungsten oxide (ions are transported from counter electrode 310 to electrochromic layer 306), the counter electrode layer will transition from a transparent state to a colored state.

In the depicted electrochromic device, between electrochromic layer 306 and counter electrode layer 310, there is the ion conducting layer 308. Ion conducting layer 308 serves as a medium through which ions are transported (e.g., in the manner of an electrolyte) when the electrochromic device transitions between, e.g., the bleached state and the colored state. Ion conducting layer 308 may be highly conductive to the relevant ions for the electrochromic and the counter electrode layers the ion conductive layer may have sufficiently low electron conductivity that negligible electron transfer takes place during normal operation. A thin ion conducting layer with high ionic conductivity may permit fast ion conduction (e.g., and fast switching for high performance electrochromic devices). In certain embodiments, the ion conducting layer 308 includes inorganic and/or solid material.

Examples of suitable ion conducting layers (for electrochromic devices having a distinct IC layer) include silicates, silicon oxides, tungsten oxides, tantalum oxides, niobium oxides, and/or borates. These materials may be doped with different dopants, including lithium. Lithium doped silicon oxides include lithium silicon-aluminum-oxide. In some embodiments, the ion conducting layer includes a silicate-based structure. In some embodiments, a silicon-aluminum-oxide (SiAlO) is used for the ion conducting layer 308.

Electrochromic device 300 may include one or more additional layers (not shown), such as one or more passive layers. Passive layers (e.g., used to improve certain optical properties) may be included in electrochromic device 300. Passive layers for providing moisture or scratch resistance may be included in electrochromic device 300. For example, the conductive layers may be treated with anti-reflective or protective (e.g., oxide and/or nitride) layers. Other passive layers may serve to hermetically seal electrochromic device 300. Hermetically sealed may comprise gas sealed.

FIG. 3B is a schematic cross-section of an electrochromic device in a bleached state (or transitioning to a bleached state). In accordance with specific embodiments, an electrochromic device 400 includes a tungsten oxide electrochromic layer (EC) 406 and a nickel-tungsten oxide counter electrode layer (CE) 410. Electrochromic device 400 includes a substrate 402, a conductive layer (CL) 404, an ion conducting layer (IC) 408, and conductive layer (CL) 414.

A power source 416 is configured to apply a potential and/or current to an electrochromic stack 420 through suitable connections (e.g., bus bars) to the conductive layers 404 and 414. In some embodiments, the voltage source is configured to apply a potential of a few volts in order to drive a transition of the device from one optical state to another. The polarity of the potential as shown in FIG. 3B is such that the ions (lithium ions in this example) primarily reside (as indicated by the dashed arrow) in nickel-tungsten oxide counter electrode layer 410.

FIG. 3C is a schematic cross-section of electrochromic device 400 shown in FIG. 3B but in a colored state (or transitioning to a colored state). In FIG. 3C, the polarity of voltage source 416 is reversed, so that the electrochromic layer is made more negative to accept additional lithium ions, and thereby transition to the colored state. As indicated by the dashed arrow, lithium ions are transported across ion conducting layer 408 to tungsten oxide electrochromic layer 406. Tungsten oxide electrochromic layer 406 is shown in the colored state. Nickel-tungsten oxide counter electrode 410 is shown in the colored state. As explained herein, nickel-tungsten oxide becomes progressively more opaque as it gives up (de-intercalates) lithium ions. In this example, there is a synergistic effect where the transition to colored states for both layers 406 and 410 are additive toward reducing the amount of light transmitted through the stack and substrate.

As described herein, an electrochromic device may include an electrochromic (EC) electrode layer and a counter electrode (CE) layer separated by an ionically conductive (IC) layer that is highly conductive to ions (e.g., and highly resistive to electrons) The ionically conductive layer may reduce (e.g., prevent) shorting between the electrochromic layer and the counter electrode layer. The ionically conductive layer may allow the electrochromic and counter electrodes to hold a charge (e.g., and maintain their bleached or colored states). In electrochromic devices (e.g., having distinct layers), the components form a stack include the ion conducting layer sandwiched between the electrochromic electrode layer and the counter electrode layer. The boundaries between the (e.g., three) stack components may be defined by abrupt changes in composition and/or microstructure. The EC device may have (e.g., three) distinct layers with (e.g., two) abrupt interfaces.

In accordance with certain embodiments, the counter electrode and electrochromic electrodes are formed immediately adjacent one another, sometimes in direct contact, without separately depositing an ionically conducting layer. In some embodiments, electrochromic devices having an interfacial region rather than a distinct IC layer are employed. Such devices, methods of fabricating them and related apparatuses and software, are described in U.S. Pat. No. 8,300,298 and U.S. patent application Ser. No. 12/772,075, filed Apr. 30, 2010, and U.S. patent application Ser. Nos. 12/814,277 and 12/814,279, filed on Jun. 11, 2010, each of the three patent applications and patent is entitled "Electrochromic Devices," each names Zhongchun Wang et al, as inventors, and each of which is incorporated herein by reference in its entirety.

At least one window controller is used to control the tint level of the electrochromic device of an electrochromic window. In some embodiments, the window controller(s) is able to transition the electrochromic window between two tint states (levels), a bleached state and a colored state. In some embodiments, the controller(s) can additionally transition the electrochromic window (e.g., having a single electrochromic device) to intermediate tint levels. In some embodiments, the at least one controller includes a master controller, and a local controller. In some embodiments, the at least one controller is a hierarchical control system. In some embodiments, the at least one controller comprises a local controller such as a window controller. In some disclosed embodiments, the window controller is able to transition the electrochromic window to two, three, four or more (e.g., distinct) tint levels. In some embodiments, the window controller is able to transition the electrochromic window continuously from a transparent to the darkest tint level. Certain electrochromic windows allow intermediate tint levels by using two (or more) electrochromic lites in a single IGU, where each lite is a two-state lite. This is described in reference to FIGS. 2A and 2B in this section.

As noted above with respect to FIGS. 2A and 2B, in some embodiments, an electrochromic window can include an electrochromic device 400 on one lite of an IGU 200 and another electrochromic device 400 on the other lite of the IGU 200. Such multiple EC devices in an IGU allow for more combinations of tint states. For example, if the window controller is able to transition each electrochromic device between two (e.g., distinct) states (e.g., a bleached state and a colored state), the electrochromic window may be able to attain four different states (tint levels) that include a colored state with both electrochromic devices being colored, a first intermediate state with one electrochromic device being colored, a second intermediate state with the other electrochromic device being colored, and a bleached state with both electrochromic devices being bleached. Embodiments of multi-pane electrochromic windows are further described in U.S. Pat. No. 8,270,059, naming Robin Friedman et al, as inventors, titled "MULTI-PANE ELECTROCHROMIC WINDOWS," which is incorporated herein by reference in its entirety.

In some embodiments, the window controller is able to transition an electrochromic window having an electrochromic device capable of transitioning between two or more tint levels. For example, a window controller may be able to transition the electrochromic window to a bleached state, one or more intermediate levels, and a colored state. In some other embodiments, the window controller is able to transition an electrochromic window incorporating an electrochromic device between any number of tint levels between the bleached state and the colored state. Embodiments of methods and controllers for transitioning an electrochromic window to an intermediate tint level or levels are further described in U.S. Pat. No. 8,254,013, naming Disha Mehtani et al, as inventors, titled "CONTROLLING TRANSITIONS IN OPTICALLY SWITCHABLE DEVICES." which is incorporated herein by reference in its entirety.

In some embodiments, a window controller can power one or more electrochromic devices in an electrochromic window. Such function of the window controller can be augmented with one or more other functions described in more detail below. Local (e.g., window) controllers described herein may not be limited to those that have the function of powering an electrochromic device to which it is associated for the purposes of control. The power source for the electrochromic window may be separate from the window controller, where the controller has its own power source and directs application of power from the window power source to the window. It may be convenient to include a power source with the window controller (e.g., and to configure the controller to power the window directly).

The window controller may be configured to control the functions of a single window or a plurality of electrochromic windows. A window controller may control at least 1, 2, 3, 4, 5, 6, 7, or 8 tintable windows. The local (e.g., window) controller may or may not be integrated into a building control network and/or a building management system (BMS). Window controllers, however, may be integrated into a building control network or a BMS, as described herein.

Figure 4:
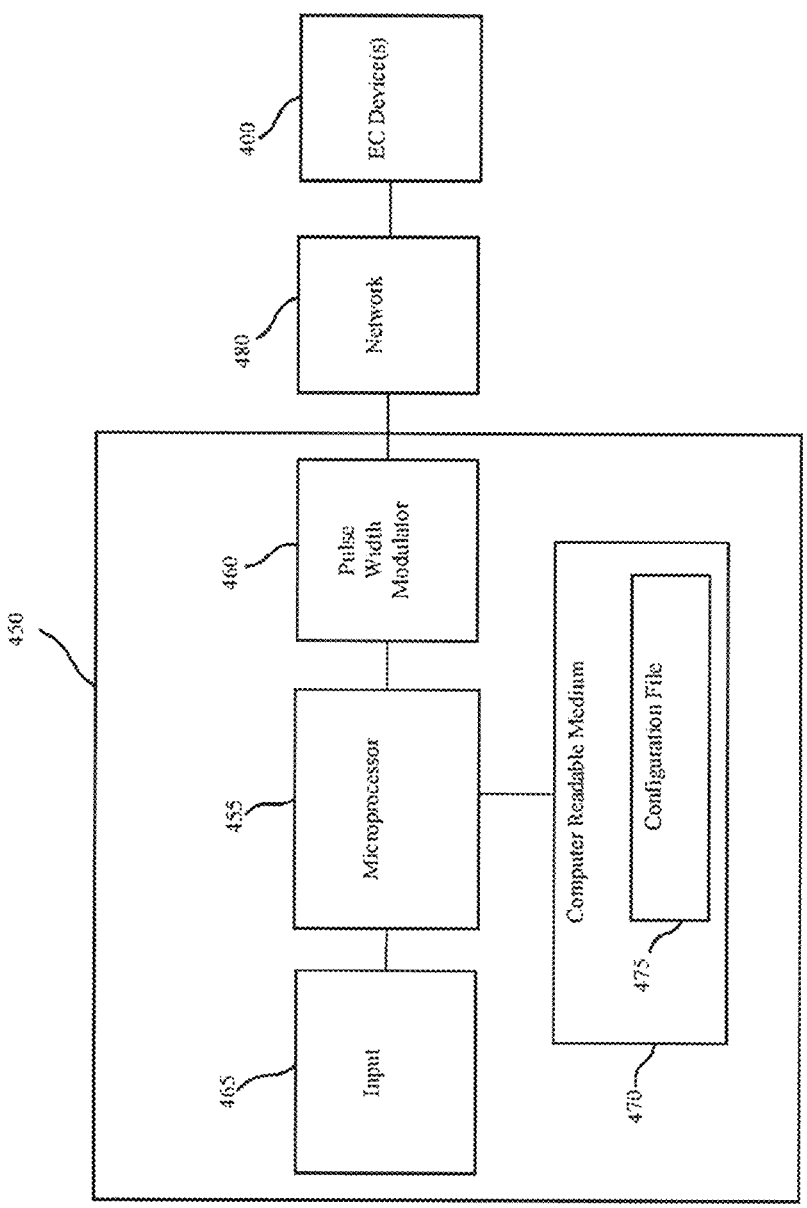
FIG. 4 depicts a simplified block diagram of components of a window controller.

FIG. 4 depicts a schematic block diagram of some components of a window controller 450 and other components of a window controller system of disclosed embodiments. More detail of components of window controllers can be found in U.S. patent application Ser. Nos. 13/449,248 and 13/449,251, both naming Stephen C. Brown as inventor, both titled "CONTROLLER FOR OPTICALLY-SWITCHABLE WINDOWS," and both filed on Apr. 17, 2012, and in U.S. patent Ser. No. 13/449,235, filed on Apr. 17, 2012, titled "CONTROLLING TRANSITIONS IN OPTICALLY SWITCHABLE DEVICES," naming Stephen C. Brown et al. as inventors and each of which is incorporated herein by reference in its entirety.

In FIG. 4, the illustrated components of the window controller 450 include a microprocessor 455 or other processor, a pulse width modulator 460, one or more input 465, and a computer readable medium (e.g., memory) having a configuration file 475. Window controller 450 is in electronic communication with one or more electrochromic devices 400 in an electrochromic window through network 480 (wired or wireless) to send instructions to the one or more electrochromic devices 400. In some embodiments, the window controller 450 may be a local window controller in communication through a network (wired or wireless) to a master window controller.

In some embodiments, an enclosure (e.g., a building) may have at least one room having an electrochromic window. e.g., disposed between the exterior and interior of the enclosure (e.g., the building). One or more sensors may be disposed (e.g., located) in the exterior or interior of the enclosure (e.g., in the exterior of the building and/or inside the room). In embodiments, outputs from the one or more sensors are used to control various devices in the enclosure, e.g., a tintable window such one comprising electrochromic device(s) 400. Although the sensors of depicted embodiments are shown as located on the outside vertical wall of an enclosure such as a building, this is for the sake of simplicity, and the sensors may be disposed in other locations of the enclosure, such as inside the room, the roof, or on other surfaces to the exterior, as well. In some cases, two or more sensors may be used to measure the same input, which can provide redundancy in case one sensor fails or has an otherwise erroneous reading and/or sense the same property at different locations. In some cases, two or more sensors may be used to measure the different input, e.g., to sense different properties.

Figure 5:
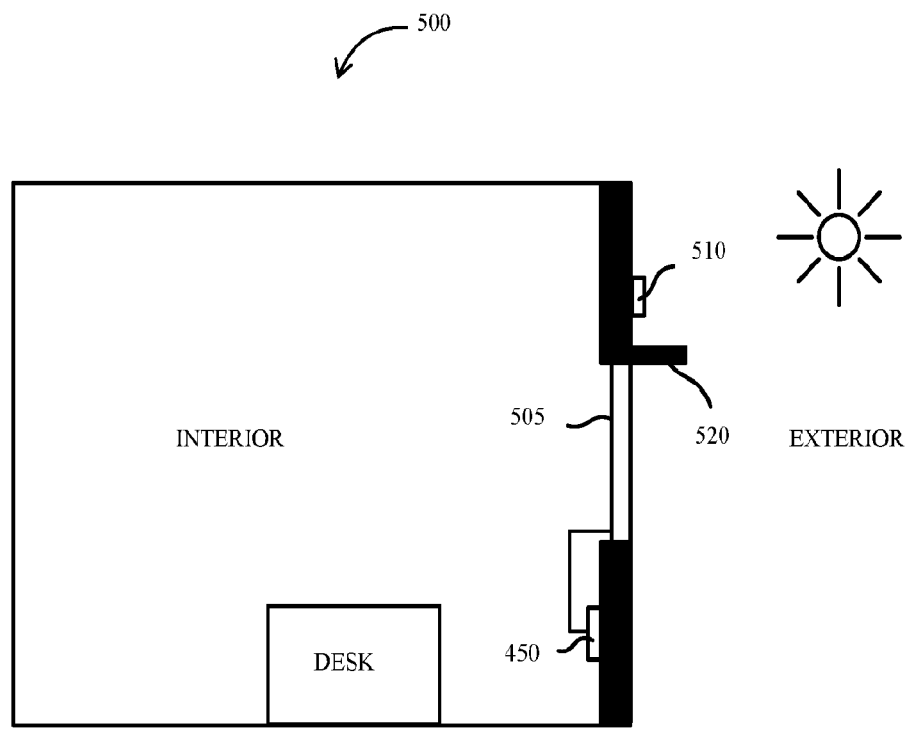
FIG. 5 is a schematic diagram of a room including a tintable window and at least one sensor, according to disclosed embodiments.

FIG. 5 depicts a schematic (side view) diagram of an enclosure (e.g., a room) 500 having an electrochromic window 505 with at least one electrochromic device. The electrochromic window 505 is located between the exterior and the interior of a building, which includes the room 500. The room 500 includes a window controller 450 connected to and configured to control the tint level of the electrochromic window 505. An exterior sensor 510 is located on a vertical surface in the exterior of the building. In some embodiments, an interior sensor may be used to measure the ambient light in room 500. In yet other embodiments, an occupant sensor may be used to determine when an occupant is in the room 500.

Exterior sensor 510 is a device, such as a photosensor, that is able to detect radiant light incident upon the device flowing from a light source such as the sun or from light reflected to the sensor from a surface, particles in the atmosphere, clouds, etc. The exterior sensor 510 may generate a signal in the form of electrical current that results from the photoelectric effect and the signal may be a function of the light incident on the sensor 510. In some cases, the device may detect radiant light in terms of irradiance in units of watts/m$^2$ or other similar units. In other cases, the device may detect light in the visible range of wavelengths in units of foot candles or similar units. In many cases, there is a linear relationship between these values of irradiance and visible light.

In some embodiments, exterior sensor 510 is configured to measure infrared light. In some embodiments, an exterior photosensor is configured to measure infrared light and/or visible light. In some embodiments, an exterior photosensor 510 may include sensors for measuring temperature and/or humidity data. In some embodiments, intelligence logic may determine the presence of an obstructing cloud and/or quantify the obstruction caused by a cloud using one or more parameters (e.g., visible light data, infrared light data, humidity data, and temperature data) determined using an exterior sensor or received from an external network (e.g., a weather station). Various methods of detecting clouds using infrared sensors are described in International Patent Application Serial No. PCT/US17/55631, filed Oct. 6, 2017, titled "INFRARED CLOUD DETECTOR SYSTEMS AND METHODS," and which designates the United States and is incorporated herein by reference in its entirety.

Irradiance values from sunlight can be predicted based at least in part on the time of day and time of year as the angle at which sunlight strikes the earth changes. Exterior sensor 510 can detect radiant light in real-time, which accounts for reflected and obstructed light due to buildings, changes in weather (e.g., clouds), etc. For example, on cloudy days, sunlight would be blocked by the clouds and the radiant light detected by an exterior sensor 510 would be lower than on cloudless days.

In some embodiments, there may be one or more exterior sensors 510 associated with a single electrochromic window 505. Output from the one or more exterior sensors 510 could be compared to each other to determine, for example, if one of exterior sensors 510 is shaded by an object, such as by a bird that landed on exterior sensor 510. In some cases, it may be desirable to use relatively few sensors because some sensors can be unreliable and/or expensive. In certain implementations, a single sensor or a few sensors may be employed to determine the current level of radiant light from the sun impinging on the building or perhaps one side of the building. A cloud may pass in front of the sun or a construction vehicle may park in front of the setting sun. These will result in deviations from the amount of radiant light from the sun calculated to normally impinge on the building.

Exterior sensor 510 may be a type of photosensor. For example, exterior sensor 510 may be a charge coupled device (CCD), photodiode, photoresistor, or photovoltaic cell. One of ordinary skill in the art would appreciate that future developments in photosensor and other sensor technology would work, as they measure light intensity and provide an electrical output representative of the light level.

In disclosed embodiments, window controller 450 can instruct the PWM 460, to apply a voltage and/or current to electrochromic window 505 to transition it to any one of four or more different tint levels. In disclosed embodiments, electrochromic window 505 can be transitioned to at least eight different tint levels described as: 0 (lightest), 5, 10, 15, 20, 25, 30, and 35 (darkest). The tint levels may linearly correspond to visual transmittance values and solar heat gain coefficient (SHGC) values of light transmitted through the electrochromic window 505. For example, using the above eight tint levels, the lightest tint level of 0 may correspond to an SHGC value of 0.80, the tint level of 5 may correspond to an SHGC value of 0.70, the tint level of 10 may correspond to an SHGC value of 0.60, the tint level of 15 may correspond to an SHGC value of 0.50, the tint level of 20 may correspond to an SHGC value of 0.40, the tint level of 25 may correspond to an SHGC value of 0.30, the tint level of 30 may correspond to an SHGC value of 0.20, and the tint level of 35 (darkest) may correspond to an SHGC value of 0.10.

Window controller 450 or a master controller in communication with the window controller 450 may employ any one or more predictive control logic components to determine a desired tint level based at least in part on signals from the exterior sensor 510 and/or other input. The window controller 450 can instruct the PWM 460 to apply a voltage and/or current to electrochromic window 505 to transition it to the desired tint level.

In some embodiments, the window controller(s) described herein are suited for integration with or are within/part of a Building Management System (BMS). A BMS can be a computerized control system installed in a building that controls (e.g., monitors) the building's mechanical and/or electrical equipment such as ventilation, lighting, power systems, elevators, fire systems, and/or security systems. A BMS may consists of hardware. e.g., including interconnections by communication channels to a computer or computers, and associated software. The BMS may maintain conditions in the building according to preferences (e.g., requests) set by user(s) such as the occupant(s) and/or by the building manager. A BMS may be implemented using a local area network, such as Ethernet. The software can be based at least in part on, for example, internet protocols and/or open standards. One example is software from Tridium, Inc. (of Richmond, Virginia). One communication protocol used with a BMS is BACnet (building automation and control networks). The BMS may be configured for such communication protocol(s).

A BMS may be common in a large building. The BMS may function at least to control the environment within the building. For example, a BMS and/or the control system may control temperature, carbon dioxide levels, and/or humidity within a building, e.g., using one or more sensors. There may be mechanical devices that are controlled by a BMS such as heaters, air conditioners, blowers, vents, and/or the like. To control the building environment, a BMS may attenuate, and/or turn on and off any of these various devices, e.g., under defined conditions. In some embodiments, a core function of a BMS may be to maintain a comfortable environment for the building's occupants. e.g., while minimizing heating and cooling costs/demand. Thus, a BMS can be used to control and/or to optimize the synergy between various systems, for example, to conserve energy and/or lower building operation costs.

In some embodiments, a control system (or any portion thereof such as a window controller) is integrated with a BMS. The window controller may be configured to control one or more electrochromic windows (e.g., 505) or other tintable windows. In some embodiments, the window controller is incorporated in the BMS (e.g., and the BMS controls both the tintable windows and the functions of other systems of the building). In one example, the BMS may control the functions of all the building systems including the one or more zones of tintable windows in the building.

Figure 6:
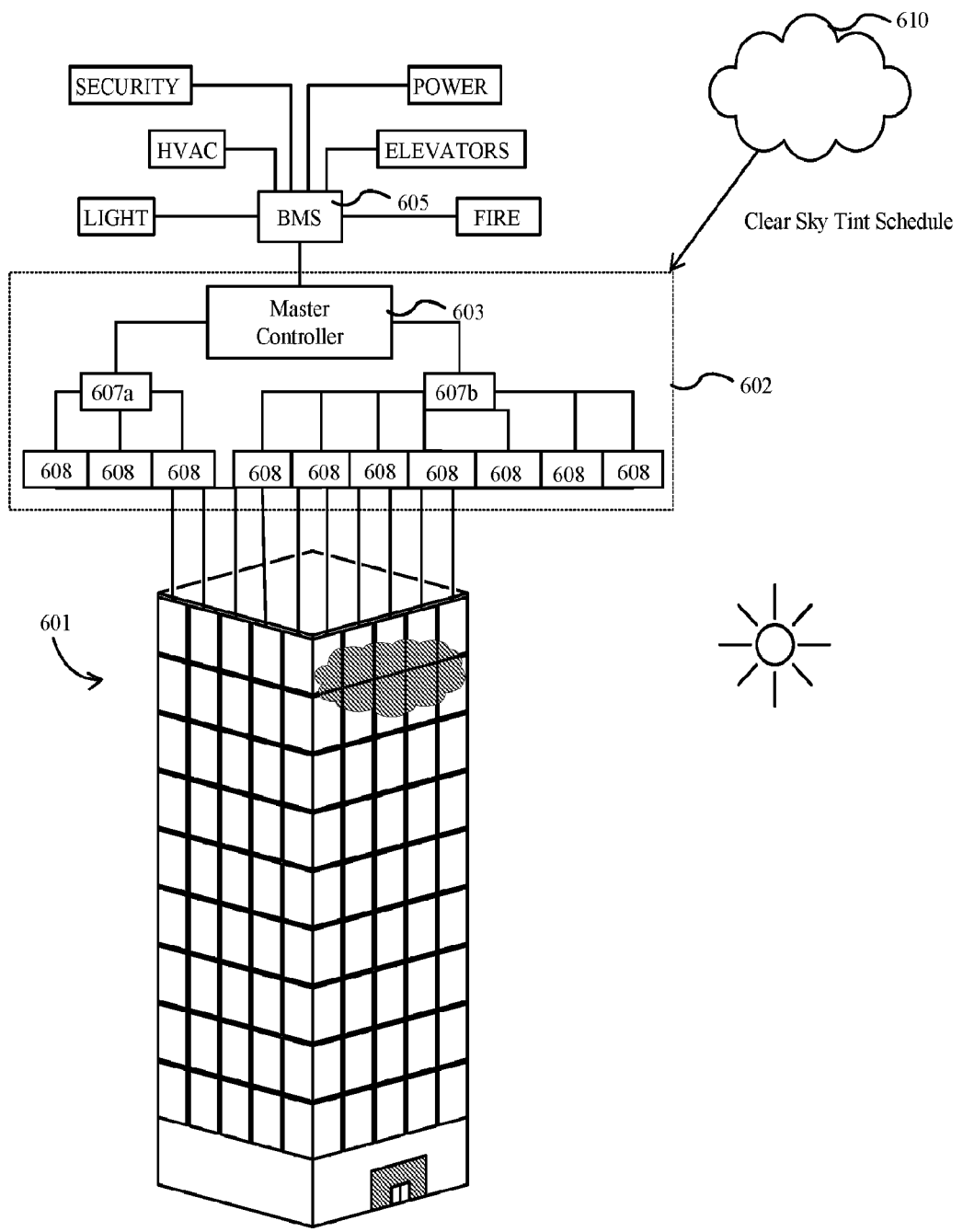
FIG. 6 is a schematic diagram of a building, a control system, and a building management system (BMS), according to certain implementations.

In some embodiments, at least one (e.g., each) tintable window of the one or more zones includes at least one solid state and/or inorganic electrochromic device. In one embodiment, at least one (e.g., each) of the tintable windows of the one or more zones is an electrochromic window having one or more solid state and/or inorganic electrochromic devices. In one embodiment, the one or more tintable windows include at least one all solid state and inorganic electrochromic device, but may include more than one electrochromic device, e.g. where each lite or pane of an IGU is tintable. In one embodiment, the electrochromic windows are multistate electrochromic windows, as described in U.S. patent application Ser. No. 12/851,514, filed Aug. 5, 2010, and entitled "Multipane Electrochromic Windows," that is incorporated herein by reference in its entirety. FIG. 6 depicts a schematic diagram of an example of a building 601 and a BMS 605 that manages a number of building systems including security systems, heating/ventilation/air conditioning (HVAC), lighting of the building, power systems, elevators, fire systems, and the like. Security systems may include magnetic card access, turnstiles, solenoid driven door locks, surveillance cameras, burglar alarms, metal detectors, and/or the like. Fire systems may include fire alarms and fire suppression systems including a water plumbing control. Lighting systems may include interior lighting, exterior lighting, emergency warning lights, emergency exit signs, and/or emergency floor egress lighting. Power systems may include the main power, backup power generators, and/or uninterrupted power source (UPS) grids.

In the example show in in FIG. 6, the BMS 605 manages a window control system 602. The window control system 602 is a distributed network of window controllers including a master controller, 603, floor (e.g., network) controllers, 607a and 607b, and local (e.g., end or leaf) controllers 608 such as window controllers. End or leaf controllers 608 may be similar to window controller 450 described with respect to FIG. 4. For example, master controller 603 may be in proximity to the BMS 605, and at least one (e.g., each) floor of building 601 may have one or more network controllers 607a and 607b, while at least one (e.g., each) window of the building has its own end controller 608. In this example, each of controllers 608 controls a specific electrochromic window of building 601. Window control system 602 is in communication with a cloud network 610 to received data. For example, the window control system 602 can receive schedule information from clear sky models maintained on cloud network 610. Although, master controller 603 is described in FIG. 6 as separate from the BMS 605, in another embodiment, the master controller 603 is part of or within the BMS 605. FIG. 6 shows an example of a hierarchical control system 602.

At least one (e.g., each) of controllers 608 can be in a separate location from the electrochromic window that it controls, or be integrated into the electrochromic window. For simplicity, only ten electrochromic windows of building 601 are depicted as controlled by master window controller 602. In a setting (e.g., facility that includes a building) there may be a large number of electrochromic windows in a building controlled by window control system 602. Advantages and features of incorporating electrochromic window controllers as described herein with BMSs are described herein.

One aspect of the disclosed embodiments is a BMS including a multipurpose electrochromic window controller, e.g., as described herein. By incorporating feedback from at least one (e.g., local) controller, a BMS can provide, for example, enhanced: 1) environmental control. 2) energy savings, 3) security, 4) flexibility in control options. 5) improved reliability and usable life of other systems due to less reliance thereon and therefore less maintenance thereof, 6) information availability and/or diagnostics, 7) effective use of, and higher productivity from, staff, or any combination thereof. In some embodiments, a BMS is not be present, or a BMS may be present but may not communicate with the control system (e.g., with a master controller), or communicate at a high level with the control system (e.g., with a master controller). In certain embodiments, maintenance on the BMS would not interrupt control of the electrochromic windows.

In some cases, the systems of BMS 605 or building network 1200 may run according to daily, monthly, quarterly, or yearly schedules. For example, any of the devices operatively (e.g., communicatively) coupled to the BMS such as the lighting control system, the window control system, the HVAC, and/or the security system, may operate on a schedule such as a 24 hour schedule (e.g., accounting for when people are in the facility (e.g., building) during the work day). At night, the building may enter an energy savings mode, and during the day, the systems may operate in a manner that minimizes the energy consumption of the facility (e.g., building) while providing for occupant comfort. As another example, the systems may shut down or enter an energy savings mode over a holiday period.

In some embodiments, an enclosure comprises an area defined by at least one structure. The at least one structure may comprise at least one wall. An enclosure may comprise and/or enclose one or more sub-enclosure. The at least one wall may comprise metal (e.g., steel), clay, stone, plastic, glass, plaster (e.g., gypsum), polymer (e.g., polyurethane, styrene, or vinyl), asbestos, fiber-glass, concrete (e.g., reinforced concrete), wood, paper, or a ceramic. The at least one wall may comprise wire, bricks, blocks (e.g., cinder blocks), tile, drywall, or frame (e.g., steel frame).

In some embodiments, the enclosure comprises one or more openings. The one or more openings may be reversibly closable. The one or more openings may be permanently open. A fundamental length scale of the one or more openings may be smaller relative to the fundamental length scale of the wall(s) that define the enclosure. A fundamental length scale may comprise a diameter of a bounding circle, a length, a width, or a height. A surface of the one or more openings may be smaller relative to the surface the wall(s) that define the enclosure. The opening surface may be a percentage of the total surface of the wall(s). For example, the opening surface can measure about 30%, 20%, 10%, 5%, or 1% of the walls(s). The wall(s) may comprise a floor, a ceiling or a side wall. The closable opening may be closed by at least one window or door. The enclosure may be at least a portion of a facility. The enclosure may comprise at least a portion of a building. The building may be a private building and/or a commercial building. The building may comprise one or more floors. The building (e.g., floor thereof) may include at least one of: a room, hall, foyer, attic, basement, balcony (e.g., inner or outer balcony), stairwell, corridor, elevator shaft, façade, mezzanine, penthouse, garage, porch (e.g., enclosed porch), terrace (e.g., enclosed terrace), cafeteria, and/or Duct. In some embodiments, an enclosure may be stationary and/or movable (e.g., a train, a plane, a ship, a vehicle, or a rocket).

In some embodiments, a plurality of devices (e.g., sensors, emitters, and/or tintable windows) may be operatively (e.g., communicatively) coupled to the control system. The control system may comprise the hierarchy of controllers. The devices may comprise an emitter, a sensor, or a window (e.g., IGU). The device may be any device as disclosed herein. At least two of the plurality of devices may be of the same type. For example, two or more IGUs may be coupled to the control system. At least two of the plurality of devices may be of different types. For example, a sensor and an emitter may be coupled to the control system. At times the plurality of devices may comprise at least 20, 50, 100, 500, 1000, 2500, 5000, 7500, 10000, 50000, 100000, or 500000 devices. The plurality of devices may be of any number between the aforementioned numbers (e.g., from 20 devices to 500000 devices, from 20 devices to 50 devices, from 50 devices to 500 devices, from 500 devices to 2500 devices, from 1000 devices to 5000 devices, from 5000 devices to 10000 devices, from 10000 devices to 100000 devices, or from 100000 devices to 500000 devices). For example, the number of windows in a floor may be at least 5, 10, 15, 20, 25, 30, 40, or 50. The number of windows in a floor can be any number between the aforementioned numbers (e.g., from 5 to 50, from 5 to 25, or from 25 to 50). At times the devices may be in a multi-story building. At least a portion of the floors of the multi-story building may have devices controlled by the control system (e.g., at least a portion of the floors of the multi-story building may be controlled by the control system). For example, the multi-story building may have at least 2, 8, 10, 25, 50, 80, 100, 120, 140, or 160 floors that are controlled by the control system. The number of floors (e.g., devices therein) controlled by the control system may be any number between the aforementioned numbers (e.g., from 2 to 50, from 25 to 100, or from 80 to 160). The floor may be of an area of at least about 150 m$^2$, 250 m$^2$, 500 m$^2$, 1000 m$^2$, 1500 m$^2$, or 2000 square meters (m$^2$). The floor may have an area between any of the aforementioned floor area values (e.g., from about 150 m$^2$ to about 2000 m$^2$, from about 150 m$^2$ to about 500 m$^2$, from about 250 m$^2$ to about 1000 m$^2$, or from about 1000 m$^2$ to about 2000 m$^2$).

The BMS schedule may be combined with geographical information. Geographical information may include the latitude and longitude of the enclosure (e.g., building). Geographical information may include information about the direction that the side of the building faces. Using such information, different enclosures (e.g., rooms) on different sides of the building may be controlled in different manners. For example, for east facing rooms of the building in the winter, the window controller may instruct the windows to have no tint in the morning so that the room warms up due to sunlight shining in the room and the lighting control panel may instruct the lights to be dim because of the lighting from the sunlight. The west facing windows may be controllable by the occupants of the room in the morning because the tint of the windows on the west side may have no impact on energy savings. However, the modes of operation of the east facing windows and the west facing windows may switch in the evening (e.g., when the sun is setting, the west facing windows are not tinted to allow sunlight in for both heat and lighting).

Described below is an example of a building, for example, like building 601 in FIG. 6, including a building network or a BMS, tintable windows for the exterior windows of the building (e.g., windows separating the interior of the building from the exterior of the building), and a number of different sensors. Light from exterior windows of a building has an effect on the interior lighting in the building about 20 feet or about 30 feet from the windows. Space in a building that is at least about 20 feet or at least about 30 feet, from an exterior window receives little light from the exterior window. Such spaces away from exterior windows in a building may be lit by lighting systems of the building.

The temperature within a building may be influenced by exterior light and/or the exterior temperature. For example, on a cold day and with the building being heated by a heating system, rooms closer to doors and/or windows may lose heat faster than the interior regions of the building and be cooler compared to the interior regions.

For exterior sensors, the building may include exterior sensor(s) disposed on the roof or exterior wall(s) of the building. Alternatively, the building may include an exterior sensor associated with at least one (e.g., each) exterior window (e.g., as described in relation to FIG. 5, room 500) and/or an exterior sensor on at least one (e.g., each) side of the building. An exterior sensor on at least one (e.g., each) side of the building could track the irradiance on a side of the building as the sun changes position throughout the day.

In some embodiments, the output signals received include a signal indicating energy or power consumption by a heating system, a cooling system, and/or lighting within the building. For example, the energy and/or power consumption of the heating system, the cooling system, and/or the lighting of the building may be monitored to provide the signal indicating energy or power consumption. Devices may be operatively coupled (e.g., interfaced with or attached) to the circuits and/or wiring of the building, e.g., to enable this monitoring. The power systems in the building may be installed such that the power consumed by the heating system, a cooling system, and/or lighting for an individual enclosure(s) (e.g., room within the building or a group of rooms within the building) can be controlled (e.g., monitored).

Tint instructions can be provided to change to tint of the tintable window to the determined level of tint. For example, referring to FIG. 6, this may include master controller 603 issuing commands to one or more network controllers 607a and 607b, which in turn issue commands to end (e.g., local) controllers 608 that control at least one (e.g., each) window of the building. End controllers 608 may apply voltage and/or current to the window to drive the change in tint pursuant to the instructions. The end controller can control any device disclosed herein (e.g., sensor, emitter. HVAC, and/or tintable window).

In some embodiments, a building including tintable (e.g., electrochromic) windows and a BMS may be enrolled in or participate in a demand response program (e.g., run by the utility (ies) providing power to the building). The program may be a program in which the energy consumption of the building is reduced when a peak load occurrence is expected. The utility may send out a warning signal prior to an expected peak load occurrence. For example, the warning may be sent on the day before, the morning of, or about one hour before the expected peak load occurrence. A peak load occurrence may be expected to occur on a hot summer day when cooling systems/air conditioners are drawing a large amount of power from the utility, for example. The warning signal may be received by the BMS of the building or by window controllers configured to control the electrochromic windows in the building. This warning signal can be an override mechanism that disengages window controllers from the system. The BMS can then instruct the window controller(s) to transition the appropriate electrochromic device in the electrochromic windows 505 to a dark tint level aid in reducing the power draw of the cooling systems in the building at the time when the peak load is expected.

In some embodiments, tintable windows for the exterior windows of the building (e.g., windows separating the interior of the building from the exterior of the building), may be grouped into one or more zones, with tintable windows in a zone being instructed in a similar manner. For example, groups of electrochromic windows on different floors of the building or different sides of the building may be in different zones. For example, on the first floor of the building, all of the east facing electrochromic windows may be in zone 1, all of the south facing electrochromic windows may be in zone 2, all of the west facing electrochromic windows may be in zone 3, and all of the north facing electrochromic windows may be in zone 4. As another example, all of the electrochromic windows on the first floor of the building may be in zone 1, all of the electrochromic windows on the second floor may be in zone 2, and all of the electrochromic windows on the third floor may be in zone 3. As yet another example, all of the east facing electrochromic windows may be in zone 1, all of the south facing electrochromic windows may be in zone 2, all of the west facing electrochromic windows may be in zone 3, and all of the north facing electrochromic windows may be in zone 4. As yet another example, east facing electrochromic windows on one floor could be divided into different zones. Any number of tintable windows on the same side and/or different sides and/or different floors of the building may be assigned to a zone. In embodiments where individual tintable windows have independently controllable zones, tinting zones may be created on a building façade using combinations of zones of individual windows, e.g. where individual windows may or may not have all of their zones tinted. The zones may be designated according to geographical orientation, floors in a building, designated utility of the enclosures in which they are disposed, temperature of the enclosure in which they are disposed, radiation (e.g., sun radiation) thorough the window, weather, and/or occupancy (or projected occupancy level of the enclosures in which they are disposed.

In some embodiments, at least two (e.g., all) electrochromic windows in a zone may be controlled by the same window controller or same set of window controllers. In some other embodiments, at least two (e.g., all) electrochromic windows in a zone may be controlled by different window controller(s).

In some embodiments, at least two tintable (e.g., electrochromic) windows in a zone may be controlled by a window controller and/or controller(s) that receive an output signal from an optical (e.g., transmissivity) sensor. In some embodiments, the transmissivity sensor may be mounted proximate the windows in a zone. For example, the transmissivity sensor may be mounted in or on a frame containing an IGU (e.g., mounted in or on a window frame portion such as a mullion or a transom) included in the zone. In some other embodiments, tintable (e.g., electrochromic) window(s) in a zone that includes the windows on a single side of the building, may be controlled by a window controller or controller(s) that receive an output signal from an optical (e.g., transmissivity) sensor.

In some embodiments, a user (e.g., a building manager, and/or occupant) of rooms in the second zone, may manually instruct (using a tint command, clear command, or a command from a user console of a BMS, for example) the tintable (e.g., electrochromic) windows in the second zone (e.g., the slave control zone) to enter a tint level such as a colored state (level) or a clear state. In some embodiments, when the tint level of the windows in the second zone is overridden with such a manual command, the electrochromic window(s) in the first zone (e.g., the master control zone) remain under control of an output received from a (e.g., transmissivity) sensor. The second zone may remain in a manual command mode for a period of time and then revert back to be under control of an output from the transmissivity sensor. For example, the second zone may stay in a manual mode for one hour after receiving an override command, and then may revert back to be under control of the output from the transmissivity sensor.

In some embodiments, a building manager, occupants of rooms in the first zone, or other person may manually instruct (using a tint command or a command from a user console of a BMS, for example) the windows in the first zone (e.g., the master control zone) to enter a tint level such as a colored state or a clear state. In some embodiments, when the tint level of the windows in the first zone is overridden with such a manual command, the electrochromic windows in the second zone (e.g., the slave control zone) remain under control outputs from the exterior sensor. The first zone may remain in a manual command mode for a period of time and then revert back to be under control of the output from the transmissivity sensor. For example, the first zone may stay in a manual mode for one hour after receiving an override command, and then may revert back to be under control of an output from the transmissivity sensor. In some other embodiments, the electrochromic windows in the second zone may remain in the tint level that they are in when the manual override for the first zone is received. The first zone may remain in a manual command mode for a period of time and then both the first zone and the second zone may revert back to be under control of an output from the transmissivity sensor.

Any of the methods described herein of control of a tintable window, regardless of whether the window controller is a standalone window controller or is interfaced with a building network, may be used control the tint of a tintable window.

In some embodiments, window controllers described herein include components for wired or wireless communication between the window controller, sensors, and (e.g., separate) communication nodes. Wireless and/or wired communications may be accomplished with a communication interface that interfaces (e.g., directly) with the window controller. Such interface could be native to the microprocessor or provided via additional circuitry enabling these functions.

A separate communication node for wireless communications can be, for example, another wireless window controller, an end, intermediate, or master window controller, a remote-control device, or a BMS. Wireless communication is used in the window controller for at least one of the following operations: programming and/or operating the electrochromic window 505, collecting data from the EC window 505 from the various sensors and protocols described herein, and/or using the electrochromic window 505 as a relay point for wireless communication. Data collected from electrochromic windows 505 may include count data such as number of times an EC device has been activated, efficiency of the EC device over time, current, voltage, time and/or date of data collection, window identification number, window location, window characteristics, and the like. The window characteristics may comprise characteristics of the tintable material (e.g., electrochromic construct), or of the pane (e.g., thickness, length and width).

In one embodiment, wireless communication is used at least in part to operate the associated electrochromic windows 505, for example, via an infrared (IR), and/or radio frequency (RF) signal. In certain embodiments, the controller will include a wireless protocol chip, such as Bluetooth, EnOcean, WiFi. Zigbee, and the like. Window controllers may be configured for wireless communication via a network. Input to the window controller can be manually input by an end user at a wall switch, either directly or via wireless communication, or the input can be from a BMS of a building of which the electrochromic window is a component.

In one embodiment, when the window controller is part of a distributed (e.g., and hierarchical) network of controllers, wireless communication is used to transfer data to and from at least one (e.g., each) of a plurality of electrochromic windows via the distributed network of controllers having wireless communication components. For example, referring again to FIG. 6, master controller 603, communicates wirelessly with at least one (e.g., each) of network controllers 607*a* and 607*b*, which in turn communicate wirelessly with end controllers 608, associated with an electrochromic window. Master controller 603 may communicate wirelessly with the BMS 605. In one embodiment, at least one level of communication in the window controller is performed wirelessly. In other embodiments, the communication may comprise wired communication.

In some embodiments, more than one mode of wireless communication is used in the window controller distributed network. For example, a master window controller may communicate wirelessly to intermediate controllers via WiFi and/or Zigbee, while the intermediate controllers communicate with end controllers via Bluetooth, Zigbee. EnOcean, and/or other protocol. In another example, window controllers have redundant wireless communication systems for flexibility in end user choices for wireless communication.

Wireless communication between, for example, master and/or intermediate window controllers and end window controllers offers the advantage of obviating the installation of hard communication lines. This may also be true for wireless communication between window controllers and BMS. In one aspect, wireless communication in these roles is useful for data transfer to and/or from electrochromic windows for operating the window and providing data to, for example, a BMS for optimizing the environment and energy savings in a building. Window location data as well as feedback from sensors are synergized for such optimization. For example, granular level (window-by-window) microclimate information is fed to a BMS in order to optimize the building's various environments.

Figure 7:
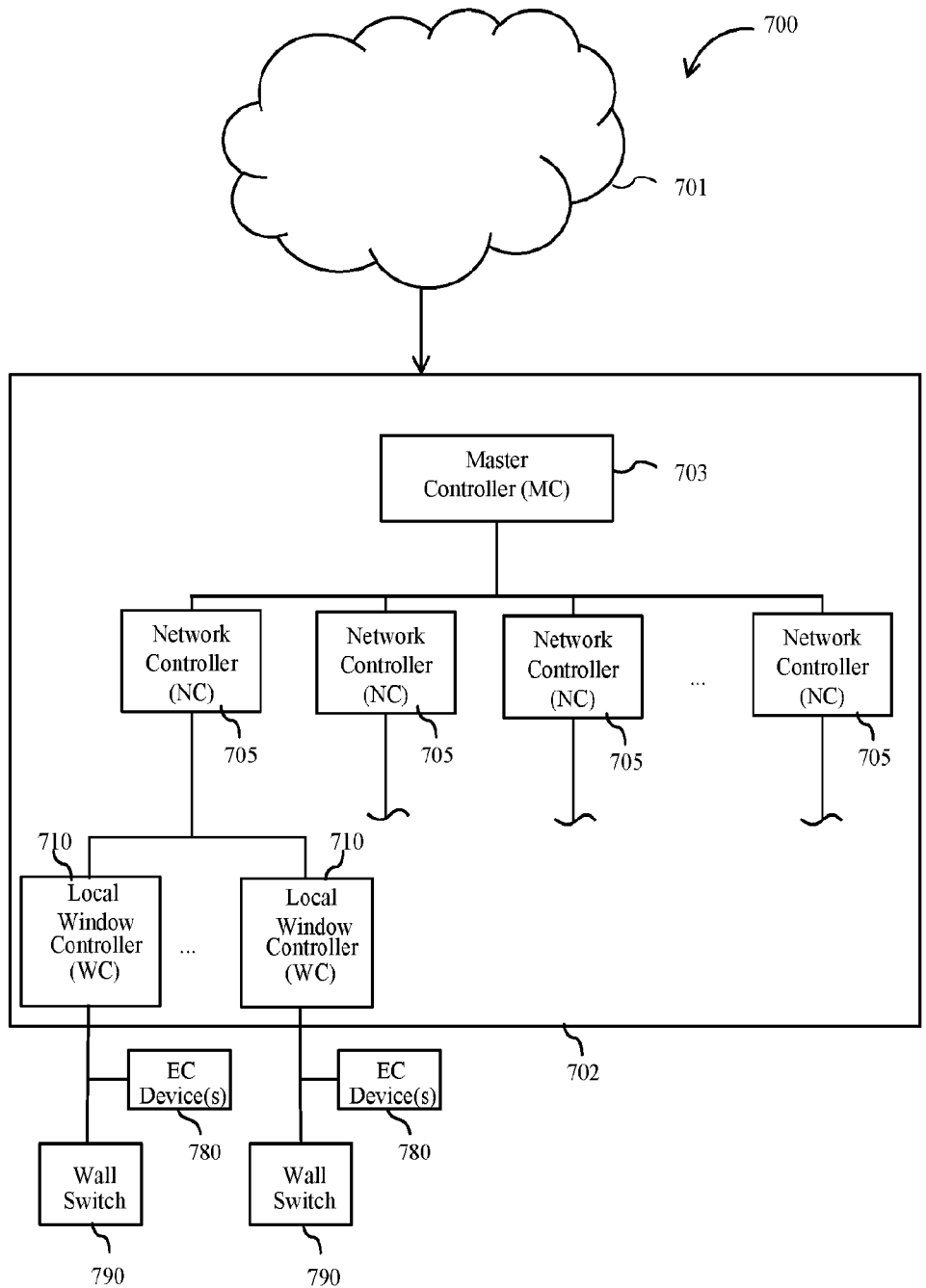
FIG. 7 is a block diagram of components of a hierarchical control system and controlled devices.

FIG. 7 is an example of a block diagram of components of a system 700 for controlling functions (e.g., transitioning to different tint levels) of one or more tintable windows of a building (e.g., building 601 shown in FIG. 6), according to embodiments. System 700 may be one of the systems managed by a BMS (e.g., BMS 605 shown in FIG. 6) or may operate independently of a BMS.

System 700 includes a window control system 702 having a network of window controllers that can send control signals to the tintable windows to control its functions. System 700 includes a network 701 in electronic communication with master controller 703. The predictive control logic, other control logic and instructions for controlling functions of the tintable window(s), sensor data, and/or schedule information regarding clear sky models can be communicated to the master controller 703 through the network 701. The network 701 can be a wired and/or wireless network (e.g. a cloud network). In one embodiment, network 701 may be in communication with a BMS to allow the BMS to send instructions for controlling the tintable window(s) through network 701 to the tintable window(s) in a building.

System 700 includes EC devices 780 of the tintable windows (not shown) and optional wall switches 790, which are both in electronic communication with master controller 703. In this illustrated example, master controller 703 can send control signals to EC device(s) 780 to control the tint level of the tintable windows having the EC device(s) 780. Each wall switch 790 is in communication with EC device(s) 780 and master controller 703. An end user (e.g., occupant of a room having the tintable window) can use the wall switch 790 to input an override tint level and other functions of the tintable window having the EC device(s) 780.

In FIG. 7, the window control system 702 is depicted as a distributed network of window controllers including a master controller 703, a plurality of network controllers 705 in communication with the master controller 703, and multiple pluralities of end or leaf window controllers 710. Each plurality of end or leaf window controllers 710 is in communication with a single network controller 705. The components of the system 700 in FIG. 7 may be similar in some respects to components described with respect to FIG. 6. For example, master controller 703 may be similar to master controller 603 and network controllers 705 may be similar to network controllers 607. Each of the window controllers in the distributed network of FIG. 7 may include a processor (e.g., microprocessor) and/or a computer readable medium in electrical communication with the processor.

In FIG. 7, each leaf or end window controller 710 is in communication with EC device(s) 780 of a single tintable window to control the tint level of that tintable window in the building. In the case of an IGU, the leaf or end window controller 710 may be in communication with EC devices 780 on multiple lites of the IGU control the tint level of the IGU. In some embodiments, at least one (e.g., each) leaf or end window controller 710 may be in communication with a plurality of tintable windows. The leaf or end window controller 710 may be integrated into the tintable window or may be separate from the tintable window that it controls. Leaf and end window controllers 710 in FIG. 7 may be similar to the end or leaf controllers 608 in FIG. 6 and/or may be similar to window controller 450 described with respect to FIG. 4.

Signals from the wall switch 790 may override signals from window control system 702 in some cases. In other cases (e.g., high demand cases), control signals from the window control system 702 may override the control signals from wall switch 1490. Each wall switch 790 is also in communication with the leaf or end window controller 710 to send information about the control signals (e.g. time, date, tint level requested, etc.) sent from wall switch 790 back to master window controller 703. In some cases, wall switches 790 may be (e.g., also) manually operated. In other cases, wall switches 790 may be (e.g., also) wirelessly controlled by the end user using a remote device (e.g., cell phone, tablet, etc.) sending wireless communications with the control signals, for example, using infrared (IR), and/or radio frequency (RF) signals. In some cases, wall switches 790 may include a wireless protocol chip, such as Bluetooth, EnOcean, WiFi. Zigbee, and the like. Although wall switches 790 depicted in FIG. 7 are located on the wall(s), other embodiments of system 700 may have switches located elsewhere in the room.

Conventional smart window and/or shade control systems actively model shadows and reflections on a building, which is cumbersome and inefficient to computing resources at the building. The system architecture described herein may not require a control system to actively generate models of the building. Instead, models specific to the building site may be generated and/or maintained on a cloud network or other network separate from the control system. For example, neural network models (e.g., Deep neural networks (DNN) and/or Long Short-Term Memory (LSTM)) may be initialized, retrained, and/or the live models executed on the cloud network or other network separate from the window control system and the tint schedule information from these models may be pushed to the window control system 840. Example DNN architectures that may be used in some implementations include Convolutional Neural Networks (CNNs), Recurrent Neural Networks (RNNs). Deep Belief Networks (DBNs), and the like.

Tint schedule information may be utilized to define rules that are derived from these models and that are pushed to the window control system. The window control system may utilize the tint schedule information (e.g., derived from the predefined models, custom to the building in question), to make final tinting decisions implemented at the tintable windows. The 3D models may be maintained on a cloud-based 3D modeling platform, e.g., that can generate visualizations of the 3D model to allow users to manage input for setting up and customizing the building site and the corresponding final tint states applied to the tintable windows. Once the tint schedule information is loaded into the window control system, there is may be no need for modeling calculations to tie up computing power of the control system. Tint schedule information resulting from any changes to the models can be pushed to the window control system when needed (e.g., on demand or in a predetermined schedule). It would be understood that although the system architecture is described herein with respect to controlling tintable windows, other components and systems at the building could additionally or alternatively be controlled with this architecture.

In various implementations, system architecture includes (e.g., cloud-based) modules to setup and/or customize a 3D model of the enclosure (e.g., building site). In some embodiments, a cloud-based 3D model system initializes the 3D model of the building site using architectural model(s) as input, for example, an Autodesk® Revit model or other industry standard building model may be used. A 3D model in its simplest form includes exterior surfaces of structures of the building including window openings and a stripped version of the interior of the building with only floors and walls. More complex models may include the exterior surfaces of objects surrounding the building as well as more detailed features of the interior and exterior of the building. The system architecture may include a (e.g., cloud-based) clear sky module that assigns reflective or non-reflective properties to the exterior surfaces of the objects in the 3D model, defines interior three-dimensional occupancy regions, assigns IDs to windows, and/or groups windows into zones based at least in part on input from user(s) and/or sensor(s). Time varying simulations of the resulting clear sky 3D model (e.g., the 3D model with configuration data having the assigned attributes) can be used to determine the direction of sunlight at the different positions of the sun under clear sky conditions and taking into account (i) shadows and/or reflections from objects at the building site, (ii) sunlight entering spaces of the building, and/or (iii) intersection of 3D projections of sunlight with three-dimensional occupancy regions in the building. In some embodiments, the clear sky module uses this information to determine whether certain conditions exist for particular occupancy regions (e.g., from the perspective of the occupant) such as, for example, a glare condition, direct reflection condition, indirect reflection condition, and/or passive heat condition. In some embodiments, the clear sky module determines a clear sky tint state for at least one (e.g., each) zone in at least one (e.g., each) time interval based at least in part on (I) the existence of particular conditions at that time, (II) tint states assigned to the conditions, and/or (III) the priority of different conditions if multiple conditions exist. The tint schedule information, (e.g., a yearly schedule) may be communicated (e.g., pushed to), e.g. a master controller of, the control system at the building. The control system may determine a weather-based tint state for at least one (e.g., each) zone in at least one (e.g., each) time interval based at least in part on sensor data such as measurements from infrared sensors and/or photosensors (e.g., sensing light in the visible spectrum). The control system then determines the minimum of the weather-based tint state and the clear sky tint state to set the final tint state and send tint instruction(s) to implement the final tint state at the zones of the tintable windows. Thus, in some embodiments, the window control system does not model the building or 3D parameters around and inside the building, that is done offline and therefore computing power of the control system can be used for other tasks, such as applying tint states based at least in part on the model(s) and/or other input(s) received by the control system.

In some embodiments, the control system (e.g., master controller) utilizes one or more modules (e.g., as described herein). The module(s) may facilitate controlling tint of at least one tintable window (e.g., by providing at least a portion of a control logic). The module(s) may be based at least in part on sensor data collected from real physical sensors (e.g., photosensor, IR sensor, or any other sensor disclosed herein). The module(s) may predict senor values at a future time, e.g., using machine learning (e.g., artificial intelligence), weather forecast, historic sensor measurements, and/or real-time sensor measurements. The module(s) may utilize physics simulation, e.g., utilized for weather forecasting. Processing the sensor data comprises performing sensor data analysis. The sensor data analysis may comprise at least one rational decision making process, and/or learning. The sensor data analysis may be utilized to adjust tint of the tintable window(s). The sensor data analysis may be utilized to adjust and environment, e.g., by adjusting one or more components that affect the environment of the enclosure. The data analysis may be performed by a machine based system (e.g., a circuitry). The circuitry may be of a processor. The sensor data analysis may utilize artificial intelligence. The sensor data analysis may rely on one or more models (e.g., mathematical models such as weather forecast models). In some embodiments, the sensor data analysis comprises linear regression, least squares fit, Gaussian process regression, kernel regression, nonparametric multiplicative regression (NPMR), regression trees, local regression, semiparametric regression, isotonic regression, multivariate adaptive regression splines (MARS), logistic regression, robust regression, polynomial regression, stepwise regression, ridge regression, lasso regression, elasticnet regression, principal component analysis (PCA), singular value decomposition, fuzzy measure theory, Borel measure, Han measure, risk-neutral measure, Lebesgue measure, group method of data handling (GMDH), Naive Bayes classifiers, k-nearest neighbors algorithm (k-NN), support vector machines (SVMs), neural networks, support vector machines, classification and regression trees (CART), random forest, gradient boosting, generalized linear model (GLM) technique, or deep learning techniques.

Figure 8:
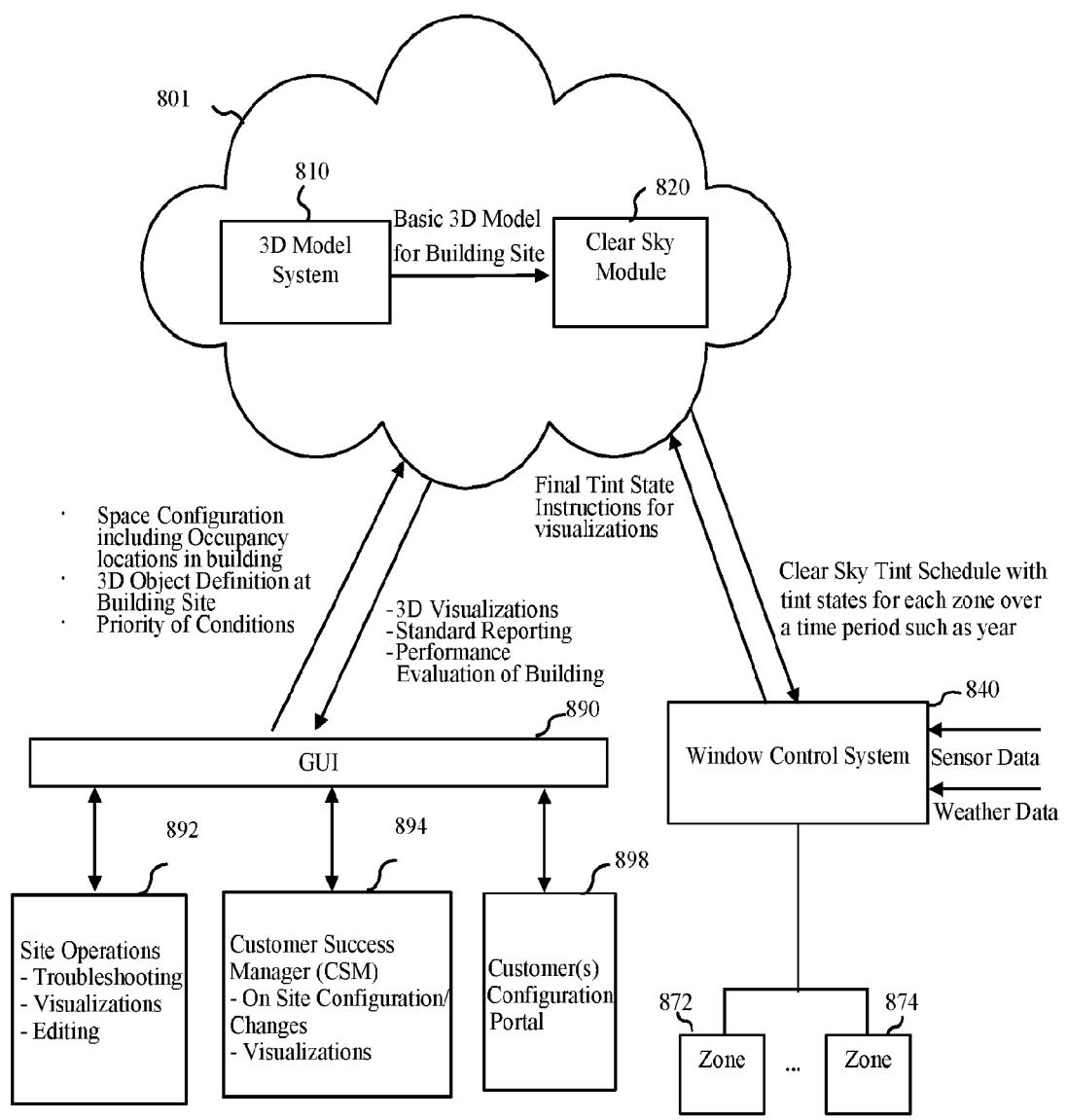
FIG. 8 is schematic diagram depicting the general system architecture of systems and users involved in maintaining clear sky models on a cloud network and controlling the tintable windows of a building based at least in part on data derived from output from the models, according to various implementations.

FIG. 8 is a schematic illustration depicting the architecture 800 of systems and users involved in initializing and customizing models maintained in a cloud network 801 and controlling the tintable windows of a building based at least in part on output such as rules from the model(s), according to various implementations. The system architecture 800 includes a cloud-based 3D model system 810 in communication with a cloud-based clear sky module 820, where the combination of 810 and 820 is referred to Module A. In one embodiment. Module A provides inputs to a window control system 840. The 3D model system 810 can initialize and/or revise a 3D model of a building site and communicate the data for the 3D model to the clear sky module 820. The 3D model initialized by the 3D model system includes the exterior surfaces of the surrounding structures and other objects at the building site and the building stripped of all but walls, floors, and exterior surfaces. The cloud-based clear sky module 820 can assign attributes to the 3D model to generate clear sky 3D models such as, e.g., one or more of a glare/shadow model, a reflection model, and/or a passive heat model. The cloud-based systems can be in communication with each other and with other applications via the (e.g., cloud) network, e.g., using application program interfaces (APIs). Both the cloud-based 3D model system 810 and the clear sky module 820 include logic as described herein. It would be understood that the logic of these cloud-based modules (as well as other modules described herein) can be stored in computer readable medium (e.g. memory), e.g., of a server of the cloud network. One or more processors (e.g., on the server in the cloud network) can be in communication with the computer readable medium, e.g., to execute instructions to perform the functions of the logic. In one embodiment, window control system 840 receives inputs from a Module B, which is described herein. In another embodiment, window control system 840 receives inputs from Modules A, C1 and/or D1.

The clear sky module 820 can use the 3D model of a building site to generate simulations over time for different positions of the sun under clear sky conditions to determine glare, shadows and/or reflections from one or more objects at and around the building site. For example, the clear sky module 820 can generate a clear sky glare/shadow model and/or a reflection model. The clear sky module may utilize a ray tracing engine to determine the direct sunlight through the window openings of a building based at least in part on shadows and reflections under clear sky conditions. The clear sky module 820 may utilize shadow and reflection data to determine the existence of glare, reflection, and/or passive heat conditions at occupancy regions (i.e. likely locations of occupants) of the building. The cloud-based clear sky module 820 can determine a yearly schedule (or other elected time period) of tint states for at least one (e.g., each) of the zones of the building based at least in part on one or more of these conditions. The cloud-based clear sky module 820 communicates (e.g., pushes) the tint schedule information to the window control system 840.

In some embodiments, the window control system 840 includes a network of window controllers such as the networks described in FIGS. 6 and 7. The control system 840 is in communication with the zones of tintable windows in the building, depicted in FIG. 8 as series of zones from a $1^{st}$ zone 872 to an $n^{th}$ zone 874. The window control system 840 determines final tint states and sends tint instructions to control the tint states of the tintable windows. The final tint states can be determined based at least in part on the (e.g., yearly) schedule information, sensor data, and/or weather feed data. As described with respect to the illustrated system architecture 800, the control system 840 may not generate models (or otherwise invest computing power) on modeling. In some embodiments, the models, which may be specific to the building site, are created, customized, and stored in the cloud network 801. The predefined tint schedule information can be communicated (e.g., pushed) to the window control system initially, and optionally only if updates to the 3D model are needed (for example changes to the building layout, new objects in the surrounding area, or the like).

The system architecture 800 may include a graphical user interface (GUI) 890. e.g., for communicating with customers and/or other users to provide application services, reports, visualizations of the 3D model, receive input for setting up the 3D model, and/or receive input for customizing the 3D model. Visualizations of the 3D model can be provided to users and/or received from users, e.g., through the GUI. In the example shown in FIG. 8, the illustrated users include site operations 892 that are involved in troubleshooting at the site and have the capability to review visualizations and edit the 3D model. The users include a Customer Success Manager (CSM) 894 with the capability of reviewing visualizations and on-site configuration changes to the 3D model. The users include a customer(s) configuration portal 898 in communication with various customers. Through the customer(s) configuration portal 898, the customers can review various visualizations of data mapped to the 3D model and provide input to change the configuration at the building site. Some examples of input from the users can include space configurations such as occupancy areas, 3D object definition at the building site, tint states for particular conditions, and priority of conditions. Some examples of output provided to users include visualizations of data on the 3D model, standard reporting, and performance evaluation of the building. Certain users are depicted for illustrative purposes. It would be understood that other or additional users could be included.

Although many examples of the system architecture are described herein with the 3D Model system, clear sky module, and neural network models residing on the cloud network, in another implementation, one or more these modules and models do not necessarily need reside on the cloud network. For example, the 3D Model system, the clear sky module and or other modules or models described herein may reside on a standalone computer or other computing device that is separate from and in communication with the window control system. As another example, the neural network models described herein may reside on a window controller such as a master window controller or a network window controller.

In certain embodiments, the computational resources for training and executing the various models (e.g., a DNN and LSTM model) and modules of the system architecture described herein include: (1) local resources of the window control system, (2) remote sources separate from the window control system, or (3) shared resources. In the first case, the computational resources for training and executing the various models and modules reside on the master controller or one or more window controllers of a distributed network of window controllers such as the distributed network of the window control system 602 in FIG. 6. In the second case, the computational resources for training and executing the various models and modules reside on remote resources separate from the window control system. For example, the computational resources may reside on a server of an external third-party network or on a server of a leasable cloud-based resource such as might be available over the cloud network 801 in FIG. 8. As another example, the computational resources may reside on a server of a standalone computing device at the site separate from and in communication with the window control system. In the third case, the computational resources for training and executing the various models and modules reside on shared resources (both local and remote). For example, the remote resource such as a leasable cloud-based resource available over the cloud network 801 in FIG. 8 perform daily retraining operations of a DNN model and/or a LSTM model at night and the local resources such as a master window controller or a group of window controllers of the window control system 602 in FIG. 6 execute the live models during the day when tint decisions need to be made.

In various implementations, the system architecture has a cloud-based 3D modelling system that can generate a 3D model (e.g., solid model, surface model, or wireframe model) of the building site using a 3D modelling platform Various commercially-available programs can be used as the 3D modelling platform. An example of such a commercially-available program is Rhino R: 3D software produced by McNeel North America of Seattle Washington. Another example of a commercially-available program is Autocad® computer-aided design and drafting software application by Autodesk® of San Rafael, California. Other examples of tools that may be used to implement aspects of the invention are a reflected/direct glare tool available commercially as WRLD3d by WRLD of Dundee city DD1 INJ, United Kingdom, and IMMERSIFY! VR for Revit and Rhino available from the Immersify Project at https://immersify.cu.

Figure 9:
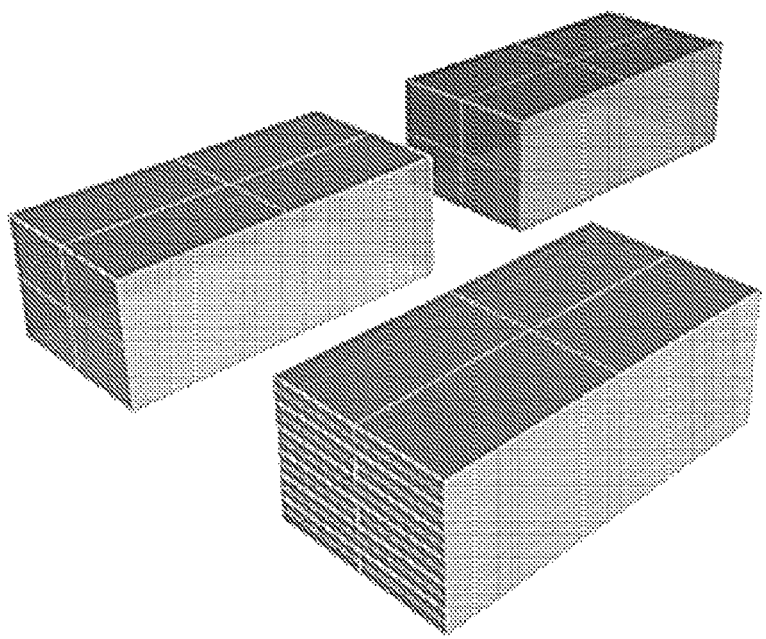
FIG. 9 is an illustration of a 3D model of a building site, according to one example.

In some embodiments, the 3D model is a three-dimensional representation of the buildings and optionally other objects at the site of the building with the tintable windows. A building site refers to a region surrounding the building of interest. The region can be defined to include all objects surrounding the building that would cause shadows and/or reflections on the building. The 3D model can include three-dimensional representation of the exterior surfaces of the building and other objects surrounding the building and of the building stripped of all its surfaces except walls, floors, and exterior surfaces. The 3D model system can generate the 3D model, for example, automatically using a 3D model such as a Revit or other industry standard building model and stripping the modelled building of all its surfaces except walls, floors, and exterior surfaces with window openings. Any other objects in the 3D model would be automatically stripped of all elements except exterior surfaces. As another example, the 3D model can be generated from scratch using 3D modelling software. An example of a 3D model of a building site having three buildings is shown in FIG. 9.

In some embodiments, the model of the enclosure comprises the architecture of the enclosure (e.g., including one or more fixtures). The model may include a 2D and/or a 3D representation of the enclosure (e.g., facility including a building). The model may identify one or more materials of which these fixtures are comprised. The model may comprise Building Information Modeling (BIM) software (e.g., Autodesk Revit) product (e.g., file). The BIM product may allow a user to design a building with parametric modeling and drafting elements. In some embodiments, the BIM is a Computer Aided Design (CAD) paradigm that allows for intelligent, 3D and/or parametric object-based design. The BIM model may contain information pertaining to a full life cycle for a building, from concept to construction to decommissioning. This functionality can be provided by the underlying relational database architecture of the BIM model, that may be referred to as the parametric change engine. The BIM product may use .RVT files for storing BIM models. Parametric objects—whether 3D building objects (such as windows or doors) or 2D drafting objects—may be referred to as families, can be saved in .RFA files, and can be imported into the RVT database. There are many sources of pre-drawn RFA libraries.

The BIM (e.g., Revit) may allow users to create parametric components in a graphical "family editor." The model can capture relationships between components, views, and annotations, such that a change to any element is automatically propagated to keep the model consistent. For example, moving a wall updates neighboring walls, floors, and roofs, corrects the placement and values of dimensions and notes, adjusts the floor areas reported in schedules, redraws section views, etc. The BIM may facilitate continuous connection, updates, and/or coordination between the model and (e.g., all) documentation of the facility, e.g., for simplification of update in real time and/or instant revisions of the model. The concept of bi-directional associativity between components, views, and annotations can be a feature of BIM.

Recent installations of large numbers of tintable windows (such as electrochromic windows, sometimes referred to as "smart windows") in large-scale buildings have created an increased need for complex control systems, e.g., that involve extensive computing resources. For example, a high number of tintable windows deployed in a large-scale building may have a huge number of zones (e.g., 10,000) which requires complex reflection and glare models. As these tintable windows continue to gain acceptance and are more widely deployed, they will require more sophisticated systems and models that will involve a large amount of data.

Figure 10:
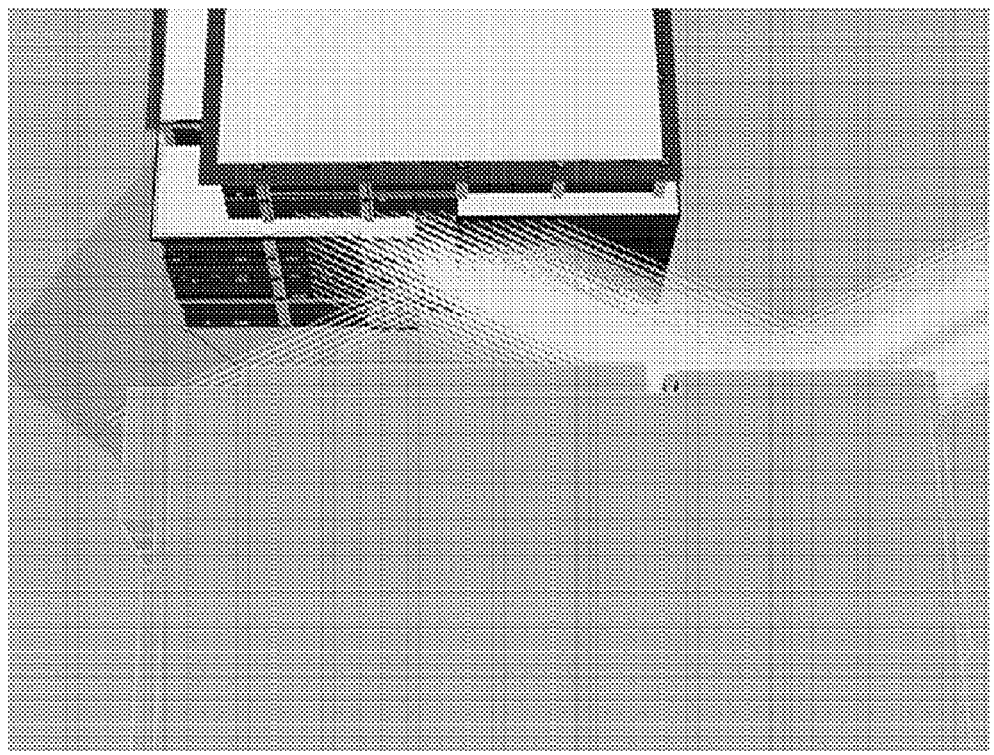
FIG. 10 is an illustration of a visualization of a glare/shadow and reflection model based at least in part on the 3D model and showing the rays of direct sunlight from the sun at one position in the sky under clear sky conditions, according to one example.

The system architecture described herein generates 3D model visualizations using 3D modelling platforms that can be implemented locally, remotely, and/or in the cloud. The models include, for example, a glare/shadow model, a reflection model, and a passive heat model. The 3D models can be used to visualize effects of sunlight on the interior and the exterior of a building. FIG. 10 is an example of a visualization of glare, shadows, reflections, and heat present along exterior surfaces of a building according to the path of the sun at a particular time of day. The visualizations can be generated under clear sky conditions, e.g., that are based at least in part on a clear sky model for the location of the building. The visualizations can be used to evaluate and control glare in single and/or multiple occupancy regions and zones in any sized interior space on any floor of a building and can take into account the exterior of buildings and their features such a overhangs, columns, etc. that may be in the path of the sun. The 3D representation can take into account primary reflections, secondary reflections, single reflections, and/or multiple reflections from complex curved and convex shapes of external objects and buildings; and their impact on occupancy regions and zones within a building. The visualizations can be used to model the presence and/or effects of heat caused by direct radiation, radiation reflected and/or diffused by external objects and buildings, and as well, radiation occluded by external objects and buildings.

The clear sky module includes logic that can be implemented to assign attributes to the 3D model to generate a clear sky 3D model. The clear sky module can include logic that can be used to generate other models to determine various conditions such as, for example, a glare/shadow model, a reflection model, and a passive heat model. These models of the building site can be used to generate a (e.g., yearly) schedule of tint states for the zones of the building that is communicated (e.g., pushed) to the control system at the building, e.g. to make (e.g., final) tinting decisions. With such a system architecture, most of the data can be kept on the (e.g., cloud) network. Keeping the models on the (e.g., cloud) network can allow for easy access to and/or customization by customers and other users. For example, visualizations of various models can be sent to the users to allow them to review and send input, for example, to setup and customize the models and/or override final tinting schedules or other systems functions at the building. For example, the visualizations can be used by users to manage input used to assign rules to the clear sky model such as in zone management and/or window management, e.g., as part of site set up and/or customization.

In some embodiments, the system architecture includes a GUI for interfacing with various customers and other users. The GUI can provide application services and/or reports to the user(s), and/or receive input for the various models from the users. The GUI can, for example, provide visualizations of various models to the users. The GUI can provide an interface for zone management, window management, and/or occupancy region definition, to set up the clear sky model. The GUI can provide an interface for entering priority data, reflective properties of exterior surfaces, override values, and/or other data. The users can use the GUI to customize the spaces of the 3D model, for example, after viewing visualizations of the clear sky model of the building site. Some examples of customizations include: (1) re-structure the building site (move buildings, revise exterior surface properties) to see changes to reflection, glare, and heat conditions or to tinting of zones of building, (2) re-structure internal structures (walls, floors) and external shell of building to see how changes will affect tint states. (3) manage zones of windows, (4) change materials used in building to see changes to reflection properties and corresponding changes in reflection model and tint states, (5) change tinting priorities to see changes in tint states as mapped to a three-dimensional (3D) model of building. (6) override tint states in schedule data. (7) revise buildings at building site, and/or (8) add model of new condition.

The system architecture described herein includes a control system that includes a network of controllers controlling the tint levels of the tintable windows (e.g., arranged in one or more zones) at the building. Some examples of controllers that may be included in the window control system 840 of the system architecture are described with respect to FIGS. 6-8. Other examples of window controllers are described in U.S. patent application Ser. No. 15/334,835 filed Oct. 26, 2016 and titled "CONTROLLERS FOR OPTICALLY-SWITCHABLE DEVICES," which is hereby incorporated by reference in its entirety.

Window control system 840 includes control logic for making tinting decisions and sending tint instructions to change tint levels of the tintable windows. In certain embodiments, the control logic includes a Module A having a cloud-based 3D model system 810 and a cloud-based clear sky module 820, and a Module B described further below, where Module B receives signals from a Module C with one or more photosensor values and/or from a Module D with one or more infrared sensor values (see FIG. 27). Module C may include one or more photosensors that take photosensor readings or may receive signals with the raw photosensor readings from one or more photosensors, e.g., residing in a multisensor device or in a sky sensor. Similarly. Module D may include one or more infrared sensors and/or an ambient temperature sensor(s) that take temperature readings or may receive signals with the raw temperature measurements from one or more infrared sensors, e.g., residing in a multi-sensor device or a sky sensor.

In some embodiments, the tinting decisions (e.g., based on real physical sensor data) may be referred to herein as "Intelligence" module. The Intelligence module may comprise modules A, B, C, C1, D and/or D1. The Intelligence module may at least partially rely on sensor data that occurred in the past. The Intelligence module may at least partially rely on sensor data from real physical sensors (e.g., any sensor or sensor module disclosed herein such as a photosensor, infrared sensor, and/or sky sensor. The Intelligence module may not rely on a virtual sensor (e.g., VSS), e.g., as disclosed herein.

Figure 11:
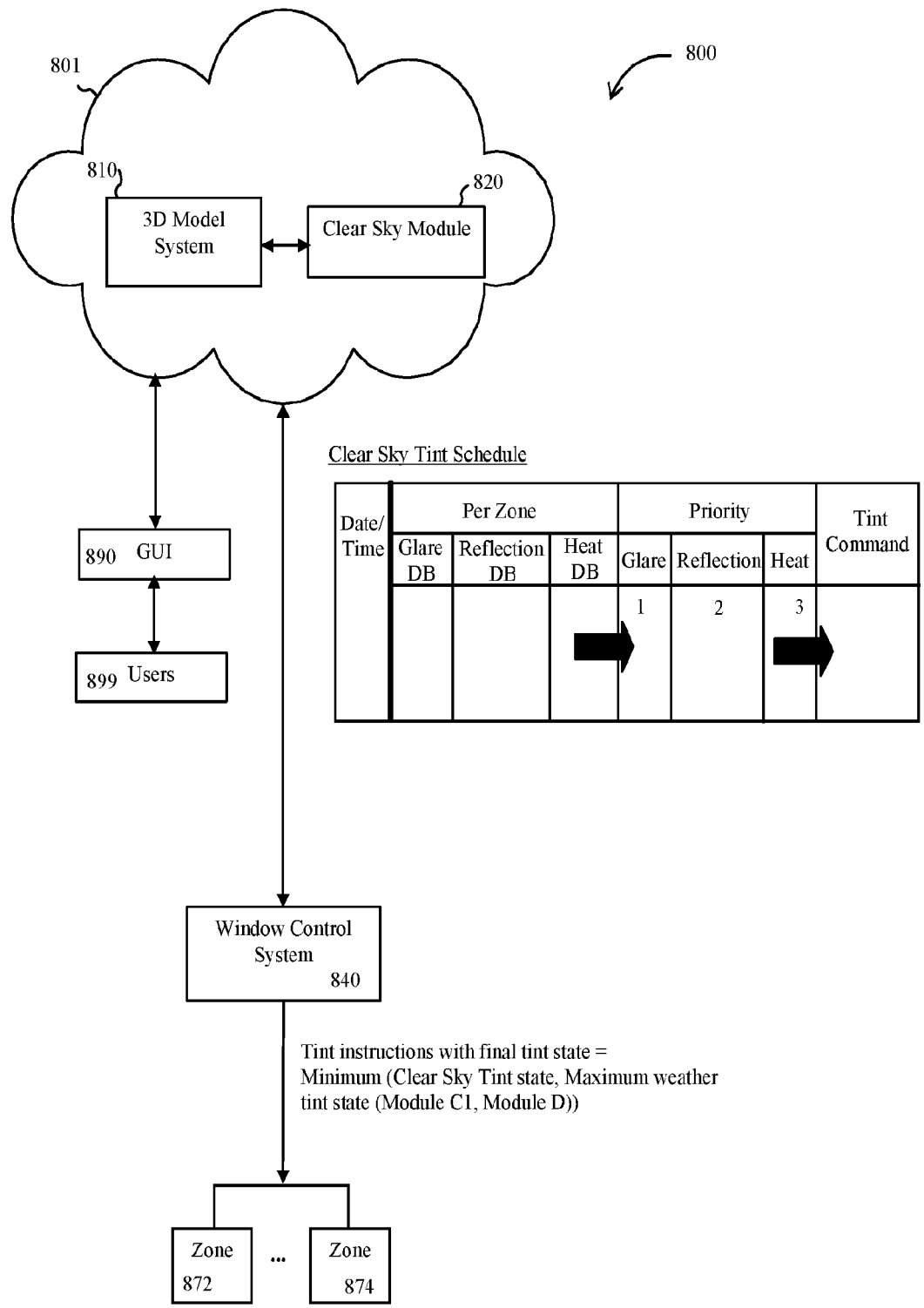
FIG. 11 is an illustrated example of the flow of data communicated between some of the systems of the system architecture shown in FIG. 8.

FIG. 11 is an illustrated example of the flow of data communicated between some of the systems of the system architecture 800 shown in FIG. 8. As shown, Module A (including 810 and 820) provides its information to the window control system 840. In one implementation, the control logic of the window control system 840 receives one or more inputs from Module B and sets the final tint state for at least one (e.g., each) zone based at least in part on outputs received from Module A and/or Module B. In another implementation shown in FIG. 28, the control logic of the window control system 840 receives one or more inputs from Module C1 and Module D1 and sets the final tint state for at least one (e.g., each) zone based at least in part on outputs received from Module A, Module C1, and Module D1.

Figure 12:
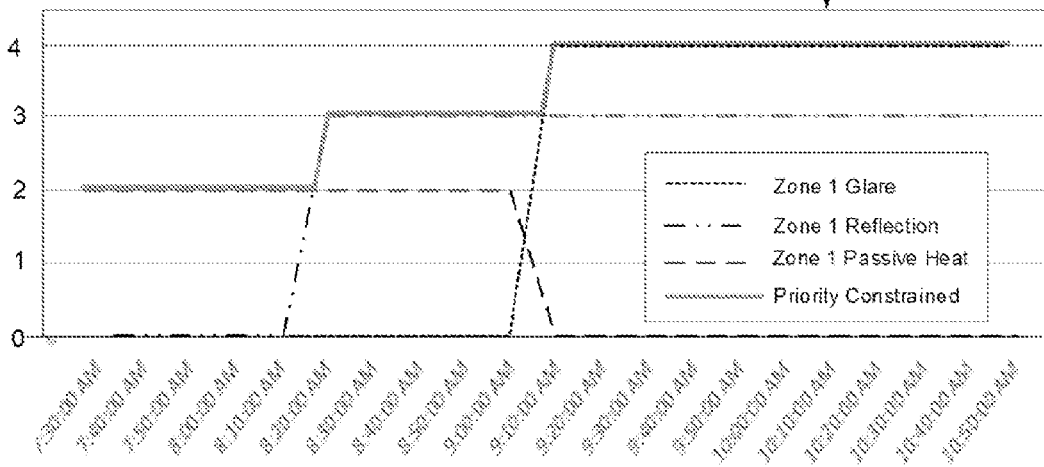
FIG. 12 is illustrates an example of logic operations of a clear sky module in generating clear sky model schedule information, according to an implementation.

FIG. 12 is schematic illustration of an example of certain logic operations implemented by the clear sky module 820 to generate tint schedule information based at least in part on clear sky conditions. In this illustrated example, the clear sky module applies the tint state assigned to at least one (e.g., each) condition to the condition values and then applies the priorities from the priority data to determine the tint state for at least one (e.g., each) zone at a particular time. In another example, the clear sky module could apply the priorities from the priority data to the condition values to determine the condition that applies and then apply the tint state for that condition to determine a tint state for at least one (e.g., each) zone at a particular time interval. In FIG. 12, the top table titled "Table 1" is an example of a table of condition values determined by the clear sky module including values of the glare condition, the direct reflection condition, and the passive heat condition for zone 1 at time intervals during a day. In this example, the condition values are binary values 0/1 of whether condition exists at different times during day: 0—Condition does not exist; and 1—Condition does exist. FIG. 12 includes a second table titled "Table 2" that shows an example of tint state output from the clear sky module. This tint state assigned to each zone for each condition. For example, Zone 1 is assigned for a glare condition to Tint 4. Zone 1 is assigned for a reflection condition to Tint 3, Zone 2 is assigned for a passive heating condition to Tint 1. When a condition is true, the clear sky module assigns a tint state to apply for that condition. Priority data refers to the list of priorities for applying conditions at each zone of the building. Priority data can be configurable by a user in certain cases. The third table titled "table 3" illustrated in FIG. 12 is an example of a configurable priority table (e.g. configurable by a user) that lets the system know which condition takes priority. In this example, priorities are given for glare condition, direct reflection condition, and passive heat condition for each zone of a building. The bottom graph in FIG. 12 is an example of the tint states determined at Zone 1 over a portion of a day based on the priority data from Table 3 applied to the condition values in the top tables Table 1 and Table 2.

Figure 13:
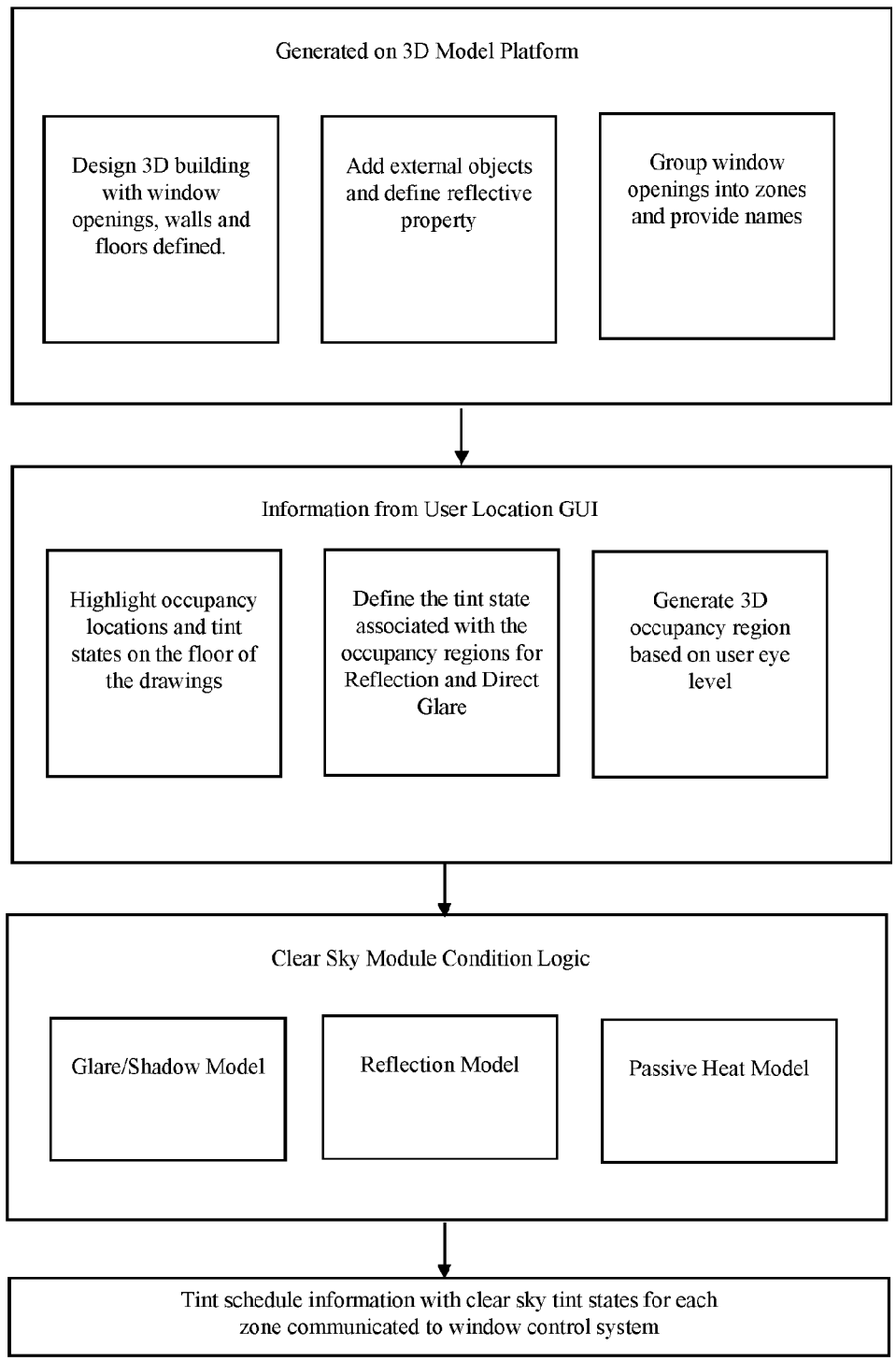
FIG. 13 is schematic depiction of the model data flow through the cloud-based systems of the system architecture shown in FIG. 8.
Figure 13:
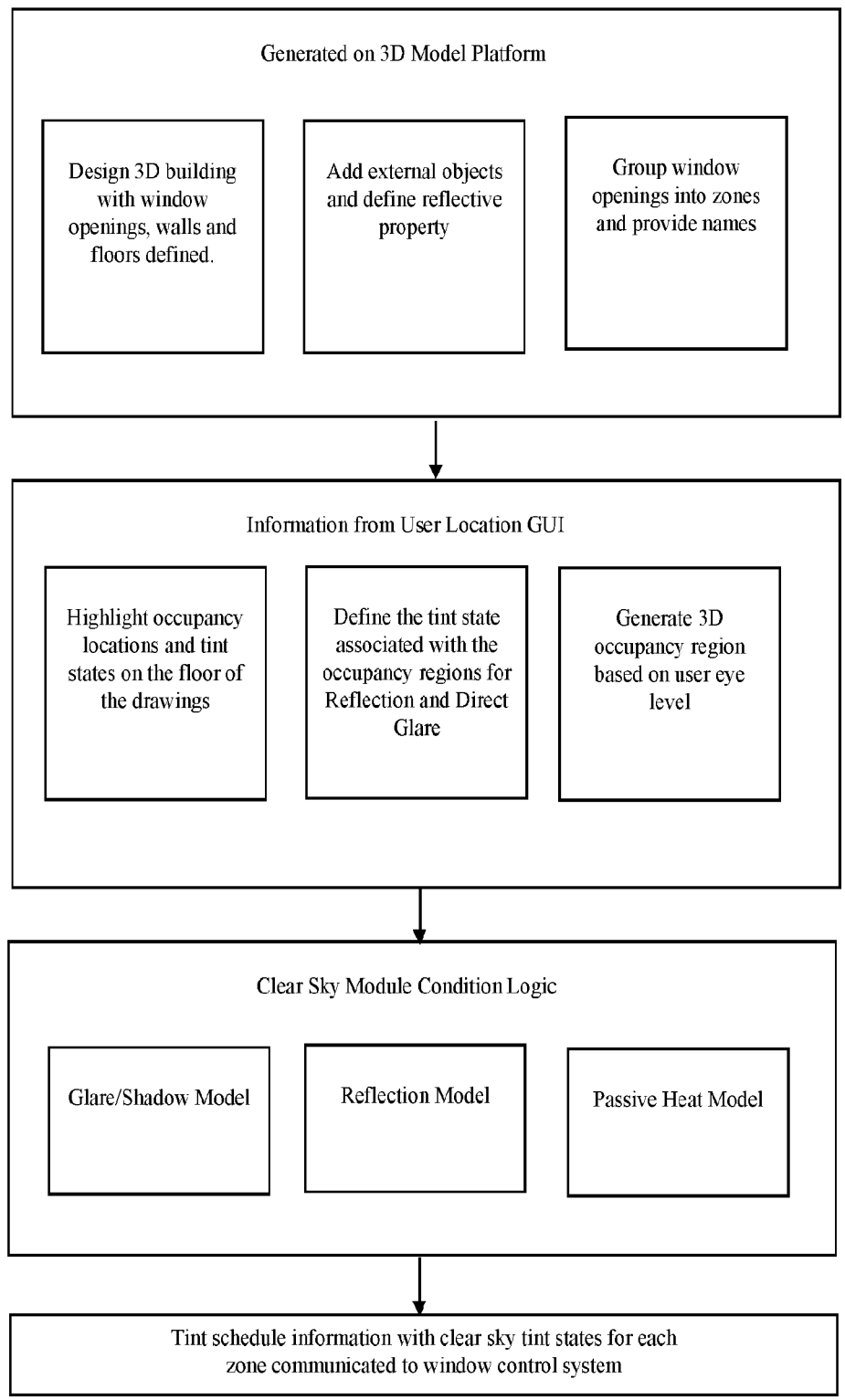

FIG. 13 is schematic depiction of the model data flow through the cloud-based systems of the system architecture of an implementation. A 3D model is generated on the 3D platform. The 3D model includes a 3D version of the building of with window openings, walls and floors defined. External surfaces of surrounding objects (and their reflective properties) can be added to the 3D model. The window openings in the 3D model can be grouped into zones and/or given names.

Information is received from the user, for example, via the user location GUI. For example, the user can highlight or otherwise identify the 2D areas of the occupancy locations and the desired tint states for these occupancy locations on the floor of the spaces of the 3D model of the building (or in the architectural model used to generate the 3D model). The user can use the GUI to define the tint state for at least one (e.g., each) occupancy region that is associated with at least one (e.g., each) condition such as, for example, direct glare condition and reflection condition. The user can input a user level between a ground level up to a user eye level, which level can be used to generate a 3D extrusion of the 2D area to generate a 3D volume of the occupancy region. In one embodiment, if a user does not input a level, the level defaults (e.g., to 6 feet). The clear sky module condition logic can be used to generate various condition models including, for example, a glare/shadow model, a reflection model, and/or a heat model, at least one of these condition models can be used to generate (e.g., yearly) schedule information communicated to the window control system.

In some embodiments, the 3D model of the building site is initialized during a site setup process. In some implementations, the user is given the capability (e.g., through a GUI) of revising the model, e.g., to customize the control of the tintable windows and/or other systems in the building. These customizations can be reviewed by the user through visualizations on the 3D modelling platform. For example, customers or other users can view what has been designed for the building after customization and how it will operate on a given day and provide "what if" scenarios. Different users can review the same 3D model stored on the (e.g., cloud) network, e.g., to compare and/or discuss options that will cater to multiple users. For example, CSMs can review user locations, tint states by condition, priorities, and/or expected behavior during clear sky conditions. e.g., with facility managers.

In some embodiments, the site setup process includes generating a 3D model of the building site and/or assigning attributes to the elements of the 3D model. The 3D model platform can be used to generate a 3D model of the building site, e.g., by stripping away unnecessary features from an architectural model of the building and creating external surfaces of objects surrounding the building.

Figure 14:
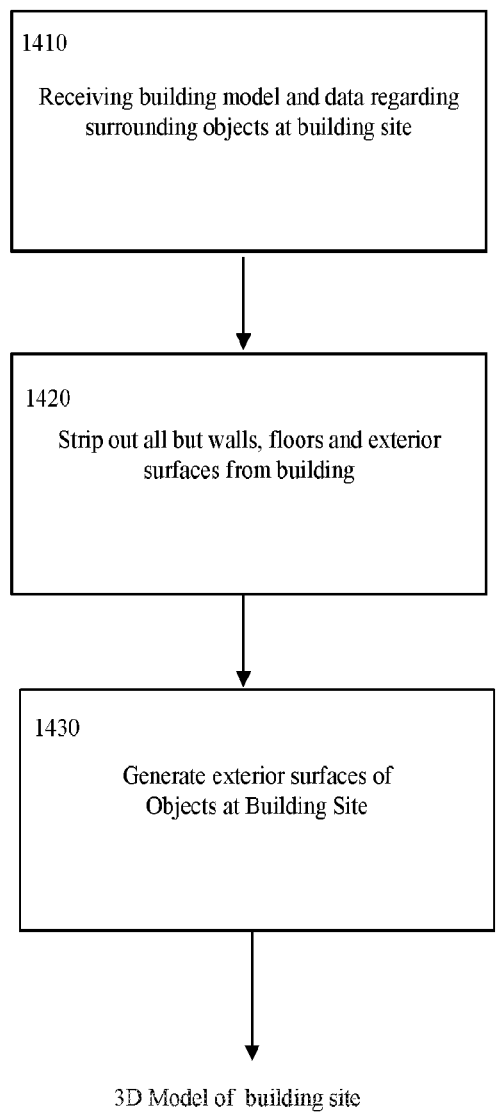
FIG. 14 is a flowchart of the general operations involved in initializing the 3D model on the 3D model platform, according to various implementations.

FIG. 14 is an example flowchart of operations involved in initializing the 3D model on the 3D model platform according to various implementations. In one implementation, the 3D model is generated automatically from an architectural model of the building and/or the surrounding structures by stripping the architectural model of all extra elements. For example, an Autodesk® Revit model of a building may be received and stripped of all elements except walls, floors, and exterior surfaces including window openings. These operations may be implemented by the 3D modelling system. In FIG. 14, the 3D modelling system receives an architectural model for the building with the tintable windows for the structures and other objects surrounding the building at the building site (1410). At operation 1420, the 3D modelling system strips out all but the structural elements representing the window openings, walls, floors and exterior surfaces of the building with the tintable windows. At operation 1430, the 3D modelling system builds the exterior surfaces of buildings and other objects surrounding the building or removes all elements from the surrounding objects except the exterior surfaces. The output of operation 1430 is the 3D model of the building site. An example of a 3D model of a building site is shown in FIG. 9. In some embodiments, the model is un-stripped from at least one (e.g., all) non-structural element.

Figure 15:
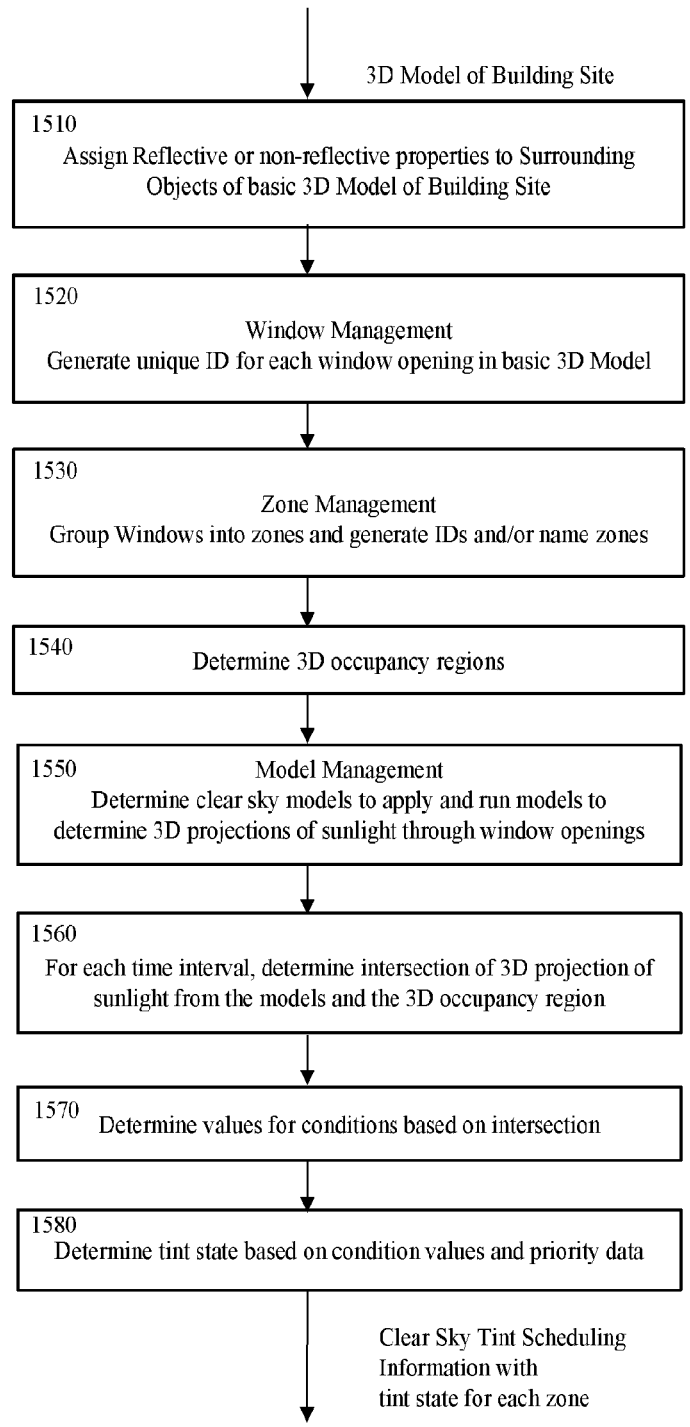
FIG. 15 is a flowchart of the general operations involved in assigning attributes to the 3D model, generating the condition models, and other operations involved to generate the clear sky scheduling information, according to various implementations.

FIG. 15 is a flowchart of the operations involved in assigning attributes to the 3D model, generating the condition models, and other operations involved to generate the clear sky scheduling information according to certain implementations. One or more of these operations may be implemented using logic of the clear sky module. As depicted, the input for the operations is the 3D model of the building site from the 3D modelling system. At operation 1510, the reflective or non-reflective properties are assigning to the surface elements of objects surrounding the building of the 3D model of the building site. These reflective properties will be used to generate the reflective model to evaluate conditions. At 1520, a unique window ID is assigned to each window opening of the 3D model. In this window management operation, the window openings are mapped to unique window/controller IDs. In one implementation, these mappings may be validated and/or revised based at least in part on input from commissioning of the windows at installation in the building. At 1530, window openings in the 3D model are grouped into zones and zone IDs and/or names are assigned to the zones. In this zone management operation, window openings in the 3D model are mapped to zones. At 1540, the 3D occupancy regions in the model are generated and assigned tint states. For example, the user may identify 2D occupancy areas on floors of the 3D model and an eye level of an occupant and the logic of the clear sky module may generate extrusions of the 3D occupancy area to the eye level to generate the 3D region. At 1550, the clear sky models that will be applied are determined and the models are run to determine the 3D projections of sunlight through the window openings. In this model management operation, the various clear sky models, e.g., glare/shadow model and reflection model, are generated according to one implementation. The clear sky module includes a ray tracing engine that determines the directions of rays of sunlight based at least in part on different positions of the sun in the sky throughout a day of a year or other time period and determines the reflection direction and intensity from the location and reflective properties of the external surfaces of the objects surrounding the building. From these determinations. 3D projections of direct beam sunlight through the window openings in the 3D model can be determined. At 1560, the amount and duration of any intersection of the 3D projection of sunlight from the models and the 3D occupancy region is determined. At 1570, the conditions are evaluated based at least in part on the determined intersection properties at operation 1560. At operation 1580, the priority data is applied to the conditions values to determine a tint state for at least one (e.g., each) zone of the building over time, e.g., in a (e.g., yearly) schedule. These tint states based at least in part on clear sky conditions are communicated to the window control system.

In some embodiments, during set up of the 3D model of the building site, at least one (e.g., each) window opening is assigned a unique window identification (ID) that corresponds to its local window controller. Assigning the window opening to a window ID maps the window opening to a window controller. A window ID effectively represents a window controller that can be grouped into a zone. After installation of the windows and their controllers in a building, commissioning operations may be used to determined which window is installed in which location, and paired to which window controller. These associations from the commissioning process can then be used to compare to and validate the mapping in the 3D model and/or update the mapping in the configuration data of the 3D model. An example of a commissioning process that can determine such mappings is described in International Patent Application Serial No. PCT/US17/62634, filed Nov. 20, 2017, titled "AUTOMATED COMMISSIONING OF CONTROLLERS IN A WINDOW NETWORK," which is hereby incorporated by reference in its entirety. The mapping of the window opening to a window ID may be revised based at least in part on other user customizations.

Figure 16:
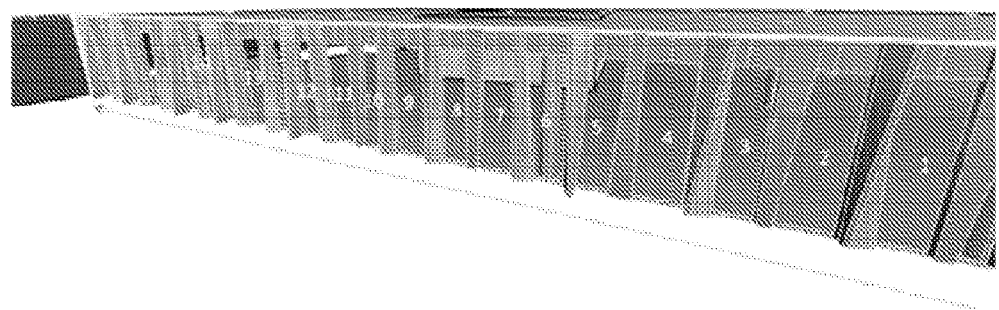
FIG. 16 is an example of a visualization of window management on the 3D modelling platform, according to various implementations.

In one implementation, the user can select window openings in the 3D model on the 3D platform and assign unique window ids. FIG. 16 is an example of such an implementation as applied to fourteen (14) window openings in a floor of a building. As shown, the user has assigned these window openings the window IDs of 1-14.

In some embodiments, at least one (e.g., each) zone of a building includes one or more tintable windows. The tintable windows may be represented as openings in the 3D model. The one or more tintable windows in a zone will be controlled to behave in the same way. This means that if the occupancy region(s) associated with one of the windows in a zone experiences a particular condition, all the windows will be controlled to react to that condition. The configuration data with attributes of the 3D model include zone properties such as name, glass SHGC, and maximum internal radiation. An occupant may (e.g., manually) override inclusion of a window in a zone.

Figure 17A:
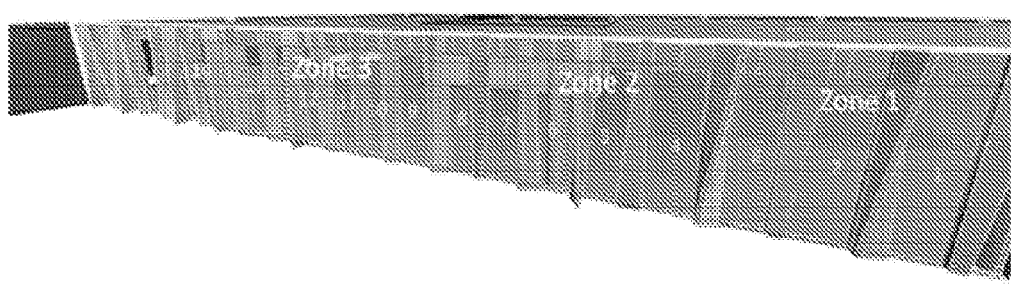
FIG. 17A is an example of a visualization of zone management on the 3D modelling platform, according to various implementations.
Figure 17B:
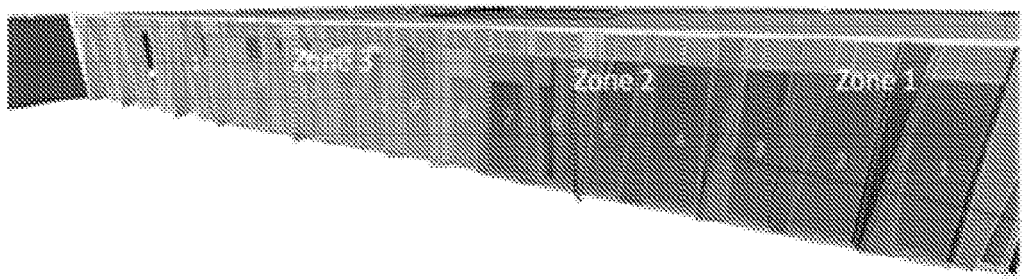
FIG. 17B is an example of a visualization of zone management on the 3D modelling platform, according to various implementations.

During zone management as part of site setup or customization of the 3D model, a user can define the window openings that will be grouped together in zones and assign properties to the defined zones. FIG. 17A is an example of an interface on the 3D modelling platform that allows a user to select window openings shown in FIG. 16 to group together as (map to) zones and name the zones. As shown, openings 1, 2, and 3 are defined as a "Zone 1," openings 4-7 are defined as "Zone 2," and openings 8-14 are defined as "Zone 3." In one aspect, the user can combine zones so that they multiple zones behave in the same way. FIG. 17B is an example of an interface on the 3D modelling platform that allows a user to combine multiple zones from FIG. 17A. As shown, "Zone 1" and "Zone 2" are grouped together.

Figure 18:
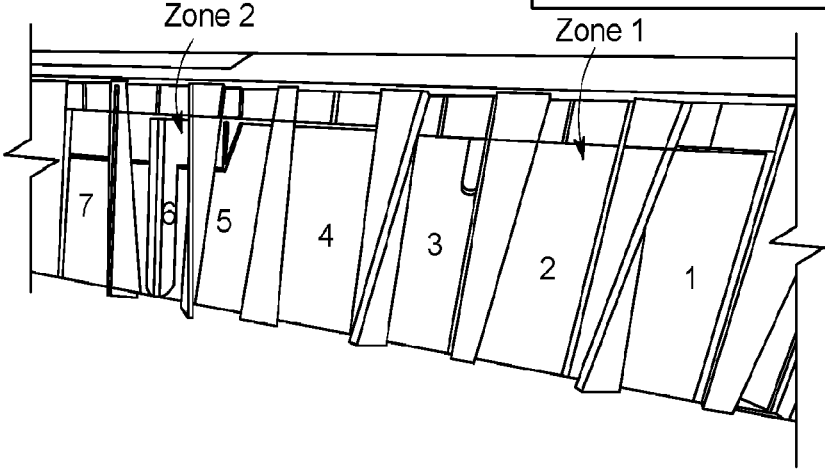
FIG. 18 is an example of an interface that can be used by a user in zone management, according to various implementations.

FIG. 18 is an example of interface that can be used by a user to map the unmapped spaces of the 3D model to particular modelled zones. As shown, the user has selected the spaces of "Office 1," "Office 2," "Office 3," and "Office 4" to be mapped to "Zone 1." In this example, the windows associated with these spaces will be associated with "Zone 1." In one embodiment, the user can select the "review mapping" button to visualize the mapped windows of the spaces in "Zone 1" on the 3D model of the building site.

Figure 19:
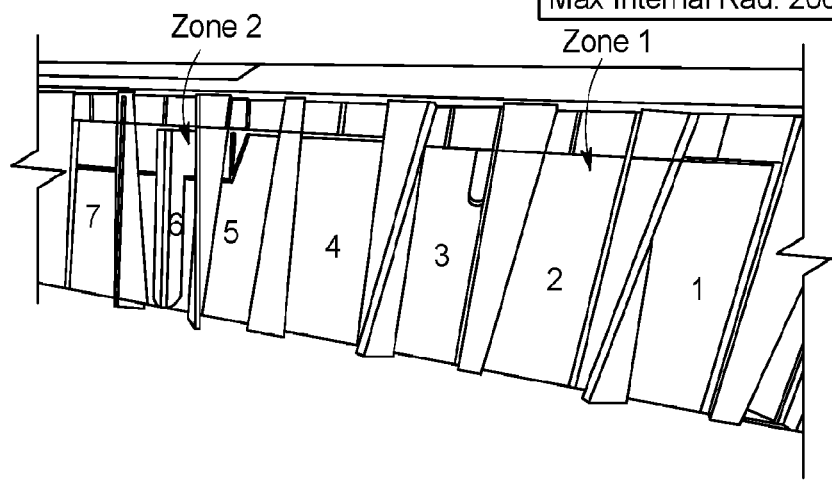
FIG. 19 is an example of an interface that can be used by a user in zone management to review the properties assigned to each zone, according to various implementations.

During zone management, at least one (e.g., each) zone is assigned zone properties. Some examples of zone properties include: zone name (user defined), zone id (system generated), IDs of windows, glass SHGC, maximum allowable radiation into the space in watts per meter squared. FIG. 19 is an example of interface that can be used by review the properties assigned to at least one (e.g., each) zone.

As used herein, an occupancy region refers to a three-dimensional volume that is likely to be occupied or is occupied during a particular time period. Occupancy regions (e.g., conference rooms) are defined during site setup and can be re-defined during customization. Defining occupancy regions can involve defining the three-dimensional volume by extruding a two-dimensional area to an occupant eye level, and assigning properties to the occupancy region. Some examples of properties include occupancy region name, glare tint state (tint state if glare condition exists), direct reflection tint state (tint states for different levels of direct reflection radiation), and/or indirect reflection tint state (tint states for different levels of indirect reflection radiation).

Figure 20A:
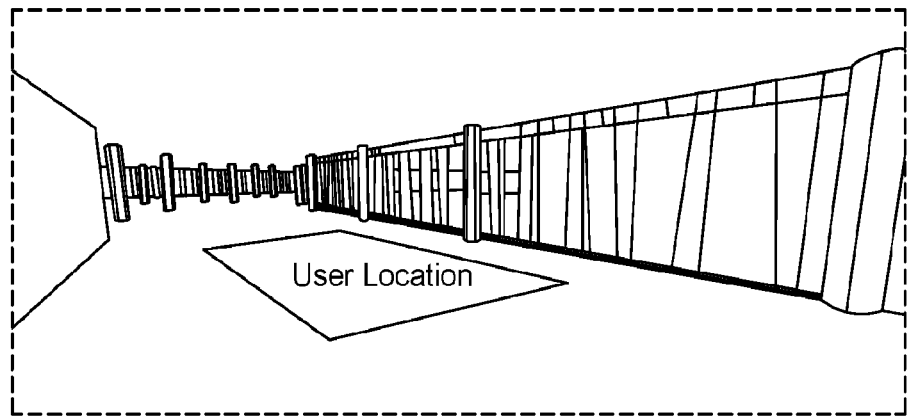
FIG. 20A is an illustrated example of a two-dimensional user location drawn on the floor of a 3D model, according to an implementation.
Figure 20B:
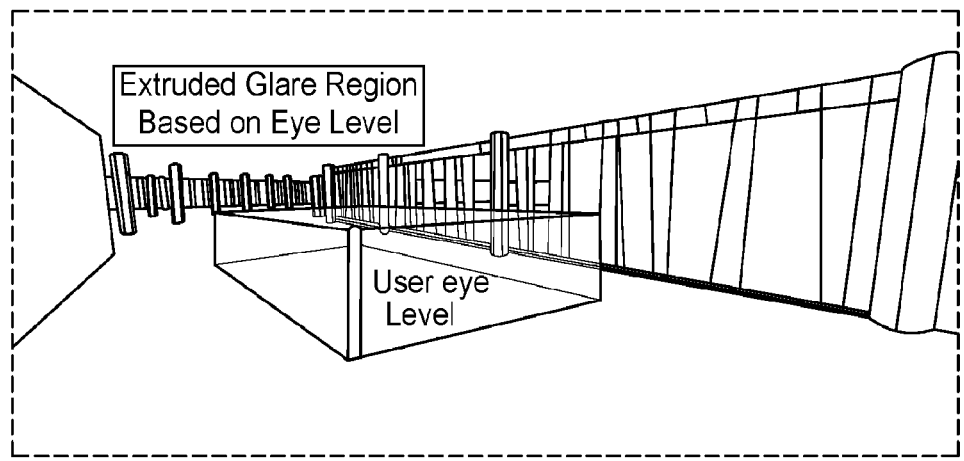
FIG. 20B is an illustrated example of a three-dimensional occupancy region generated by extruding the two-dimensional object in FIG. 20A to an upper eye level.

In certain implementations, an occupancy region is generated on the 3D modelling platform. The user may draw or otherwise define the user location as a two-dimensional shape (e.g., polygon) or shapes on the floor or other surface (e.g., desktop) of the 3D model and defines an occupant eye level. The clear sky module may define the three-dimensional occupancy region as an extrusion of the two-dimensional object from the surface to the occupant eye level (e.g., lower eye level or upper eye level). An example of a two-dimensional four-sided user location drawn on the floor of a 3D model is shown in FIG. 20A. An example of a three-dimensional occupancy region generated by extruding the two-dimensional object in FIG. 20A to an upper eye level is shown in FIG. 20B.

In certain implementations, a glare/shadow model, a direct reflection model, and an indirect reflection model are generated based at least in part on the 3D model. These models can be used to determine the 3D projections of sunlight through the window openings of the 3D model over time based at least in part on clear sky conditions. In some embodiments, a raytracing engine is used to simulate the directions of rays of sunlight at the location of the sun during at least one (e.g., each) time interval. The simulations can be run to evaluate different glare conditions in at least one (e.g., each) of the zones of a building such as a basic glare condition (direct radiation intersecting an occupancy region), direct reflection glare condition (single bounce reflection off a direct reflective surface to an occupancy region), and/or indirect reflection glare condition (multiple bounce reflection off an indirect reflective surface(s) to an occupancy region). In some embodiments, the simulations assume clear sky conditions and may take into account shadowing on spaces and reflection by external objects surrounding the building. The simulations determine values of glare and other conditions in time intervals over a year or other time period. The schedule data may include values for at least one (e.g., each) of the conditions and/or tint state for at least one (e.g., each) time interval (e.g., every 10 minutes) over a time period such as a year.

In some embodiments, the clear sky module includes logic to determine whether different conditions (e.g., glare, reflection, passive heat) exist at least one (e.g., each) zone of the building at least one (e.g., each) time interval (e.g., every ten minutes) of a time period such as a year. The clear sky module can output schedule information of values for these conditions and/or associated tint states at least one (e.g., each) zone for at least one (e.g., each) time interval. The value of a condition may be, for example, a binary value of 1 (condition does exist) or 0 (condition does not exist). In some cases, the clear sky module includes a raytracing engine that determines the direction of rays of sunlight (direct or reflected) based at least in part on the location of the sun at different times.

In one embodiment, the glare condition is evaluated based at least in part on multiple glare areas from the models in a single occupancy region. For example, light projections can intersect different occupancy areas within a single occupancy region. In one aspect, the conditions are evaluated based at least in part on multiple elevations within in a single zone.

In some embodiments, a determination of the glare condition is a function of the intersection of a 3D projection of sunlight from the glare (absence of shadow) model and/or the direct reflection (one bounce) model with the three-dimensional occupancy region. In some embodiments, a positive determination of basic glare from the glare model is a function of the % of total intersection with the 3D occupancy region and the duration of the intersection. In some embodiments, the determination of reflection glare based at least in part on the reflection model is a function of the duration of the intersection.

In some embodiments, the clear sky module includes logic for evaluating the existence of a glare condition based at least in part on the glare (absence of shadow) model and/or the direct reflection (one bounce) model based at least in part on surrounding objects to the building.

According to some embodiments, for at least one (e.g., each) zone, the logic determines from the glare model if 3D projections of direct sunlight through the window openings of the zone intersect any of the three-dimensional occupancy regions in the zone. If the % intersection is greater than the minimum % of total Intersection (minimum threshold of overlap from the window projection into the occupancy region before glare condition is considered) and the duration of the intersection is greater than the minimum duration of intersection (minimum amount of time the intersection must occurs before it becomes significant), then a glare condition value (e.g., 1) and tint state associated with the glare condition is returned. If the logic determines from the glare model that a 3D projection of direct sunlight through the window openings does not intersect any of the three-dimensional occupancy regions in the zone, for example, zone is in a shadow, then a glare condition value (e.g., 0) and tint state associated with no glare condition is returned. The logic takes the maximum tint state of the zones that may be linked together. If there are no intersections, a lowest tint state is returned (e.g., tint 1). The occupancy region may be predetermined (e.g., using a 3D model of the enclosure (e.g. facility). Occupancy of a region may be determined by a sensor and/or emitter. The sensor may be an occupancy sensor. The sensor and/or emitter may comprise geolocation technology (e.g., ultrawide bandwidth (UWB) radio waves, Bluetooth technology, global positioning system (GPS), and/or infrared (IR) radiation. The occupancy may be determined using a microchip (e.g., comprising the sensor(s) and/or emitter(s)). The occupancy may be determined using space mapping. The occupancy region may be determined using an identification tag of occupant(s), e.g., comprising the microchip, sensor(s), and/or emitter(s).

In an implementation, the logic determines for at least one (e.g., each) time interval, for at least one (e.g., each) zone of tintable windows (collection of window openings), if the sun is (e.g., directly) intersecting any of the three-dimensional occupancy regions. If any of the occupancy regions are simultaneously intersected, output is condition does exist. If none of the occupancy regions are intersected, the condition does not exist.

Figure 21:
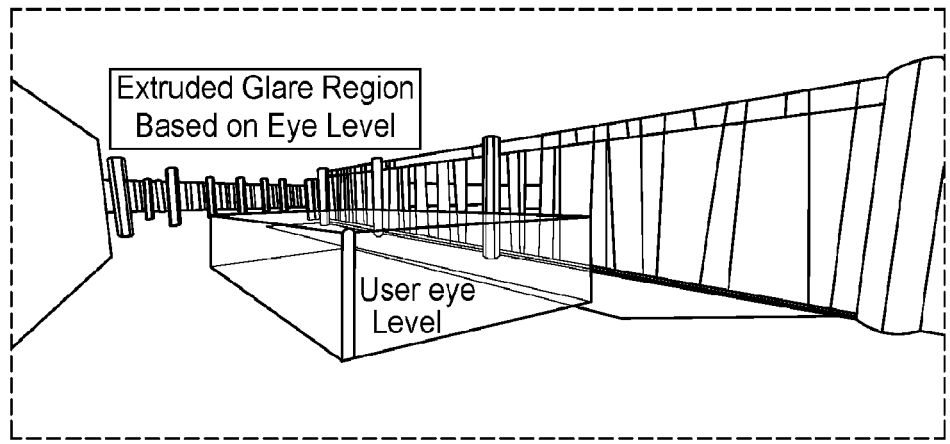
FIG. 21 is an illustrated example of using the glare/shadow model that returned a no glare condition based at least in part on the three-dimensional occupancy region shown in FIG. 20B.

FIG. 21 is an example of using a simulation of the glare/shadow model that did not return a glare condition using basic glare. In this example, the simulation generated a low total intersection of glare with the 3D occupancy region and the glare was not present long throughout the day so that the clear sky module did not return a glare condition.

Figure 22:
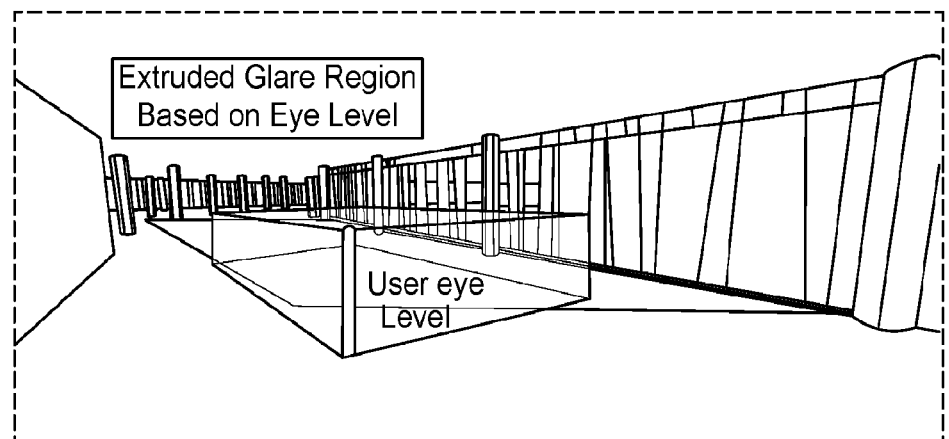
FIG. 22 is an illustrated example of using the direct reflection (one bounce) model that returned a glare condition based at least in part on the three-dimensional occupancy region shown in FIG. 20B.

FIG. 22 is an example of using a simulation of the direct reflection (one bounce) model that returned a glare condition using glare from direct one-bounce reflection. In this example, the simulation generated a high total intersection with the 3D occupancy region and extended periods of glare occurred on this day so that glare value was returned.

The clear sky module includes logic for evaluating the existence of a reflection condition under clear sky conditions based at least in part on the models and for determining the lowest state to keep the internal radiation below the maximum allowable internal radiation. The logic determines a radiation condition based at least in part on the direct normal radiation hitting the window openings of a zone. In some embodiments, the logic determines a tint state based at least in part on the clearest tint state that can keep the normal radiation below the defined threshold for that zone.

In some embodiments, the logic determines the external normal radiation on the tintable window from the 3D model, and calculates the internal radiation for at least one (e.g., each) tint state by multiplying the determined level of external radiation by the glass SHGC. In some embodiments, the logic compares the maximum internal radiation for the zone to the calculated internal radiation for at least one (e.g., each) of the tint states and chooses the lightest calculated tint state that is below the maximum internal radiation for that zone. For example, the external normal radiation from the model is 800 and the maximum internal radiation is 200 and the T1 SHGC=0.5, T2=0.25, and T3=0.1. The logic calculated the internal radiation for at least one (e.g., each) tint state by multiplying the determined level of external radiation by the glass SHGC: Calc T1 (800)*0.5=400, Calc T2 (800)*0.25=200, and Calc T3 (800) *0.1=80, the symbol "*" designates the mathematical operation "times." In some embodiments, the logic would select T2 since T2 is lighter than T3.

In another implementation, the logic determines for at least one (e.g., each) zone of windows (e.g., collection of openings), if the sun has a single bounce off of the external objects. If there is a reflection to any of the occupancy regions, then reflection condition does exist. If reflection is not on any of the occupancy regions, the reflection condition does not exist.

In certain implementations, the clear sky module includes logic for evaluating the existence of a passive heat condition that sets a darker tinting state in the windows of a zone based at least in part on output from the clear sky models. The logic can determine the external solar radiation hitting the tintable windows under clear sky conditions from the clear sky models. The logic can determine the estimated clear sky heat entering the room based at least in part on the external radiation on the tintable windows. If the logic determines that the estimated clear sky heat entering the room is greater than a maximum allowable value, then the passive heat conditions exists and a darker tint state can be set to the zone based at least in part on the passive heat condition. The maximum allowable value may be set based at least in part on the external temperature to the building and/or user input. In one example, if the external temperature is low, the maximum allowable external radiation may be set very high to allow for an increased level of passive heat to enter the building space.

Figure 23:
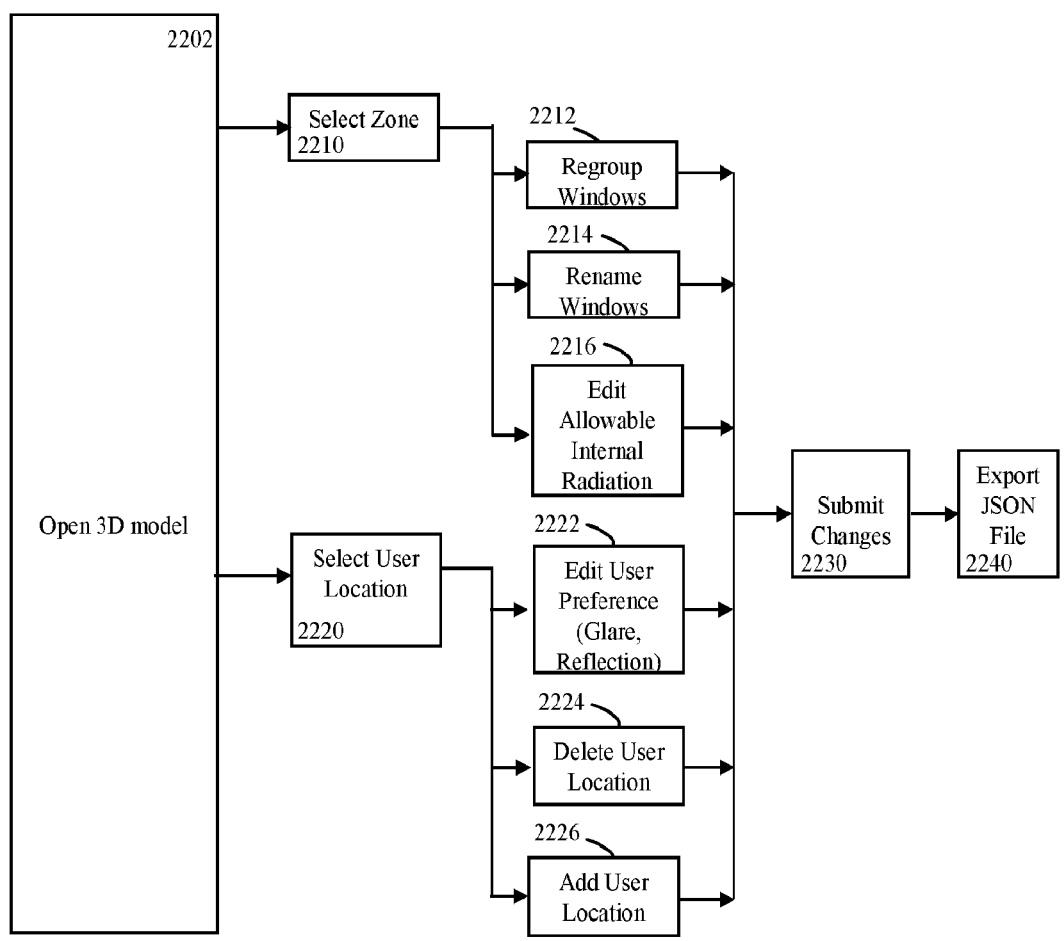
FIG. 23 is a flowchart of the actions and processes for implementing user input to customize the clear sky 3D model of a building site, according to one aspect.

FIG. 23 is an example of a flowchart of the actions and processes for implementing user input to customize the clear sky 3D model of a building site, according to one aspect. These site editing operations can be implemented by logic on the clear sky module 820 shown in FIG. 8. The attributes of the clear sky model can be editable (customizable), defined, and/or redefined at any time (including in real-time). The user can enter input, e.g., via a GUI. In the flowchart, the process starts by opening the 3D model (2202). The user then may have the options of selecting at least one zone to edit and/or at least one user location to edit (2210, 2220). In some embodiments, if the user selects to edit a zone, the user can regroup the windows defined to that zone (2212), rename the zone (2214), and/or edit the allowable internal radiation or other property of the zone (2216). In some embodiments, if the user selects a user location to edit (2220), (i) the user may edit the user preferences to select a glare model or a reflection model to map to the user location (2222), and/or (ii) delete a user location (2224) and/or add a user location (2226). Once the edit is made or edits are made, the user may submit the changes. e.g., to update the clear sky 3D model of the building site (2230). The changes may be used to generate new schedule data based at least in part on the revised clear sky 3D model. The schedule data may be exported and communicated to the window control module (2240).

In certain implementations, the system architecture includes GUI that allows the user to make changes to attributes of the clear sky model to see the changes to the model and/or changes to the schedule data in visualizations on the 3D modeling platform. Visualizations of the building site on the 3D modeling platform can be used for the purposes of customization.

In one example, the GUI can include a slider, or other interface, that allows the user (I) to (e.g., quickly) simulate periodic (e.g., daily) changes in the path of the sun and/or (II) to visualize glare, shadows, and/or heat caused by the sun over the course of a period (e.g., day).

In addition to visualizations of (a) direct and/or indirect reflection, (b) glare, (c) shadows, and/or (d) heat, at one or more locations on or in an enclosure (e.g., building); tint states of window(s) can be visualized via interior and/or exterior views of the windows. The window tint may be determined by control logic, e.g., as described herein. For example, a user can visualize window tint(s) and/or changes made thereto by control logic, for at least one (e.g., each) time and/or location of the sun. Such visualizations can be used by a user, e.g., to verify proper operation of the models and/or control logic.

In some embodiments, module A embodies control logic and/or rules that are used to control glare and reflectivity in a building under clear sky conditions. At times, tint decisions made by Module A alone can result in a less than optimal tint being applied to a window (e.g., because the clear sky module used by Module A does not account for the weather and any change in the weather). In one embodiment, changes in weather are addressed via use of an additional Module B.

Figure 24:
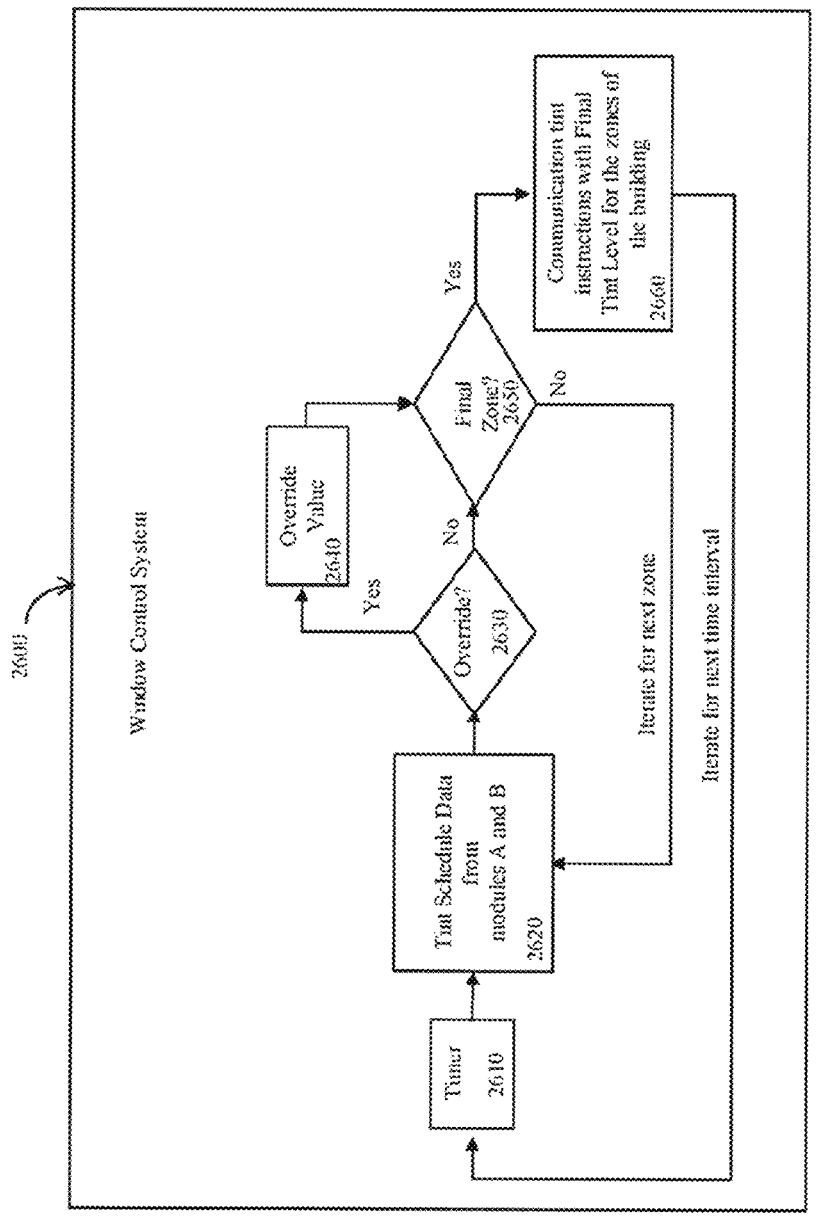
FIG. 24 depicts a window control system with general control logic to control the one or more zones of tintable windows in a building, according to various implementations.

FIG. 24 depicts an example of a window control system 2600 with control logic implemented by the window control system 2600 that communicates tint instructions to transition tintable windows within one or more zones in a building. At operation 2620, control logic determines a final tint level for at least one (e.g., each) window and/or zone based at least in part on rules output by Module A and Module B. For example, in one embodiment, window control system 2600 includes a master controller that implements the control logic to make tinting decisions and communicate the final tint level for at least one (e.g., each) zone to the local (e.g., window) controller(s) controlling the tintable windows of that zone. In one implementation, at least one (e.g., all) of the tintable windows are electrochromic windows including at least one electrochromic device. For example, at least one (e.g., each) tintable window may be an insulated glass unit with two glass lites having an electrochromic device on at least one of these lites. The control logic is performed by one or more processors of the window control system.

Figure 25:
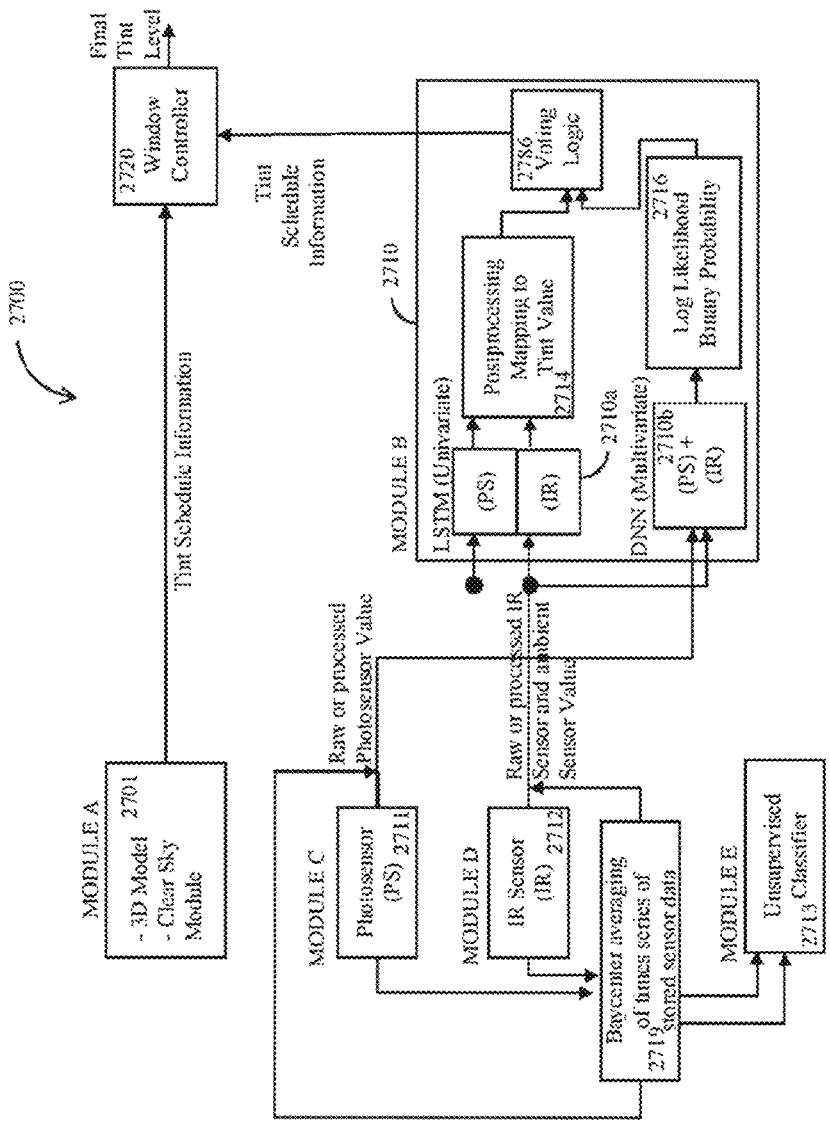
FIG. 25 depicts a flowchart with control logic for making tint decisions based at least in part on outputs from Modules A-E, according to various implementations.

FIG. 25 is another representation of a window control system 2700 that includes a window controller 2720, e.g., a master controller or a local window controller. The window control system 2700 includes control logic implemented by one or more components (e.g., other controllers) of the window control system 2700. As illustrated, the window controller 2720 receives tint schedule information (e.g., embedded in rules) from other components of the window controller system 2700 in accordance with the illustrated control logic.

In the example shown in FIG. 25, the control logic includes logic embodied by a Module B 2710. Module B 2710 is configured to forecast weather condition(s) at a particular geographical location of the site at a future time. In one embodiment, the forecasts are made based at least in part on location specific measurements provided by Module C 2711 and Module D 2712. In one embodiment, the forecast of a weather condition is provided in the form of one or more rules that can be used to initiate changes in window tint at the current time so as to complete the transition by the future time so that the interior light intensity, glare and reflection at the future time is optimized for the weather conditions forecasted to occur at that future time. The tint transition occurs in anticipation of the future condition. By doing so, it appears to an observer as if the tint in the window is being controlled in response to real time, or close to real time, changes in weather conditions. Module B includes a LSTM (univariate) sub module 2710a, a post processing mapping to tint value sub-module 2714, a DNN (multivariate) module 2710b, a binary probability sub module 2716, and a voting sub module 2786. The illustrated control logic includes a Module A 2701 with a 3D model and a clear sky model, a Module C 2711 with logic for determining raw and/or filtered photosensor value(s) from photosensor reading(s), a Module D 2712 with logic for determining raw and/or filtered IR sensor and ambient sensor value(s) from infrared and/or ambient temperature reading(s), and a Module E with an unsupervised classifier sub-module 2713. Module B may receive (e.g., minute and/or real-time) data from one or more sensors (e.g., as disclosed herein) relating to the weather. Module B may receive data from a third party (e.g., weather forecast agency) regarding any forecasted (e.g., gross) weather changes. Module B may receive predicted sensor data (e.g., from the VSS sensor). The predicted sensor value may utilize artificial intelligence (e.g., any artificial intelligence type described herein).

In one embodiment, values from Module C 2711 are provided to Module B 2710 in the form of raw and/or filtered values (e.g., signals) that are representative of present environmental conditions measured by one or more sensors. The sensors may be optical sensors. The sensors may comprise photosensors. The optical sensors may detect wavelength(s) in the visible spectrum. In one embodiment, the raw and/or filtered values (e.g., singals) are provided in the form of a (e.g., filtered) rolling mean of a plurality of sensor readings taken at different sample times, where at least one (e.g., each) sensor reading is a maximum value of measurements taken by the sensors. In one embodiment, at least one (e.g., each) sensor reading comprises a real-time irradiance reading. In one embodiment, the raw and/or filtered values (e.g., singals) are provided in the form of a (e.g., filtered) rolling mean of a sensor readings taken at different sample times, where at least one (e.g., each) sensor reading is a maximum value of measurements taken by the sensor at different times. In one embodiment, the raw and/or filtered values (e.g., singals) are provided in the form of a (e.g., filtered) rolling mean of a plurality of sensor readings disposed at consecutively different locations, where at least one (e.g., each) sensor readings is a maximum value of measurements taken by the sensors. The consecutively disposed sensors may have a contacting or overlapping angle of view. The consecutively disposed sensors may form a single file, e.g., along an arch or along a circle.

In one embodiment, values from Module D 2712 are provided to Module B 2710 in the form of raw and/or filtered values (e.g., signals) representative of present environmental conditions measured by one or more infrared (IR) sensors. In one embodiment, the raw or filtered values (e.g., singals) are provided in the form of a filtered rolling median of multiple infrared sensor readings taken at different sample times, where at least one (e.g., each) reading is a minimum value of measurements taken by the one or more infrared sensors. In one embodiment, the infrared sensors are disposed at different locations, and wherein the raw and/or filtered values (e.g., singals) are provided in the form of a filtered rolling median of the plurality of infrared sensor readings taken at the different locations.

In one embodiment, infrared sensor measurements and/or ambient temperature sensor measurements include: sky temperature readings ($T_{sky}$), ambient temperature readings (e.g., from local sensors at the building ($T_{amb}$) or from weather feed ($T_{weather}$)) and/or the difference between $T_{sky}$-$T_{amb}$. The filtered infrared sensor values are determined based at least in part on the sky temperature readings ($T_{sky}$) and the ambient temperature readings from local sensors ($T_{amb}$), or from weather feed ($T_{weather}$). The sky temperature readings can be taken by infrared sensor(s). The ambient temperature readings can be taken by one or more ambient temperature sensors. The ambient temperature readings may be received from various sources. For example, the ambient temperature readings may be communicated from one or more ambient temperature sensors located onboard an infrared sensor and/or a standalone temperature sensor of, for example, a multi-sensor device at the building. As another example, the ambient temperature readings may be received from weather feed (e.g., supplied by a third party such as a weather forecasting agency).

In one embodiment, Module D 2712 includes logic to calculate filtered IR sensor values using a Cloudy Offset value and sky temperature readings ($T_{sky}$) and ambient temperature readings from local sensors ($T_{amb}$) or from weather feed ($T_{weather}$), and/or a difference, delta ($\Delta$), between sky temperature readings and ambient temperature readings. In some embodiments, the Cloudy Offset value is a temperature offset that corresponds to the threshold values that will be used to determine a cloudy condition by the logic in Module D. The logic of Module D may be performed by one or more processors of the control system (e.g., by a network controller and/or by a master controller). The logic of Module D may be performed by one or more processors of a sensor device comprised of one or more photosensor (e.g., and infrared sensor and/or photosensor).

At operation 2810, the processor(s) performing the operations of Module D receives as input sensor readings at a current time. The sensor readings may be received via a communication network at the building, for example, from a sensor device (e.g., rooftop multi-sensor device). The received sensor readings may include sky temperature readings (Tsk)) and/or ambient temperature readings (e.g., from local sensors at the building ($T_{amb}$) or from weather feed ($T_{weather}$) and/or readings of the difference between $T_{sky}$ and $T_{amb}$ (A)). The ambient temperature readings from local sensors at the building ($T_{amb}$) may be measurements taken by ambient temperature sensors located onboard a sensor device and/or separate from the sensor device. Ambient temperature sensor readings can be (e.g., also) from weather feed data.

In one implementation, a Module D 2712 receives (and uses) raw sensor readings of measurements taken by two or more IR sensor devices at a building (e.g., of a rooftop and/or multi-sensor device), at least one (e.g., each) IR sensor device having an onboard ambient temperature sensor for measuring ambient temperature ($T_{amb}$) and an onboard infrared sensor directed to the sky for measuring sky temperature ($T_{sky}$) based at least in part on infrared radiation received within its field-of-view. Two or more IR sensor devices may be used, e.g., to provide redundancy and/or increase accuracy. In one case, at least one (e.g., each) infrared sensor device outputs readings of ambient temperature ($T_{amb}$) and sky temperature ($T_{sky}$). In another case, at least one (e.g., each) infrared sensor device outputs readings of ambient temperature ($T_{amb}$), sky temperature ($T_{sky}$), and the difference between $T_{sky}$ and $T_{amb}$, delta A. In one case, at least one (e.g., each) infrared sensor device outputs readings of the difference between $T_{sky}$ and $T_{amb}$, delta A. According to one embodiment, the logic of Module D uses raw sensor readings of measurements taken by two IR sensor devices at the building. In some embodiments, the logic of Module D uses raw sensor readings of measurements taken by at least 1, 2, 3, 4, 5, 6, 7, 8, 9, or 10 IR sensor devices at the building.

In another implementation. Module D 2712 receives and uses raw sky temperature ($T_{sky}$) readings taken by infrared sensors at a building which are directed to the sky to receive infrared radiation within their field-of-view and ambient temperature readings from weather feed data ($T_{weather}$). The weather feed data may be received from one or more weather services and/or other data sources over a communication network. Weather feed data can include other environmental data associated with weather conditions such as, for example, cloud coverage percentage, visibility data, wind speed data, percentage probability of precipitation, and/or humidity. Weather feed data can be received (in a signal) through a communication network by a window controller. The window controller can send a signal with a request for the weather feed data through a communication interface over the communication network to one or more weather services. The request can includes at least the longitude and latitude of the location of the window(s) being controlled. In response, the one or more weather services may send a signal with weather feed data, e.g., through the communication network (e.g., and through a communication interface) to the window controller. The communication interface and network may be in wired and/or wireless form. In some cases, a weather service may be accessible through a weather website. An example of a weather website can be found at www.forecast.io. Another example is the National Weather Service (www.weather.gov). The weather feed data may be based at least in part on a current time or may be forecasted at a future time. The weather feed data may be based at least in part on a geographic location (e.g., of the enclosure and/or of the window). Examples of logic that uses weather feed data can be found in International Patent Application Serial No. PCT/US16/41344, filed Jul. 7, 2016 and titled "CONTROL METHOD FOR TINTABLE WINDOWS," which is hereby incorporated by reference in its entirety.

In one implementation, a temperature value ($T_{calc}$) is calculated based at least in part on (i) sky temperature readings from one or more infrared sensors, (ii) ambient temperature readings from either one or more local ambient temperature sensors and/or from weather feed, and/or (ii) a Cloudy Offset value. In some embodiments, the Cloudy Offset value is a temperature offset which corresponds to the first and second threshold values used to determine the cloud condition in Module D 2712. In one implementation, the Cloudy Offset value is −17 millidegrees Celsius. In one example, a Cloudy Offset value of −17 millidegrees Celsius corresponds to a first threshold value of 0 millidegrees Celsius. In one implementation, the Cloudy Offset value is in the range of from −30 millidegrees Celsius to 0 millidegrees Celsius.

In one implementation, the temperature value ($T_{calc}$) can be calculated based at least in part on sky temperature readings from two or more pairs of thermal sensors, at least one (e.g., each) pair of thermal sensors having an infrared sensor and an ambient temperature sensor. In one case, the thermal sensors of at least one (e.g., each) pair are integral components of an IR sensor device. At least one (e.g., each) IR sensor device may have an onboard infrared sensor and/or an onboard ambient temperature sensor. Two IR sensor devices may be used. e.g., to provide redundancy and/or improve accuracy. In another case, the infrared sensor and ambient temperature sensor are disposed separately (e.g., in separate devices and/or separate locations). In this implementation, the temperature value is calculated as:

$$T_{calc} = \text{minimum}(T_{sky1}, T_{sky2}, \ldots) \text{minimum}(T_{amb1}, T_{amb2}, \ldots) - \text{Cloudy Offset} \quad \text{(Eqn. 1)}$$

$T_{sky1}$, $T_{sky2}$ ... are temperature readings taken by the multiple infrared sensors, and $T_{amb1}$, $T_{amb2}$, ... are temperature readings taken by the multiple ambient temperature sensors. If two infrared sensors and two ambient temperature sensors are used, then $T_{calc} = \text{minimum } (T_{sky1}, T_{sky2}) - \text{minimum } (T_{amb1}, T_{amb2}) - \text{Cloudy Offset}$. Minimums of the readings from multiple sensors of the same type can be used to bias the result toward lower temperature values that would indicate higher cloud cover, and may result in higher tint level in order to bias the result toward reducing (e.g., avoiding) glare.

In another implementation, Module D 2712 may switch from using a local ambient temperature sensor to using weather feed data, e.g., when ambient temperature sensor readings become unavailable or inaccurate, for example, where an ambient temperature sensor is reading heat radiating from a local source such as from a rooftop, and/or a nearby radiating (e.g., heating) source. In this implementation, the temperature value ($T_{calc}$) is calculated using sky temperature readings and ambient temperature readings from weather feed data ($T_{weather}$). In this implementation, the temperature value is calculated as:

$$T_{calc} = \text{minimum}(T_{sky1}, T_{sky2}, \ldots) - T_{weather} - \text{Cloudy Offset} \quad \text{(Eqn. 2)}$$

In another implementation, the temperature value ($T_{calc}$) is calculated using readings of the difference, Δ, between sky temperature and ambient temperature as measured by two or more IR sensor devices, at least one (e.g., each) having an onboard infrared sensor and ambient temperature sensor. In this implementation, the temperature value is calculated as:

$$T_{calc} = \text{minimum}(\Delta_1, \Delta_2, \ldots) - \text{Cloudy Offset} \quad \text{(Eqn. 3)}$$

$\Delta_1$, $\Delta_2$, ... are readings of the difference, Δ, between sky temperature and ambient temperature measured by multiple IR sensor devices. In the implementations that use Eqn. 1, Eqn. 2, and Eqn. 3, the control logic uses the difference between the sky temperature and the ambient temperature to determine the IR sensor value input to Module D 2712 to determine a cloud condition. Ambient temperature readings tend to fluctuate less than sky temperature readings. By using the difference between sky temperature and ambient temperature as input to determine tint state, the tint states determined over time may fluctuate to a lesser degree.

In another implementation, the control logic calculates $T_{calc}$ using sky temperature readings from two or more infrared sensors. In this implementation, the IR sensor value determined by Module D 2712 utilizes sky temperature readings (e.g., and not on ambient temperature readings). In this case. Module D determines a cloud condition using sky temperature readings. Although the above described implementations for determining $T_{calc}$ are based on two or more (e.g., redundant) sensors of each type, it would be understood that the control logic may be implemented with readings from a single sensor.

In one embodiment, Module B 2710 provides weather forecasts using a sub module 2710a having logic that uses machine learning (e.g., including deep learning) on a time series of weather data provided by Module C and Module D. Sub module 2710a includes a recurrent artificial intelligence (e.g., neural network) model logic to implement long short-term memory (LSTM) to map sequence to sequence (e.g., using a seq2seq encoder/decoder framework) predictions. With an LSTM seq2seq prediction or other LSTM prediction, a user-defined duration of historical weather data (e.g., 3 minutes of memory, 5 minutes of memory, etc.) can be used to generate short term forecasts of a user-defined length (e.g., 4 minutes into the future) on a live, rolling basis, e.g., as new sensor values from Modules C and D are acquired. Such parametric flexibility increases a likelihood that memory of changing weather conditions are only retained on a scale that are useful to a forecasting window of interest.

In one embodiment, an artificial intelligence module LSTM (e.g., seq2seq) prediction is implemented such that it leverages discretization of sensor values from Modules C and D into (e.g., three) distinct ranges and corresponding tint recommendations (e.g., tints 2, 3, and 4). The level of precision required by weather forecasts may be defined by a timely correspondence to an appropriate range of sensor values, e.g., as real-time data changes. Such level of precision may allow for periods of greater volatility (e.g., sudden changes in conditions) to be handled using forecast smoothing and other regularizing control structures designed to limit overresponsive model behavior. In one embodiment, implementation of artificial intelligence LSTM (e.g., seq2seq) prediction uses (i) a rolling mean of a timespan of about 5-minute of maximum photosensor readings and a rolling median of minimum IR sensor readings, and (ii) averages a series of four (4) forecasts at T+4 minutes to produce a representative measure of the immediate future. Within the constraints defined by an existing timespan (e.g., 5-minute) window control system command cycle, this implementation supports the introduction of additional control structures, e.g., to increase a likelihood that changes in commands may be made on a timeframe to which existing hardware is able to respond (e.g., ignoring command changes whose duration is less than a user defined number of minutes).

In one embodiment, the LSTM submodule 2710a of Module B 2710 processes outputs from Module C 2711 and Module D 2712 as univariate inputs according to LSTM (e.g., seq2seq) methodologies. e.g., where one univariate variable corresponds to maximum photo sensor values provided by Module C, and the other univariate input corresponds to minimum IR sensor values provided by Module D. Processing at least one (e.g., each) input according to the LSTM (e.g., seq2seq) methodology can provide a real value that is post processed and regularized by a post processing module 2714, to provide an output value that is mapped to a tint value. In some embodiments, it has been found that use of an LSTM (e.g., seq2seq) methodology is more suited for providing relatively short-term predictions than for providing longer term predictions.

In some embodiments, to obtain relatively longer term weather forecast predictions based at least in part on values provided by Modules C and D, Module B 2710 includes a sub-module 2170b having logic that implements an artificial intelligence methodology comprising deep neural network (DNN) multivariate forecasting. In one embodiment, the DNN methodology feature engineered relationships between photosensor and IR sensor values provided by Modules C and D that may be useful for forecasting weather and/or environmental conditions occurring on a longer timeframe. Where the LSTM methodology outputs real valued predictions (mapped onto their corresponding recommended tint regions). DNN forecasting may be implemented as a binary classifier whose log-likelihood output probabilistically models sunny vs. non-sunny conditions. The use of binary classification can entail flexibility in determining (optimizing, site-specifying, and user-personalizing) a confidence threshold (between zero and one) above which the model forecasts a sunny (rather than non-sunny) condition. Lower confidence thresholds may be set to proactively reduce (e.g., prevent) high-risk glare conditions. Higher confidence thresholds may be set in the interest of maximizing interior natural light. In one embodiment, the DNN output is based at least in part on a user-configurable threshold where an output greater than or equal to the threshold is treated as a sunny condition (e.g. a binary value of 1) and/or where an output lower than the threshold is treated as a not-sunny condition (e.g. a binary value of 0).

In certain embodiments, the artificial intelligence (e.g., DNN and LSTM) models reside on a server on a cloud network and/or on a window controller such as a master window controller or group of window controllers of a distributed network of window controllers. Various commercially available machine learning frameworks can reside on the cloud server and/or on the control system (e.g., on the window controller(s)) to define, train, and execute the artificial intelligence (e.g., DNN and/or LSTM) models. An example of a commercially available machine learning framework is TensorFlow® provided by Google R, California. An example of a commercially-available machine learning (e.g., artificial intelligence) frameworks is Amazon R SageMaker® provided by Amazon Web Services of Seattle, Washington.

In one embodiment, the DNN submodule 2170b uses a DNN binary classifier that generates 8-minute weather forecasts using 6-minutes of history. Unlike univariate LSTM forecasting, the DNN binary classifier may not require to run in real-time, alleviating computational load on existing hardware. To account for site-specific differences (in geolocation, seasonal variation, and continuously changing weather fronts), the DNN binary classifier can be run overnight using two to three weeks of historical data, which is updated daily, dropping the oldest day and bringing in the most recent data in retraining the model at least one (e.g., each) night. Such rolling daily updates can increase a likelihood that the classifier adapts in keeping with the pace and qualitative nature of the changing weather conditions. Upon retraining, model parameter weights can be adjusted to receive new inputs for generating forecasts for the duration of the subsequent day.

In some embodiments, together, the machine learning modules (e.g., multivariate DNN and univariate LSTM) forecasting sub-modules 2710a, 2710b provide foresight in anticipating and/or responding to changes in the (e.g., external) environment. In one embodiment, to mitigate the potential impact of long-term under-responsiveness by DNN and short-term over-reactivity by LSTM, Module B 2710 is configured to provide an output based at least in part on a rules-based decision made by the voting logic 2786. For example, if an LSTM output for photosensor (PS) maps to a tint state of 3 (i.e. sun is present), the LSTM output for infrared (IR) maps to a tint state of 3 (i.e. sun is present), and the DNN output provides a binary output of "0" (where "0" indicates a forecast of "cloudy", and "1 indicates a forecast of "sunny"), a majority of LSTM (PS), LSTM (IR), and DNN (PS and IR) is used as a forecast that an environmental condition will be sunny at a future time. The agreement of two of LSTM (PS). LSTM (IR), and DNN (PS and IR) may be the rule on which an output is provided to a window controller 2720. The above majority should not be considered limiting, for in other embodiments, other majorities and minorities provided by LSTM (PS), LSTM (IR), and DNN (PS and IR) could be used to provide forecasts.

In one embodiment, future forecasts of weather conditions made by Module B 2710 are compared by window controller 2720 against tint rules provided by Module A 2701 and, for example, if the output of Module B 2710 provides an indication that a weather condition at a future time will be sunny, prior to that future time, control system 2720 provides a tint command according to the tint rules provided by Module A 2701. In another embodiment, visa-versa, if the output of Module B 2710 provides an indication that a weather condition in the future will be not be sunny, prior to the future time, control system 2720 provides a tint command that overrides tint commands determined by the clear sky module of Module A 2701.

Returning to FIG. 24, in one embodiment, window controller 2600 includes control logic that determines whether there is an override to allow for various types of overrides to disengage the logic at an operation 2630. If there is an override, the control logic can set the final tint level for the zone to an override value at operation 2640. For example, the override may be input by a current occupant of the space that would like to override the control system and set the tint level. Another example an override can be a high demand (or peak load) override, which can be associated with a requirement of a utility that energy consumption in the building be reduced. For example, on particularly hot days in large metropolitan areas, it may be necessary to reduce energy consumption throughout the municipality in order to not overly tax the municipality's energy generation and delivery systems. In such cases, the building management may override the tint level from the control logic to ensure that all tintable windows have a high tint level. This override may override a user's manual override. There may be levels of priority in the override values.

At operation 2650, the control logic may determine whether a tint level for at least one (e.g., each) zone of the building being determined has been previously determined. If not, the control logic can iterate to determine a final tint level for the next zone. In some embodiments, if the tint state for the final zone being determined is complete, the control signals for implementing the tint level for at least one (e.g., each) zone are transmitted over a network to the power supply in electrical communication with the device(s) of the tintable windows of the zone to transition to the final tint level at operation 2660 and the control logic can iterate for the next time interval returning to operation 2610. For example, the tint level may be transmitted over a network to the power supply in electrical communication with electrochromic device(s) of the one or more electrochromic windows to transition the windows to the tint level. In certain embodiments, the transmission of tint level to the windows of a building may be implemented with efficiency in mind. For example, if the recalculation of the tint level suggests that no change in tint from the current tint level is required, then there may be no transmission of instructions with an updated tint level. As another example, the control logic may recalculate tint levels for zones with smaller windows more frequently than for zones with larger windows.

In some embodiments, the control logic in FIG. 24 implements a control method for controlling the tint level of all the electrochromic windows of an entire building on a single device, for example, on a single (e.g., master or window) controller. This device can perform the calculations for at least one (e.g., all) electrochromic window in the building and/or provide an interface for transmitting tint levels to the electrochromic device(s), e.g., in individual electrochromic windows. There may be certain adaptive components of the control logic of embodiments. For example, the control logic may determine how an end user (e.g. occupant) tries to override the algorithm at particular times of day, and makes use of this information in a (e.g., more) predictive manner, e.g., to determine a desired tint level. For example, the end user may be using a wall switch to override the tint level provided by the control logic at a certain time a plurality of days (e.g., each day) over a consecutive sequence of days to an override value. The control logic may receive information about these instances and change the control logic to introduce an override value that changes the tint level to the override value from the end user at that time of day.

Referring back to FIG. 25, in one embodiment, the window control system 2700 includes a Module E 2713 having control logic configured to provide statistically informed foreknowledge of site-specific and/or seasonally-differentiated profiles of light and heat radiation present at the site based at least in part on past (e.g., historic) data. In one embodiment, location specific values provided by Module C 2711 and Module D 2712 are stored in memory by window control system 2700 as time series data from which the profiles by Module E 2713 are created. The ability to use past data (also referred to herein as "historical data." or "historic data") obtained at a specific location for which a forecast is requested to be made, may enable the forecast to be more accurate. In one embodiment, constructing such profiles involves use of machine learning (e.g., artificial intelligence) classification algorithms suitable for clustering time series information into groups whose longitudinal sensor values exhibit similar shapes and/or patterns. According to the requested level of granularity (for a given hour of day, time of day, week, month, and/or season of the year), identified cluster centroids may show the trajectory of the mean values of all records in that time frame whose similarity amongst themselves can be quantitatively distinguished from other groups of similar records. Such distinctions between groups may allow for statistically founded inference with respect to "typical" environmental conditions requested to be monitored at a given location during a timeframe.

Without ground truth knowledge of what counts as "typical" for a given location and timeframe, algorithmic classification of discrete weather profiles begins in an unsupervised fashion. As "correct" classes cannot be predefined, evaluating performance of a classifier may require inferential decision making regarding how much of the output is actionable. e.g., what is the number of distinct clusters amongst which it may be practically useful to distinguish.

In FIG. 25, univariate inputs (e.g., from Module C and/or Module D) of a requested length and/or granularity are passed to Module E 2713, which is configured to perform the functions of an unsupervised learning classifier. If a question of interest consists of profiling daytime weather patterns at a site over a given month, preprocessing by Module E 2713 results in an m×n dimensional data frame, where m is the number of daylight minutes, and n is the number of days for which photo sensor inputs have been collected. As different latitudes correspond to different sun trajectories during different seasons, different sensor(s) (e.g., pointing in different directions) may be important at different times of day and/or season. Incorporating these differences can involve performing a data reduction technique (e.g. Principal Component Analysis) to compress time series information from x number of sensors into a one-dimensional vector capturing the y strongest radiation signals received from at least one (e.g., each) cardinal direction. As the number of data points of daylight will vary from day to day, preprocessing the data input to the Module E 2713 involves alignment of time indices. Similarity between individual time series vectors (e.g., cluster candidates) may be measured as a function of pointwise (Euclidean) distance. Misalignment of time indices can result in misrepresentative distance calculations, distorting the clustering process.

One method for handling misalignment resulting from vector length differences may involve dividing the original time series into equally sized frames, and computing mean values for at least one (e.g., each) frame. This transformation can approximate the longitudinal shape of the time series on a piecewise basis. The dimensionality of the data can be reduced or expanded, such that clustering distance calculations can be unproblematically performed on n number of time series of equal length.

The alignment procedure provided by Module E 2713 may be configured to perform a dynamic time warping (DTW) method. The DTW method stretches or compresses a time series by constructing a warping matrix, from which the logic searches for an optimal warping path that minimizes data distortion during realignment. This procedure may increase a likelihood that the distance calculations performed by the clustering classifier do not find two sequences (with only slightly different frequencies) to be more "distant" than they actually are. Performing pointwise distance calculations across thousands of records is computationally expensive. The DTW method can be expedited by enforcing a locality constraint, or window constraint (e.g., threshold window size), beyond which the DTW method does not search in determining the optimal warp path.

Mappings within this threshold window size may be considered in calculating pointwise distance, (e.g., substantially) reducing the complexity of the operation. Other locality constraints (e.g., LB-Keogh bounding) can be applied, e.g., to prune out the (e.g., vast majority) of the DTW computations.

After preprocessing by Module E 2713, the data frame of time series vectors can be input to an unsupervised learning logic. As the appropriate number (k) of clusters may vary according to location, season, and other unquantified factors, use of a K-Means clustering logic can be identified as a suitable approach to be used by Module E 2713. Use of a K-Means clustering logic may allow the user to define, hand-tune, and/or fine-tune the number of clusters identified, to increase a likelihood that output is not only broadly representative, but also interpretable, actionable, and/or practically useful. Maintaining the example of the above-mentioned m×n dimensional data frame, execution of the K-Means clustering logic could begin by randomly choosing a k number of days from the n number of time series vectors as the initial centroids of the k number of candidate clusters. Locality constraints may be applied before calculating the pointwise DTW distances between at least one (e.g., each) centroid and all other time series vectors in the data frame. Vectors can be assigned to the nearest (most similar) centroid before the centroids are recalculated to the mean values of all vectors assigned to the same group. This process may repeat (I) for a user-defined or other pre-defined number of iterations, or (II) until further iterations no longer result in reassignment of vectors to different clusters. In some embodiments, at the end of the process, the classifier of Module E 2713 will have clustered the data into k groups of vectors exhibiting similar patterns of longitudinal sensor values, which constitute the k most representative profiles of sensor data collected over a specified past timeframe. The more historical data that is used to construct these profiles, the more representative and informative these K-Means groupings can be.

The profiles determined by Module E 2713 can be used to generate information about prior distribution of radiation levels occurring within a specified range over a given time frame at a given geographical location. On the Bayesian-principled assumption that these "typical" profiles identified constitute a mixture of Gaussian (e.g., random normal) processes, one can quantify the certainty of forecasted sensor values occurring within a particular range as a function of the first (mean) and second (variance) moments of an underlying Gaussian process. Supervised, kernel-based models (like Gaussian Process Regression) can make use of the profiles identified by unsupervised clustering to produce a full posterior distribution for one's predictions (e.g., confidence intervals for predicted sensor values), providing insight into the possible (variance) and most likely (mean) outcomes. Accordingly, in one embodiment, the unsupervised machine learning techniques of one module (e.g., Module E 2713) can be paired with supervised machine techniques of another model (e.g., Module B 2710), e.g., to reinforce and/or improve weather predictions (e.g., made by Module B 2710). In one embodiment, probabilistic confidence obtained using DNN sub-module 2710b uses the profiles provided by Module E 2713 to modify and/or better quantify its forecast. In some instances, at least one module may fail to function correctly, during which time (e.g., and until the failure is identified and corrected), the control system (e.g., 2700) may be unable to provide its intended functionality. Between the costs of travel, materials used, maintenance services provided, and/or customer-impacting downtime of the system: the expenses entailed in dealing with such an event may accumulate. One type of failure that could occur is when one or more the sensors associated with one or more modules (e.g., Module C and/or D) malfunctions. Although one or more sensor may fail to provide its intended functionality, the present invention may identify that location specific sensor data (e.g., stored by the control system (e.g., 2700)) as time series data that can be leveraged, e.g., for purposes other than described herein.

In one embodiment, if functionality associated with one or more modules (e.g., Module C 2711 and/or Module D 2712) fails or becomes unavailable, the present invention identifies that a Module (e.g., 2719) configured with control logic to perform weighted Barycenter averaging can be applied to a historical sequence of sensor data (e.g., obtained in the past), to provide for example a distribution of sensor values that can be used as a substitute for current readings and/or used to provide a forecast of future weather conditions. In one embodiment, the substitute readings can be processed by a neural network, for example by Module B. In one embodiment, days closer to the present may be given a correspondingly heavier weight in averaging day-length time series sensor data across a rolling window of the recent past. In the event of hardware failure, the weighted Barycenter averages of historical sensor data can be supplied for the duration of any downtime (e.g., required for repair or maintenance).

In some embodiments, calculation of weighted Barycenter averages involves preprocessing and/or machine learning, e.g., to temporally align coordinates and/or minimize the distances between time series profiles used in generating an optimal set of mean values that reflects the requirements of the weighting scheme. In one embodiment, an appropriate preprocessing technique is Piecewise Aggregate Approximation (PAA), which compresses data along the time axis by dividing time series into a number of segments equal to a desired number of time steps before replacing at least one (e.g., each) segment by the mean of its data points. After applying PAA, all-time series profiles included in the historical rolling window can contain an equal number of time steps (e.g., regardless of seasonal differences in day length) which may change over the course of the specified time frame. Equal dimensions along the time axis may be required to calculate the pointwise distances minimized by the optimization function used to perform Barycenter averaging. Although a range of different distance metrics may be used to compute the Barycenters, other solutions such as Euclidean or Soft-Dynamic Time Warping (Soft-DTW) metrics can be used to provide mean profiles. In some embodiments, while the former is faster to compute and performs an ordinary straight-line distance between coordinates along the time axis, the latter is a regularized, smoothed formulation of the DTW metric, which applies a bounded window to its distance calculations, e.g., to account for (e.g., slight) differences in phase. Constraints may be imposed on the Barycenter optimization function to determine the length of the rolling window of historical data to be used. Time frames with high optimization costs may indicate volatile weather. Time frames with high optimization costs may warrant using a shorter rolling window of days to perform Barycenter averaging. Lower optimization costs may correspond to more stable weather, from which a longer rolling window of informative historical data may be taken in performing Barycenter averaging. In one embodiment, barycenter averaging can be generated on a site-specific basis with any historical data that is available.

In some embodiments, the barycenter averaging operation (e.g., in module 2719 or in module 2819) can be implemented to generate synthetic real-time raw sensor data from historical data, when real-time data becomes (or is) unavailable. For example, barycenter averaging operation could be used to generate synthetic real-time sensor (e.g., photosensor and/or infrared sensor) readings should the sensor device (e.g., multi-sensor device or sky sensor at the site) fail or otherwise become unavailable. To generate the synthetic sensor data mimicking real-time raw sensor data, barycenter averaging can use historical sensor data stored over a time frame to calculate pointwise weighted distance of at least one (e.g., each) time index (e.g., from sunrise to sunset) to generate a likely radiation profile for the following day. In one example, historical sensor data over a time frame in the range of from 7 to 10 days can be used. Barycenter averaging can use the same distance between time indexes for at least two days (e.g., each day) of the time frame e.g., at an interval of at least about 0.5 minute (min), 1min, 1.5 min, 2 min, or 3 min. The number of time indexes changes may depend on the length of the respective day between sunrise to sunset. In some embodiments, the number of time indexes in at least two consecutive days expands or shrinks to account for the seasonal changing of daylight minutes as days get longer or shorter. In certain embodiments, barycenter averaging is used to calculate a weighted average of historical sensor values for at least two time indices (e.g., each time index) over the time frame where the most recent values are weighted more heavily. For example, barycenter averaging can use stored historical photosensor readings taken at 12 noon each day over a time frame of 10 days, weighting readings from the most recent days more heavily (e.g., weighting 10 for day 10, 9 for day 9, 8 for day 8, etc.), to calculate a weighted average of the photosensor value at 12 noon. Barycenter averaging may be used to determine the weighted average of the sensor (e.g., photosensor) value of at least two time indices (e.g., at each time index) to generate a mean profile of the synthetic real-time photosensor values over a day.

The barycenter averaging operation can be used to generate mean profiles of synthetic real-time sensor values such as photosensor values, infrared sensor values, ambient temperature sensor values, etc. The barycenter averaging operation can use the synthetic real-time sensor values taken from the mean profiles to generate input to the various modules and models that might be called upon to be executed over the course of the day. For example, the barycenter averaging operation can use the rolling historical data to generate synthetic sensor (e.g., photosensor) values as input into a neural network model (or other model). e.g., the LSTM neural network of module 2710*a* and/or the DNN of module 2710*b*.

In some embodiments, a set of input features for at least one (e.g., each) of the neural network models (or other models) is kept up to date and ready to be fed into the live models, e.g., to forecast conditions at the site. In certain embodiments, the input features are based at least in part on (e.g., raw) measurements from sensor(s) (e.g., photosensors, infrared sensors, ambient temperature sensors, ultraviolet sensors, occupancy sensors, etc.) at the site. The sensors can be an sensor(s) disclosed herein. The input features may be based at least in part upon (e.g., raw) measurements of current and/or voltage. In certain embodiments, the sensors are located in a single housing or otherwise centrally located, e.g., in a multi-sensor device such as a device ensemble. The device ensemble may be disposed in the enclosure (e.g., facility, building or room), or external to the enclosure. For example, the sensor ensemble may be located on a rooftop of a building and/or in a sky sensor. A multi-sensor device may include includes a plurality of sensors, e.g., at least about 2, 4, 6, 8, 10, or twelve (12) sensors. The sensors may comprise photosensors. The sensors may be arranged in a single file. The single file may be disposed on an arc. The single file may be disposed along a ring. The sensors may be radially disposed. The sensors may be disposed in various azimuthal orientations. At least one sensor (e.g., one photosensor) may be vertically-oriented (facing upward in a direction opposite to the gravitational center when installed). The device may comprise at least one or two infrared sensors (e.g., oriented upward). The device may comprise at least one or two ambient temperature sensors. The device may comprise a transparent housing portion (e.g., glass, sapphire, or plastic). The device may comprise an opaque housing portion. The device may comprise a portion transparent to the radiation sensed by a sensor disposed in the housing. The ensemble may comprise a redundancy of sensors. The ensemble may comprise at least two sensors of the same type. The ensemble may comprise at least two sensors of a different type. An example of such a multi-sensor device that can be mounted to the rooftop of a building is described in U.S. patent application Ser. No. 15/287,646 filed Oct. 6, 2016, (now U.S. Pat. No. 10,533,892 issued on Jan. 14, 2020) titled "Multi-sensor device and system with a light diffusing element around a periphery of a ring of photosensors and an infrared sensor," which is hereby incorporated by reference in its entirety. The information from multiple different sensors may be used in various ways. For example, at a particular time, measured values from two more sensors (e.g., of the same type) may be combined, e.g., a central tendency such a mean or average of the sensor values. At a particular time, only one measured value can be used: e.g., a maximum value from all the sensors, a minimum value of all sensors, or a median value of all sensor readings in an ensemble. In one embodiment, the model input features are based at least in part on a maximum value, a minimum value, and/or an average (e.g., mean, or median) value of multiple raw sensor readings taken by ensemble sensors (e.g., of the multi-sensor). For example, the model input features can be based at least in part on a maximum value of multiple raw photosensor readings taken by the (e.g., thirteen) photosensors of the multi-sensor device and/or based at least in part on a minimum infrared sensor(s) value, e.g., the minimum of the two infrared sensor readings less the minimum of the two ambient temperature sensor readings of the multi-sensor device. The maximum photosensor value can represent the highest level of solar radiation at the site and the minimum infrared sensor value can represent the highest level of clear sky at the site.

In certain embodiments, the set of input features fed into a neural network model (or other model) includes calculations of multiple rolling windows of historical sensor data. In one case, a plurality (e.g., six (6)) rolling windows ranging in length from about five (5) to about ten (10) minutes are used. Examples of rolling calculations can include a rolling mean, a rolling median, a rolling minimum, a rolling maximum, a rolling exponentially weighted moving average, and/or a rolling correlation. In one embodiment, the set of input features includes (e.g., six) rolling calculations of a rolling mean, a rolling median, a rolling minimum, a rolling maximum, a rolling exponentially weighted moving average, and/or a rolling correlation for multiple rolling windows of historical data of a maximum photosensor value and a minimum IR sensor value (e.g., where the forecasted output is learned as a function of a time frame of history of these inputs). For example, if the six (6) rolling calculations were used for five (5) rolling windows ranging in length from six (6) to ten (10) minutes for each of the maximum photosensor and minimum IR sensor values where the forecasted output is learned as a function of four (4) minutes of history, the set of input features would be 240 (=6 rolling calculations×5 rolling windows×2 sensor values×4 minutes). The rolling windows may be updated on a regular basis, e.g., every minute, to drop (e.g., delete) the oldest data and bring in (e.g., update with) the more recent data. In some cases, the length of the rolling windows is selected to minimize the delays in queueing the data during live (real-time) prediction.

In certain embodiments, a machine learning submodule with a self-correcting feature selection process such as described herein can be implemented to (e.g., indirectly) quantify and/or empirically validate the relative importance of all potential model inputs to reduce the number of features in the input set to a more performant input configuration. In these cases, the total number of input features can be reduced to a smaller subset that can be used to initialize and/or execute the model. For example, the set of seventy two (72) input features based at least in part on the six rolling calculations for six (6) rolling windows ranging in length from about five (5) to about ten (10) minutes for both the raw maximum photosensor value and the minimum IR sensor value can be reduced to a subset of 50 input features.

In one embodiment, input features (e.g., a set of two-hundred (200) or more input features) are fed into a neural network. One example of neural network architecture is a deep dense neural network such as one having at least seven (7) layers and at least fifty-five (55) total nodes. In some DNN architectures, at least one (e.g., each) input feature is connected with at least one (e.g., each) first-layer node and at least one (e.g., each) node is a placeholder (variable X) that connects with at least one (e.g., every) other node. The nodes in the first layer model a relationship between all the input features. The nodes in subsequent layers learn a relation of relations modeled in at least one of the previous layers. When executing the DNN, the error can be iteratively minimized, e.g., by updating the coefficient weights of at least one (e.g., each) node placeholder.

In some cases, the model outputs one or more forecasted condition values in the future. For example, the model may output a forecasted condition at some point in the future, e.g., from about five (5) to about sixty (60) minutes in the future. In some embodiments, the model outputs a forecast condition at about seven (7) minutes in the future (t+7 minutes). As another example, the model may output a forecasted condition several future times e.g., about seven (7) minutes in the future (t+7 minutes), about ten (10) minutes in the future, or at about fifteen (15) minutes in the future (t+10 minutes). In other cases, the model outputs forecasted sensor values such as in the single DNN architecture embodiment.

To account for site-specific differences in geo-location, seasonal variation and changing weather fronts, the various neural network models (or other predictive models) may be retrained on a regular basis. In certain embodiments, they are retrained every day, or on some other regular basis (e.g., between every 1 and 10 days), with updated training data. The models can be retrained at a time, e.g., when the live models are not being executed such as during the night, vacation, holiday, other facility closure, or during any other low occupancy time window. In certain embodiments, the models are retrained with training data that includes historical data stored over a period of time such as of at least about one week, two weeks, three weeks, or longer. The historical data may be updated on a timely (e.g., regular) basis, for example, according to a schedule. The historical data may be updated to drop (e.g., delete and/or archive) the oldest data and bring in (e.g., update the data with) the more recent data. For example, where the historical data is updated on a daily basis at night, the data from the oldest day is dropped and the most recent data from that day is inserted. These regular updates increase a likelihood (e.g., ensure) that the historical data is keeping with the pace and/or qualitative nature of the changing external weather conditions such as temperature, sun angle, and/or cloud cover. In some embodiments, the models are retrained with training data based at least in part on one or more blocks of historical data stored over periods of time. In some embodiments, the models are retrained using training data based at least in part on a combination of historical data and blocks of historical data. The training data can include feature input values of the types used as inputs by the model during normal and/or routine execution. For example, as described herein, the feature input data may include rolling averages of sensor readings.

In some embodiments, training data includes values of model features based at least in part on historical data (rolling or otherwise) collected at the site. For example, training data may include the maximum photosensor values and/or the minimum IR sensor values of the historical readings of photosensors and infrared sensors at the site (e.g., at the enclosure). In another example, training data may include model features based at least in part on calculations of rolling windows (e.g. a rolling mean, a rolling media, a rolling minimum, a rolling maximum, a rolling exponentially weighted moving average, and a rolling correlation, etc.) of historical readings of photosensors and/or infrared sensors collected at the site. Depending on the number and types of weather conditions covered by the training data, the training data might include data obtained over days, weeks, months, or years.

In certain embodiments, the training data fed into a neural network model or other model includes model input features that are based at least in part on calculations of multiple rolling windows of historical sensor data such as described above. For example, the set of training data may include six rolling calculations of a rolling mean, a rolling median, a rolling minimum, a rolling maximum, a rolling exponentially weighted moving average, and a rolling correlation for multiple rolling windows of historical data of at least one (e.g., each) of a maximum photosensor value and a minimum IR sensor value where the forecasted output is learned as a function of a time frame of history of these inputs. If the six (6) rolling calculations were used for five (5) rolling windows ranging in length from six (6) to ten (10) minutes for at least one (e.g., each) of the maximum photosensor and minimum IR sensor values where the forecasted output is learned as a function of four (4) minutes of history, the set of input features in the training data would be 240.

In certain embodiments, a neural network model (or other model) is retrained using training data based at least in part on blocks of historical data collected over one or more periods of time during which various weather conditions existed at the site to optimize the model for these conditions and diversify the training data over subsets of the total domain. For example, the training data may include values of model features collected over periods of time during which a partly cloudy condition, a Tule fog condition, a clear sky condition, and other weather conditions existed at the site.

In some cases, the training data is designed with model features to capture one or more (e.g., all) possible weather conditions at the site. For example, the training data may include (e.g., all) rolling historical data collected over the past year, the past two years, etc. In another example, the training data may include blocks of historical data obtained over periods of time during which the respective weather condition(s) was present at the site. For example, the training data may include one data set with data obtained during a Tule fog condition, one data set with data obtained during a clear sky condition, one data set with data obtained during a partial cloud condition of 20%, one data set with data obtained during a partial cloudy condition of 60%, etc.

In some cases, the training data is designed with model features associated with a subset of one or more (e.g., all) possible weather conditions at the site. For example, the training data may include blocks of historical data obtained over periods of time during which a subset of weather conditions occurred at the site. In this case, the model is optimized for the subset of weather conditions. For example, training data for a model optimized for a Tule fog condition might use input features obtained during the winter months and further during periods when the Tule fog was present.

As weather patterns change and/or construction occurs around a site, variations to microclimates, building shadowing, and other changes to local conditions at the site might occur. To adapt to changing conditions, training data might be designed with input features that target data obtained while these local conditions exist at the site. In one embodiment, transfer learning may be implemented to initialize a model being retrained with model parameters from a model previously trained for all previously existing weather conditions at the site. The model can then be retrained with training data obtained during the new local conditions, e.g., to increase the probability that (e.g., to ensure that) the model is keeping up with the qualitative nature of the changing local conditions at the site.

In certain embodiments, the model being retrained is first initialized with model parameters (e.g., coefficient weights, biases, etc.) that are based at least in part on hyperparameters: for example, based at least in part on a random distribution of data. Various techniques can be used to determine the random distribution such as using a truncated normal distribution.

During model training, the model parameters (e.g., coefficient weights, biases, etc.) can be adjusted and the error can be iteratively minimized until convergence. The neural network model (or other model) can be trained to set the model parameters that will be used in the live model on the following day. The live model being executed may use input features based at least in part on real-time sensor values, e.g., to forecast conditions that will be used by the control logic to make tint decisions (e.g., during that day and/or in real-time). The model parameters learned during the retraining process can be stored and/or used as a starting point in a transfer learning process.

In some embodiments, transfer learning operations use stored model parameters learned in a previous training process as a starting point to retrain new models. For example, a transfer learning operation can use the coefficient weights of node placeholders of a previously-trained neural network model to initialize one or more new models. In this example, the coefficient weights of node placeholders of the trained model are saved to memory and reloaded to initialize the new models being retrained e.g., on a daily basis. Initializing the new model with the model parameters of a pre-trained model can facilitate and/or expedite convergence to final optimized model parameters, and/or speed up the re-training process. Transfer learning may obviate the need for retraining the new model from scratch (with random initialization). For example, during the daily retraining process, the model may be initialized with the coefficient weights of node placeholders of a previously trained model. Model training may be characterized as fine tuning of coefficient weights and modifying a working parametrization. By starting with coefficient weights of a previously-trained model, the optimization of the coefficient weights begins closer to the global error minimum. Such training can reduce the number of updates to the coefficient weights and/or iterations during optimization, which can help reduce platform downtime and/or computational resources. A transfer learning operation may fix transferred model parameters in the new model for certain layers and/or nodes. A transfer learning operation may retrain only the unfixed layers and/or nodes, which may reduce computational resources and/or platform downtime.

In certain embodiments, a transfer learning operation is included in the re-training process of a model. At least one (e.g., each) of the models being retrained may be initialized with stored model parameters from a previous training process. In one embodiment, a transfer learning operation is included in the daily re-training of models that might be called upon to be executed over the course of the day. For example, a transfer learning operation might be included in the retraining operation 2903 of FIG. 27A. In these embodiments, transferring the knowledge acquired during initialization and daily re-training facilitates finer-grained adjustments to site-specific changes in conditions.

In one embodiment, a transfer learning operation initializes a model with stored model parameters from a previous training process that used training data from a block of historical data over a first period of time. For example, the previous training process may use a block of historical data over a time period of at least one (1) month, two (2) months, three (3) months, or more. During retraining of the initialized model, the model can be retrained. e.g., to update the model using training data based at least in part on rolling historical data over a second period of time. For example, the retraining process may use a rolling window with a second time period in the range of about five (5) to about ten (10) days. The time period of the block of historical data is longer than the time period of the rolling window.

In one embodiment, a transfer learning operation initializes a model with stored model parameters from a previous training process that used training data from a block of historical data over a first period of time (e.g., of at least about one (1) month, two (2) months, three (3) months, or more.). During retraining of the initialized model, the initialized model can be retrained to update the initialized model using training data based at least in part on a targeted subset of weather conditions. For example, the training data may include data obtained during a new weather condition during a second period of time, e.g., that occurred during a two week period of time three months prior to the retraining. The retraining process may use the training data during the second period of time to retrain the model.

In certain embodiments, a live model selection framework facilitates release of specialized models such as those optimized for use with (e.g., only) photo sensor input, (e.g., only) infrared sensor input, (e.g., only) weather feed data, etc. In these embodiments and others, the control logic executes a subset of the full ensemble of modules and models illustrated in FIG. 25. The unexecuted portions may be stored in memory and retrained for execution on a future day or may not be present in the architecture.

The control logic can executes one or more models (e.g., selectively). For example, in one embodiment, the control logic illustrated in FIG. 25 does not implement module B and module E, and instead executes Module C 2711, Module D 2712 and barycenter averaging Module 2719. In this embodiment, the recurrent LSTM neural network of module 2710a is not implemented and a single deep neural network (DNN) is implemented instead. According to one aspect, the single DNN is a sparse DNN with a reduced number of model parameters from the total number of model parameters that would be used in the DNN of module 2710b where the full ensemble of models and modules is implemented. In one example, the sparse DNN has 20% of the model features of the DNN of module 2710b. In one embodiment, the linear-kernel Support Vector Machine (SVM), or other similar technique, is executed to eliminate model features of the sparse DNN to a subset of the total number of potential features of the DNN of module 2710b.

Figure 26:
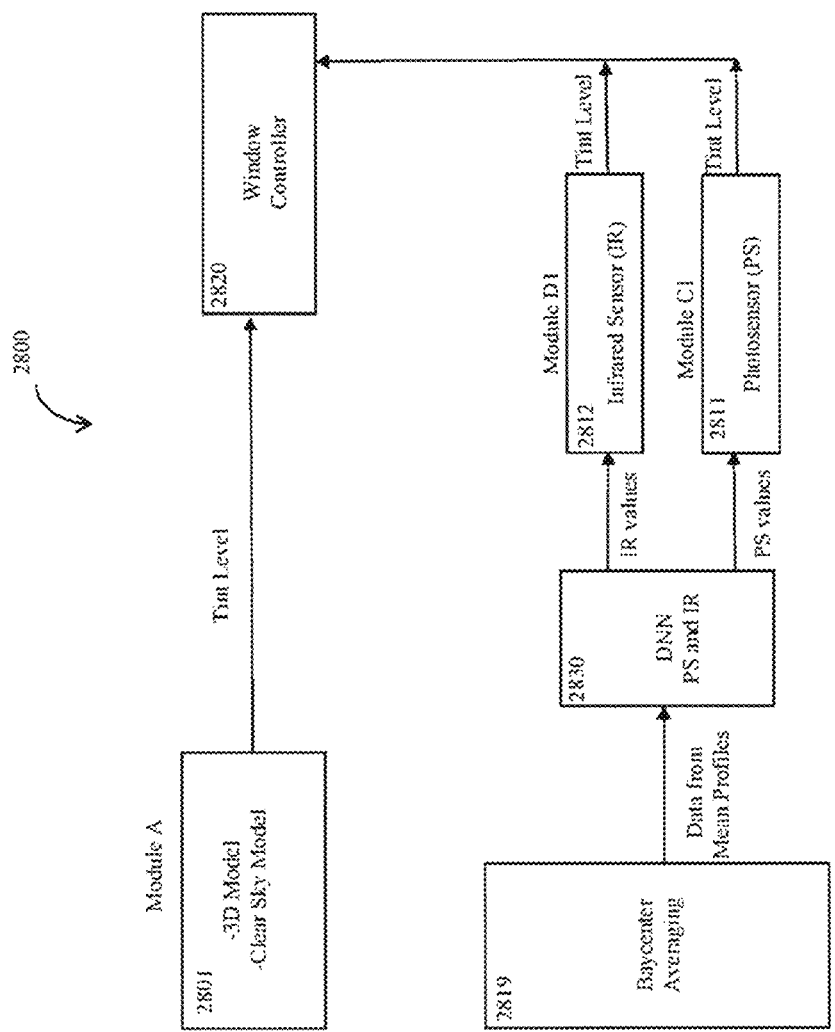
FIG. 26 depicts a flowchart with control logic for making tint decisions based at least in part on outputs from modules, according to various implementations.

FIG. 26 is an example of a block diagram of a window control system 2800 with a single DNN architecture, according to an embodiment. The window control system 2800 includes a window controller 2820, e.g., a master controller or a local window controller. The window control system 2800 includes control logic depicted by certain blocks. One or more components of the window control system 2800 implement the control logic. The control logic includes a barycenter averaging Module 2819, a DNN module 2830, a Module A 2801, a Module C1 2811, and a Module D1 2812. In one case, the DNN module 2830 includes a sparse DNN. Module A 2801 includes control logic that is similar to the logic of Module 2701 of FIG. 25.

The barycenter averaging Module 2819 can be executed to determine synthetic real-time sensor values based at least in part on historical sensor data and/or to determine mean sensor profiles for a day based at least in part on the synthetic real-time sensor values. For example, the barycenter averaging Module 2819 can be executed to determine a mean photosensor profile and/or a mean infrared sensor profile over a day. In one case, the barycenter averaging Module 2819 can be executed to (e.g., additionally) determine a mean ambient temperature sensor profile over a day. The barycenter averaging Module 2819 can use rolling historical data to generate synthetic values as input to the DNN module 2830. The live sparse DNN of DNN module 2830 can use input features based at least in part on the synthetic values from the barycenter averaging Module 2819 to output one or more forecasted IR sensor values that is used as input to Module D1 2812 and to output one or more forecasted photosensor values that is used as input to Module C1 2811. For example, the DNN module 2830 may output a forecasted IR sensor value and forecasted photosensor (PS) value at a time of at least about 7 minutes in the future, about 10 minutes in the future, or about 15 minutes in the future, etc.

In some embodiments, module C1 2811 includes control logic that can be executed to determine a cloud cover condition by comparing the photosensor values output from the live DNN of DNN module 2830 with threshold values to determine a tint level based at least in part on the determined cloud cover condition. Module D1 2812 can be executed to determine a tint level based at least in part on infrared sensor values and/or ambient temperature sensor values output from the live DNN 2830. The window controller 2820 can execute tint commands based at least in part on the maximum of the tint levels output from Module A 2801, Module C1 2811 and Module D1 2812.

In certain embodiments, control logic configured to determine window tint states dynamically selects and/or deploys particular models from a suite of available models. At least one (e.g., each) model may have a set of conditions. A model may have a set of conditions under which it is better at determining window tint states than at least one other model (e.g., the other models) in the suite. An architecture (or framework) for implementing this approach can include logic for selecting model(s) (e.g., the suite of specialized models) trained to produce best results on the specific conditions for which they are optimized. The framework may provide uninterrupted and/or real-time tint state decisions, e.g., even though different models are deployed at different times.

In some embodiments, rather than deploying a single purpose model to handle all possible external conditions encountered by a building throughout the day, week, season, or year; the model selection framework choses model(s) dynamically. The model selection logic may select, e.g., at any moment in time, a model determined to be most performant in handling external conditions of a particular kind, e.g., as they arise (e.g., in real time). For example, the selection may be based at least in part on environmental conditions currently prevailing at a particular location (e.g., at the building site) and/or be based at least in part on conditions expected during a future time of year, time of day, etc.

In certain embodiments, the model selection logic evaluates conditions and/or selects models. e.g., while one of the available models is executing (live). This means that the tint determining logic can shift between models, e.g., without any (e.g., significant) downtime. To do so, the control logic may (e.g., continuously or intermittently) receive currently available data. The control logic may dynamically deploy the models optimized for handling (e.g., currently observed real-time and/or future) conditions. The conditions may be external (e.g., temperature, sun angle, cloud cover, radiation, and/or any other weather condition.) conditions to the enclosure (e.g., facility).

In some embodiments, the dynamic model selection framework is employed to provide resilience for tint selection logic. In certain embodiments, model selection logic accounts for situations where one or more types of feature input data (for the models) becomes temporarily unavailable. For example, a first model may require multiple types of input features and also at least one specific type of feature (e.g., and also IR sensed values) and a second model may require the same input features, but not the at least one specific type of feature (e.g., but not the IR sensed values). If tint decision logic is progressing using the first model, and suddenly an IR sensor becomes disabled (e.g., goes off-line), model selection logic may then switch over to the second model to continue making real time tint decisions. In some cases, model selection logic may account for situations where one or more of the models fails or otherwise becomes unavailable, and the logic must (e.g., immediately or at a minimum lapse time) choose a different model.

In some embodiments, a live model selection framework facilitates release of specialized models such as those optimized for use with (e.g., only) photo sensor input, e.g., allowing building sites outfitted with earlier (or multiple) versions of the sensor unit to realize the benefits of model-driven prediction.

Figure 27A:
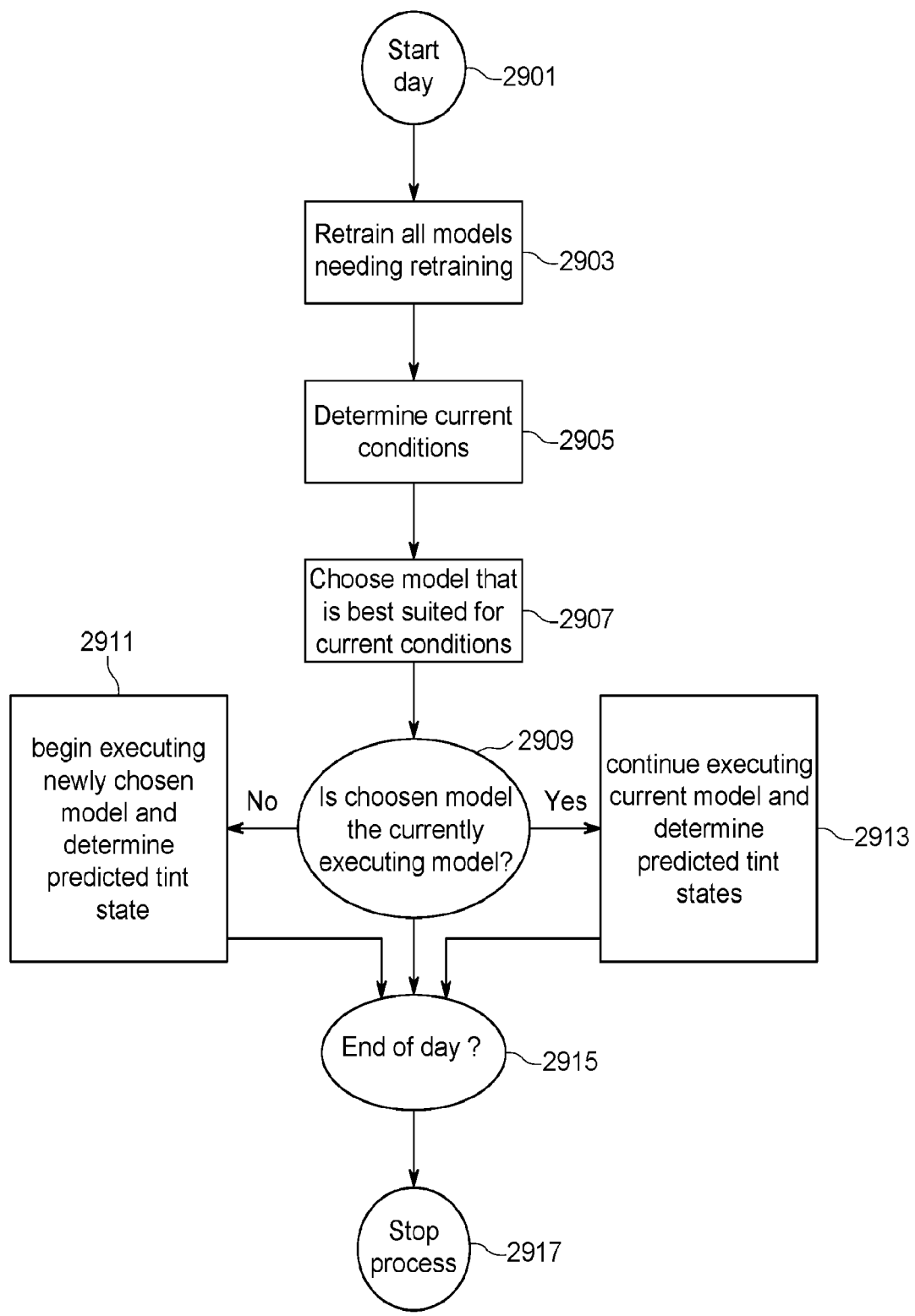
FIG. 27A presents a flow chart illustrating one approach to dynamic model selection.

FIG. 27A presents an example of a flow chart illustrating one approach to dynamic model selection. The depicted process begins at an operation 2901 which may be associated with a recurring event such as the start of a new day, sunrise, etc. The timing of such event need not be the same every day, and in some cases, it need not even be based at least in part on a recurring daily event. Regardless of the basis of the event, the process initializes or otherwise prepares the various available models for execution at an operation 2903. In the depicted embodiment, that operation involves retraining all the models that might be called upon to execute over the course of the day or other time period until the process begins again. The performance of tint condition determining models can improve (e.g., significantly) when they are frequently retrained, e.g., on a daily or on a more frequent basis. At an operation 2905, the current conditions are provided to the model selection logic. This operation may be performed before, during, or after all models are made ready for execution by retraining or other operations. The current conditions may be related to external weather conditions (e.g., temperature, sun angle, cloud cover, radiation, etc.) which may be determined by one or more sensors such as IR sensors and/or photosensors described herein. Or the current conditions may be based at least in part on the set of input features that are currently available (e.g., weather data feed from the internet, IR sensor data, photosensor data, etc.). When only a subset of available input features are available, certain models in the suite may not be usable.

At an operation 2907, the model selection logic selects a model for execution by considering the current external conditions. For example, if the current weather conditions indicate fog (or a similar condition), the model selection logic may (e.g., automatically) select a model that was trained and/or optimized for accurately choosing tint states under these (e.g., foggy) conditions. In another example, if a primary model requires, a plurality of input features (e.g., a weather feed, IR sensor data, and photosensor data); and that primary model is executing when a communications link fails (and the weather feed suddenly becomes unavailable), the model selection logic may (e.g., automatically) trigger execution of a backup model that requires as input features only part of the input features (e.g., only IR sensor data and/or photosensor data).

In some embodiments, when the model selection logic identifies a model to execute based at least in part on the current conditions, the logic should ensure continued seamless operation. To this end, the logic may determine whether the model chosen in operation 2907 is the currently executing model. See decision operation 2909. If so, it permits the currently executing model to continue to execute and determine future tint states. See operation 2913. If not, it transitions to the newly chosen model and allows it to begin determining future tint states See operation 2911.

Regardless of whether the models switch or remain constant, the process may continue to cycle through repeated checks of current conditions (e.g., operation 2905) and choices of best models for the conditions (e.g., operation 2907) until a window tinting is no longer required, such as at sundown or the end of the day. See decision operation 2915. When the ending event is determined by operation 2915, process control is directed to end state 2917, and no further model selection is preformed until the next occurrence of starting event 2901.

Tint decision logic may employ architectures having a plurality of models available for determining which tint state of windows best accounts for (e.g., near term) weather conditions. The number of models available for selection may depend on many case-specific factors such as (i) the number of unique and/or potentially fragile input feature sources, (ii) the range of qualitatively different weather conditions in a particular location, and/or (iii) the available training and/or computational resources. In certain embodiments, the number of models available to select from is at least three. In certain embodiments, the number of models available is from about two to about twenty, or from about three to about ten.

In some implementations, (e.g., all) models available for selection provide a similar output such as (i) a tint decision and/or (ii) information that tint control logic can use to determine what tint state to propose based at least in part on the current (e.g., weather, radiation, and/or sun location) conditions. For example, in some embodiments, at least one (e.g., each) model is configured to output a tint state from among two or more possible (e.g., discrete) tint states (e.g., two, three, four, or more possible tint states). In some embodiments, at least one (e.g., each) model is configured to output predicted radiation, glare conditions, thermal flux, and/or other similar predictions (e.g., as disclosed herein).

The models available for selection may or may not require similar inputs. In cases where the model selection framework is intended to provide feature input redundancy, one or more of the models may require one set of feature inputs while one or more other models may require a different set of feature inputs.

Models, (e.g., all models) available for selection may be of the same, similar, or unrelated model types. For example, all of the models may be structured at least in part on artificial neural networks having the same or similar architecture, e.g., they may all be recurrent and/or convolutional neural networks with the same architecture. In some embodiments, some of the models have a first neural network architecture while others have a different neural network architecture. In some embodiments, one or move models are neural networks, while one or more others may be regression models, random forest models, and/or other model architectures (e.g., as disclosed herein) . . . . In certain embodiments, some or all of the models are feedforward neural networks. In certain embodiments, one or more of the models are dense neural networks.

In some embodiments, there are various situations where live (e.g., real time and/or dynamic) model selection is used (e.g., selection of types of models and/or underlying model architecture used) in each situation.

In some embodiments, the model(s) are selected for feature source resilience. In this case, the models available for selection can be designed to work with different sets of input features. A given neural network may work only with (e.g., only) a specified set of input feature types (e.g., a particular model may require four inputs from IR sensors and one input from a weather feed). A neural network may have a set of input nodes, at least one (e.g., each) dedicated to receiving (e.g., only) one type of input feature. Further, model(s) requiring different sets of input features can be trained differently (e.g., using different training sets), and may have different internal architectures. For example, if two tint prediction models use neural networks model architecture, their first layers may have (i) different numbers of nodes (based at least in part on expected numbers of distinct input features) and/or (ii) different types of nodes. At least one (e.g., each) available model may have an architecture and/or training approach that is specific for its own set of expected input features.

In certain embodiments, feature source resilience is provided by using a model selection framework as described here. In certain embodiments, feature source resilience is provided by using a supplemental Barycenter averaging framework (or module) as described elsewhere herein. In certain embodiments, when sensor data is available, Barycenter averaging is used to generate confidence intervals for data produced during live prediction.

In some embodiments, the model(s) are selected as external condition-specific models. In this case, the models available for selection may be designed and/or optimized for different types of external conditions. The external condition may comprise different weather conditions (e.g., sunny, foggy, rapidly passing clouds, thunderstorms, smog, fires in area, and/or the like). In certain embodiments, the model selection logic identifies a current type of external conditions, from among various possible types of external conditions. The model selection logic can then select the model optimized to perform best under the current external conditions. In certain embodiments, characteristic(s) of distinct external conditions can be determined, e.g., using an algorithmic classifier such as an unsupervised learning model.

In an example of a feature source resilience case, the tint prediction models in the suite of models are chosen to complement one another in terms of input features set. For example, a first model in the suite may require a first set of input features (e.g., feature A, B, and C) and a second model in the suite may require a second set of input features (e.g., features A and C) Depending on the complexity of the input features, additional and/or different models may be provided in the suite. For example, a suite may additionally include a third model requiring input features A, B, and D and a fourth model requiring input features C, E, and F. For feature resilience, the number of models in a suite of models may be determined by a balance of the computational expense and the number of points of potential failure. In certain embodiments, there are only two available models. In some embodiments, there are two more embodiments. In further embodiments, there are four or more models.

In one example, a live model selection framework employs (i) a primary model that performs best and uses a first set of input features (e.g., IR and photosensor data), and (ii) one or more fallback models that do not perform as well but use an input feature set that does require the entire first set of input parameters. For example, the backup model may require only a first type of readings (e.g., photosensor readings) and a second type of readings (e.g., weather feed) as input features. For example, a backup model may require only a third type of readings (e.g., IR sensor readings) and the second type of readings (e.g., weather feed) as input features. If the primary model is executing, when suddenly the third type of readings (e.g., IR sensor) become unavailable, the model selection logic may choose an appropriate fallback model to step in and execute that utilizes the first type of reading (e.g., photosensor readings) and the second type of reading (e.g., weather feed).

In an example of an external conditions variations case, the suite of models is chosen based at least in part on a number of qualitatively distinct weather conditions encountered in a given location where the tint selection logic operates. Note that this framework may be contrasted with a framework that employs a general purpose model. A general purpose model may train on whatever information is available, e.g., over all types of external (e.g., weather) conditions. Such model can, in theory, predict all types of future external (e.g., weather) conditions, and hence determine appropriate tint states for all types of external (e.g., weather) conditions. However, this flexibility may come at a cost of reduced accuracy, increased modeling time, and/or increased computational resources, in some contexts. Trained models optimized to predict future conditions in certain specific contexts at times outperform general purpose models within the contexts. One example of a context where special purpose models can outperform general purpose models can be in the context of fast moving clouds.

As an example of why different models can provide better results, a model optimized on foggy or mostly cloudy conditions might saturate if exposed to data from sunny conditions, and so may be inappropriate for determining tint states during sunny conditions, but would perform better than a general purpose model during foggy conditions. For example, a foggy or cloudy condition optimized model may provide a finer grained and/or more nuanced picture of condition variations during fog or cloud cover. Training such a model employs training data having lower intensity radiation values.

When using a suite of models specialized for the external conditions variation case, the live model framework set up may involve first identifying groups or types of environmental conditions that can profit from having their own models, at least one (e.g., each) optimized to predict future external conditions within the realm of a particular type of external condition.

In one approach, a set up process identifies possible classes of weather condition based at least in part on recurring sets of feature values (e.g., measured photosensor (e.g., visible radiation sensor) and/or IR sensor values) such as feature value profiles (time sequence of feature values over, e.g., a portion of a day or all of the day). The feature profiles, for a given location, may be collected over several days, e.g., at least about 100 days. 300 days, or 500 days. Using an algorithmic classification tool, the produce may identify clusters of feature profiles. At least one (e.g., each) cluster can represent an external environmental condition requiring a separate model.

In another approach, the set up involves identifying different types of external (e.g., weather) conditions expected to require different models (e.g., models optimal for fog, smog, cloud free skies, passing cumulus clouds, cirrus clouds, thunderstorms, and/or any other external condition disclosed herein). For at least one (e.g., each) of these different external (e.g., weather) conditions, the process may collect feature values (which may be provide over time as a profile) and/or algorithmically determines patterns associated with the different weather conditions. In certain embodiments in a suite of models, there may be four or more models, at least one (e.g., each) designed and trained to excel at predicting a particular type (or a particular combination of types) of external (e.g., weather) condition, e.g., as disclosed herein. In certain embodiments, there may be at least five, seven, or more such models.

In various embodiments, the distinct external condition types (or clusters) are (I) identified by analyzing historical data (e.g., radiation profiles), which may be provided as radiation intensity sets as a function of time, and (II) clustering these profiles based at least in part on an appropriate classification algorithm. The collection of profiles may be taken over a (e.g., long) period, e.g., one or more months, or one or more years. In some embodiments, the profile contains sequential values of a single measured value (e.g., raw photosensor measurements of external radiant flux as a function of time).

In certain embodiments, a cluster of profiles is used to generate an average or representative profile that may then be used for comparison against current radiation data to determine which model to use. Determining which cluster, a current condition is closest to may be accomplished using various distance metrics including, for example, an Euclidean distance.

The clustering algorithm can produce a number of clusters of distinct radiation profiles (e.g., at least the number of models that are available to be selected). In an appropriately designed clustering algorithm, clusters can be based at least in part on properties that are meaningful given the tint control logic, e.g., have different window tint sequences for given sensor readings. Examples of divergent conditions giving rise to qualitatively different radiation profile clusters include weather that produces rapidly moving clouds (e.g., cumulus clouds), low hanging clouds or fog, clear and sunny conditions, snow, and/or similar weather conditions.

Suitable clustering algorithms may take different forms. In one approach, radiation profiles can be provided and compared with one another to generate point-wise distances. In multidimensional profile space, the profiles can be naturally clustered into different groups that may be associated with different external (e.g., weather) conditions. However, this is not necessary, nor is it necessary to explicitly identify different external (e.g., weather) conditions associated with different clusters.

In certain embodiments, profiles of measured radiation values over time are collected and used identify clusters. The radiation profiles may span various time lengths. For example, in some cases, they span at least hourly, or at least day-long radiation profiles. The radiation profiles used in clustering may be collected over a period of at least hour(s), day(s), week(s), month(s), or year(s). The radiation profiles may be collected with at least a second or minute resolution. At least one (e.g., each) profile may have radiation values collected at least about every second, every minute, every few minutes, every half hour, or every hour. In certain embodiments, the values can be at least taken on the order of minutes (e.g., have resolution of at least second, seconds, minute, or minutes). These profiles can be used as at least one basis of the clustering. They may be clustered in an unsupervised fashion. e.g., considering which profiles form distinct clusters.

To facilitate the clustering process and/or reduce the computational effort (e.g., time and/or resources), the data in the radiation profiles may be reduced in size by any of various techniques. One approach may map the profiles to a reduced dimensional space that is (e.g., still) effective for clustering. Such an approach to clustering may be implemented with an autoencoder such as Google's seq2seq framework in Tensorflow. Certain techniques may provide an unsupervised pretraining that identifies general characteristics of related profiles that may ultimately be clustered together. The computing problem may be reduced by combining data from two or more periods (e.g., days) into a single profile. For example, techniques such as Barycenter averaging may be employed to combine profiles from two or more periods (e.g., days). In certain embodiments, a k-means clustering technique is used.

After clusters have been identified, they may be tested. Any various clustering tests or validation procedures may be used. Examples include:
1. Inertia (the sum of the distances of samples [e.g., data instances] to their closest cluster center)
2. Silhouette Scores (the difference between the mean intra-cluster distance and the mean nearest-cluster distance for each sample, divided by the maximum of the two)
3. Calinski-Harabaz Scores (the ratio between within-cluster and between-cluster dispersion) (cf. Rousseeuw, P. (1986). Silhouettes: a Graphical Aid to the Interpretation and Validation of Cluster Analysis. In: *Journal of Computational and Applied Mathematics*. 20. 53-65). (cf. Caliński T. and Harabasz J. (1974). A Dendrite Method for Cluster Analysis, In: *Communications in Statistics*, 3:1, 1-27.

In some cases, a test checks for and compares within cluster distances and inter-cluster distances.

Figure 27B:
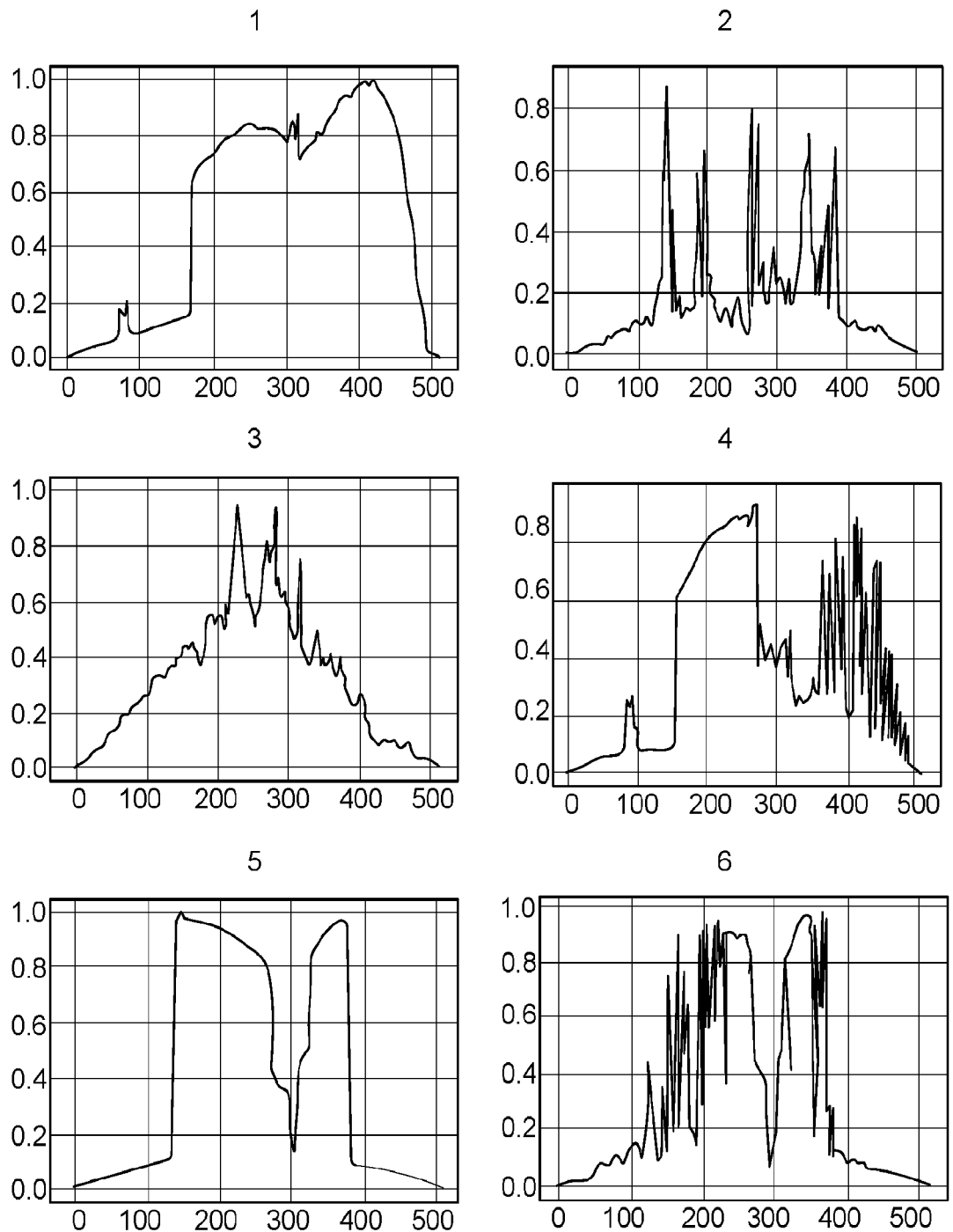
FIG. 27B presents example characteristic radiation profiles for different clusters or models that may be used in live model selection.

Clusters of radiation profiles may have recognizable characteristics. FIG. 27B depicts examples of characteristic radiation profiles from different clusters. This figure illustrates an example of characteristic profiles of radiation profiles in different clusters. The labeling is as follows: (1.) Sunny, (2.) Cloudy, (3.) Partially Cloudy, (4.) Mix Sunny/Partially Cloudy, (5.) Sunny with Occlusion, and (6.) Partially Cloudy with Occlusion. All profiles are day length with minute-level resolution. The Y-axis are the photo sensor values, scaled from (0-779 Watts/sq. meter) to (0 to 1).

In certain embodiments, the clustering logic identifies distinguishing characteristic features for the individual clusters of radiation profiles. Various techniques may be employed for this purpose. One embodiment employs shapelet analysis. Certain subsets of radiation data points in a profile may serve as a characteristic feature. A shapelet identification algorithm may be used. When using live model selection, the current conditions may be processed. e.g., in real time, to produce a shapelet or other feature that is compared against corresponding characteristics for the various clusters associated with the various available live models. Based at least in part on which cluster the current conditions associate with, a live model may be selected.

In certain embodiments, the clustering is conducted using supervised or unsupervised learning. In some cases, the clustering is conducted using unsupervised learning, and optionally using information collected and conclusions drawn using the logic in Module E discussed in the context of FIG. 25.

In some embodiments, when the different types of models are identified for inclusion in the framework, those models should be generated or obtained. Thus, the relevant workflow generates or selects models based at least in part on data for profiles or other information for the specific models.

In some embodiments (e.g., in the case of input feature resilience), the different models must be trained with one or more different training sets (e.g., that may use different combinations of input features). For example, one model may be trained using data having IR sensor readings and corresponding weather feed information, while another model may be trained using data having photosensor readings along with corresponding IR sensor readings and weather feed information. Yet another model may be trained using photosensor readings and corresponding weather feed information. At least one (e.g., each) of these models may have different architectures.

In the case of a suite of models optimized for different external conditions (e.g., different weather types), the individual models may be (e.g., each) trained on data collected for their own specific types of external conditions. For at least one (e.g., each) external condition identified in the setup, the workflow may retain a model using (e.g., only) data obtained when such condition occurs. For example, the work-flow may develop and/or test a first model using training data from a first external (e.g., weather) condition (e.g., foggy mornings), develop and test a second model using training data from a second weather condition (e.g., passing clouds), and so on. In certain embodiments, at least one (e.g., each) performance of the trained model is tested against some benchmark (such as the performance of a model trained with data from multiple different weather conditions).

Various factors may be used by model selection logic to select a model to use for real time (e.g., immediate) or near term tint state determination. The process of deciding which model to use in real time (or near real time) may depend on the immediate or anticipated conditions and/or the differences between the models that are available for selection. For example, in the feature source resilience case, the model selection logic may monitor input parameter sources for possible problems. If a failure is observed that has or will likely result in an input feature becoming unavailable for a currently executing model, the model selection logic may in real time (e.g., immediately or promptly) shift to a different model for which all the required input features are currently available.

In one example, a primary model performs best and uses a first set of input features (e.g., IR sensor and photosensor data), and one or more fallback models do not perform as well but use an input feature set that does require the (e.g., entire) first set of input parameters. For example, the backup model may require (e.g., only) photosensor readings and weather feed as input features. Or, a backup model may require (e.g., only) IR sensor readings and weather feed as input features. Then, if the primary model is executing, when suddenly the IR sensor or photosensor become unavailable, the model selection logic may choose an appropriate fallback model that does not require IR sensor readings to step in and execute.

In the case where the suite of models includes models optimized to handle different types of external conditions, the selection logic may monitor external conditions and regularly determine which model is likely to perform best given those conditions.

In some embodiments, such model selection logic uses a set of current data (e.g., local IR sensor and/or photosensor readings) and/or current information (e.g., weather feeds) to assess a current external condition (e.g., based at least in part on a radiation profile). The model selection logic associates the current external condition with the most similar cluster or classification, which implicates a particular model. Various techniques may be employed to identify the cluster or classification that is most similar to the current conditions. For example, if the cluster or classification is represented by a region or point in multidimensional space, the model selection logic may determine distances (such as Euclidean distances between the current conditions and each of the clusters or classifications). Non-Euclidean techniques may be employed. In some embodiments, k-means is used to associate with current conditions. After clustering the current conditions, the logic selects for execution the model that is associated with the cluster or classification associated with the current conditions.

As an example, if a radiation profile changes due to, for example, fog lifting or a storm front approaching, processed sensor readings may indicate that external conditions have transitioned from one classification of radiation profiles to another classification of radiation profiles, and this transition requires selection of a new model that is optimized for the new radiation profiles.

The model selection logic may select models at particular frequencies appropriate for real time control of window tinting, e.g., from at least one second to hours. The model selection logic may determine which model to use at a defined frequency such as every second, every few seconds, every minute, every few minutes, every hour, or every few hours. In certain embodiments, the model selection logic determines which model to use at a frequency from about 5 seconds to about 30 minutes. In certain embodiments, the model selection logic determines which model to use at a frequency from about 30 seconds to about 15 minutes. In some embodiments, the model selection logic selects models when triggered to do so by a detected event such as a change in a detected radiation profile that is greater than a defined threshold.

Within a suite of models, those that are not currently used to determine tint states may need to be kept ready for execution. All models in a suite may be retrained on a timely basis (e.g., every day, or on some other regular basis (e.g., between every 1 and 10 days)). In certain embodiments, the models are retrained at a time when the live models are not executing, such as during a time of low occupancy in the facility (e.g., sometime during the night such as at midnight, or at any other low occupancy period, e.g., as disclosed herein).

In some embodiments, when tint decisions are being made (e.g., during daylight hours), all models must be ready for deployment. The data required by all models, particularly data that includes historical components such as rolling average sensor data, should be kept up to date and ready to serve as feature inputs for newly selected models, e.g., even if it is not used in a currently executing model. In various embodiments, all input features for all models are constantly generated or otherwise kept up to date and ready to be fed to the models.

When a model that is not currently used to determine tint states is a recurrent neural network, it may be necessary to feed it input feature(s), and have it execute (e.g., even though its outputs are not currently used) so that it is ready to immediately provide useful outputs should it be selected. If the model is a non-time dependent (e.g., it does not include a memory and/or does not have a feedback loop as in the case of a feedforward neural network), it may need not execute prior to being called upon to determine tint states.

Figure 28:
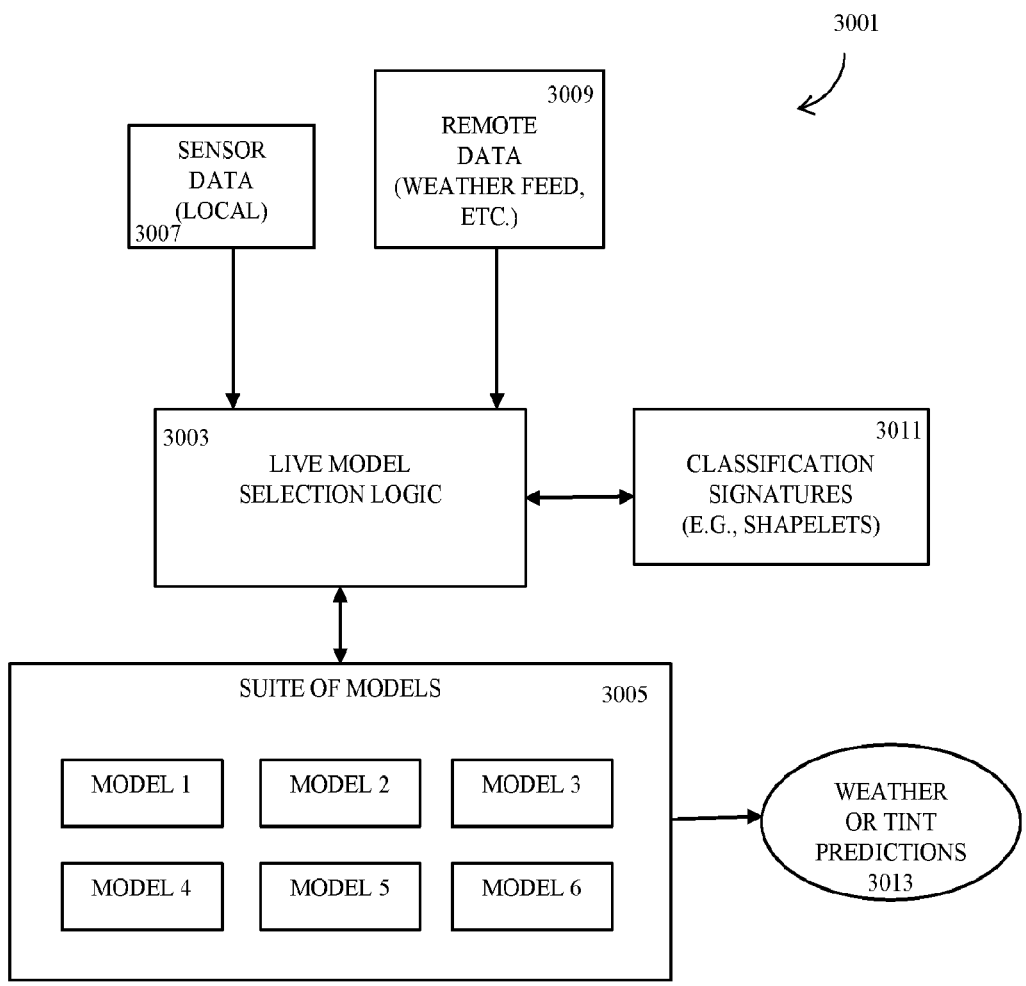
FIG. 28 presents a block diagram of an example of an architecture for dynamic model selection.

FIG. 28 presents a block diagram of an example architecture 3001 for a live model selection framework. The framework relies on live model selection logic 3003, which may be implemented as program instructions and associated processing hardware. Logic 3003 receives various inputs relevant to the current exterior conditions. In the depicted embodiment, these inputs include local sensor data 3007 and remote data 3009 such as a weather feed provided over the internet. The live model selection logic 3003 may access signatures 3011 or other stored information that allows the logic to compare current conditions against previously classified condition types. In certain embodiments, the classification signatures are shapelets. By applying classification logic for the current conditions, live model selection logic 3003 determines which type of model from among multiple condition-specific models it should select to predict future conditions. When it makes this decision, logic 3003 selects a model from among those in a suite 3005 of available condition-specific models. In the depicted embodiment, there are six available models.

In certain embodiments, a live model selection framework employs sensor data and/or current condition information. Examples of sensor data include photodetector and/or IR sensor inputs. The current condition information may be provided through, e.g., a live weather feed from, e.g., a selected third-party Application Programing Interface (API).

In some embodiments, input resilience is one application of this framework. In a prediction model that leverages live weather data from a third-party API in addition to Photo and/or IR sensor input from a hardware unit (e.g., a rooftop sensor unit such as those described in U.S. Patent Publication No. 2017/0122802, published May 4, 2017 that is incorporated herein by reference in its entirety), there are three possible points of failure. Because any one of the three inputs could be present or absent during a connection failure event, there are (e.g., at least about 8 (or 23)) possible input combinations, which (e.g., only) a framework that supports live model selection can seamlessly handle without downtime.

Unlike sensor data, third-party weather data cannot be reliably synthesized from historical values using. e.g., a weighted barycenter averaging technique. However, experimental results have shown that it is helpful to supplement the model with real weather data, e.g., when connection to one or both of the sensor inputs is missing and/or must be synthesized. Because a given model may perform only when all expected inputs are provided, two models should be ready for deployment in the event of connection failure (e.g., one which includes network placeholders ready to receive input from the live weather feed, and another which does not).

With such an architecture, a live model selection framework (e.g., only) makes use of real weather data when it is available, and the framework (e.g., only) synthesizes sensor values for whichever inputs are missing, retaining (e.g., every) real data point received. In this way, the presence or absence of input each minute drives model selection in real time, ensuring that the presently deployed model supports the combination of inputs currently being received.

In some embodiments, such approach (and the associated architecture) enables deployment of a single framework with specialized models to sites currently outfitted with (e.g., only) the Photo Sensor hardware unit. Should the site prefer to maintain both versions of hardware when receiving an upgrade (e.g., one type of sensor on one building, and an upgraded version of the sensor on another), the live model selection framework may support simultaneous deployment of two prediction models, (e.g., each) optimized for the input it receives from its corresponding hardware unit. In this way, the framework may provide versatility in the sensor forecasting software.

Figure 29:
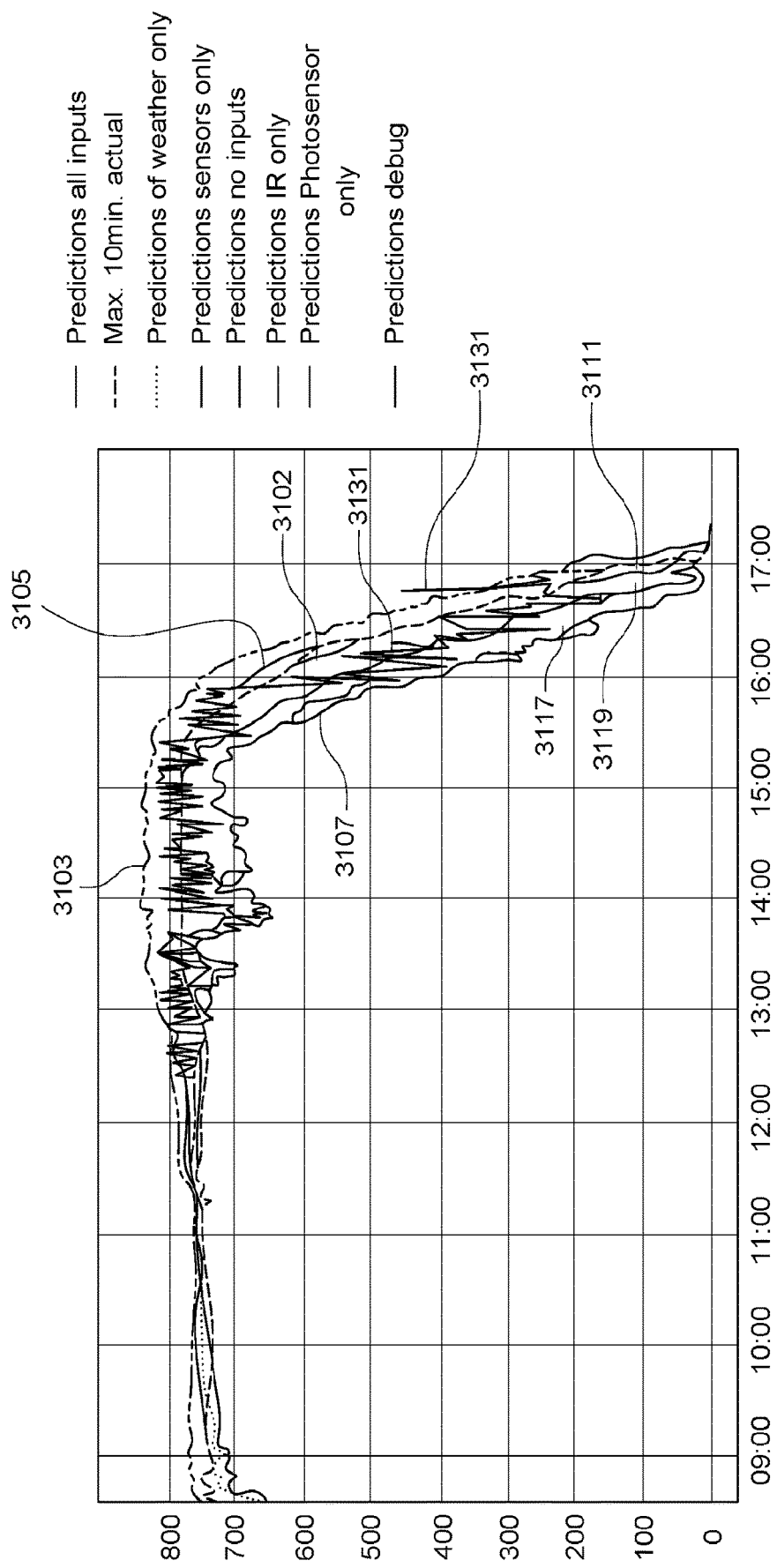
FIG. 29 presents results of a stress test running from noon to sunset for a dynamic model selection process.

To validate the resiliency of the live model selection framework, an extreme volatility stress test can be devised that randomizes input to the prediction module each time period depending on the resolution (e.g., each minute). Such a test may simulate a scenario in which the presence or absence of (e.g., any) one of the three inputs is determined at random. From one minute to the next, all, none, only one, or any combination of two inputs can be made available to a prediction module, which selects in real time one of two models designed for those inputs. For the duration (of each of the seven days) during which the prediction module was subjected to the stress test, deployment of the live model selection framework resulted in zero downtime, successfully generating minute-level predictions throughout the day. FIG. 29 presents results of the stress test running from noon to sunset. Line 3103 (designated as "Predictions all inputs") represents predictions generated using all inputs (Photo Sensor, IR. Forecast IO data from a weather feed). Line 3111 (designated as "Max. 10 min. actual") represents the actual values being predicted: e.g., actual measured radiant intensity from outside. The line 3119 (designated as "Predictions of weather only") represents predictions generated using Forecast IO data and synthetic Photo Sensor and IR data. The synthetic data was generated from Barycenter averaging of data from recent days, line 3105 (designated as "Predictions sensors only") represents predictions generated using only real Photo Sensor and IR data. Line 3107 (designated as "Predictions no inputs") represents predictions generated using only synthetic Photo Sensor and IR data. Line 3117 (designated as "Predictions IR only") represents predictions generated using synthetic Photo Sensor data and real IR data. The 3102 line (designated as "Predictions photosensors only") represents predictions generated using real Photo Sensor data and synthetic IR data. And line 3131 (designated as "Predictions debug") represents predictions generated by a model subjected to the stress test, in which the presence or absence of any of the three inputs to the model is randomized from minute-to-minute. The predictions shown in the line 3131 were generated using live model selection of two models, one designed for accepting photosensor data. IR sensor data, and Forecast IO data, and the other designed for receiving only photosensor and IR sensor data. All other curves were generated using a model that accepts data from all three sources: photosensor data. IR data, and Forecast IO data. Because the live model selection run (line) transitioned back and forth between two models, the predictions generated fluctuate across the range of predicted values output by all the previously described models. However, while the line 3131 fluctuates, it stays reasonably close to the actual measured values of radiant flux (line 3111), hence indicating that it provides a reasonable prediction under challenging conditions.

In some embodiments, the power of deep learning relies on the informative signal strength of input features whose relations are represented by the layers of the network architecture. It may not be able to determine in advance which baseline input feature set results in best predictive performance in (e.g., all) the geographical locations and (e.g., all) the times of year, there may be various possible input features for a neural network, sometimes hundreds or more. As mentioned herein, some examples have about 200 available input features. However, using (e.g., all) those features can lead to certain problems such as overfitting and/or requiring extra computation resources that add expense and/or slow the process.

In some embodiments, neural networks are in some regards "black box" algorithms. It may not be possible to directly quantify the relative importance of input features. For such networks (i) model relations between inputs and/or (ii) relations of relations (of other relations . . . ) for however many layers of representation are constructed, effectively bury the relative importance of input features. Such characteristic of deep learning models may make it difficult to determine whether the set of input features currently being used is optimal. A different set of input features may train a different set of relations (of other relations . . . ), and the neural representation of an alternative baseline feature set may be more successful in minimizing overall prediction error. The diverse range of site-specific external conditions and their distinct and/or irregular rates of change, may make hand-tuning of model input features impractical.

In certain embodiments, machine learning is used to automate a feature selection process that might otherwise require monitoring by a team of specialists tasked with regularly updating model parameters. In certain embodiments, automated feature selection is implemented by integrating a machine learning module into an initialization architecture for models that predict future values of window tinting and/or local weather conditions. Such feature selection module may be configured to quantify and/or (e.g., empirically) validate relative feature importance. Such information allows, in certain embodiments, automatic re-initialization of predictive models with new inputs and/or updating of the feature set for changes in, e.g., different locations and/or at different times of year.

In some embodiments, the conditions prevailing at a particular time and/or place may determine which input feature set is best for minimizing prediction error. Site-specific changes in conditions over time may drive re-initialization of the model with an improved set of inputs, enabling it to automatically self-correct and/or update its existing parameterization.

In some embodiments, the process effectively filters one or more of the various available input features. While various filtering processes may be employed, the following discussion focuses on a recursive feature elimination process (RFE) that may be implemented with a regression and/or classification methodology, such as a support vector machine or a random forest technique.

The disclosed techniques may allow a recursive feature elimination system to identify particular feature inputs, from among all possible feature inputs, that are likely to be most valuable on any given day. Thus, a relatively small set of input features may be used to initialize and/or run a model. As a consequence, reduced computational resources and/or time may be needed to execute prediction routines. Execution of the prediction routines may reduce the model error, e.g., inaccurate predictions of future external conditions relevant to choosing tint appropriate window tint states.

As suggested herein, recursive feature elimination process (RFE) may be used to capture behavior differences in weather data and/or weather characteristics (i) at different locations (e.g., even within the same city or neighborhood), and/or (ii) at different times of year. An input feature set that works well at one location may not work as well at a different location. A feature set that works well in early February may not work as well in mid-March. Every time a new input feature set is selected, it may be used to re-initialize a neural network (such as a dense neural network and/or a recurrent neural network) used to predict future tint states and/or weather conditions.

In certain embodiments, the feature elimination system identifies the relative importance of feature inputs. The process may employ various features derived from photosensor and/or IR sensor input as described herein.

In certain embodiments, the model that is periodically reinitialized (e.g., as described herein) is any neural network (e.g., as described herein) such as a dense neural network and/or a recurrent neural network (e.g., a LSTM). In certain embodiments, the model is configured to predict external conditions at least about five minutes into the future. In certain embodiments, the prediction extends further into the future, such as at least about 15 minutes or at least about 30 minutes into the future. In some embodiments, it extends to a period that is no longer to the longest period of time required to transition from any one tint state to a different tint state.

In certain embodiments, a submodule for filtering input features is configured to perform a support vector regression, or more specifically, a linear kernel support vector machine. This type of algorithmic tool can generate coefficients of all the available input parameters. The relative magnitudes of the coefficients can serve as quantitative indicators of the associated input parameters relative importance. A feature filtering submodule may be embedded in a feature engineering pipeline used in preprocessing input to the neural network during model training. As an example, see FIG. 30 described below.

In certain embodiments, a support vector machine is used in a regression context rather than a classification context (e.g., used for support vector machines). Mathematically, both processes can generate hyperplanes and identify data points closest to the hyperplane. Through this process, a support vector machine can identify coefficients for the feature inputs that can be used to specify their importance. In some embodiments, generation of coefficients for different feature types is common to partial least squares and principle component analysis. In some embodiments, unlike principle component analysis, the support vector machine does not combine feature types into vectors and/or it presents the independent feature inputs separately.

In some embodiments, the "support vectors" of a support vector machine are data points lying outside an error threshold of which the support vector machine is tolerant in regressing potential model inputs on the forecasted target variable (e.g., W/m2 for photosensors, degrees Fahrenheit or Centigrade for IR Sensors, etc.). When training the support vector machine, (e.g., only) these data points may be used to minimize the prediction error, e.g., ensuring that relative feature importance is quantified with respect to those conditions which pose greatest difficulty to the model.

In certain embodiments, the regression analysis employs historical data points taken for a given time (e.g., noon on a particular winter day), and each data point includes (i) a value of a single putative input feature (e.g., a rolling mean value of an IR sensor reading over the last 10 minutes) and (ii) an associated raw measured external radiation value (e.g., a radiation value measured by an external photosensor, which may be the same photosensor providing some of the putative input features values). The raw measured external radiation value may serve as a label and/or as an independent variable for the regression analysis.

In some embodiments, the input to the regression analysis is a single data point for each putative input feature. Some input data points (putative input features) may have an associated time value. Aside from that time value they may represent feature types that are identical to one or more other input points. Some or all input features may be time-lagged, for example by four or more time steps. For example, a five-minute rolling median of the minimum measured IR value may be represented by four model parameters (e.g., its value at time index 't', 't-1', 't-2', and 't-3'), some of which may be selected by RFE. Thus, at every time interval such as every minute (e.g., in every row in an input data structure), the model can contain some information about how that feature has changed over the previous four minutes.

Support vector regression (or another regression technique) may be used to develop an expression (or relationship) between coefficients (e.g., with their putative input features) and an external radiation value. The expression is may be function of input feature values and their associated coefficients. For example, the expression may be a sum of the products of the coefficients and the values of their associated putative input features.

In some embodiments, an error minimization routine is used to adjust the coefficients, e.g., so that the calculated radiation value generated by the function matches the actual radiation value that was measured (e.g., a photosensor value taken to generate the feature values). The regression technique may use calculations employed by a support vector machine to classify labelled points. The process may eliminate those features that contribute the least to minimizing the error of predictions. Regardless of the specific technique employed, the process may generate a regression expression with coefficients for at least one (e.g., each) of the feature values.

Inn some embodiments, the feature elimination process initially applies a regression to all potential input features, and through this process ranks the features based at least in part on coefficient magnitudes. One or more putative input features with low magnitude coefficients may be filtered out. Then the process can apply the regression again, but this time with a reduced set of putative input features, the set having been reduced by eliminating certain low ranking input features in the previous regression. The process may be continued recursively for as many cycles as is appropriate to reach a desired number of input features. For example, the process may continue until a user-defined stop criterion or a requested number of remaining predictors (e.g., a threshold) is reached.

The resulting feature set can then be used to initialize the neural network (e.g., having the most performant input configuration). The decision to re-initialize the model with a new configuration of input features may be made with respect to how well the existing input features perform on the same validation set of recent historical data.

While support vector regression may be a suitable technique for filtering and/or eliminating putative input features, it may not be the only suitable technique. Other examples can include random Forest regression, partial least squares, and/or principal component analysis.

In some embodiments, a "recursive" elimination process runs a filtering algorithm (e.g., a linear kernel support vector regression) multiple times, each time attaining a greater degree of filtering. Through this approach, the process step-wise can eliminate the least important feature inputs. e.g., via multiple runs of the filtering algorithm. A parameter, which may be a user-definable parameter, can specify how many features are to be selected at the end of the recursive filtering process.

In some embodiments, a fixed number of features are eliminated each time a support vector machine runs with a set of potential input features. For example, in each iteration, a single feature can be eliminated, and then the support vector machine can rerun with one less data point. As an example, if there are initially 200 available input features, and each time a support vector machine is run, one more input feature is eliminated, the support vector machine would have to run 100 times to reduce the number of input features from 200 to 100.

In certain embodiments, an RFE process removes from about 20% to about 70% of the initial number of available features. In certain embodiments, an RFE process removes at least about 10%, 25%, 50% or 75% of the features. In certain embodiments, an RFE process removes from about 50 to about 200 features. As an example, there are initially 200 distinct input features and over the course of an RFE process. 100 (50%) of these features are filtered, to reduce the number input features to 100 features at the end of the process.

In some embodiments, the input feature elimination is flexible in identifying features to filter. For example, in a given iteration, a feature of any type may be filtered. Consider for example the case where there are 50 input features based solely on static sensor readings, and those 50 input features are available over each of four different time intervals (e.g., each of four successive minutes prior to the present time). Thus, in this example, there are 200 available input features. An elimination procedure may consider elimination some features at one time interval, other features at a different time interval (e.g., time interval or time step), still other features at a third time interval, and so on. Some feature types may be preserved at more than one time interval. Hence, the elimination procedure may eliminate features at least in part on the basis of feature type (e.g., a rolling photosensor mean value versus a rolling IR sensor median value) and/or at least in part on the basis of time increment (compared to the current time).

In computational model design, there may be various stages of model definition and development. One of these stages may be initialization. In some embodiments, at least one (e.g., each) time a new set of input feature types is defined, the process initializes or re-initializes a model.

(1) Model architecture—in the case of a neural network, this may represent the overall structure of the network including the number layers, the nodes in at least one (e.g., each) layer, and the connections between nodes in adjacent layers. (2) Model hyperparameter optimization—hyperparameters are set before training. As an example, a hyperparameter may be an initial (prior to training) set of parameter values for one or more parameters in activation functions of individual nodes in a network. In another example, hyperparameters to be optimized include initial (e.g., before training) weights of individual nodes. Hyperparameters can be used to define how a model learns. For example, they can set the rate at which a model learns in, e.g., a gradient descent technique. (3) Initialization-once the hyperparameters are set, a model is initialized by defining the set of input feature types that will be used. The initial training of the neural network model with the set of input features is an initialization. At least one (e.g., each) time a model is reinitialized, it may be trained with a new set of input feature types. (4) Learning—with an initialized model, a training algorithm uses a training set of data having values of the input features and associated labels to train a model.

Figure 30:
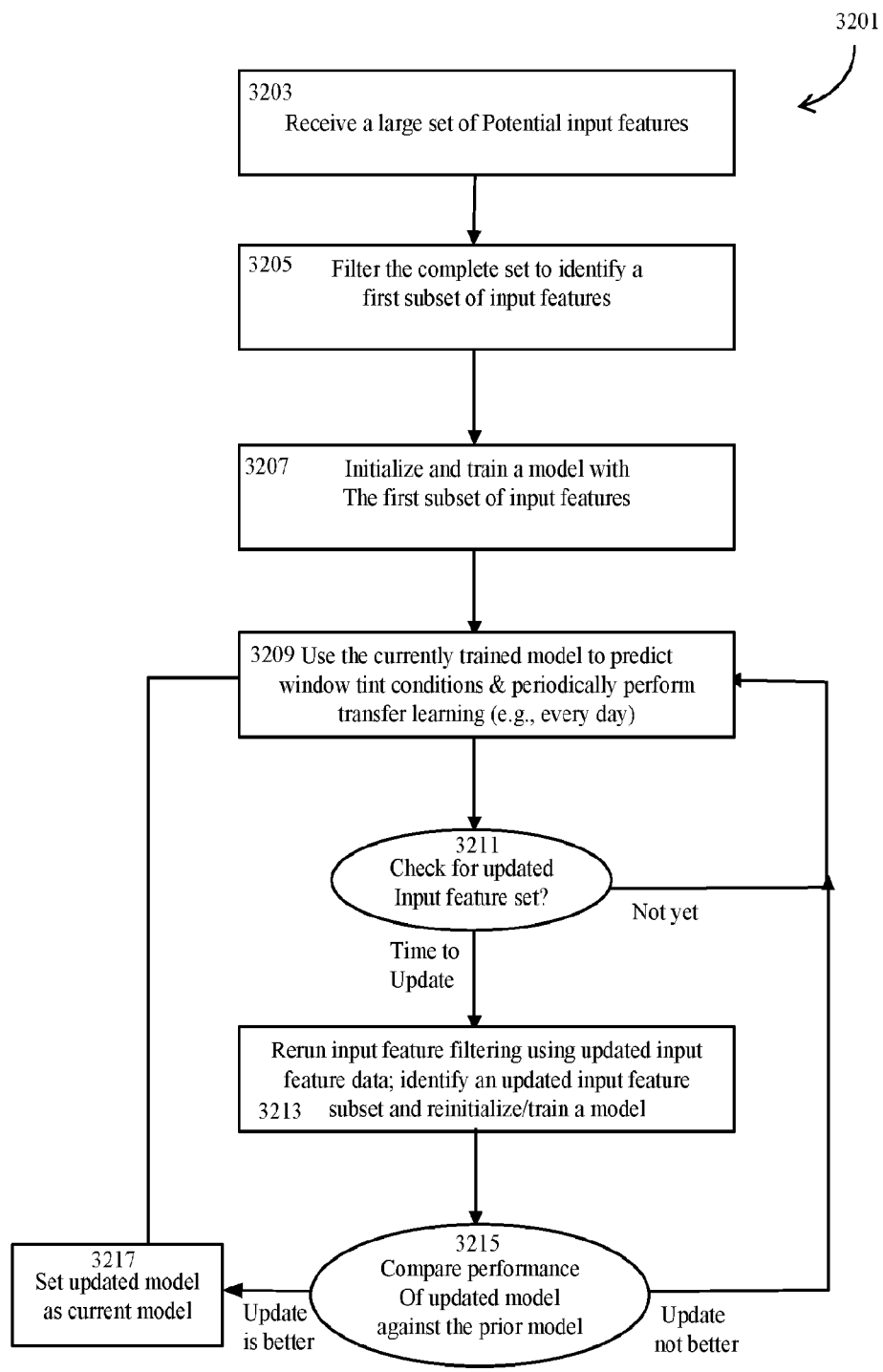
FIG. 30 presents a flow chart of a process for model updating that employs periodic input feature filtering.

FIG. 30 presents a flow chart 3201 showing one implementation of a process for model updating that employs periodic input feature filtering. The following operations may be performed: (a) Receive a large set of potential input features (e.g., about 100 more features derived from historical values of frequency specific sensor readings). See operation 3203. (b) Conduct an initial feature filtering (e.g., use SVM RFE) on the complete set to identify a first input feature subset. See operation 3205. (c) Initialize and train a model with the current subset of input features. See operation 3207. (d) Use the currently trained model to predict window tint conditions and periodically perform transfer learning (e.g., every day). See operation 3209. (e) Check whether to revise the input feature set (e.g., wait a threshold number of days since the model was last reinitialized, such as about three to ten days). See operation 3211. (f) When needed, rerun input feature filtering using the large set of potential input features but updated with data obtained since time when the model was last initialized. Identify an updated input feature subset and re-initialize and train a model. See operation 3213. (g) Compare the performance of the updated model with new feature set against the prior model, which may be the current model. See operation 3215. (h) If the new performs better, set it as the "current" model (see operation 3217) and loop back to operation 3209 (*d*) with the new model and updated feature subset: if not, continue to use the prior model as indicated at operation 3217.

In some embodiments, to ensure that premature model re-initialization does not undermine the performance gains made by other periodic optimization routines such as a transfer learning process (which may be performed regularly such as nightly using a re-training module), the predictive ability of models produced by RFE and re-initialization may be compared against the predictive ability of models optimized by transfer learning or other routine retraining technique. This can be illustrated by operations 3215 and 3217 in FIG. 30. If the routine model outperforms the model with RFE re-initialization, the prior input feature set can be retained. Optionally, the coefficient weights of the existing predictors are updated so they can be reused to initialize the next regression analysis. If the RFE re-initialization model outperforms the normal re-training model, the input feature set self-corrects, requiring no user intervention.

In some embodiments, embedding SVM-based recursive feature elimination into the (re-) training module allows the conditions prevailing at a given location and time of year to drive model parameterization and re-initialization. In this fashion, the neural representation of model inputs can be prompted to undergo continuous competition with itself. The result can be an application of artificial intelligence that learns from the most difficult scenarios, remembers what is still useful, forgets what is not, and self-corrects when finding a better solution to the problem at hand.

Figure 31:
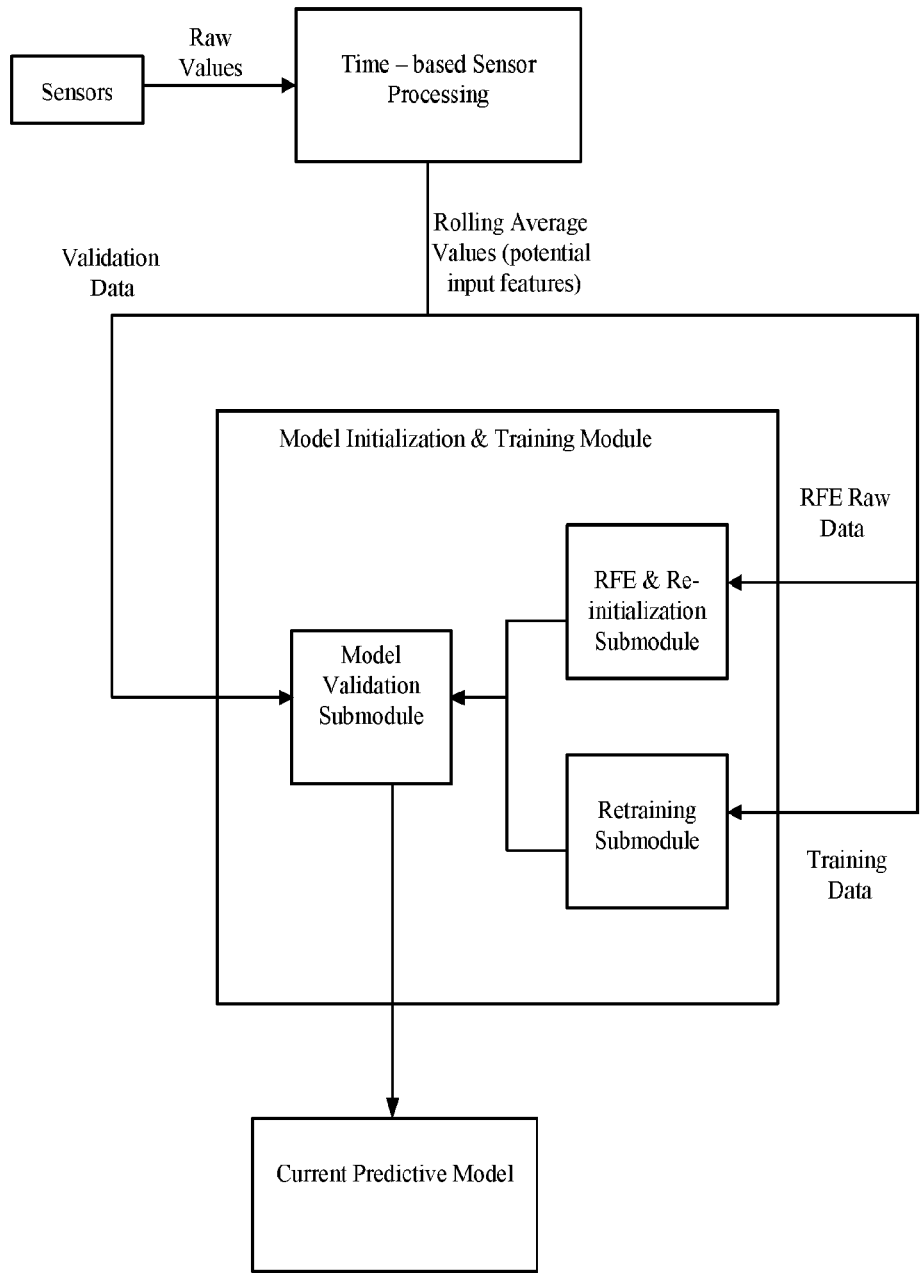
FIG. 31 represents an example of a model re-initializing and re-training architecture.

FIG. 31 represents an example of a re-training architecture.

Recursive Feature Elimination—Summary Points:
- Refining the input feature set over time and by location can filter out extraneous input
- Spreading meaningful signal over less useful features impedes model convergence
- A machine learning submodule is embedded in a deep learning pipeline
- Feature importance can be quantified using linear kernel support vector regression (SVR)
- SVR model fitting focuses on the most difficult data points, known as 'support vectors'
- Features contributing less to the minimization of the loss function are recursively eliminated
- User input defines the number of features to be retained from the original (e.g., 200+ features)
- Model initialization can apply RFE to identify an optimal baseline feature set
- The optimal feature set is not static, varying by location and changing throughout the year
- The most performant model parameterization is unknown, and hand-tuning is impractical
- RFE can be leveraged to automate self-correcting feature selection
- Transfer Learning and RFE model re-initialization may be periodically pitted against one another
- Model performance is validated on the most recent historical data
- If Transfer Learning outperforms RFE re-initialization, features are retained and weights updated
- If RFE re-initialization outperforms Transfer Learning, the feature set self-corrects
- The prevailing conditions thus drive parameterization and model re-initialization Certain implementations employ a virtual sky sensor application (sometimes referred to herein as a "virtual sky sensor" or a "VSS") that can host forecasted data or test data for consumption by control logic that makes decisions based at least in part on the data to control one or more systems (e.g., a window control system) at a site. Statistical post-processing can be applied by the VSS module. A virtual sky sensor can be used, for example, in prediction, A-B testing, and/or quality assurance (QA) data simulation. In a predictive use example, a virtual sky sensor application can host predictive model output (predictions) such as forecasted sensor data from a deep learning application (e.g., a deep neural network (DNN)) and the forecasted sensor data is passed to the control logic. In another example, the virtual sky sensor application can host a test suite of data for test cases (e.g., for purposes of quality assurance) for a variety of conditions. The test cases may be passed onto the control logic to determine the behavior of the control logic under diverse conditions. In another example, one forecasted data set is passed by a VSS and one actual (e.g., real, physical sensor measured) data set is passed from a physical sensor to the control system, e.g., using duplicate site configurations. The control system (e.g., master controller) can run side-by-side comparisons of performance, e.g., using the duplicated site configurations.

With a test bed enabled by the virtual sky sensor, execution and performance (e.g., tint acceleration, error metrics, CPU and memory usage on Platform) of different predictive models on various site configurations can be tracked and evaluated, e.g., in controlled experiments on a (e.g., single) control system. The same virtual sky sensor interface can provide a data simulation framework for conducting quality assurance and other testing of predictive models, e.g., under conditions which may be infrequent or difficult to replicate. Hosting prediction model output via a virtual sky sensor can allow for accelerating tint commands. e.g., without having to alter the existing code and/or data infrastructure. Different combinations of data from the examples of the VSS implementations can be hosted by the VSS in parallel. One or more virtual sky sensors can be used.

In some cases, the VSS hosts data that can be passed to control logic such as, e.g., window control logic. For example, a virtual sky sensor may host sensor data and/or weather condition predictions to pass to a Module C and/or a Module D of window control logic described herein. In examples where the VSS hosts forecasted sensor data from a deep learning application (e.g., a deep neural network (DNN)), the deep learning application may reside on the control system. In certain aspects, the control system may not include a deep learning application. For example, a VSS may host test data for testing Module C and/or a Module D of window control logic.

In some embodiments, the virtual sky sensor application is configured to interface and interact with control logic as would a physical sky sensor such as a sensor ensemble (e.g., ring sensor) with a plurality of sensors (e.g., infrared sensor(s) and/or photosensor(s)). The virtual sky sensor application may run on a local host IP address. In some cases, a data fetcher application (e.g., Viewfetcher) inserts the predictions (e.g., weather conditions and/or sensor data) hosted by the virtual sky sensor application into a database, e.g., an on-site database residing on the control system. In one aspect, a virtual sky sensor is a third-party API.

In certain embodiments, the VSS is a web application/server. In some embodiments, when the VSS receives requests for data from a data fetcher application (e.g., Viewfetcher), the predictions are retrieved from the on-site database, the VSS perform calculations on the data, and data is returned to the on-site database on a control system (e.g., a master controller) via the data fetcher application. The data fetcher application (e.g., Viewfetcher) may reside on the control system and/or in the cloud. In some cases, the virtual sky sensor application and/or the site monitoring system reside on a computing device at a site.

A Flask Python library (or library of a similar application) may be used to instantiate a virtual sky sensor as a (e.g., web) application running on a local host at a user-specified port number. In this case, a data fetcher platform can be pointed to the user-specified port number, e.g. using a user interface such as a site management console. Upon execution, the Flask application responds to the requests for XML-formatted sensor data from the data fetcher, which it process via queries to a data source. In one example, the data source is a table of recent prediction values stored in the database. In another example, the data source is a repository of data frames containing simulated values corresponding to the test case being executed. The existing prediction modules (e.g., Module C and/or Module D) may consume the sensor values inserted in the on-site database just as it would actual sensor data produced by a physical sky sensor such as a ring sensor.

In some implementations, multiple virtual sky sensors may be used to host the sensor values of however many prediction models and/or test conditions are used in performance comparison of A/B testing, in test cases of a quality assurance (QA) test suite being completed, and/or in a prediction use case. Under this multi-VSS framework, network controllers and zones of windows can be assigned to receive control instructions driven by sensor values passed by the VSS assigned to those network controllers and zones. A benefit of a multi-VSS framework to a prediction use implementation may be that orientational sensor radiation modeling can be supported. In this instance, a single master controller can execute multiple prediction models whose sensor values are hosted using distinct virtual sky sensors respectively.

Certain aspects pertain to predictive use examples that employ a virtual sky sensor (e.g., a virtual sky sensor that hosts predictions determined by a deep learning application). In some embodiments, the deep learning application (e.g., a DNN) takes in live (e.g., real time) sensor data detected by a physical sky sensor (e.g., a ring sensor), performs calculations to determine predictions, and the predictions are passed on to a virtual sky sensor. The virtual sky sensor application can host the predictions from the deep learning application, e.g., to pass on the predictions to a database. The control logic can then retrieve the predictions from the database for consumption. For example, predictions from a DNN on a (e.g., master) controller can be saved to a database (e.g., on the controller or elsewhere coupled to the network), and the control logic of the controller can make tint decisions based at least in part on predictions retrieved from the database. The data from the VSS may be communicated (e.g., passed) to the database as would data detected by a physical sky sensor.

In certain implementations, a virtual sky sensor communicates (e.g., passes) forecasted or predicted data (forecasts or predictions) calculated by a deep learning application (e.g., a DNN) to control logic for consumption. For example, a DNN may be employed to output one or more forecasted sensor values (e.g. IR sensor values and/or photosensor values) and/or one or more conditions (e.g., weather conditions). The virtual sky sensor may direct a data fetcher application (in response to a request from the data fetcher) to save the forecasted data from the DNN to a database on, or accessible by, a control system (e.g., as disclosed herein). The control logic can retrieve the values saved to the database to make tint decisions and/or control tint states in one or more zones of optically switchable windows at the site. In some cases, the DNN employed is a sparse DNN with a reduced number of model parameters from the total number of model parameters that would be used in the DNN where a full ensemble of models and modules is implemented. Example techniques that may be executed to eliminate model features to a subset of the total number of potential features include a linear-kernel Support Vector Machine (SVM), stochastic optimization using information theoretic metrics (e.g., a Fisher Information metric or other similar metrics). Principal Component Analysis (PCA), or any combination thereof. In one example, a linear-kernel Support Vector Machine (SVM) (or other similar technique) is executed to eliminate model features to a subset of the total number of potential features that would be used. In another example, stochastic optimization using information theoretic metrics (e.g., a Fisher Information metric) is executed to eliminate model features to a subset of the total number of potential features that would be used. In yet another example, PCA is executed to eliminate model features to a subset of the total number of potential features that would be used. In certain implementations, two or more techniques may be used in combination, e.g., to eliminate model features to a subset of the total number of potential features that would be used. In some cases, barycenter averaging may be employed to determine synthetic real-time sensor values based at least in part on historical sensor data and to determine mean sensor profiles for a day based at least in part on the synthetic real-time sensor values. The DNN may use input features based at least in part on the synthetic values from the barycenter averaging to output the forecasted sensor values. For example, the DNN may output a forecasted infrared sensor (IR) value and forecasted photosensor (PS) value at about 7 minutes in the future, 10 minutes in the future, 15 minutes in the future, etc.

Certain aspects pertain to quality assurance (QA) or other type of testing that employs one or more virtual sky sensors to host simulated data for testing the behavior of control logic under diverse conditions. For example, a VSS may host simulated data for testing the behavior of intelligence control logic under diverse weather conditions. The test data may be provided by a user interface of a site monitoring console. The virtual sky sensor application can host the simulated data and pass this test data to the database on, or accessible by, a control system, e.g., for usage by the control logic. In these testing implementations, a virtual sky sensor can be employed to provide a framework with which to execute a test suite of test cases on predictive models that require certain changes in sensor values over a specified time frame, that can facilitate the simulation of conditions that may have otherwise required several days of wait time to occur. For example, instead of having to wait until diverse weather conditions occur naturally, the simulated data can be fed into the virtual sky sensor to generate the test data for the various weather conditions of the test suite.

In certain implementations, the test suite can include simulated test data, e.g., photosensor and/or IR sensor levels, for varied types of conditions and other types of events that would be related to different levels of sensor readings. Different structures of the control logic may behave differently for these different levels of sensor readings in the test data, e.g., depending on the time of day and date. The test data suite may be developed with different sensor levels that generate replicable control situations for testing purposes. In one implementation, the test data hosted by the VSS and passed to the database can include: time and date stamps, sensor values (e.g., photosensor and/or IR sensor levels), and/or other related data for the test cases. An example test case would verify proper Tint Lockout behavior during a change in weather conditions (and sensor values) that occurs over a time frame in which the defined control logic for issuing tint commands changes (e.g., >200 Watts/m$^2$=T3 in daytime, but T4 in the morning/evening when the sun angle is low and glare-risk is high). The test condition can be replicated in advance with, for example, user-provided sensor values hosted by the VSS.

A/B testing refers to a randomized experiment with at least two variants, A and B. In such a test, site configurations (e.g., network controller (NC) and zone configurations) can be duplicated on a single master controller onto which the control logic receives both real and virtual sky sensor values to evaluate and/or compare the performance of the predictive model(s) in an experimental setting controlled by system parity.

In some embodiments, performing A/B testing is conducted by employing one or more virtual sky sensors to host data sets based at least in part on forecasted and/or calculated sensor values from predictive model(s) and data sets from actual (e.g., real) physical sensor readings taken by a physical sensor, e.g., to evaluate the performance of the predictive model(s). In A/B testing implementations, a site configuration can be duplicated on a master controller. For example, a duplicate mapping of network controller identifications (IDs) to zone IDs, zone IDs to end/leaf controller IDs, and end/leaf controller IDs to window IDs.

In some embodiments, the A/B testing evaluation is performed by employing the virtual sky sensor to pass forecasted and/or calculated sensor values (virtual sky sensor values) from the predictive model(s) to the control logic, and actual sensor values from the physical sensor (e.g., sensor ensemble such as a ring sensor and/or sky sensor) associated with another duplicate site configuration that may be passed to the control logic. The control logic can calculate control levels, such as tint states, for both site configurations, and the performance of these control levels can be tracked. This can allow for side-by-side comparison of (a) control levels calculated using forecasted and/or calculated sensor values from predictive model(s) to (b) control levels calculated using actual sensor values. In some implementations, instead of an entire site configuration being duplicated, one or more zone configurations are duplicated on the master controller and a similar A/B testing evaluation performed. In some implementations, A/B testing evaluation are performed by employing the virtual sky sensor to pass forecasted and/or calculated sensor values from a first set of one or more predictive model(s) to the control logic, and employing the virtual sky sensor to pass forecasted and/or calculated sensor values from a second set of one or more different predictive model(s) to the control logic, to evaluate and compare the performance between the first set and the second set of predictive model(s).

In certain A/B testing implementations, performance metric are used to compare the performance of the control levels determined using the forecasted sensor values from the predictive model(s) to the control levels determined using actual sensor values detected by a physical sensor such as a ring sensor. Some examples of performance metrics include: the difference in the amount of glare protection, the difference in the amount of daylight, the difference in the amount of average acceleration of the tint transitions, and/or any similar performance metrics. The performance metrics can be further broken down into categories such as with respect to average week day (e.g., 8:00a.m.-6:00p.m.), average transition time for a lite based at least in part on a particular bus bar configuration, and/or the like.

In one embodiment, a site configuration is duplicated on the (e.g., master) controller (e.g., a first site configuration and a second site configuration). The controller can be any controller of the control system, e.g., as disclosed herein. Test data for the A/B testing can be returned to the database. The calculated sensor values (e.g., predictions from a DNN) may be passed from the VSS and returned to the database for the first site configuration. The real physical sensor values from the local and/or remote sources may be returned to the database for the second site configuration.

In some embodiments, the virtual sky sensor application interfaces with a site monitoring console or other user interface, to receive input. A "site monitoring console" can refer to a user interface (UI) that can be used by operator(s) as a means of setting parameters for site level customizations for one or more applications that control (e.g., monitor) functions of systems (e.g., controlling the IGUs) at one or more sites. In certain implementations, a site monitoring console, or other user interface, can interface with one or more VSSs. For example, the site monitoring console (or other UI) may be used to set parameters used by the VSS to determine which sensor values (or other data) to have returned to the (e.g., on-site) database on the (e.g., master) controller. For example, if it is requested in a site to change a parameter to determine and/or implement tint states for optically-switchable windows that would more conservatively protect against glare, a parameter can be set and used by the VSS to calculate sensor values and return the calculated sensor values to the on-site database that would be retrieved and used by the predictive models to determine more glare conservative tint states. As another example, if it is requested in a site that more daylight entering a zone of optically-switchable windows so that a darkest tint state (e.g., tint level 4) is not used, a parameter can be set for that zone and used by the VSS to calculate sensor values that are below an upper threshold associated with the darkest tint state, e.g., so that the predictive models will determine tint states for that zone that would be less than the darkest tint state.

The user interface of the site monitoring console (or other component) may support user (e.g., operator) entry of fields for QA testing and/or A/B testing. For example, the site monitoring console may include a user interface that that supports user entry of field (e.g., time stamps, sensor values) pertaining to the test case of QA testing. The simulated data to be retrieved by the virtual sky sensor from a QA database can be (e.g., automatically) generated.

The site monitoring console may interface with systems at one or more sites to monitor functions and/or output of components such as, e.g., sensors, controllers, or other devices. The site monitoring console can allow a user (e.g., an operator) to (i) input information and/or (ii) view details, of the status of one or more components at the site(s). The user interface may display a log and/or performance report (sometimes referred to as a "dashboard") on the various components.

In certain implementations, the site monitoring console interfaces with a window control system at a site. The control system may retrieve data from a database that can be used to analyze information from the site(s) to determine when to adjust control of a device. In some implementations, the control system includes control logic (e.g., with a deep learning application (e.g., a DNN)) that can (I) learn from data, such as, e.g., local and/or remote sensor data, and/or (II) adapt its logic to meet user and/or customer goals. In some embodiments, the control logic may learn how to better conserve energy, sometimes through interaction with a site's lighting, HVAC systems, and/or window systems, and optionally modify the controller settings accordingly. By doing this (e.g., over multiple sites and/or at the site multiple times), new energy control and/or conservation methods may be learned at one site and deployed on other sites. In certain implementations, learned weights and/or values associated with one or more layers (e.g., hidden layers) of a DNN may be extracted. Such weights and/or values may correspond to parameters of interest. The parameter of interest may include: user goals, customer goals, parameters that correlate with energy conservation (e.g., parameters that correlate with energy conservation with respect to a site's lighting, HVAC systems, and/or window systems), or any combination thereof. In certain implementations, a control system may extract learned weights and/or values associated with one or more layers (e.g., hidden layers) of a DNN. e.g., to implement one or more learned rules that relate one or more controller settings to one or more user and/or customer goals.

A "site" refers to a location comprising a facility comprising a building and/or at least one structure. A site may comprise interacting systems including one or more controllers that control device(s) at the site. The site may have local sensors that provide local sensor data. For example, a building may have a ring sensor located at or near the building with photosensors and/or IR sensors that provide local sensor data. Remote sensor data may be provided from other sources such as, e.g., weather feed data. The local and/or remote sensor data can be used in making decisions to control devices (switchable optical devices such as electrochromic devices) at the site. At times, virtual synthesized data may be used at least in part for making such decisions. In some cases, one system may, control the functioning of elements of a different system. For example, a window control system may send instructions to a lighting system and/or an HVAC system, e.g., to adjust the lighting level and/or air conditioning level in an enclosure of the site (e.g., a room) or a zone where the control system controls tint levels of windows.

Systems at the site may employ APIs to allow external systems to access data and/or functions that are otherwise opaque to the external systems. APIs can provide syntax and/or a portal to permit the access. For example, an API for a control system may allow access to window sensor data (e.g., temperature) through a URL, username, and/or handshake. HomeKit compliant definitions and Thread compliant definitions are commercially-available examples that provide third-party APIs for controlling devices of other technology companies including NEST and Samsung (Samsung Group of Seoul, South Korea). Thread and HomeKit define standard connection protocols for messaging.

Figure 32:
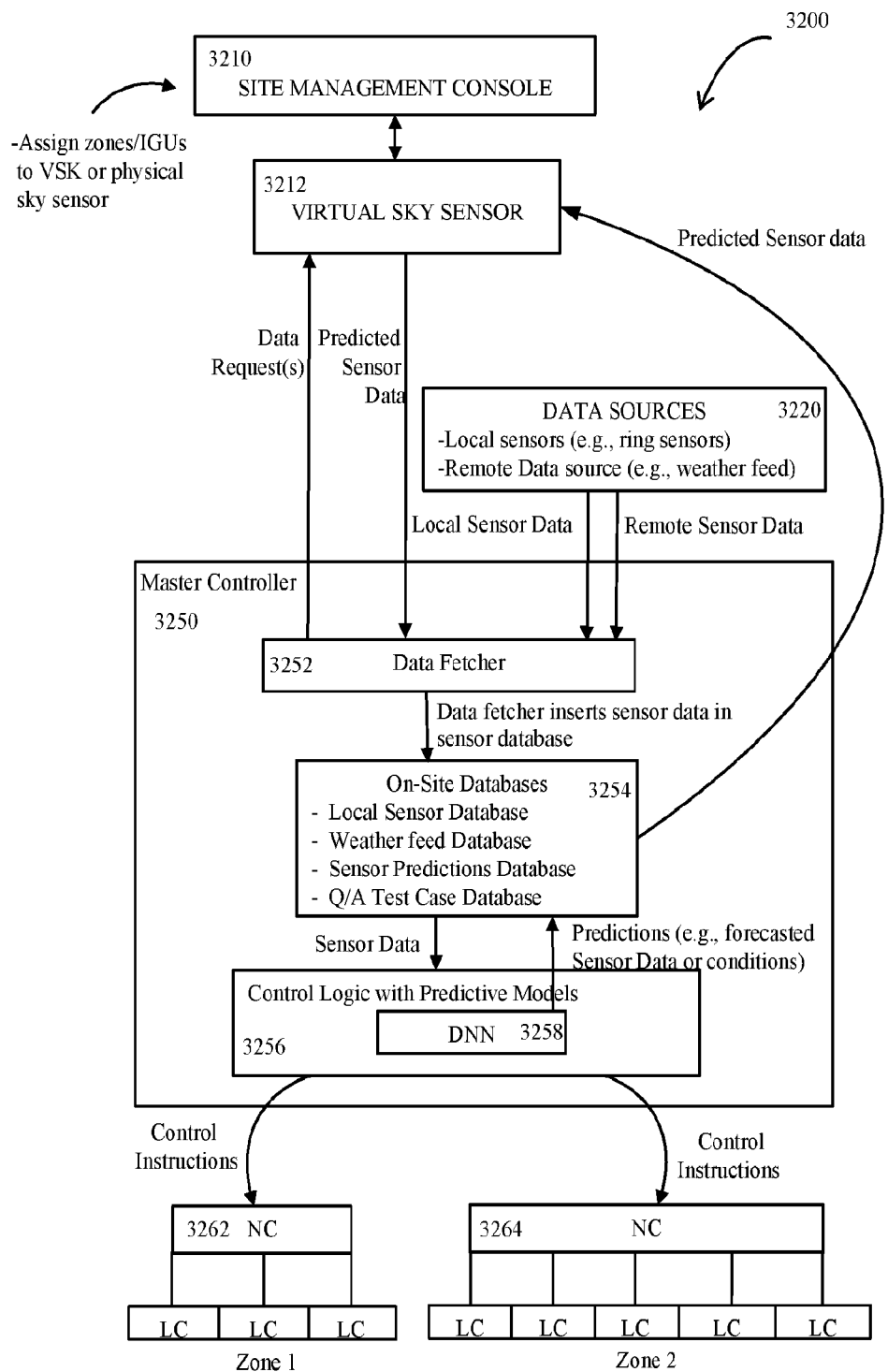
FIG. 32 is an illustrative example of a predictive use scenario implementation of a virtual sky sensor, according to an aspect.

FIG. 32 is a schematic diagram of a system 3200 including one or more interacting systems at a site that are interfacing with one another, according to an aspect. The system 3200 includes a site management console 3210 configured to monitor one or more sites and a virtual sky sensor application 3211 in communication with the site management console 3210. The site management console 3210 is configured to receive user input and interpret the information. In this example, the site management console 3210 is configured to receive user input including a mapping of IDs of zones and/or IDS of devices to the virtual sky sensor application 3214 or to a physical sensor such as a ring sensor and/or sky sensor ensembles. In some cases, the site management console 3210 is an API capable of interfacing with systems external to the site.

The system 3200 includes a master controller 3250 having a data fetcher application 3252, on-site databases 3254 in communication with the data fetcher application 3252 to insert data into the on-site databases 3254, control logic 3256 with predictive models in communication with the on-site databases 3254 to receive sensor data and to send predictions saved to the on-site databases 3254. The on-site databases 3254 may include one or more of a local sensor database, a weather feed database, a predictions database, and a QA test case database. The data fetcher application 3252 is in communication with the virtual sky sensor 3212 to sends request for data to the virtual sky sensor 3212 and to receive data. The data fetcher application 3252 is in communication with the data sources 3220 to receive local sensor data from local sensor(s) such as a ring sensor or to receive remote sensor data from remote data source such as weather feed data through a third party API. The control logic 3256 include a deep neural network (DNN) 3258 that generates predictions such as forecasted sensor data and/or forecasted weather conditions. The control logic 3256 is in communication with the on-site databases 3254 to receive sensor data and to insert predictions determined by the DNN 3258 into the on-site databases 3254.

The system 3200 includes a first network controller 3262 in communication with a plurality of three leaf/end controllers controlling a first zone ("Zone 1") of devices (e.g., tintable windows) and a second network controller 3264 in communication with a plurality of five leaf/end controllers controlling a second zone ("Zone 2") of devices. In other implementations, fewer or more network controllers, zones, and leaf/end controllers may be used.

FIG. 32 is an illustrative example of a predictive use scenario, according to an aspect. In this implementation, the DNN 3258 takes in live sensor data communicated from the physical sky sensor of the data sources 3220, performs predictions, and passes the predictions to the VSS 3212. The data fetcher 3252 requests the data from the virtual sky sensor and the VSS 3212 and the data fetcher 3252 inserts the predictions from the DNN 3258 in the on-site database 3254 for consumption by the control logic to determine control instructions. The control instructions are communicated to the first network controller 3262 to control the Zone 1 of devices and to the second network controller 3264 to control the Zone 2 of devices.

In certain implementations, data entered by the operator at a user interface (e.g., a site management console) is used to assign the zone IDs or device IDs (e.g., IGU IDs) and/or network controller IDs to a particular VSS or particular physical sky sensor. In such cases, these mappings can be used to determine whether to run the predictive models for a zone and/or device using test and/or simulated data from the particular VSS (virtual sky sensor values), using actual data from a physical (e.g., sky) sensor(s), or any combination of virtual and real sensor data.

Figure 33:
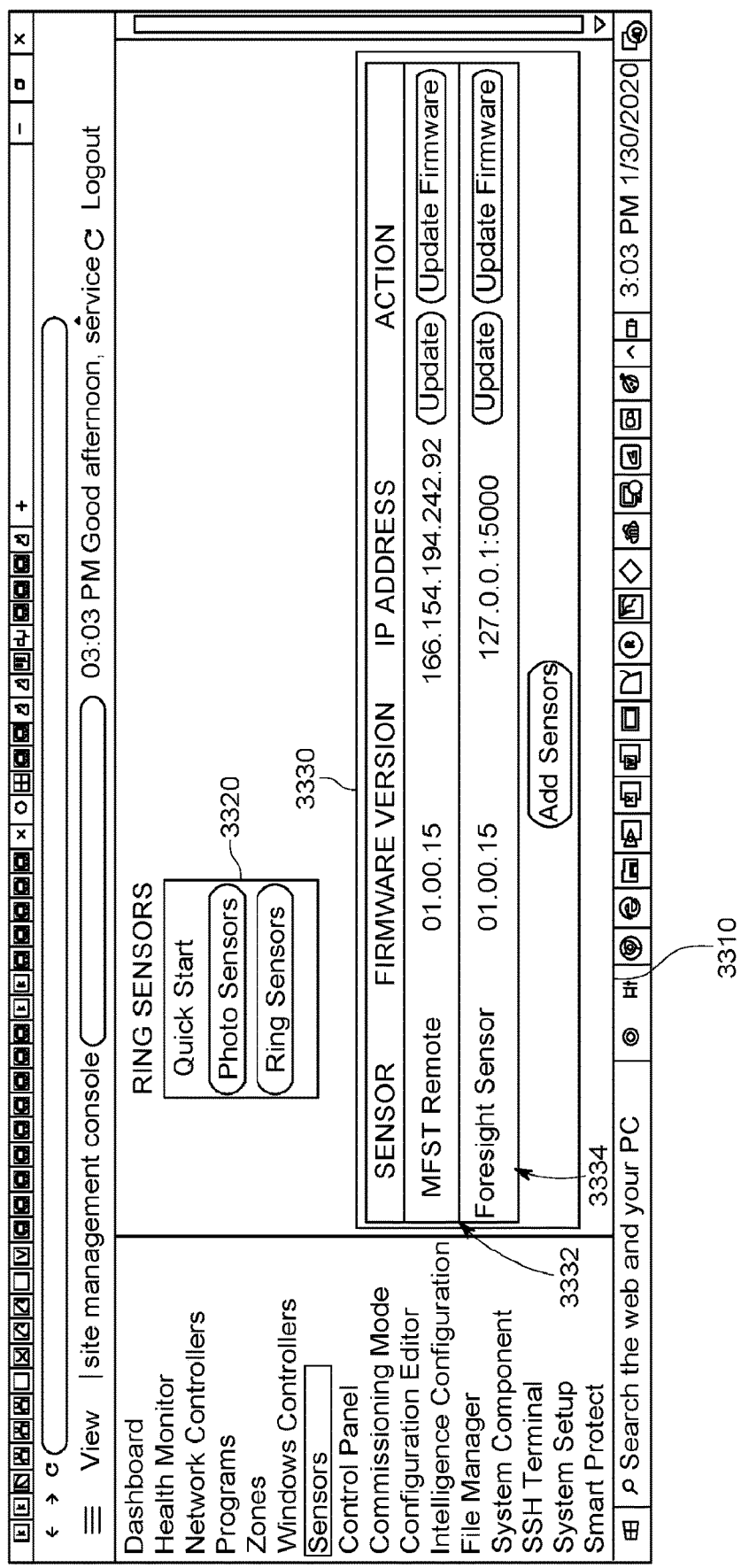
FIG. 33 is an example of a site management console 3310, according to an aspect.

FIG. 33 is an example of a site management console 3310, according to an aspect. The site management console 3310 is configured to receive user input and interpret the information. For example, the site management console 3310 may be configured to receive user input at the virtual sky sensor 3314. The site management console 3310 includes a first portion 3320 with a lower button labeled "Ring Sensors" that when selected can map sky (ring) sensor to zone(s) of tintable window(s) or to particular tintable window(s). The first portion 3320 includes an upper button labeled "Photo Sensors" that when selected can map photosensors. In this illustration, the lower button labeled "Ring Sensors" has been selected. The site management console 3310 includes a second portion 3330 for selecting the ring sensor to assign to the zone/window including: 1) "MFST Remote" sensor 3332, which is a physical sky sensor; or 2) "Foresight Sensor" sensor 3334, which is a virtual sky sensor.

In one implementation, sensor data from local sensors or weather feed is used to determine the control states for a first set of zone(s) of one or more devices and virtual sky sensor data is used to determine the control states for a second set of zone(s) of one or more devices. In this case, the mapping of the first set of zone(s) is to the physical sky sensor and the mapping of the second set of zone(s) is to the virtual sky sensor. If sensor data is not available, weather feed data will be used to determine control states for the first set of zone(s). A site management console may be used to map the sky sensors to the zones.

Figure 34:
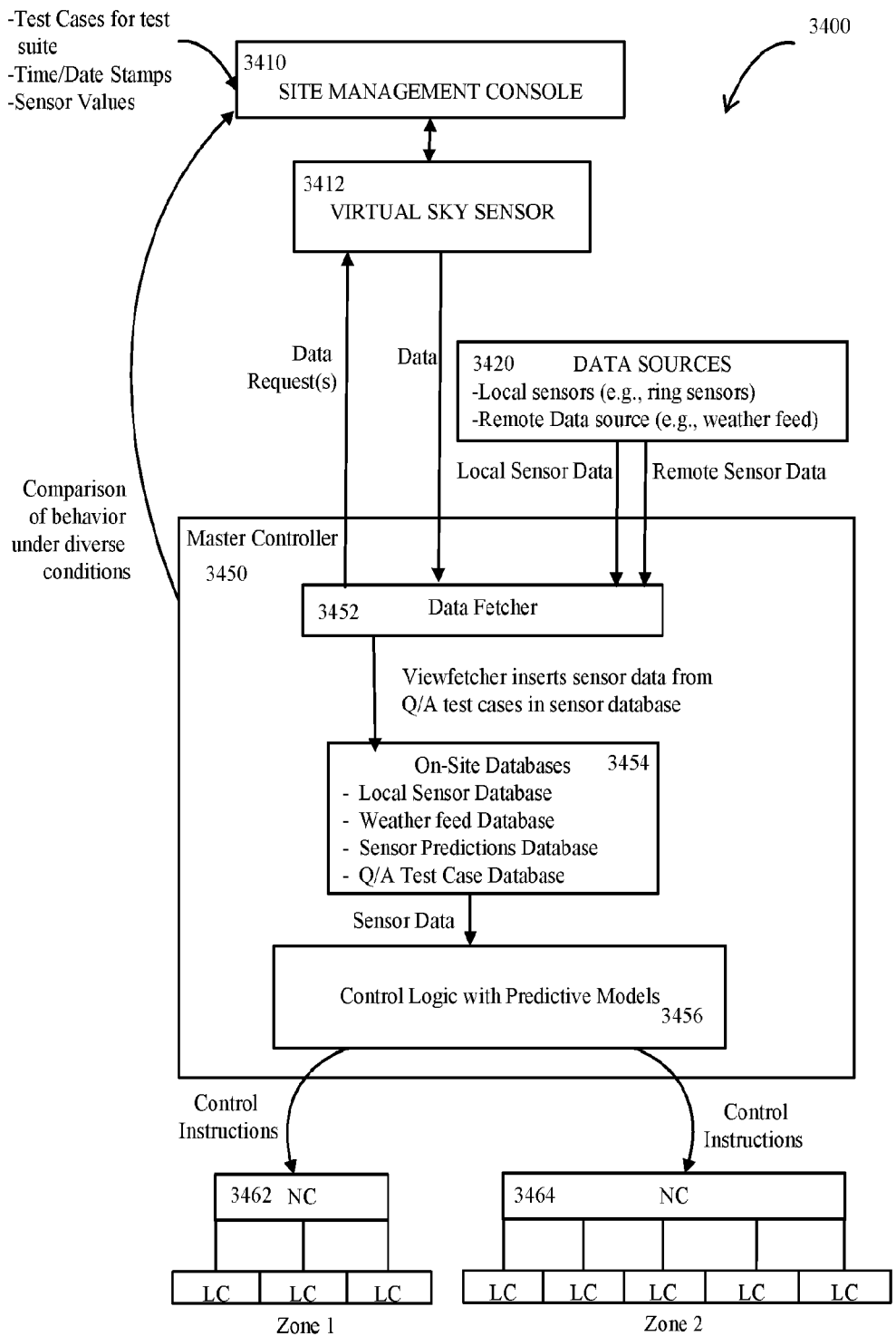
FIG. 34 illustrates a Quality Assurance (Q/A) or testing scenario implementation of a virtual sky sensor, according to an aspect.

FIG. 34 illustrates a Quality Assurance (QA) or testing scenario implementation of a virtual sky sensor, according to an aspect. FIG. 34 is a schematic diagram of a system 3400 including one or more interacting systems at a site that are interfacing with one another, according to an aspect. The system 3300 includes a site management console 3410 configured to monitor one or more sites and a virtual sky sensor application 3412 in communication with the site management console 3410. The site management console 3410 is configured to receive user input and interpret the information. In this example, the site management console 3410 is configured to receive user input including test cases for a test suite including time/date stamps and sensor values. In some cases, the site management console 3410 is an API capable of interfacing with systems external to the site.

The system 3400 includes a master controller 3450 having a data fetcher application 3452, on-site databases 3454 in communication with the data fetcher application 3452 to insert data into the on-site databases 3454, control logic 3456 with predictive models in communication with the on-site databases 3454 to receive sensor data and to send predictions saved to the on-site databases 3454. The on-site databases 3454 may include one or more of a local sensor database, a weather feed database, a predictions database, and a QA test case database. The data fetcher application 3452 is in communication with the virtual sky sensor 3412 to sends request for data to the virtual sky sensor 3412 and to receive data. The data fetcher application 3452 may be in communication with the data sources 3420 to receive local sensor data from local sensor(s) such as a ring sensor or to receive remote sensor data from remote data source such as weather feed data through a third party API. In another implementation, the control logic 3456 further includes a deep neural network (DNN).

Although a DNN is used in examples delineated herein, it would be understood that other deep learning applications can be used in various implementations.

The system 3400 includes a first network controller 3462 in communication with a plurality of three leaf/end controllers controlling a first zone ("Zone 1") of devices (e.g., tintable windows) and a second network controller 3464 in communication with a plurality of five leaf/end controllers controlling a second zone ("Zone 2") of devices. In other implementations, fewer or more network controllers, zones, and leaf/end controllers may be used.

In this implementation, the time and/or date stamps and sensor values from the test cases with diverse conditions in the test suite are provided to the site management console 3410. This data is passed to the VSS 3412. The data fetcher 3452 requests the data from the VSS 3412 and the data fetcher 3452 inserts the data into the on-site database 3454 for consumption by the control logic 3456 to determine control instructions. The control logic 3456 makes determinations and compares the behavior of the predictive models under the diverse conditions in the test suite. The comparison may be passed back to the site management console 3410 for viewing by the user. Optionally (denoted by the dashed line), the control instructions based at least in part on the various test cases may be communicated to the first network controller 3462 to control the Zone 1 of devices and to the second network controller 3464 to control the Zone 2 of devices.

Figure 35:
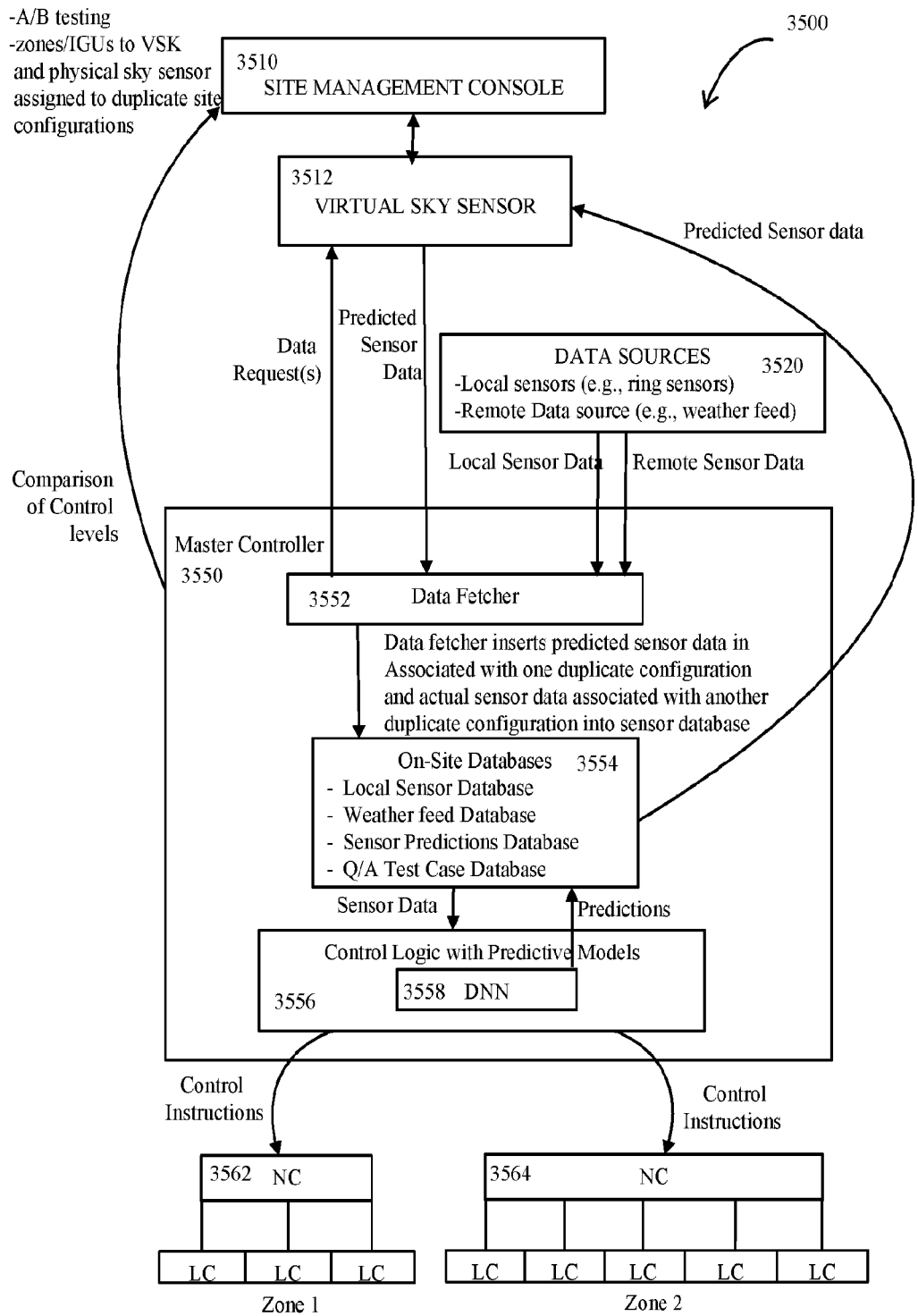
FIG. 35 illustrates a A/B testing implementation of a virtual sky sensor, according to an aspect.

FIG. 35 illustrates a A/B testing implementation of a virtual sky sensor, according to an aspect. FIG. 35 includes a schematic diagram of a system 3500 including one or more interacting systems at a site that are interfacing with one another, according to an aspect. The system 3500 includes a site management console 3510 configured to monitor one or more sites and a virtual sky sensor application 3512 in communication with the site management console 3510. The site management console 3510 is configured to receive user input and interpret the information. In this example, the site management console 3510 is configured to receive user input including a mapping of IDs of zones and/or IDS of devices to a virtual sky sensor application 3512 and mapping of IDs of zones and/or IDs of devices to a physical sky sensor (or sensor ensemble) such as a ring sensor in duplicated site configurations. In some cases, the site management console 3510 is an API capable of interfacing with systems external to the site.

In another implementation, the system 3500 employs a virtual sky sensor 3512 or multiple virtual sky sensors to host data sets with forecasted/calculated sensor values from multiple predictive modules on duplicated site configurations to be able to evaluate the performance of the predictive modules.

Returning to FIG. 35, the system 3500 includes a master controller 3550 having a data fetcher application 3552, on-site databases 3554 in communication with the data fetcher application 3552 to insert data into the on-site databases 3554, control logic 3556 with predictive models in communication with the on-site databases 3554 to receive sensor data and to send predictions saved to the on-site databases 3554. The on-site databases 3554 may include one or more of a local sensor database, a weather feed database, a predictions database, and a Q/A test case database. The data fetcher application 3552 is in communication with the virtual sky sensor 3512 to send requests for data to the virtual sky sensor 3512 and to receive data. The data fetcher application 3552 is in communication with the data sources 3520 to receive local sensor data from local sensor(s) such as a ring sensor or to receive remote sensor data from remote data source such as weather feed data through a third party API. The control logic 3556 include a deep neural network (DNN) 3558 that generates predictions such as forecasted sensor data and/or forecasted weather conditions. The control logic 3556 is in communication with the on-site databases 3554 to receive sensor data and to insert predictions determined by the DNN 3558 into the on-site databases 3554.

The system 3500 includes a first network controller 3562 in communication with a plurality of three leaf/end controllers controlling a first zone ("Zone 1") of devices (e.g., tintable windows) and a second network controller 3564 in communication with a plurality of five leaf/end controllers controlling a second zone ("Zone 2") of devices. In other implementations, fewer or more network controllers, zones, and leaf/end controllers may be used.

In this implementation, the DNN 3558 takes in live sensor data communicated from the physical sky sensor of the data sources 3520, performs predictions, and passes the predictions to the VSS 3512. The data fetcher 3552 requests the data from the VSS 3512 and the data fetcher 3552 inserts the predictions from the DNN 3558 for one duplicate site configuration into the on-site database 3554. The data fetcher 3552 receives sensor data from the data sources 3220 and inserts the data for another duplicate site configuration into the on-site database 3554. The control logic uses the data for the duplicate site configurations separately to determine different sets of control levels. The control logic 3456 compares the control levels associated with data from the predictive models with control levels associated with the actual sensor data from the data sources 3220. The data comparison is passed back to the site management console 3410 for viewing by the user. Optionally (denoted by the dashed line), control instructions based at least in part on one of these sets of control levels may be communicated to the first network controller 3562 to control the Zone 1 of devices and to the second network controller 3564 to control the Zone 2 of devices.

Figure 36:
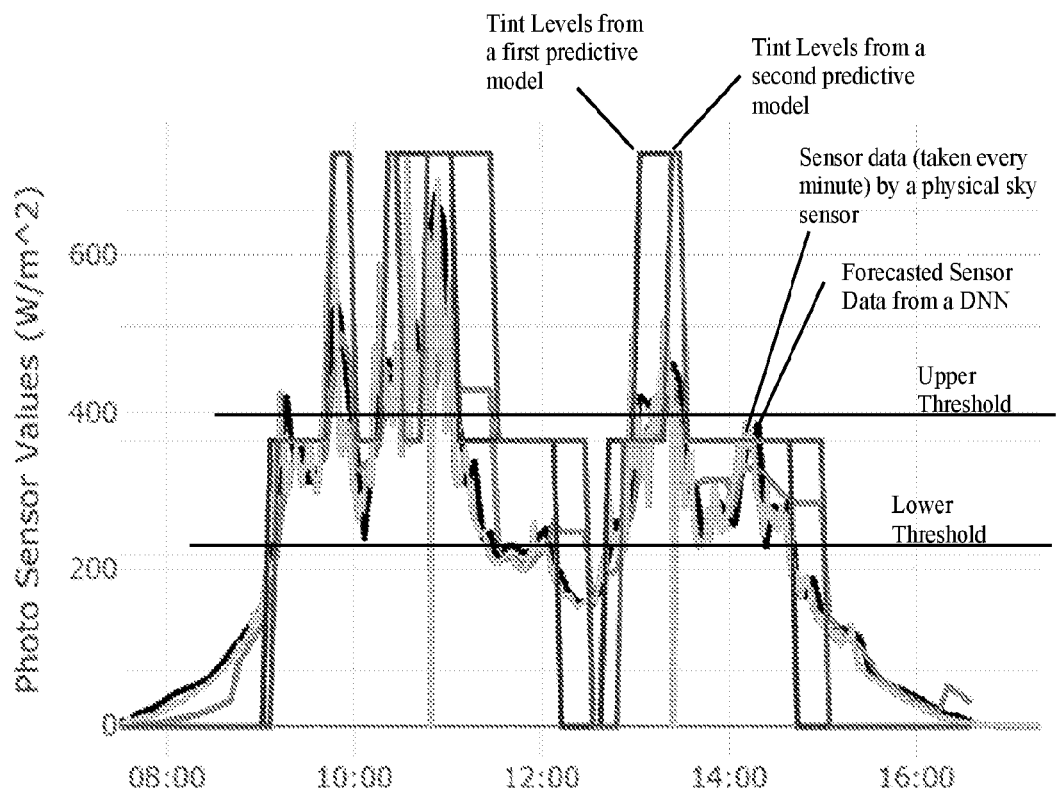
FIG. 36 illustrates a plot of sensor readings detected by a physical ring sensor, forecasted/predicted sensor values determined by a DNN, and tint levels determined by control logic using the forecasted/predicted sensor values determined by a DNN, according to an aspect.

FIG. 36 illustrates a plot of sensor readings detected by a physical ring sensor, forecasted and/or predicted sensor values determined by a DNN, and tint levels determined by control logic using the forecasted and/or predicted sensor values determined by a DNN, according to an aspect. This is an example of results of an A/B evaluation.

Certain aspects pertain to building specialized predictive models using training data representing distinct weather conditions and/or selecting particular specialized predictive models for deployment in real time (live) as the representative weather condition occurs. These specialized weather models may be built in a "supervised" and/or in an "unsupervised" fashion. In implementations where the specialized weather models are built in an "unsupervised" fashion, a machine learning process may be employed to cluster similar day-length radiation profiles into quantitatively distinct weather types. In implementations where the specialized weather models are built in a "supervised" fashion, the specialized predictive models may be trained on data for which a qualitative classification already exists, e.g., by making use of data available through third party APIs Some examples of existing classifications and/or conditions comprise a sunny condition or "Sunny," a partly cloudy condition or "Partly Cloudy," a foggy condition or "Foggy," a rain condition or "Rainy," a hail condition or "Hail," a thunderstorm condition or "T-Storms," or a smog condition or "Smog." These specialized models may be optimized for performance on these weather conditions. The specialized predictive models may be deployed for live prediction on days for which the corresponding conditions have been met (e.g., as sensed by the sensors) or have been forecasted, e.g., in weather feed from a third-party API. These specialized predictive models can benefit from specialized curriculum learning of the pattern characteristic of at least one (e.g., each) condition.

In certain implementations, specialized weather models are built in an "unsupervised" fashion. A machine learning process may be employed to cluster similar day-length radiation profiles into quantitatively distinct weather types. An example of an unsupervised classifier module that can be used is Module E shown in FIG. 25. In this case, an unsupervised clustering approach is used to identify different weather profiles from the data, and train the models for the different kinds of weather and deploy them. For example, building specialized weather models in an "unsupervised" fashion may be used, e.g., when there is no access to weather feed data from a third-party API. Some unsupervised approaches to developing a curriculum of weather types from which to learn may be more computationally expensive and data intensive than some supervised approaches since these unsupervised approaches: (1) a longer history representative of the range of conditions for which distinct classes are being identified, and (2) the work of a subject matter expert to determine whether the quantitative distinctions made are qualitatively valid. Examples of unsupervised clustering algorithms that may be used in various combinations include: k-means clustering, Hidden Markov Models, PCA, t-distributed Stochastic Neighbor Embedding (t-SNE), and the like.

In certain implementations, specialized weather models are built in a "supervised" fashion. For example, building specialized weather models in a "supervised" fashion may be used where weather feed data is accessible from one or more third-party APIs and the data is retained on a database. In this case, the specialized predictive models are trained on data for which a qualitative classification already exists by making use of data available through the third party API(s). The models may be trained on data associated with weather condition and then the specialized model trained on a particular weather condition can be deployed when the weather condition is forecast. In certain instances, leveraging third-party APIs to supervise training of models optimized for performance on pre-labeled training data may obviate (1) the 'cold-start' problem (e.g., insufficient data available), and/or (2) the need for human intervention during model curation. Examples of supervised models that may be used in various combinations include: multilayer perceptrons, decision trees, regressions (e.g., logistic regression, linear regression, and the like). SVMs, naïve Bayes, and the like. In certain implementations, unsupervised clustering may be combined with a specialized weather model built in a "supervised" fashion. In one example, a clustering algorithm may be used to reduce a dimensionality of a feature space of a training set used to train a supervised model in order to reduce variance of the supervised model.

According to certain aspects, the control logic may generate training data in a supervised fashion using the historical sensor data retained in a database and the weather forecasts received from a third-party API over time. For example, weather forecasts may be received over incremental time periods (e.g., over a day, over an hour, over a minute, etc.). The system can divide up the historical sensor data stored to the database according to these time periods, and label (index) the sensor data with the corresponding weather condition at that time period provided in the weather feed from the third-party API. The sensor data labeled with the weather conditions can be used as the training data for the specialized predictive models.

As an example, control logic may store historical sensor data (one reading per minute) from a physical sky sensor (e.g., a ring sensor, such as a rooftop unit, with infrared sensor(s) and photosensor(s)) to the database over a time period of an hour. During this hour, a weather condition of "Sunny" may be received in weather feed from a third-party API. In this example, the control logic labels each sensor data with readings taken during that hour as "Sunny." The control logic can generate training data that can be used to train a specialized weather model for a "Sunny" weather condition with the sensor data labeled with "Sunny" (or a label identified with "Sunny") including the labeled data taken during that hour. The control logic can generate other training data sets for use in training other specialized weather models for other weather conditions such as "Rainy." "T-Storms," etc. using sensor data in the database that has been labeled with the other corresponding weather conditions.

In one embodiment, at least two specialized predictive models for a particular weather condition are built in each of a supervised and a unsupervised fashion, e.g., to compare the results and/or validate one or both models to be available for deployment.

In certain implementations, the pre-trained specialized predictive models are deployed in real time using a live model selection framework such as described herein. For example, should the third-party API forecast a mix of weather conditions for the following day, a live model selection framework of the prediction module may be used to deploy the corresponding pre-trained specialized weather model at the time index specified by the forecast. FIG. 27A presents an example of a flow chart illustrating an approach to dynamic model selection that can be used to determine the pre-trained specialized predictive model for deployment and when to deploy. For example, the operation 2907 of the flowchart may further include selecting a specialized predictive model at the index specified by the forecast in the weather feed from the third-party API. The selected pre-trained specialized weather model may be deployed at the time index specified by the forecast.

In certain implementations, the pre-trained specialized predictive models are deployed in real time using a live model selection framework (e.g., approach in FIG. 27A) based at least in part on a supervisory deployment architecture to deploy specialized predictive models that have been built in a supervisory fashion. Unlike some unsupervised approaches to live model selection, a supervisory deployment architecture may reduce (e.g., avoid) additional computational expense and/or time involved in identifying the emergence of quantitatively distinct sensor radiation patterns, e.g., at run time. Using the supervised approach leverages third-party information to drive curriculum development of a range of weather conditions for which distinct predictive models can be learned, transferred, and/or efficiently deployed.

In one embodiment, specialized predictive models are built in both a supervised and an unsupervised fashion. A model selection framework can be used to identify (e.g., in advance) which of these specialized predictive models to deploy. The selection may involve determining whether to use a specialized predictive model built in a supervised fashion and/or a specialized predictive model built in an unsupervised fashion using, e.g., performance metrics. An advantage of models trained in unsupervised fashion is allowing the data (e.g., the unique hyperlocal weather conditions) to themselves define the most appropriate "weather types." The advantage of models trained in supervised fashion can be the saved computational expense involved in having those "weather types" provided by the third-party API as readymade labels. In the case of unsupervised models, a quantitative metric would determine when a change in the weather conditions warrant deployment of a different model (e.g., a pretrained time series classifier is applied once every 30 minutes to a rolling window of sensor data, quantifying the 'distance' (Euclidean, Cosine, Dynamic Time Warping, and/or the like), between the sensor values of from a 30-minute archetypical template of a weather condition and to what is currently being observed. The model corresponding to its classification is deployed.). In the case of supervised models, one can rely on the accuracy of the $3^{rd}$-party forecast to determine when to deploy a different model.

Specialized predictive models may be initialized when a minimum number of day-length data frames (e.g., of 7 days) of historical data have accrued that can be paired with the corresponding weather labels (e.g., provided by the third-party API). In some cases, historical data may be stored in off-site storage, such as cloud storage, and/or retained on an on-site database (e.g., for a particular length of time (e.g., 10 days)). If the minimum amount of historical data is not available in the off-site storage, the retention on the on-site database can be extended (e.g., by 30 days) to support the initialization in certain instances.

In some embodiments, specialized predictive models are initialized for at least one (e.g., each) site using training data derived from sensor input taken by a physical (e.g., sky) sensor at the site and/or from weather feed data corresponding to the physical location of the site. In certain cases, specialized predictive models at other sites, such as those in close proximity, may be initialized using sensor input from the physical (e.g., sky) sensor at another site (a nearby site) and weather feed data applicable to the other (e.g. nearby) site. The sensor input and/or weather feed data from the other (e.g., nearby) site may augment the training queue of data for at least one (e.g., each) class at the other sites. The specialized predictive models initialized for the other (e.g., nearby) site may be used as pre-trained models for the different sites, e.g., for newly-commissioned sites with empty sensor data queues. The initialized specialized models can establish a class template for at least one (e.g., each) of the weather conditions upon which a (e.g., nightly) transfer learning process improves as additional days exhibiting the weather condition present themselves. The transfer can be during periods of low occupancy in the site (e.g., as disclosed herein).

The specialized predictive models may be retrained on a periodic basis (e.g., every day, or on some other regular basis (e.g., between every 1 and 10 days)). In certain embodiments, the specialized predictive models may be retrained at a time when the live models are not executing (e.g., during low occupancy site periods such as sometime during the night such as at midnight). The models may be retrained on data (sensor data and/or weather feed data) that has been updated since the last training. To receive weather feed data from the third-party API, requests can be made to the third-party API at the beginning of training (e.g., at midnight) and the end of prediction (e.g., at sunset). The weather feed data can be appended to the most recent day-length data frame to the corresponding training queue for its weather class. The weather feed data can be used to identify the appropriate specialized weather model for deployment. e.g., during live prediction the following day.

In some embodiments, the network is operatively (e.g., communicatively) coupled to at least one forecasting (e.g., predictive) module (e.g., external condition forecasting such as disclosed herein). The forecasting module may process data (or direct processing of data) from one or more controllers (e.g., of the hierarchical control system). The forecasting module may predict (or direct prediction of) photosensor, infrared (IR), and/or temperature sensor data. The photosensor may be configured to sense one or more wavelength to which an average person is sensitive (e.g., one or more wavelength in the visible spectrum). The photosensor may be configured to sense infrared and/or ultraviolet radiation. The predictive module may be utilized to predict and/or accelerate tint transitions of the tintable window(s), e.g., by accelerating tinting commands (e.g., to darken and/or to brighten the tintable window). The predictive module may utilize statistical postprocessing applied to the sensor data. The sensor data may be of any of the sensors disclosed herein (e.g., sky sensor). The sensor may be a virtual sensor (e.g., virtual sky sensor). The sensor may be a combi-sensor. Examples of combi-sensor can be found in U.S. patent application Ser. No. 15/514,480 filed on Mar. 24, 2017, (now U.S. patent Ser. No. 10/539,456 issued on Jan. 21, 2020) titled "COMBI-SENSOR SYSTEMS," which is incorporated herein by reference in its entirety. The virtual sensor may predict one or more properties in at least one location devoid of sensor(s), using measurements(s) of one or more adjacent sensors to the location, which one or more adjacent sensors sense the one or more properties. The virtual sensor may be implemented in a (e.g., non-transitory) computer readable media. The virtual sensor may comprise a logic to predict sensor reading in the one or more locations devoid of sensor(s). The forecasting module(s) may comprise logic that forecasts one or more sensed properties of the sensor(s). The forecasting module may reduce bias and/or discrepancy in processing the sensor data and forming prediction(s).

In some embodiments, the predictions of the module(s) disclosed herein are (1) generated using inputs from (e.g., Sky) sensor(s) and/or weather forecasts (e.g., 3rd party weather APIs) and (2) stored on a database (e.g., on the master controller). In some embodiments, the module(s) disclosed herein provide automated model governance over at least a portion (e.g., the entire) of the life cycle of the application, e.g., to increase a probability that transfer learning continues successfully and/or to enable the module(s) to adapt to changing weather conditions over time. In some embodiments, the (e.g., autonomous) learning system comprising the module(s) benefits from at least minimal guidance with respect to criteria comprising (1) what the learning system learns, 2) how the learning system learns, and 3) that the learning system is learning.

In some embodiments, the learning system (e.g., comprising VSS) learns the artificial intelligence (e.g., neural network) model parameters, e.g., that minimize prediction error. In some embodiments, the learning system performs its learning at least in part by using hyperparameters. Example hyperparameters that may be tuned include: a number of hidden layers, a dropout rate that indicates a percentage of neurons that are removed during each epoch to prevent overfitting, a selected activation function, a weight initialization, or any combination thereof. The learning of the hyperparameters determines at least in part how the learning system arrives at its optimal model parameterization, e.g., the path which the learning system takes to reach that optimum. In some embodiments, what the learning system is learning pertains to the model governance functionality provided by the learning system (e.g., comprising the module(s) disclosed herein). In some embodiments, to provide this functionality, the learning system interprets potential model bias events flagged during prediction postprocessing.

In some embodiments, model bias occurs at least when (1) the training is interrupted by a platform failure, and/or (2) the operation which executes the training is (e.g., mistakenly and/or inadvertently) removed by a user. Such a failure may impact training and/or re-training of the learning system. The learning may be performed during a low occupancy period on the site (e.g., as disclosed herein), such as during the night. The user may be remotely servicing a portion of the control system. The control system portion may be where the database and/or modules reside and/or operate (e.g., at the master controller). A failure to train and/or re-train may impact model quality, and may introduce bias, e.g., as the (e.g., nightly) training keeps the learning system up to date with changing weather conditions.

Model bias may be quantified (e.g., in real time) during postprocessing. Bias detection can occur in several ways, e.g., by comparing predicted values to the values which eventually occur (e.g., as sensed by real physical sensors). The model bias may be a discrepancy between a sensor value predicted at time t (e.g., predicted before time t by a modeling system such as VSS) and an actual sensed value by a real physical sensor at time t (once that time arrives). In some embodiments, the Health Monitor (comprising the VSS) predicts photosensor and/or IR sensor values for each time increment (e.g., minute) to accelerate tinting commands for the tintable window(s). The VSS may forecasted sensor data based at least in part on the data utilized to control one or more systems (e.g., a window control system) at a site. The health monitor may be referred to herein as "Foresight Health Monitor," or "Foresight."

In some embodiments, model bias is found once there is a difference between the forecasted value and the actual measured value, that exceeds a threshold. Model bias may be quantified by tracking discrepancies between (i) predictions of the learning system (e.g., using VSS) and (i) the default rolling measured sensor values (e.g., measured by physical sensors such as the physical sky sensor ensemble). The physical sensor values are fed into the network and utilized by the control system, e.g., to alter a tint of the tintable window(s). The rolling physical sensor measurements may roll over a time period (e.g., any time period disclosed herein), such as every about t (e.g., about 10 minute) time period. A plurality of consecutive sensor values may be represented by one sensor value that is an average/mean/median of the plurality of consecutive sensor values. For example, sensor values taken during a period of time (e.g., 10 min.) can be used for such average/mean/median calculation. The sensor(s) may comprise photosensor or IR sensor (or any other sensor disclosed herein).

In some embodiments, a difference (e.g., delta, deviation) between the predicted sensor values by the learning system and a physical sensor values during time "t" is greater than a threshold (e.g., set by bias control automatically and/or manually by a user), forming a first bias that is unhealthy. The threshold may comprise a value or a function. The function may be time and/or space dependent. The function may depend on the sensor type. The learning system (e.g., through its database such as a log file) may facilitate identification (e.g. flagging) of the predicted value at "t" as potential model bias event (e.g., using any timestamps of the virtual sensor data it generates). The learning system (e.g., Health Monitor module) may track for any consecutive bias to the identified bias at time "t" (e.g., before or after comparison with the threshold and finding that it is a healthy/unhealthy bias). If the consecutive time of the bias is greater than a consecutive time threshold, and if the bias is greater than the bias threshold (e.g., flagging it as an "unhealthy" bias"), then the Health monitor may record and/or notify the unhealthy bias (e.g., to initiate a remedy).

In some embodiments, the learning system operates during low occupancy periods in the site (e.g., on a nightly basis). The learning system may analyze (e.g., parse) the VSS data (e.g., embodied in the log file) for such minute-level bias events. When any such event occurs for a lengthy period of time (e.g., longer than "t," for example, t is 10 minutes, and the longer period of time is one hour), a Health Monitor module may detect the timeframe over which the bias event(s) occurred. A bias module may record or otherwise indicate an "unhealthy" status for the bias event(s) in the learning system. For example, the bias module may update (e.g., in a table) on a (e.g., dedicated) database the "unhealthy" bias event(s). The database may be of the control system (e.g., the master controller). The database may be stored in the processor that occupies and/or operates the bias module. The database may be stored in the processor that does not occupy and/or operate the bias module. The bias module platform may (e.g., automatically) alerts and/or report the "unhealthy" status, e.g., so that it can be quickly resolved. The reporting may be to a site manager, service team, owner, user, and/or the like. The bias module may be part of the Health Monitor module, or be operatively (e.g., communicatively) coupled to the Health Monitor module (e.g., and operate jointly).

The bias module can be configured to deliver timely (e.g., minute-level) governance in real time (e.g., at runtime in the live prediction setting), or in a non-real time fashion. The Health Monitor can track the duration and/or persistence of any bias event, e.g., on a periodic basis (e.g., on a daily basis). Tracking the bias events may be to provide module governance over at least a portion of (e.g., the entire) life cycle of the Health Monitor operation (e.g., and other module(s) operation). The module governance may increase the probability (e.g., ensure) that transfer learning is continuing successfully, and that the learning system is adapting to changing weather conditions over time.

In some embodiments, at runtime, the bias trigger returns sensor values predicted by the weather prediction module(s) (e.g., VSS) for that minute. Isolated bias triggers may reflect slow response of the weather predicting module(s), e.g., to rapidly changing weather. Persisting bias trigger over a time span, may interfere with (e.g., nightly) model re-training.

Figure 37:
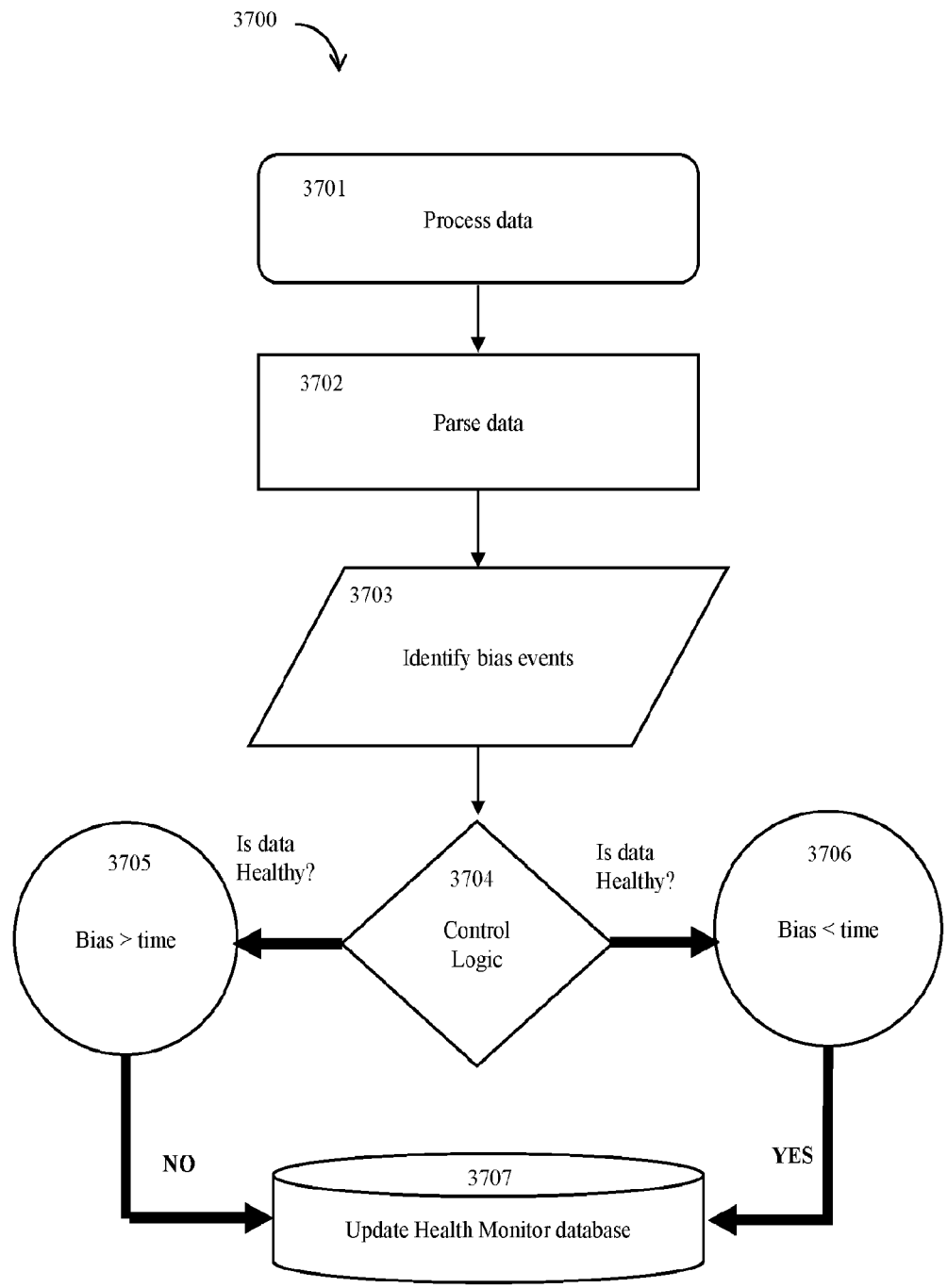
FIG. 37 illustrates a flowchart of operations in a learning system (e.g., Foresight Health Monitor)

FIG. 37 shows an example of a flow chart 3700 depicting operations of the Health Monitor and bias model. In block 3701 the sensor data (e.g., VSS sensor data) is processed. For example, photosensor data can be provided with a photosensor identifier string, and IR sensor can be provided with a IR identifier string. The sensor data may be stored in a database (e.g., as a log file). The analysis may entail extracting the stored data. In block 3702 the sensor data is identified. e.g., by sensor type, and optionally parceled by sensor type and/or time. For example, identifying photosensor vs. IR sensor data and/or their respective timestamp information. The timestamp information may comprise the beginning and/or end of the sensor measurement. In block 3703 the bias data is identified (e.g., by comparing with default sensor data). The data can be split into (e.g., consecutively occurring) bias events. In block 3704 the bias data is compared to a threshold and is categorized as "healthy" or "unhealthy." The health flag can be a binary flag (e.g., 1 for "healthy" and 0 for "unhealthy). In blocks 3705 and 3706 the timestamps for the biased data are analyzed to find an event lasting more than a time window (e.g., for more than 1 hour), e.g., to find biased data that is "unhealthy" for consecutive measurements lasting more than the time threshold. The time threshold may be the same for at least two data types (e.g., photosensor and IR sensor) The time threshold may be the different for at least two data types (e.g., photosensor and IR sensor). For example, the time threshold for a photosensor bias may be 60 min, and the time window for the IR sensor bias may be 70 min. In block 3707 the Health Monitor database (e.g., table) is updated with at least two of (i) bias related information (ii) health flags and (iii) associated Timestamps.

In some embodiments, one or more benefits of the modules disclosed herein (e.g., the Health Monitor module) may be quantified (e.g., in a quantification module). Quantifying the module benefit(s) may facilitate acceleration of tint decision(s). For example, the quantification may allow knowledge of any gain in daylight and/or glare protection. For example, by comparing certain module(s) with other module(s). For example, comparing data (e.g., pertaining to tint based decisions) from module(s) A, B, C, and/or C1 with data (e.g., pertaining to tint based decisions) from the Health Monitor and/or VSS modules. The Health Monitor module may be referred to herein as "Foresight Health Monitor," or "Foresight." The quantification module may be referred herein as "Foresight analytics module." The Intelligence module may include modules A, B, C, C1, D and/or D1, e.g., as disclosed herein. The Foresight module may comprise the learning module, Heath Monitor Module, and/or VSS module, e.g., as disclosed herein.

In some embodiments, the quantification module may quantify the amount of additional glare protection and/or additional daylight provided to facility occupants, by utilizing any of the modules including their logic, variables, methodologies, and/or thresholds.

In some embodiments, the qualification module is configured to (e.g., quantifiably) compare Intelligence module(s) tint commands to Foresight tint commands. The Intelligence module(s) tint commands may be taken directly from the Intelligence module(s) output, or may be recreated by the quantification module. For example, the quantification module may (I) use Intelligence module(s) generated tint commands or (II) recreate Intelligence module(s) tint commands by using sensor data (e.g., as used by Intelligence module(s)), Intelligence module(s) analysis scheme, and/or Intelligence module(s) thresholds). In some embodiments, the learning module (e.g., Foresight Health Monitor) and/or quantification module are configured to carry out one or more operations (e.g., scheme, or logic). In some embodiments, the qualification module may carry one or more operations of the Intelligence modules (e.g., Intelligence control logic), e.g., to evaluate Intelligence tint commands (e.g., by comparing those to respective Foresight commands).

Figure 38:
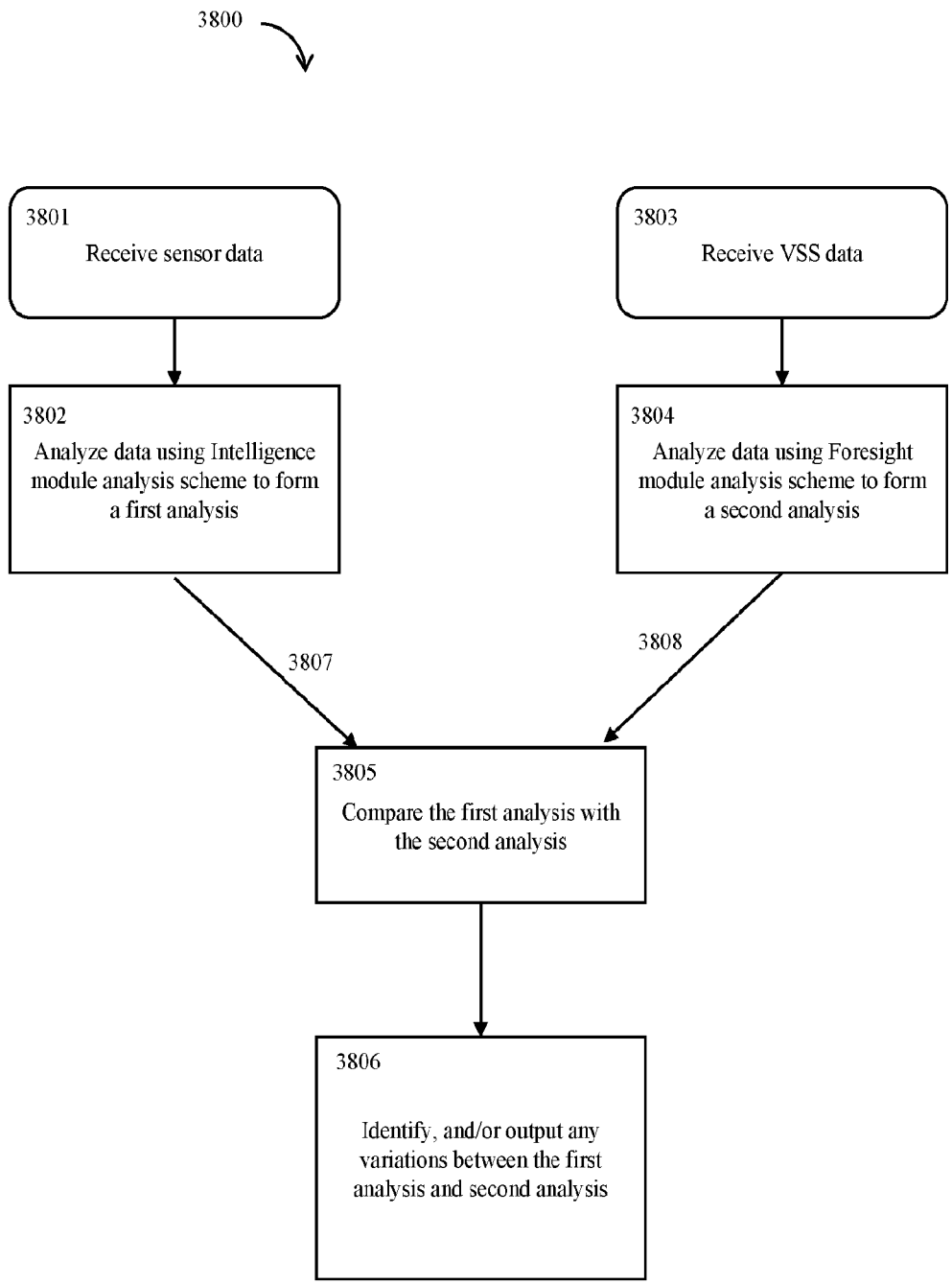
FIG. 38 illustrates a flow chart for a quantification module.

FIG. 38 shows an example of a flowchart 3800 delineating quantification module operations. In block 3801 physical sensor data is received (e.g., directly from the sensor or through Intelligence module(s)). The sensor data is analyzed in block 3802 using the logic (e.g., including any thresholds) in the respective Intelligence module(s), to output 3807 a first tint command (e.g., receiving a first timestamp). The output 3807 may arrive directly from the Intelligence module(s) (not shown). In block 3803 virtual sensor data is received (e.g., directly from the VSS or through Foresight module(s)). The virtual sensor data is analyzed in block 3804 using the logic (e.g., including any thresholds) in the respective Foresight module(s), to output 3808 a second tint command (e.g., receiving a second timestamp). The output 3808 may arrive directly from the Intelligence module(s) (not shown). The tint commands and/or timestamps are (e.g., quantifiably) compared in block 3805 to generate a result. The result can be identified and/or is output in block 3806. e.g., when there is a variation between the first and second tint commands (e.g., including a variation in the timestamps). The comparison may be against a threshold (e.g., time threshold, tint threshold). The variation may contribute to a gain in daylight and/or glare protection to a user in the facility. The output may be in terms of the gain in daylight and/or glare protection.

In some embodiments, the qualification module recreates values of the Intelligence module(s) using (i) raw data provided to the Intelligence module(s) and/or (ii) processing scheme (e.g. logic) of one or more Intelligence module(s). For example, the qualification module can recreate values of the Intelligence module using raw (e.g., photosensor or IR) physical sensor data (e.g., tails) and/or processing scheme (e.g. logic) of one or more Intelligence module(s). The threshold (e.g., parameters thereof) utilized by one or more Intelligence modules (e.g. module C/C1 or D/D1 of Intelligence) for the (e.g., photosensor or IR) sensor measurement analysis may be utilized by the quantification module to recreate the respective Intelligence module(s) command(s) The Foresight module tint commands may be taken directly from Foresight output, or recreated by the quantification module. The Foresight tint commands may utilize virtual synthesized sensor data (e.g., VSS data) and an input, as well as the Foresight logic for generating the tint commands.

In some embodiments, the quantification module may utilize sensor data. For example, the quantification module may comprise photosensor(s) and/or IR sensor(s) data. The quantification module may utilize zone related data. A zone may comprise a plurality of windows having the same geographical location, are disposed on the same floor, the same façade of the facility (e.g., building), the same room type (e.g., conference rooms, offices, or cafeterias), or the same level of occupancy (e.g., a room designated for 10 occupants or less, between 10 and 100 occupants, and 100 occupants and more). The level of occupancy may be actual (e.g., using an occupancy sensor or and ID tag input), or projected (e.g., using a projected date and/or hourly schedule for the facility). The quantification module may utilize sensor values predictions (e.g., using the Health Monitor module, VSS module, and/or any other predictive module disclosed herein (e.g., using artificial intelligence)). The quantification module may utilize one or more thresholds (e.g., threshold values), e.g., utilized by any of the Intelligence modules or the Foresight modules.

In some embodiments, the quantification module performs an analysis (e.g., comprising one or more calculations). The analysis may comprise calculating tint command related data for one or more of the Intelligence modules (e.g., module C (or C1) and module D (or D1)) using physical sensor data (e.g. using photosensor and/or IR sensor values). The data utilized for the tint commands may be calculated for the window(s) disposed in a zone (e.g., listed in a table or otherwise associated to a zone). The analysis may comprise deriving sensor time information (e.g., via timestamps of the sensor measurements) for designated time frames (e.g., morning and evening, or day and night). The analysis may comprise assigning module C values to non-tails data region and module D (or D1) values to tails data region, based at least in part on threshold(s) (e.g., threshold parameter for modules A, B, C, C1. D and/or D1 (e.g., threshold parameter(s)). An Intelligence module may comprise modules A, B, C, C1, D and/or D1. The analysis may comprise recreating one or more Intelligence module values using raw sensor data (e.g., photosensor measurements and/or IR measurements) taken by real physical sensor(s). In some embodiment, the quantification module is configured to receive and/or acquire (e.g., load) raw sensor measurements (e.g., from the photosensor). The sensor data may be of a plurality of sensors (e.g., at least 2, 4, 6. 8, 10, 12, or 13 sensors). The sensor data may be from sensors in a sensor ensemble (e.g., real physical sky sensor). The sensor values from the plurality of sensor may be filtered. Filtering may utilized boxcar filtering. The boxcar may comprise a short boxcar or a long boxcar. Filtering may comprise a high-pass or low-pass filter. The analysis may comprise calculating a mean/median/average value assigned to the plurality of photosensors. The plurality of photosensors may be disposed in a single file (e.g., on a curve such as a circle or ellipse or portion thereof). At least one of the plurality of (e.g., photo-) sensors may be disposed in the exterior of the facility (e.g., building) such as on a roof of the building or attached to the building façade. The filtering may comprise filtering measurements acquired during a time frame. The timeframe may be of at least about 5 minutes (min.), 10 min, 15 min., 20 min., 40 min., 60 min, or 80 min. The timeframe may be of at most about 2 min, min., 10 min, 15 min., 20 min, 40 min., 60 min., or 70 min. The timeframe may be any timeframe disclosed herein. The sensor values are measured at time intervals (e.g., at a frequency) of at most about every 0.25 min., 0.5 min., 1 min., 2.5 min, 5 min., or 7.5 min. The tint commands may be issued at time intervals (e.g., at a frequency) of at most about every 2.5 min., 5 min., 7.5 min., 10 min., 15 min., 20 min., 30 min. The tint command may be issued at an interval (e.g., at a frequency) that is at least about 2.5*, 5*, 7.5*, or 10* slower than the sensor measurement interval (e.g., sensor measurement frequency). The symbol "*" designates the mathematical operation "times."

In some embodiments, the quantification module differentiates between tint transition types (e.g., from bright to dark or from dark to bright; from less tinted to more tinted or from more tinted to less tinted). In some embodiments, the quantification module analyzes tint transition, e.g., from bright to dark (e.g., from less tinted to more tinted). Module C (and/or C1) may be configured to make decisions as to a determination (e.g., recommendation) of target tint value, e.g., based at least in part (e.g., only) on sensor measurements (e.g., as disclosed herein). The tint decision of the Intelligence module(s) (e.g., Module C or C1) can be generated (e.g., calculated) based at least in part on (i) filtered sensor data (e.g., boxcar filtered photosensor and IR sensor values). The tint decisions can be assigned to the daytime time frames (that may be referred to as "non-tails" time frames). Morning or evening time frames may be referred to as "tails" time frames.

In some embodiments, the qualification module recreates values of the Intelligence module using raw (e.g., photosensor or IR) physical sensor data (e.g., "tails" data collected during morning or evening time frame) and/or processing scheme (e.g. logic) of one or more Intelligence modules. The threshold (e.g., parameters thereof) utilized by one or more Intelligence modules for the (e.g., photosensor or IR) sensor measurement analysis may be assigned (e.g. to module C/C1 or D/D1 of Intelligence).

In some embodiments, the quantification module recreates Intelligence module(s) processing scheme. For example, the qualification module may execute an intermediate tint (e.g., tint 3) command between a lower tint level and a higher (e.g., darker) tint level (such as between tint 2 and the darker tint 4 transitions), which tint command is derived from module C (or C1) output and receives a timestamp at its execution. The lockout time frame of module C (or C1) may be enforced for every such intermediate tint (e.g., tint 3) decision. Tint decisions derived from values in the data table (e.g., of the Foresight Health module) and from the sensors (e.g., directly or through the Intelligence module) are compared at time interval (e.g., of 2 min., 5 min . . . 7 min., or 10 min.) according to the Intelligence command cycle. Calculation of gain in daylight and/or gain in glare protection resulting from any varied (e.g., accelerated) Foresight decisions can be made, e.g., by comparing the timestamps at which Intelligence tint commands and Foresight Health Monitor module tint commands are issued. Such timestamp comparison may also reveal any delayed Foresight decision (e.g., prompting revision(s) in and/or evaluation of the Foresight module logic). In a timely (e.g., daily) manner, the gains in daylight and/or glare protection (e.g., in minutes) delivered by the predicted sensor values (e.g., predicted photosensor and/or IR sensor of the VSS) of the Foresight Health Monitor module may be updated in a (e.g., dedicated) table in and/or stored in a (e.g., dedicated) database.

It should be understood that control logic and other logic used to implement techniques described herein can be implemented in the form of circuits, processors (including microprocessors, digital signal processors, application specific integrated circuits, programmable logic such as field-programmable gate arrays, etc.), computers, computer software, devices such as sensors, or combinations thereof.

Any of the software components or functions described in this application, may be implemented as code to be executed by a processor using any suitable computer language such as, for example, Java, C++ or Python using, for example, conventional or object-oriented techniques. The code may be stored as a series of instructions, or commands on a computer readable medium, such as a random-access memory (RAM), a read only memory (ROM), a programmable memory (EEPROM), a magnetic medium such as a hard-drive or a floppy disk, or an optical medium such as a CD-ROM. Any such computer readable medium may reside on or within a single computational apparatus, and may be present on or within different computational apparatuses within a system or network.

Further, although the present invention discloses use of particular types of recursive neural networks, use of other neural network architectures to make short and/or longer term predictions of environmental conditions, for example, but not limited to, recurrent multilayer perception (RMLP), gated recurrent unit (GRU), and temporal convolutional neural network (TCNN) architectures known to those skilled in the art.

Although the foregoing disclosed embodiments for controlling lighting received through a window or a building's interior have been described in the context of optically switchable windows such as electrochromic windows, one can appreciate how the methods described herein may be implemented on appropriate controllers to adjust a position of a window shade, a window drapery, a window blind, or any other device that may be adjusted to limit or block light from reaching a building's interior space. In some cases, methods described herein may be used to control both the tint of one or more optically switchable windows and the position of a window shading device. All such combinations are intended to fall within the scope of the present disclosure.

One or more features from any embodiment may be combined with one or more features of any other embodiment without departing from the scope of the disclosure. Further, modifications, additions, or omissions may be made to any embodiment without departing from the scope of the disclosure. The components and modules of any embodiment may be integrated or separated according to particular needs without departing from the scope of the disclosure.

Accordingly, although the foregoing disclosed embodiments have been described in some detail to facilitate understanding, the described embodiments are to be considered illustrative and not limiting. It will be apparent to one of ordinary skill in the art that certain changes and modifications can be practiced within the scope of the appended claims.

In some embodiments, the sensor(s) are operatively coupled to at least one controller and/or processor. Sensor readings may be obtained by one or more processors and/or controllers. A controller may comprise a processing unit (e.g., CPU or GPU). A controller may receive an input (e.g., from at least one sensor). The controller may comprise circuitry, electrical wiring, optical wiring, socket, and/or outlet. A controller may deliver an output. A controller may comprise multiple (e.g., sub-) controllers. The controller may be a part of a control system. A control system may comprise a master controller, floor (e.g., comprising network controller) controller, or a local controller. The local controller may be a window controller (e.g., controlling an optically switchable window), enclosure controller, and/or component controller. The controller can be a device controller (e.g., any device disclosed herein such as sensor or emitter). For example, a controller may be a part of a hierarchal control system (e.g., comprising a main controller that directs one or more controllers, e.g., floor controllers, local controllers (e.g., window controllers), enclosure controllers, and/or component controllers). A physical location of the controller type in the hierarchal control system may be changing. For example, at a first time: a first processor may assume a role of a main controller, a second processor may assume a role of a floor controller, and a third processor may assume the role of a local controller; at a second time: the second processor may assume a role of a main controller, the first processor may assume a role of a floor controller, and the third processor may remain with the role of a local controller; and at a third time: the third processor may assume a role of a main controller, the second processor may assume a role of a floor controller, and the first processor may assume the role of a local controller. A controller may control one or more devices (e.g., be directly coupled (e.g., connected) to the devices). A controller may be disposed proximal to the one or more devices it is controlling. For example, a controller may control an optically switchable device (e.g., IGU), an antenna, a sensor, and/or an output device (e.g., a light source, sounds source, smell source, gas source, HVAC outlet, or heater). In one embodiment, a floor controller may direct one or more window controllers, one or more enclosure controllers, one or more component controllers, or any combination thereof. The floor controller may comprise a floor controller. For example, the floor (e.g., comprising network) controller may control a plurality of local (e.g., comprising window) controllers. A plurality of local controllers may be disposed in a portion of a facility (e.g., in a portion of a building). The portion of the facility may be a floor of a facility. For example, a floor controller may be assigned to a floor. In some embodiments, a floor may comprise a plurality of floor controllers, e.g., depending on the floor size and/or the number of local controllers coupled to the floor controller. For example, a floor controller may be assigned to a portion of a floor. For example, a floor controller may be assigned to a portion of the local controllers disposed in the facility. For example, a floor controller may be assigned to a portion of the floors of a facility. A master controller may be coupled to one or more floor controllers. The floor controller may be disposed in the facility. The master controller may be disposed in the facility, or external to the facility. The master controller may be disposed in the cloud. A controller may be a part of, or be operatively coupled to, a building management system. A controller may receive one or more inputs. A controller may generate one or more outputs. The controller may be a single input single output controller (SISO) or a multiple input multiple output controller (MIMO). A controller may interpret an input signal received. A controller may acquire data from the one or more components (e.g., sensors). Acquire may comprise receive or extract. The data may comprise measurement, estimation, determination, generation, or any combination thereof. A controller may comprise feedback control. A controller may comprise feed-forward control.

Figure 39:
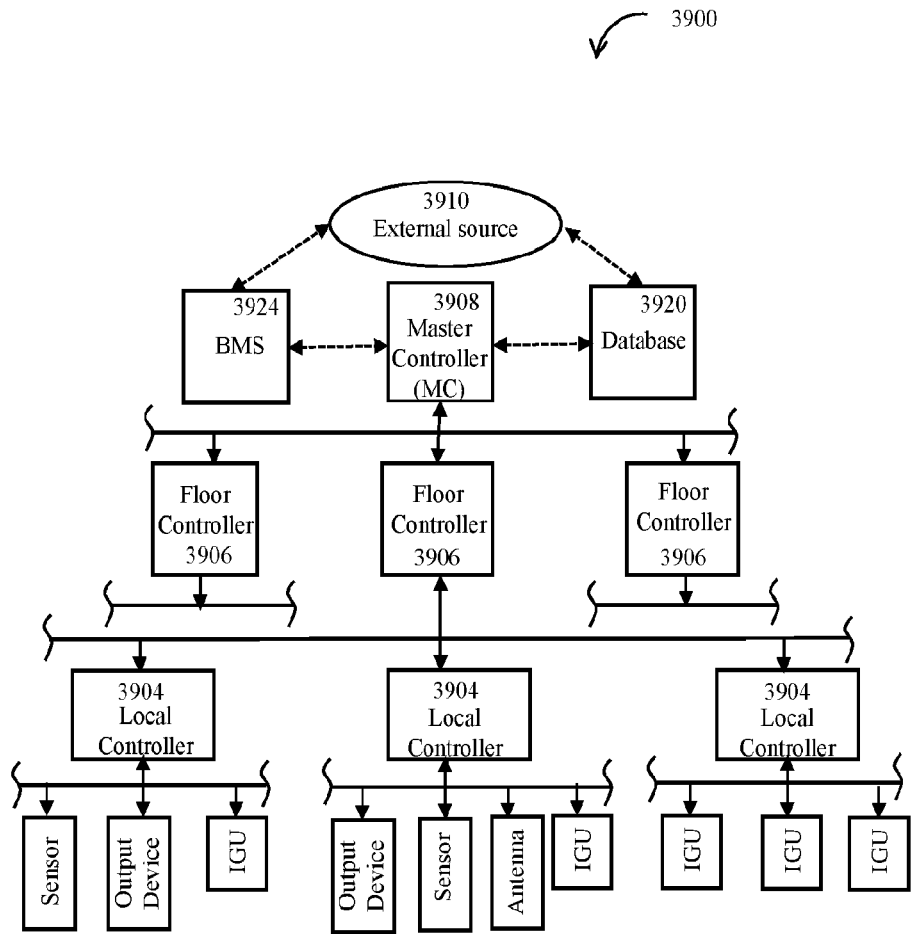
FIG. 39 illustrates a hierarchical control system and controlled devices.

Control may comprise on-off control, proportional control, proportional-integral (PI) control, or proportional-integral-derivative (PID) control. Control may comprise open loop control, or closed loop control. A controller may comprise closed loop control. A controller may comprise open loop control. A controller may comprise a user interface. A user interface may comprise (or operatively coupled to) a keyboard, keypad, mouse, touch screen, microphone, speech recognition package, camera, imaging system, or any combination thereof. Outputs may include a display (e.g., screen), speaker, or printer. FIG. 39 shows an example of a control system architecture 3900 comprising a master controller 3908 that controls floor controllers 3906, that in turn control local controllers 3904. In some embodiments, a local controller controls one or more IGUs, one or more sensors, one or more output devices (e.g., one or more emitters), or any combination thereof. FIG. 39 shows an example of a configuration in which the master controller is operatively coupled (e.g., wirelessly and/or wired) to a building management system (BMS) 3924 and to a database 3920. Arrows in FIG. 39 represents communication pathways. A controller may be operatively coupled (e.g., directly/indirectly and/or wired and/wirelessly) to an external source 3910. The extern al source may comprise a network. The external source may comprise one or more sensor or output device. The external source may comprise a cloud-based application and/or database. The communication may be wired and/or wireless. The external source may be disposed external to the facility. For example, the external source may comprise one or more sensors and/or antennas disposed, e.g., on a wall or on a ceiling of the facility. The communication may be monodirectional or bidirectional. In the example shown in FIG. 39, the communication all communication arrows are meant to be bidirectional.

The controller may monitor and/or direct (e.g., physical) alteration of the operating conditions of the apparatuses, software, and/or methods described herein. Control may comprise regulate, manipulate, restrict, direct, monitor, adjust, modulate, vary, alter, restrain, check, guide, or manage. Controlled (e.g., by a controller) may include attenuated, modulated, varied, managed, curbed, disciplined, regulated, restrained, supervised, manipulated, and/or guided. The control may comprise controlling a control variable (e.g. temperature, power, voltage, and/or profile). The control can comprise real time or off-line control. A calculation utilized by the controller can be done in real time, and/or off line. The controller may be a manual or a non-manual controller. The controller may be an automatic controller. The controller may operate upon request. The controller may be a programmable controller. The controller may be programed.

The methods, systems and/or the apparatus described herein may comprise a control system. The control system can be in communication with any of the apparatuses (e.g., sensors and/or tintable windows) described herein. The apparatuses may be of the same type or of different types, e.g., as described herein. For example, the control system may be in communication with the first sensor and/or with the second sensor. The control system may control the one or more sensors. The control system may control one or more components of a building management system (e.g., lightening, security, and/or air conditioning system). The controller may regulate at least one (e.g., environmental) characteristic of the enclosure. The control system may regulate the enclosure environment using any component of the building management system. For example, the control system may regulate the energy supplied by a heating element and/or by a cooling element. For example, the control system may regulate velocity of an air flowing through a vent to and/or from the enclosure. The control system may comprise a processor. The processor may be a processing unit. The controller may comprise a processing unit. The processing unit may be central. The processing unit may comprise a central processing unit (abbreviated herein as "CPU"). The processing unit may be a graphic processing unit (abbreviated herein as "GPU"). The controller(s) or control mechanisms (e.g., comprising a computer system) may be programmed to implement one or more methods of the disclosure. The processor may be programmed to implement methods of the disclosure. The controller may control at least one component of the forming systems and/or apparatuses disclosed herein.

Figure 40:
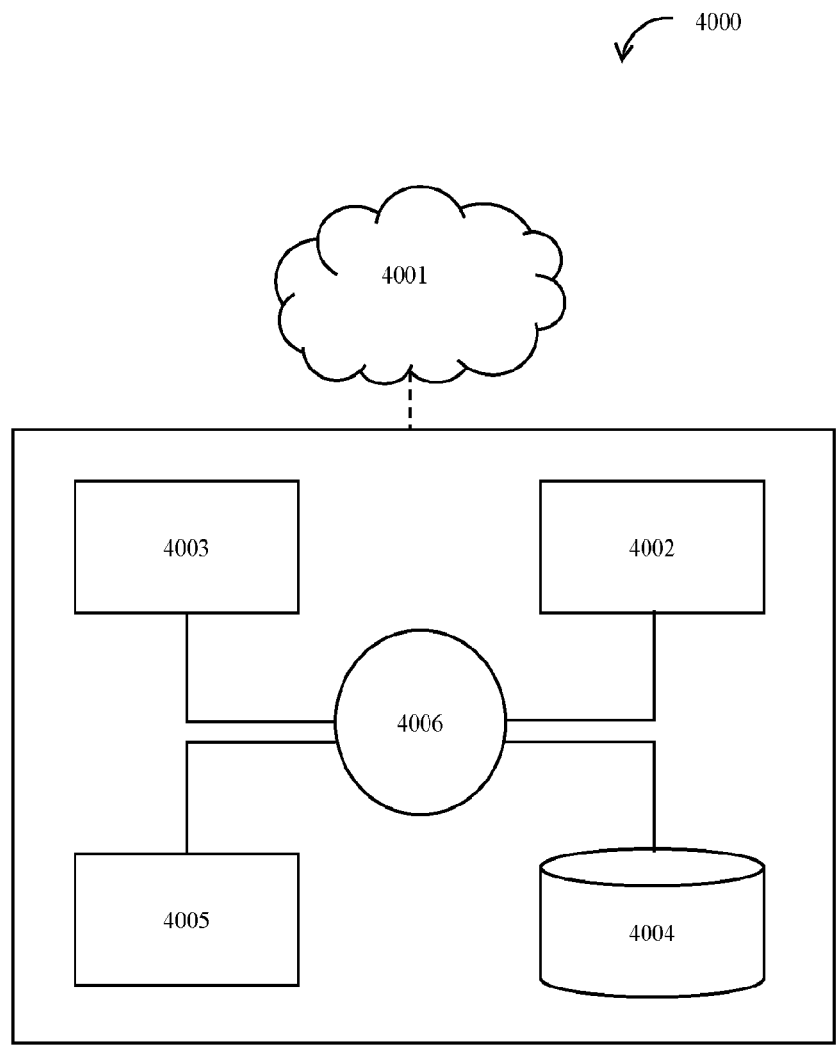
FIG. 40 illustrates a processing system and its various components.

FIG. 40 shows a schematic example of a computer system 4000 that is programmed or otherwise configured to one or more operations of any of the methods provided herein. The computer system can control (e.g., direct, monitor, and/or regulate) various features of the methods, apparatuses and systems of the present disclosure, such as, for example, control heating, cooling, lightening, venting of an enclosure, or any combination thereof. The computer system can be part of, or be in communication with, any sensor or sensor ensemble disclosed herein. The computer may be coupled to one or more mechanisms disclosed herein, and/or any parts thereof. For example, the computer may be coupled to one or more sensors, valves, switches, lights, windows (e.g., IGUs), motors, pumps, optical components, or any combination thereof.

The computer system can include a processing unit (e.g., 4006) (also "processor," "computer" and "computer processor" used herein). The computer system may include memory or memory location (e.g., 4002) (e.g., random-access memory, read-only memory, flash memory), electronic storage unit (e.g., 4004) (e.g., hard disk), communication interface (e.g., 4003) (e.g., network adapter) for communicating with one or more other systems, and peripheral devices (e.g. 4005), such as cache, other memory, data storage and/or electronic display adapters. In the example shown in FIG. 40, the memory 4002, storage unit 4004, interface 4003, and peripheral devices 4005 are in communication with the processing unit 4006 through a communication bus (solid lines), such as a motherboard. The storage unit can be a data storage unit (or data repository) for storing data. The computer system can be operatively coupled to a computer network ("network") (e.g., 4001) with the aid of the communication interface. The network can be the Internet, an internet and/or extranet, or an intranet and/or extranet that is in communication with the Internet. In some cases, the network is a telecommunication and/or data network. The network can include one or more computer servers, which can enable distributed computing, such as cloud computing. The network, in some cases with the aid of the computer system, can implement a peer-to-peer network, which may enable devices coupled to the computer system to behave as a client or a server.

The processing unit can execute a sequence of machine-readable instructions, which can be embodied in a program or software. The instructions may be stored in a memory location, such as the memory 4002. The instructions can be directed to the processing unit, which can subsequently program or otherwise configure the processing unit to implement methods of the present disclosure. Examples of operations performed by the processing unit can include fetch, decode, execute, and write back. The processing unit may interpret and/or execute instructions. The processor may include a microprocessor, a data processor, a central processing unit (CPU), a graphical processing unit (GPU), a system-on-chip (SOC), a co-processor, a network processor, an application specific integrated circuit (ASIC), an application specific instruction-set processor (ASIPs), a controller, a programmable logic device (PLD), a chipset, a field programmable gate array (FPGA), or any combination or plurality thereof. The processing unit can be part of a circuit, such as an integrated circuit. One or more other components of the system 4000 can be included in the circuit.

The storage unit can store files, such as drivers, libraries and saved programs. The storage unit can store user data (e.g., user preferences and user programs). In some cases, the computer system can include one or more additional data storage units that are external to the computer system, such as located on a remote server that is in communication with the computer system through an intranet or the Internet.

The computer system can communicate with one or more remote computer systems through a network. For instance, the computer system can communicate with a remote computer system of a user (e.g., operator). Examples of remote computer systems include personal computers (e.g., portable PC), slate or tablet PC's (e.g., Apple® iPad, Samsung Galaxy Tab), telephones, Smart phones (e.g., Apple® iPhone, Android-enabled device, Blackberry®), or personal digital assistants A user (e.g., client) can access the computer system via the network.

Methods as described herein can be implemented by way of machine (e.g., computer processor) executable code stored on an electronic storage location of the computer system, such as, for example, on the memory 4002 or electronic storage unit 4004. The machine executable or machine-readable code can be provided in the form of software. During use, the processor 4006 can execute the code. In some cases, the code can be retrieved from the storage unit and stored on the memory for ready access by the processor. In some situations, the electronic storage unit can be precluded, and machine-executable instructions are stored on memory.

The code can be pre-compiled and configured for use with a machine have a processer adapted to execute the code or can be compiled during runtime. The code can be supplied in a programming language that can be selected to enable the code to execute in a pre-compiled or as-compiled fashion.

In some embodiments, the processor comprises a code. The code can be program instructions. The program instructions may cause the at least one processor (e.g., computer) to direct a feed forward and/or feedback control loop. In some embodiments, the program instructions cause the at least one processor to direct a closed loop and/or open loop control scheme. The control may be based at least in part on one or more sensor readings (e.g., sensor data). One controller may direct a plurality of operations. At least two operations may be directed by different controllers. In some embodiments, a different controller may direct at least two of operations (a), (b) and (c). In some embodiments, different controllers may direct at least two of operations (a), (b) and (c). In some embodiments, a non-transitory computer-readable medium cause each a different computer to direct at least two of operations (a), (b) and (c). In some embodiments, different non-transitory computer-readable mediums cause each a different computer to direct at least two of operations (a), (b) and (c). The controller and/or computer readable media may direct any of the apparatuses or components thereof disclosed herein. The controller and/or computer readable media may direct any operations of the methods disclosed herein.

In some embodiments, the at least one sensor is operatively coupled to a control system (e.g., computer control system). The sensor may comprise light sensor, acoustic sensor, vibration sensor, chemical sensor, electrical sensor, magnetic sensor, fluidity sensor, movement sensor, speed sensor, position sensor, pressure sensor, force sensor, density sensor, distance sensor, or proximity sensor. The sensor may include temperature sensor, weight sensor, material (e.g., powder) level sensor, metrology sensor, gas sensor, or humidity sensor. The metrology sensor may comprise measurement sensor (e.g., height, length, width, angle, and/or volume). The metrology sensor may comprise a magnetic, acceleration, orientation, or optical sensor. The sensor may transmit and/or receive sound (e.g., echo), magnetic, electronic, or electromagnetic signal. The electromagnetic signal may comprise a visible, infrared, ultraviolet, ultrasound, radio wave, or microwave signal. The gas sensor may sense any of the gas delineated herein. The distance sensor can be a type of metrology sensor. The distance sensor may comprise an optical sensor, or capacitance sensor. The temperature sensor can comprise Bolometer, Bimetallic strip, calorimeter, Exhaust gas temperature gauge, Flame detection, Gardon gauge, Golay cell, Heat flux sensor, Infrared thermometer, Microbolometer. Microwave radiometer. Net radiometer. Quartz thermometer, Resistance temperature detector, Resistance thermometer, Silicon band gap temperature sensor, Special sensor microwave/imager, Temperature gauge, Thermistor, Thermocouple, Thermometer (e.g., resistance thermometer), or Pyrometer (e.g., Pyranometer such as silicon pyranometer). The temperature sensor may comprise an optical sensor. The temperature sensor may comprise image processing. The temperature sensor may comprise a camera (e.g., IR camera. CCD camera). The pressure sensor may comprise Barograph, Barometer, Boost gauge, Bourdon gauge, Hot filament ionization gauge, Ionization gauge, McLeod gauge, Oscillating U-tube, Permanent Downhole Gauge, Piezometer, Pirani gauge, Pressure sensor, Pressure gauge, Tactile sensor, or Time pressure gauge. The position sensor may comprise Auxanometer, Capacitive displacement sensor, Capacitive sensing, Free fall sensor, Gravimeter, Gyroscopic sensor, Impact sensor, Inclinometer, Integrated circuit piezoelectric sensor, Laser rangefinder, Laser surface velocimeter, LIDAR, Linear encoder, Linear variable differential transformer (LVDT). Liquid capacitive inclinometers, Odometer, Photoelectric sensor, Piezoelectric accelerometer, Rate sensor, Rotary encoder, Rotary variable differential transformer, Selsyn, Shock detector, Shock data logger. Tilt sensor. Tachometer, Ultrasonic thickness gauge, Variable reluctance sensor, or Velocity receiver. The optical sensor may comprise a Charge-coupled device, Colorimeter, Contact image sensor, Electro-optical sensor, Infra-red sensor, Kinetic inductance detector, light emitting diode (e.g., light sensor), Light-addressable potentiometric sensor, Nichols radiometer, Fiber optic sensor, Optical position sensor, Photo detector, Photodiode, Photomultiplier tubes, Phototransistor, Photoelectric sensor, Photoionization detector, Photomultiplier, Photo resistor, Photo switch, Phototube, Scintillometer, Shack-Hartmann, Single-photon avalanche diode, Superconducting nanowire single-photon detector, Transition edge sensor, Visible light photon counter, or Wave front sensor. The one or more sensors may be connected to a control system (e.g., to a processor, to a computer).

While preferred embodiments of the present invention have been shown, and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein might be employed in practicing the invention. It is therefore contemplated that the invention shall cover any such alternatives, modifications, variations, or equivalents. It is intended that the following claims define the scope of the invention and that methods and structures within the scope of these claims and their equivalents be covered thereby.

What is claimed is:

1. An apparatus for controlling at least one setting of one or more devices at a site, comprising one or more controllers having circuitry, wherein the one or more controllers are configured to:
   operatively couple to a virtual sensor predicting at a first time predicted sensor data of a physical sensor at a second time;
   operatively couple to the physical sensor measuring real sensor data at the second time;
   detect model bias in a model associated with the virtual sensor by determining that a difference between the predicted sensor data and the real sensor data exceeds a difference threshold for a duration of time that exceeds a time threshold; and
   responsive to detecting model bias in the model, alter, or direct alteration of, one or more operations of the virtual sensor based at least in part on the result to generate an altered virtual sensor; and
   control, or direct control of, the at least one setting of the one or more devices based at least in part on the altered virtual sensor.

2. The apparatus of claim 1, wherein the one or more controllers are configured to monitor over a time window a comparison between (i) successively predicted sensor data that are successively predicted after the second time and (ii) successive real sensor data that are successively taken after the second time, to generate successive results.

3. The apparatus of claim 2, wherein alteration of the one or more operations of the virtual sensor is based at least in part on a length of the time window.

4. The apparatus of claim 1, wherein the one or more controllers are configured to send, or direct sending of, a notification based at least in part on the result difference.

5. The apparatus of claim 1, wherein the one or more controllers are configured to utilize, or direct utilization of, data from the virtual sensor and from the physical sensor to control the at least one setting of the one or more devices at the site.

6. The apparatus of claim 1, wherein the one or more devices comprise a tintable window.

7. The apparatus of claim 1, wherein the one or more devices comprise a building management system.

8. The apparatus of claim 1, wherein the one or more controllers are configured to control an environment of the site.

9. A method for controlling at least one setting of one or more devices at a site:
   operatively coupling to a virtual sensor predicting at a first time predicted sensor data of a physical sensor at a second time;
   operatively coupling to the physical sensor measuring real sensor data at the second time;
   detecting model bias in a model associated with the virtual sensor by determining that a difference between the predicted sensor data and the real sensor data exceeds a difference threshold for a duration of time that exceeds a time threshold; and
   responsive to detecting model bias in the model, altering one or more operations of the virtual sensor based at least in part on the result to generate an altered virtual sensor; and
   controlling the at least one setting of the one or more devices based at least in part on the altered virtual sensor.

10. The method of claim 9, further comprising monitoring over a time window a comparison between (i) successively predicted sensor data that are successively predicted after the second time and (ii) successive real sensor data that are successively taken after the second time, to generate successive results.

11. The method of claim 10, wherein alteration of the one or more operations of the virtual sensor is based at least in part on a length of the time window.

12. The method of claim 9, further comprising sending a notification based at least in part on the difference.

13. The method of claim 9, further comprising utilizing data from the virtual sensor and from the physical sensor to control the at least one setting of the one or more devices at the site.

14. The method of claim 9, wherein the one or more devices comprise a tintable window.

15. The method of claim 9, wherein the one or more devices comprise a building management system.

16. The method of claim 9, wherein the one or more controllers are configured to control an environment of the site.

17. A non-transitory processor-readable media storing instructions which, when executed by one or more processors, cause performance of:
   operatively coupling to a virtual sensor predicting at a first time predicted sensor data of a physical sensor at a second time;
   operatively coupling to the physical sensor measuring real sensor data at the second time;
   detecting model bias in a model associated with the virtual sensor by determining that a difference between the predicted sensor data and the real sensor data exceeds a difference threshold for a duration of time that exceeds a time threshold; and
   responsive to detecting model bias in the model, altering one or more operations of the virtual sensor based at least in part on the result to generate an altered virtual sensor; and
   controlling the at least one setting of the one or more devices based at least in part on the altered virtual sensor.

18. The non-transitory processor-readable media of claim 17, wherein the instructions further cause performance of monitoring over a time window a comparison between (i) successively predicted sensor data that are successively predicted after the second time and (ii) successive real sensor data that are successively taken after the second time, to generate successive results.

19. The non-transitory processor-readable media of claim 18, wherein alteration of the one or more operations of the virtual sensor is based at least in part on a length of the time window.

20. The non-transitory processor-readable media of claim 17, wherein the instructions further cause performance of sending a notification based at least in part on the difference.

* * * * *